United States Patent
Mohammadabadi et al.

(10) Patent No.: US 12,549,222 B2
(45) Date of Patent: Feb. 10, 2026

(54) POWER TRANSFER SYSTEM AND METHODS

(71) Applicant: Daanaa Resolution Inc., Vancouver (CA)

(72) Inventors: Soroush Dehghani Mohammadabadi, Vancouver (CA); Mohammadjavad Shariatzadeh, Vancouver (CA); Ehsan Hadizadeh Hafshejani, Vancouver (CA); Ehud Daon, Bowen Island (CA); Alireza Asoodeh, Vancouver (CA)

(73) Assignee: Daanaa Resolution Inc., Vancouver (CA)

( * ) Notice: Subject to any disclaimer, the term of this patent is extended or adjusted under 35 U.S.C. 154(b) by 321 days.

(21) Appl. No.: 18/373,653

(22) Filed: Sep. 27, 2023

(65) Prior Publication Data
US 2024/0128998 A1    Apr. 18, 2024

Related U.S. Application Data

(63) Continuation-in-part of application No. 18/282,155, filed as application No. PCT/IL2023/050992 on Sep.
(Continued)

(51) Int. Cl.
*H04B 5/79* (2024.01)
*H03F 3/54* (2006.01)
(Continued)

(52) U.S. Cl.
CPC ............... *H04B 5/79* (2024.01); *H03F 3/54* (2013.01); *H04B 5/22* (2024.01); *H04B 5/48* (2024.01); *H03F 2200/451* (2013.01)

(58) Field of Classification Search
CPC .... H04B 5/79; H04B 5/48; H04B 5/22; H03F 3/54
See application file for complete search history.

(56) References Cited

U.S. PATENT DOCUMENTS

| | | | |
|---|---|---|---|
| 8,855,554 B2* | 10/2014 | Cook | H02J 50/80 307/104 |
| 11,121,573 B1* | 9/2021 | Oh | H02J 50/90 |

(Continued)

FOREIGN PATENT DOCUMENTS

| | | |
|---|---|---|
| EP | 3032698 A1 | 6/2006 |
| EP | 3939139 A1 | 1/2022 |

(Continued)

OTHER PUBLICATIONS

Japanese Patent Office, Japanese Office Action (2021-552247), corresponding to the subject matter of the present application. Date of Mailing; Dec. 27, 2023.
(Continued)

*Primary Examiner* — David Bilodeau
(74) *Attorney, Agent, or Firm* — Kevin R. Erdman; Brannon Sowers & Cracraft PC

(57) ABSTRACT

A system and associated method transfer power between a DC source and a variable load. Two power signals are extracted from the DC source at HF frequency via two self-synchronous radio frequency rectifiers/amplifiers switched by two corresponding HF switching signals having between them either a frequency difference or a phase difference controlled by a duty cycle and overlap controller. The two HF power signals are mixed in a wired, wireless, or bimodal wireless HF power link system to produce a transferred power signal based on the mixing and on manipulating the phase difference when present. A power signal conversion circuit in communication with the HF power link system produces an unfolded output power signal from the transferred power signal. The system and method allow transfer to the load of at least one of an adjustable DC power signal and an AC power signal phase locked to an existing power signal in the load.

25 Claims, 64 Drawing Sheets

Related U.S. Application Data 13, 2023, and a continuation-in-part of application No. PCT/IB2023/000016, filed on Mar. 15, 2023.

(60) Provisional application No. 63/476,781, filed on Dec. 22, 2022, provisional application No. 63/320,590, filed on Mar. 16, 2022.

(51) Int. Cl.
*H04B 5/22* (2024.01)
*H04B 5/48* (2024.01)

(56) References Cited

U.S. PATENT DOCUMENTS

| | | | |
|---|---|---|---|
| 2002/0060914 A1* | 5/2002 | Porter | E02D 7/26 363/21.01 |
| 2007/0182530 A1* | 8/2007 | Pilz | H01Q 1/2241 152/152.1 |
| 2011/0254377 A1 | 10/2011 | Wildmer et al. | |
| 2011/0292697 A1 | 12/2011 | Alexander | |
| 2012/0098350 A1 | 4/2012 | Campanella et al. | |
| 2013/0300205 A1 | 11/2013 | Tzanidis | |
| 2013/0300210 A1 | 11/2013 | Hosotani | |
| 2014/0267797 A1 | 9/2014 | Clarke et al. | |
| 2015/0073768 A1 | 3/2015 | Kurs et al. | |
| 2017/0063098 A1 | 3/2017 | Jeong et al. | |
| 2017/0093218 A1* | 3/2017 | Hrinya | H02J 7/00034 |
| 2018/0083490 A1* | 3/2018 | Oh | H02M 1/088 |
| 2018/0101188 A1 | 4/2018 | Kurs | |
| 2018/0123398 A1 | 5/2018 | Jha et al. | |
| 2019/0103771 A1* | 4/2019 | Piasecki | H02J 50/10 |

FOREIGN PATENT DOCUMENTS

| | | |
|---|---|---|
| EP | 4214818 A1 | 7/2023 |
| JP | 2014103778 A | 6/2014 |
| JP | 2011010159 A | 9/2014 |
| JP | 2015002621 A | 1/2015 |
| JP | 2016534698 A | 11/2016 |
| JP | 2018207670 A | 12/2018 |
| JP | 2020504442 A | 2/2020 |
| NO | 2022058790 A1 | 3/2022 |
| WO | 2012101907 A1 | 8/2012 |
| WO | 2013042224 A1 | 3/2013 |
| WO | 2015023899 A2 | 2/2015 |
| WO | 2018115990 A1 | 6/2018 |
| WO | 2018115991 A1 | 6/2018 |
| WO | 2020185877 A1 | 9/2020 |

OTHER PUBLICATIONS

European Patent Office Extended European Search Report (EP 20 77 0333), corresponding to the subject matter of the present application. Date of Mailing; Dec. 5, 2022.

Intellectual Proprty Office of Singapor, Singapore Search Report (11202109739W), corresponding to the subject matter of the present application. Date of Mailing; Jun. 7, 2023.

Intellectual Proprty Office of Singapor, Singapore Written Opinion (11202109739W), corresponding to the subject matter of the present application. Date of Mailing; Jun. 7, 2023.

Dehghani et al.: Adjustable Load With Tracking Loop to Improve RF Rectifier Efficiency Under Variable RF Input Power Conditions. IEEE Transactions on Microwave Theory and Techniques. 64(2):343-352 (2016).

PCT/IB2021/000627 International Search Report and Written Opinion dated Feb. 17, 2022.

PCT/US2020/022068 International Preliminary Report on Patentability dated Sep. 23, 2021.

PCT/US2020/022068 International Search Report and Written Opinion dated Jun. 22, 2020.

Canadian Intellectual Intellectual Property Office International Search Report (PCT/1B2023/000167), corresponding to the subject matter of the present application. Date of Mailing; Sep. 14, 2023.

Canadian Intellectual Intellectual Property Office Written Opinion of the International Search Report (PCT/1B2023/000167), corresponding to the subject matter of the present application. Date of Mailing; Sep. 14, 2023.

* cited by examiner

[1000]

[1010]
Providing a transmitter subsystem comprising a power signal tuner module and a transmitter antenna subsystem configured for resonating at the variable resonant power signal oscillation frequency

[1020]
Providing a receiver subsystem comprising a receiver antenna subsystem configured for resonating at the resonant power signal oscillation frequency

[1030]
Providing a power signal from the tuner module to the transmitter antenna subsystem at the power signal oscillation resonant frequency

[1040]
Adjusting the transfer mode ratio by adjusting the power signal from the tuner module to the transmitter antenna subsystem

[1050]
Receiving transferred power in the receiver subsystem at the power signal oscillation resonant frequency via the receiver antenna subsystem at the transfer mode ratio

[1060]
Allowing the resonant power signal oscillation frequency to vary within a predetermined frequency band

[1610] Converting in each of a first plurality of corresponding transmission modules the power from each of the photovoltaic cells in the array into an oscillating electrical power signal having an oscillation frequency

[1620] Transferring the power in each of the transmission modules to a corresponding transmitter resonator from among a second plurality of transmitter resonators each configured to resonate at the oscillation frequency

[1630] Receiving the power in a receiver resonator configured to resonate at the oscillation frequency and disposed to receive the power from the plurality of transmitter resonators via at least one of capacitive coupling and magnetic induction

[1640] Receiving the power in a receiver module in wired electrical communication with the receiver resonator

[1650] Rendering via wired electrical communication to the power load the received power in direct current form

[1710] Converting in each of a first plurality of corresponding transmission modules the power from each of the photovoltaic cells in the array into an oscillating electrical power signal having an oscillation frequency

[1720] Transferring the power from each of the transmission modules to a corresponding transmitter resonator from among a second plurality of transmitter resonators wherein each transmitter resonator is configured to resonate at the oscillation frequency

[1730] Receiving the power from each transmitter resonator in a corresponding receiver resonator configured to resonate at the oscillation frequency, wherein each receiver resonator is further configured and disposed to receive the power from the transmitter resonator via at least one of capacitive coupling and magnetic induction

[1740] Receiving the power from each receiver resonator in a corresponding receiver module in wired electrical communication with the receiver resonator

[1750] Rendering via wired electrical communication to the power load the received power in direct current form

[1810]
Converting in each of a first plurality of corresponding transmission modules the power from each of the photovoltaic cells in the array into an oscillating electrical power signal having an oscillation frequency

[1820]
Transferring the power from each of the transmission modules to a transmitter resonator from among a second plurality of transmitter resonators wherein each transmitter resonator is configured to resonate at the oscillation frequency

[1830]
Receiving the power from each transmitter resonator in any proximate receiver resonator among a third plurality of receiver resonators configured to resonate at the oscillation frequency, wherein each receiver resonator is further configured and disposed to receive the power from the transmitter resonator via at least one of capacitive coupling and magnetic induction

[1840]
Sharing the received power among the third plurality of receiver resonators

[1850]
Rendering via wired electrical communication to the power load the received power in direct current form from one or more of the third plurality of receiver resonators via a corresponding one or more receiver modules.

Providing a bimodal resonant near-field radio frequency power transfer system comprising a plurality of power transmit-receive modules wherein each of the plurality of power transmit-receive modules is in wired communication with a transmitter-receiver resonator disposed to exchange power with at least one other of the plurality of power transmit-receive modules

[2220]

Operating the power transfer system for simultaneous capacitive power transfer and inductive power transfer according to an adjustable transfer mode ratio.

FIG. 31

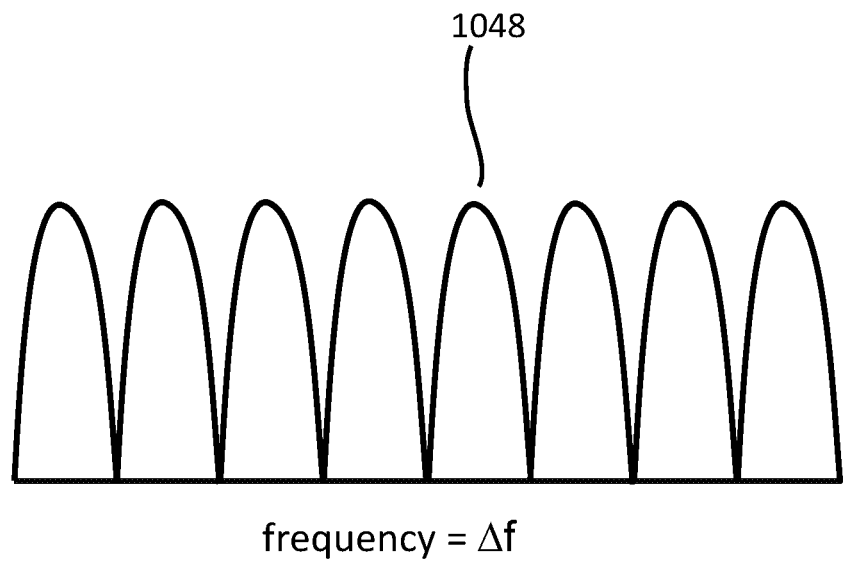
frequency = Δf
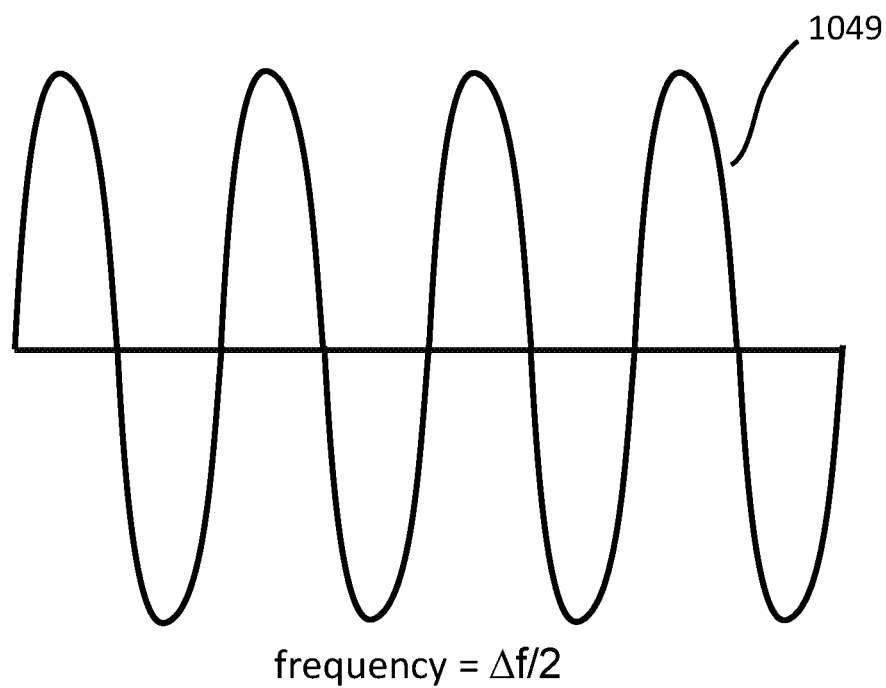
frequency = Δf/2
FIG. 38

POWER TRANSFER SYSTEM AND METHODS

REFERENCE TO RELATED APPLICATIONS

This application is a continuation-in-part of International Patent Application No. PCT/IB2023/000167, filed Mar. 15, 2023, which claims priority to and the benefit of U.S. Application 63/320,590, filed on Mar. 16, 2022, and U.S. Application No. 63/476,781, filed on Dec. 22, 2022; the contents of each of which is incorporated herein by reference in its entirety for all purposes.

FIELD OF THE INVENTION

The invention pertains to power transmitters, receivers and systems and methods of power transfer.

BACKGROUND OF THE INVENTION

In inductive power transfer (IPT), power is typically transferred between coils of wire by a magnetic field. An alternating current (AC) is driven through a transmitter coil to create an oscillating magnetic field. The magnetic field passes through a receiving coil where it induces an alternating current in the receiving coil. The induced alternating current may either drive the load directly, or be rectified to direct current (DC), which is applied to drive the load. In order to achieve high efficiency, the transmitter and receiver coils must be very close together. For example, it is common for transmitter and receiver coils to be separated by only a fraction of the coil diameter (for example, within centimeters) and for the coils' axes to be closely aligned.

In some IPT systems, resonant inductive coupling is employed. Resonant inductive coupling may increase efficiency in IPT by using resonant circuits. Resonant inductive coupling may achieve higher efficiencies at greater distances than non-resonant inductive coupling. In resonant inductive coupling, power is transferred by magnetic fields between two resonant circuits, one in the transmitter and one in the receiver. The two circuits are tuned to resonate at the same resonant frequency.

In some IPT systems, magnetic fields may produce eddy-currents in nearby metals. This may cause significant temperature rise and fire hazard. Ferrite plates may be used to provide shielding and improve inductive coupling but may increase the cost of such systems.

Capacitive power transfer (CPT), makes use of electric fields for the transmission of power between two electrodes, such as metal plates. Commonly, four metal plates are used in a CPT system to form a capacitive coupler. Two plates are used as a power transmitter, and the other two plates act as a power receiver, resulting in at least two coupling capacitors to provide a power flow loop. An alternating voltage is applied by the transmitter to the transmitting plate. The oscillating electric field induces an alternating potential on the receiver plate, which causes an alternating current to flow in the load circuit. Resonance may also be used with capacitive coupling to extend the range of power transfer.

In a CPT system, eddy-current losses may be reduced and the plates used are low-cost and reduce the system cost. However, a problem with many systems is that high voltages may be imposed on the plates. These high voltages may generate strong electric fields, which result in significant field emission to the surrounding area.

There are also issues associated with the capacitive or inductive compensation networks in CPT and IPT systems. Currently, both CPT and IPT systems require minimal separation between receivers and transmitters. This typically requires large capacitors and inductors in the compensation networks on the primary and secondary sides. These large elements are difficult to produce, and their parasitic resistance may dramatically reduce the system efficiency. Additionally, these compensation elements are not directly involved in the power transfer process.

There remains a desire for wireless power transmitters and receivers with fewer components and/or reduced cost. There remains a desire for wireless power transmitters and receivers with reduced reliance on compensation networks. There remains a desire for wireless power transmitters and receivers with greater efficiency. There remains a desire for wireless power transmitters with more flexible requirements for alignment and spacing there between. There remains a need for power transmission systems capable of transferring power in both the forward and reverse directions between loads and sources, including between DC sources and AC grids.

The field of power transfer as pertains to consumer products is becoming ever more important. In the automotive field, the electrical wire harness has become an important and costly subsystem of vehicles. The market for automotive wire harnesses is expected to exceed $77 billion US dollars in the present decade. In an age of focus on the gasoline mileage of internal combustion vehicles, carbon emissions of those vehicles, and electric vehicle range, the cost, weight, and power transfer efficiency of these harnesses have become items of major concern in the design of vehicles. Given that materials and components represent some 57% of automobile manufacturing costs, the concerns may be understood.

While battery technologies are steadily improving to provide higher energy density batteries, the consumer demand is simultaneously increasing for ever more ancillary user electronic devices and electrically driven systems integrated into the vehicle. This places ever greater demands on the batteries, the weight of the vehicle, the costs, and the efficiency of electrical power transfer. During the 1990s higher voltage battery systems were proposed for the automotive industry, partly in the hope of reducing wire harness weight.

There has been much effort to reduce the amount of costly copper employed in wire harnesses and there is a move towards the use of less expensive aluminum. This trend is also promoted by the hope of saving some 40 lbs of weight in a typical automobile. This trend toward aluminum has problems of its own, partly due to the 1.58 times higher resistivity of aluminum as compared with copper. Aluminum also suffers from a phenomenon known as creep that causes connections to loosen. Furthermore, the aluminum also oxidizes, necessitating precautions as regards connections. Some aspects of wire harnesses still require copper, and any connection between copper and aluminum introduces galvanic potential problems.

There is a clear need for an alternative approach to vehicle wire harnesses that reduces the expensive copper content, offers flexibility in respect of voltages, avoids the problems represented by aluminum, and reduces the weight.

At the same time, there is a need for power transfer technology efficiency to be improved to keep track with the rapidly advancing battery technology, in its turn spurred by developments in the field of electric vehicles.

These requirements are not limited to the automotive field and also pertain, for example, to the field of solar energy power transfer and apply, with some modification, also to other consumer home equipment, such as computer and television displays. Power conditioning units to optimally extract power from sources with varying voltage are in extensive use today, but they generally suffer from a limited degree of control facilities. This in turn keeps the power transfer efficiency from being optimized.

The foregoing examples of the related art and limitations related thereto are intended to be illustrative and not exclusive. Other limitations of the related art will become apparent to those of skill in the art upon a reading of the specification and a study of the drawing.

SUMMARY OF THE INVENTION

In a first aspect, a bimodal near-field resonant wireless electrical power transfer system is presented configured for simultaneous capacitive power transfer and inductive power transfer according to an adjustable transfer mode ratio at a resonant power signal oscillation frequency, the system comprising: a transmitter subsystem comprising a transmitter antenna subsystem and a power signal tuner module, the tuner module configured for adjusting the transfer mode ratio by adjusting a power signal provided by the tuner module to the transmitter antenna subsystem; and a receiver subsystem comprising a receiver antenna subsystem configured for receiving electrical power from the transmitter antenna subsystem at the transfer mode ratio.

The tuner module may be configured for adjusting the power signal by adjusting a phase difference between the current and the voltage of the power signal provided to the transmitter antenna subsystem. The transmitter subsystem may further comprise a controller and at least one sensor, wherein the controller is configured for receiving sensor information from the at least one sensor and for automatically providing a tuning instruction to the tuner module based on the sensor information; and the tuner module is configured to adjust according to the tuning instruction the phase difference between the current and the voltage of the power signal provided to the transmitter antenna subsystem.

At least one sensor may be disposed on the transmitter subsystem. In other embodiments, at least one sensor may be disposed on the receiver subsystem and the controller may be configured for wirelessly receiving the sensor information. At least one sensor may be one of a power load sensor; a transmission power sensor; a surrounding object detector; and a distance detector disposed for detecting a distance between the transmitter antenna and the receiver antenna.

The resonant power signal oscillation frequency may be free to vary within a predetermined frequency band. The predetermined frequency band may be an Industrial, Scientific and Medical (ISM) frequency band. The system may be detuned to a degree that allows the resonant power signal oscillation frequency to vary within opposing limits of the predetermined frequency band.

In a further aspect, a wireless method is provided of transferring power bimodally according to an adjustable transfer mode ratio at a resonant power signal oscillation frequency, the method comprising providing a transmitter subsystem comprising a power signal tuner module and a transmitter antenna subsystem configured for resonating at the resonant power signal oscillation frequency; providing a receiver subsystem comprising a receiver antenna subsystem configured for resonating at the resonant power signal oscillation frequency; providing a power signal from the tuner module to the transmitter antenna subsystem at the power signal oscillation resonant frequency; adjusting the transfer mode ratio by adjusting the power signal from the tuner module to the transmitter antenna subsystem; and receiving transferred power in the receiver subsystem at the power signal oscillation resonant frequency via the receiver antenna subsystem at the transfer mode ratio. Adjusting the transfer mode ratio may comprise adjusting a phase difference between the current and the voltage of the power signal provided to the transmitter antenna subsystem.

The providing a transmitter subsystem may further comprise providing a controller and at least one sensor and adjusting the phase difference between the current and the voltage may be done by the tuner module via a command of the controller based on sensor information received by the controller from the at least one sensor. The command of the controller may be automatically issued to the tuner module upon receipt by the controller of the sensor information; and the tuner module may automatically execute the command from the controller to change the phase difference.

The method may further comprise allowing the resonant power signal oscillation frequency to vary within a predetermined frequency band. The predetermined frequency band may be an Industrial, Scientific and Medical (ISM) frequency band. Providing a transmitter subsystem may comprise providing a transmitter subsystem detuned to a degree that allows the resonant power signal oscillation frequency to vary within opposing limits of the predetermined frequency band.

In a further aspect, a bimodal near-field resonant wireless electrical power transfer system is provided, configured for simultaneous capacitive power transfer and inductive power transfer according to an adjustable transfer mode ratio of the capacitive power transfer to the inductive power transfer at a variable resonant power signal oscillation frequency, the system comprising: a transmitter subsystem comprising a transmitter antenna and a power signal tuner module, wherein the power signal tuner module adjusts the transfer mode ratio by adjusting a power signal provided by the power signal tuner module to the transmitter antenna subsystem; and a receiver subsystem comprising a receiver antenna subsystem to receive electrical power from the transmitter antenna at the transfer mode ratio.

The system communicates information between the transmitter antenna subsystem and the receiver antenna subsystem via the transmitter antenna and a receiver antenna of the receiver antenna subsystem. The system may further comprise a modulator for modulating information onto an information bearing signal and providing the information bearing signal to the transmitter antenna subsystem. The system may modulate information onto an information bearing signal and provides the information bearing signal to the transmitter antenna subsystem. The modulator may be arranged to modulate the information bearing signal to the transmitter antenna subsystem according to the information. The power signal tuner module may comprise the modulator.

The information bearing signal may have a frequency different from the variable resonant power signal oscillation frequency. The modulator may modulate the information bearing signal by any one of frequency modulation, amplitude modulation and phase modulation. The information bearing signal may be modulated such that the variable power signal oscillation frequency is a harmonic of a frequency of the information bearing signal. The information bearing signal may be modulated onto a harmonic of the power signal. The signal modulated and provided to the transmitter antenna subsystem may be the power signal.

The modulator may modulate a reflective characteristic of the receiver antenna and transfer the information from the receiver antenna subsystem to the transmitter antenna subsystem by modulating the reflective characteristic of the receiver antenna according to the information. The modulated reflective characteristic of the receiver antenna may be an impedance of the receiver antenna.

The system may transfer the information from the receiver subsystem to the transmitter subsystem by modulating a reflection by the receiver antenna of a signal from the transmitter subsystem. The receiver subsystem may modulate a reflective characteristic of the receiver antenna. The receiver subsystem may modulate an impedance of the receiver antenna.

A power load may be present at an output of the receiver subsystem; and the information may comprise one or more of a presence of the power load, a charge level of the power load, a power transfer efficiency, a charging rate of the power load, a status of the power load, a presence of a voltage over the power load, a charge capacity of the power load, and a remaining time to charge the power load.

The system may communicate digital information between the transmitter subsystem and the receiver subsystem via the transmitter antenna. The system may communicate analog information between the transmitter subsystem and the receiver subsystem via the transmitter antenna. The receiver subsystem may be configured to transmit power to a subsequent receiver subsystem. The receiver may further comprise a rectifier comprising a phase shifter.

In a further aspect, a bimodal resonant near-field radio frequency power transfer system is provided comprising, a plurality of power transmit-receive modules for simultaneous capacitive power transfer and inductive power transfer according to an adjustable transfer mode ratio via a power signal at a power signal frequency, wherein each of the plurality of power transmit-receive modules is in wired communication with a transmitter-receiver resonator disposed to exchange power with at least one other of the plurality of power transmit-receive modules.

A first of the plurality of power transmit-receive modules may comprise a power signal tuner module adjustable for changing the transfer mode ratio by adjusting the power signal provided by the power signal tuner module to a transmitter-receiver resonator in wired communication with the first of the plurality of power transmit-receive modules. At least one of the plurality of power transmit-receive modules may comprise a modulator arranged to modulate information onto a radio frequency signal exchanged between an associated transmitter-receiver resonator in wired communication with the at least one of the plurality power transmit-receive modules and a transmitter-receiver resonator in wired communication with any other of the plurality of power transmit-receive modules.

The modulator may be any one of an amplitude modulator, a frequency modulator, and a phase modulator. The information may comprise one or both of digital information and analog information. The radio frequency signal modulated by the modulator may be the power signal. The radio frequency signal modulated by the modulator may have a frequency different from the power signal frequency. The radio frequency signal modulated by the modulator may have a frequency that is a harmonic of the power signal frequency. The power signal frequency may be a harmonic of the frequency of the signal modulated.

The modulator may be arranged to modulate according to the information a reflective characteristic of the associated wire-connected transmitter-receiver resonator to impose the information on a signal reflected by the wire-connected transmitter-receiver resonator. The modulator may be arranged to modulate according to the information a signal provided to the associated transmitter-receiver resonator. The power signal tuner module of the first of the plurality of power transmit-receive modules may comprise the modulator. Each of the power transmit-receive modules may comprise a compensation network and the compensation network may comprise the modulator. At least one of the power transmit-receive modules may comprise a radio frequency oscillator providing a signal at the power signal frequency to the at least one power transmit-receive module and the radio frequency oscillator may comprise the modulator.

Each of the plurality of power transmit-receive modules may be reconfigurable between a power transmitter mode and a power receiver mode. Each of the power transmit-receive modules may comprise a differential self-synchronous radio frequency power amplifier/rectifier capable of reconfiguring between an amplifier condition and a rectifier condition corresponding respectively to the power transmitter mode and the power receiver mode of the power transmit-receive module. The differential self-synchronous radio frequency power amplifier/rectifiers may be differential switched-mode self-synchronous radio frequency power amplifier/rectifiers. Each of the power transmit-receive modules may comprise a controller and the reconfiguring may be controlled by the controller. Each differential self-synchronous radio frequency power amplifier/rectifier may comprise a phase shifter adjustable by the controller for reconfiguring the differential self-synchronous radio frequency power amplifier/rectifier between the amplifier condition and the rectifier condition.

When a power load is present at an output of one of the plurality of power transmit-receive modules in the receiver mode, the information may comprise one or more of a presence of the power load, a charge level of the power load, a power transfer efficiency, a charging rate of the power load, a status of the power load, a presence of a voltage over the power load, a charge capacity of the power load, and a remaining time to charge the power load.

In a further aspect, a near-field radio frequency method is provided for transferring power via a power signal at a power signal frequency, the method comprising: providing a bimodal resonant near-field radio frequency power transfer system comprising a plurality of power transmit-receive modules wherein each of the plurality of power transmit-receive modules is in wired communication with a transmitter-receiver resonator disposed to exchange power with at least one other of the plurality of power transmit-receive modules; and operating the power transfer system for simultaneous capacitive power transfer and inductive power transfer according to an adjustable transfer mode ratio.

A first of the plurality of power transmit-receive modules provided may comprise a power signal tuner module; and operating the power transfer system may comprise changing the transfer mode ratio by adjusting the power signal tuner module. Providing the power transfer system may comprise providing among the plurality of power transmit-receive modules at least one power transmit-receive module in wired communication with an associated transmitter-receiver resonator and having a modulator, and operating the power transfer system may comprise: exchanging a radio frequency signal between the associated transmitter-receiver resonator and a transmitter-receiver resonator in wired communication with at least one other of the plurality of power transmit-receive modules; and modulating information onto the exchanged radio frequency signal. When a power load is present at an output of one of the plurality of power transmit-receive modules, the information may comprise, for example without limitation, one or more of a presence of the power load, a charge level of the power load, a power transfer efficiency, a charging rate of the power load, a status of the power load, a presence of a voltage over the power load, a charge capacity of the power load, and a remaining time to charge the power load.

The information may be modulated onto the exchanged radio frequency signal by amplitude modulation, frequency modulation, or phase modulation. Modulating the information onto the exchanged radio frequency signal may comprise modulating digital information or analog information onto the exchanged radio frequency signal.

Modulating the information onto the exchanged radio frequency signal may comprise modulating the information onto the power signal. Modulating the information onto the exchanged radio frequency signal may comprise modulating the information onto a signal with a frequency different from the power signal frequency. Modulating the information onto the exchanged radio frequency signal may comprise modulating the information onto a signal with a frequency that is a harmonic of the power signal frequency. Modulating the information onto the exchanged radio frequency signal may comprise modulating the information onto a signal that has the power signal frequency as a harmonic.

Modulating the information onto the exchanged radio frequency signal may comprise modulating according to the information a reflective characteristic of the associated wire-connected transmitter-receiver resonator to impose the information on a signal reflected by the wire-connected transmitter-receiver resonator. Modulating the information onto the exchanged radio frequency signal may comprise modulating according to the information a signal provided to the associated transmitter-receiver resonator.

The method may comprise operating the power signal tuner module of the first of the plurality of power transmit-receive modules to modulate the information onto the exchanged radio frequency signal. Each of the power transmit-receive modules provided may comprise a compensation network and the compensation network may comprise the modulator, allowing the compensation network to be operated to modulate the information onto the exchanged radio frequency signal. A least one of the power transmit-receive modules may comprise a radio frequency oscillator providing a signal at the power signal frequency to the at least one power transmit-receive module, and the radio frequency oscillator may comprise the modulator; allowing the information to be modulated onto the exchanged radio frequency signal in the oscillator.

Each of the plurality of power transmit-receive modules provided may be reconfigurable between a power transmitter mode and a power receiver mode; and the method may further comprise reconfiguring at least two of the plurality of power transmit-receive modules between a power transmitter mode and a power receiver mode to reverse a direction of power transmission between the at least two transmit-receive modules. Each of the power transmit-receive modules provided may comprise a differential self-synchronous radio frequency power amplifier/rectifier capable of reconfiguring between an amplifier condition and a rectifier condition corresponding respectively to the power transmitter mode and the power receiver mode of the power transmit-receive module; and the method may comprise reconfiguring the differential self-synchronous radio frequency power amplifiers/rectifiers of the at least two transmit-receive modules between the amplifier condition and the rectifier condition. Each differential self-synchronous radio frequency power amplifier/rectifier may comprise a phase shifter adjustable for reconfiguring the differential self-synchronous radio frequency power amplifier/rectifier between the amplifier condition and the rectifier condition; and the method may comprise adjusting a phase shifter of each of the differential self-synchronous radio frequency power amplifiers/rectifiers of the at least two transmit-receive modules.

In a further aspect, a near-field resonant wireless electrical power transfer system is provided comprising: a transmission subsystem comprising a plurality of substantially mutually decoupled transmitter resonators and corresponding transmitter modules in power signal communication with each transmitter resonator, each transmitter module comprising a transmission controller and a power signal source having a power signal oscillation frequency and a power signal phase, each power signal source controlled by the corresponding transmission controller; one or more receiver subsystems each comprising a corresponding receiver resonator; a software lookup table of discrete allowed power signal oscillation frequencies for the power signal sources; and software which when loaded in a memory and executed by the controller of any of the transmitter modules performs the actions of: measuring one of an input impedance of the corresponding transmitter resonator and a test signal power draw by the corresponding transmitter resonator; and selecting for the corresponding power signal source a frequency from the lookup table based on one of the input impedance of the corresponding transmitter resonator and the test signal power draw by the corresponding transmitter resonator. The software when executed may perform the actions of measuring a level of power transferred by the corresponding transmitter resonator while adjusting a phase of a power signal from the corresponding power signal source. The transmitter resonators may be substantially mutually decoupled by a grounded shield grid.

In a further aspect, a wireless near-field method for transferring power at a variable resonant power signal oscillation frequency from a multi-transmitter subsystem to a single resonant receiver subsystem is provided, the method comprising: providing the multi-transmitter subsystem comprising a plurality of mutually independent transmitter resonators each driven by a corresponding transmitter module capable of being set independently to one of a plurality of preset power signal oscillation frequencies in a preset frequency band, wherein all the transmitter resonators have a common transmission surface; disposing proximate the common transmission surface a resonant receiver subsystem comprising a single receiver resonator overlapping two or more of the transmitter resonators; measuring one of an input impedance of each of the transmitter resonators and a power drawn from a test signal by of each of the transmitter resonators; setting to one of an off state and an active state a power signal to each of the plurality of mutually independent transmitter resonators based on one of the corresponding measured resonator input impedances and the power drawn from a test signal by the corresponding transmitter resonators; selecting a power signal oscillation frequency for each active transmitter resonator from among the plurality of preset power oscillation frequencies on the basis of the measured input impedance of the active transmitter resonator; and setting the power signal of each active transmitter resonator to the corresponding selected frequency. The method may further comprise adjusting a phase of the power signal applied to each corresponding transmitter resonator to a phase at which power transfer through the transmitter resonator is substantially maximal.

In a further aspect, a wireless near-field method for transferring power at a variable resonant power signal oscillation frequency from a multi-transmitter subsystem to two or more receiver subsystems is provided, the method comprising: providing the multi-transmitter subsystem comprising a plurality of mutually independent transmitter resonators each driven by a corresponding transmitter module capable of being set independently to one of a plurality of preset power signal oscillation frequencies in a preset frequency band, wherein all the transmitter resonators have a common transmission surface; disposing proximate the common transmission surface the two or more resonant receiver subsystems each comprising a single receiver resonator overlapping two or more of the transmitter resonators; measuring one of an input impedance of each of the transmitter resonators and a power drawn from a test signal by of each of the transmitter resonators; setting to one of an off state and an active state a power signal to each of the plurality of mutually independent transmitter resonators based on one of the corresponding measured resonator input impedances and the power drawn from a test signal by the corresponding transmitter resonators; selecting a power signal oscillation frequency for each active transmitter resonator from among the plurality of preset power oscillation frequencies on the basis of the measured input impedance of the active transmitter resonator; and setting the power signal of each active transmitter resonator to the corresponding selected frequency. The method may further comprise adjusting a phase of the power signal applied to each corresponding transmitter resonator to a phase at which power transfer through the transmitter resonator is substantially maximal.

In a further aspect, a near-field wireless system is provided for transferring power from a photovoltaic cell to a power load, the system comprising: a transmission module in wired electrical communication with the photovoltaic cell, the transmission module configured to convert the power from the photovoltaic cell into an oscillating electrical power signal having an oscillation frequency; a transmitter resonator in wired electrical communication with the transmission module and configured to resonate at the oscillation frequency; a receiver resonator configured to resonate at the oscillation frequency and disposed to receive power from the transmitter resonator via at least one of capacitive coupling and magnetic induction; and a receiver module in wired electrical communication with the receiver resonator, the receiver module configured to receive power from the receiver resonator and to render via wired electrical communication to the power load the received power in direct current form.

The transmission module may comprise a power amplifier configured to modulate the power received from the photovoltaic cell at the oscillation frequency. The transmission module may comprise an oscillator configured to provide the oscillation frequency to the power amplifier. The transmission module may comprise a controller and one or more sensors, the controller configured to vary the oscillation frequency based on first information from at least one of the one or more sensors. The transmission module may comprise a transmission tuning network configured to change under control of the controller at least a phase of the power provided by the transmission module to the transmitter resonator based on second information from at least one of the one or more sensors.

The system may comprise a power conditioning unit electrically connected between the photovoltaic cell and the transmission module and configured to adapt the power from the photovoltaic cell to a format compatible with the transmission module. The transmission module may comprise small signal electronic circuitry and the power conditioning unit may be further configured for providing power to the small signal electronic circuitry. The transmitter resonator may be disposed on a surface of the photovoltaic cell opposing an active solar radiation receiving surface of the cell. The transmitter resonator has a surface area that has an extent that is at least a major fraction of the extent of the active solar radiation receiving surface of the cell.

The transmitter resonator may have a planar area that is smaller than a planar area of the receiver resonator. The receiver resonator may be disposed and configured to receive power from further transmitter resonators via at least one of capacitive coupling and magnetic induction at the resonance frequency.

In a further embodiment of a near-field wireless system for transferring power from an array of photovoltaic cells to a power load, the system comprises: a first plurality of transmission modules, each transmission module in wired electrical communication with a corresponding photovoltaic cell in the array, each transmission module configured to convert the power from the corresponding photovoltaic cell into an oscillating electrical power signal having an oscillation frequency; a second plurality of transmitter resonators, each transmission resonator in wired electrical communication with a corresponding transmission module from the first plurality of transmission modules and configured to resonate at the oscillation frequency; a single receiver resonator configured to resonate at the oscillation frequency and disposed to receive power from the plurality of transmitter resonators via at least one of capacitive coupling and magnetic induction; and a receiver module in wired electrical communication with the receiver resonator, the receiver module configured to receive power from the receiver resonator and to render via wired electrical communication to the power load the received power in direct current form.

Each transmission module from among the first plurality of transmission modules may comprise a power amplifier configured to modulate the power received from the corresponding photovoltaic cell at the oscillation frequency. Each transmission module from among the first plurality of transmission modules may comprise an oscillator configured to provide the oscillation frequency to the corresponding power amplifier. Each transmission module from among the first plurality of transmission modules may further comprise a controller and one or more sensors, the controller configured to vary the oscillation frequency based on first information from at least one of the one or more sensors. Each transmission module from among the first plurality of transmission modules may comprise a transmission tuning network configured to change under control of the corresponding controller at least a phase of the power provided by the transmission module to the corresponding transmitter resonator based on second information from at least one of the one or more sensors.

The system may comprise a third plurality of power conditioning units, each power conditioning unit from among the third plurality of power conditioning units electrically connected between the corresponding photovoltaic cell and the corresponding transmission module and configured to adapt the power from the corresponding photovoltaic cell to a format compatible with the corresponding transmission module. Each transmission module from among the first plurality of transmission modules may comprise small signal electronic circuitry and the corresponding power conditioning unit may be further configured for providing power to the small signal electronic circuitry. Each transmitter resonator from among the second plurality of transmitter resonators may be disposed on a surface of the corresponding photovoltaic cell opposing an active solar radiation receiving surface of the cell.

In a further embodiment of a near-field wireless system for transferring power from an array of photovoltaic cells to a power load, the system comprises: a first plurality of transmission modules, each transmission module in wired electrical communication with a corresponding photovoltaic cell in the array, each transmission module configured to convert the power from the corresponding photovoltaic cell into an oscillating electrical power signal having an oscillation frequency; a second plurality of transmitter resonators, each transmission resonator in wired electrical communication with a corresponding transmission module from the first plurality of transmission modules and configured to resonate at the oscillation frequency; a third plurality of receiver resonators configured to resonate at the oscillation frequency, each receiver resonator from among the third plurality of receiver resonators disposed to receive power from a corresponding transmitter resonator from among the second plurality of transmitter resonators via at least one of capacitive coupling and magnetic induction; and a fourth plurality of receiver modules, each receiver module in wired electrical communication with a corresponding receiver resonator from among the third plurality of receiver resonators, the receiver module configured to receive power from the corresponding receiver resonator and to render via wired electrical communication to the power load the received power in direct current form.

Each transmission module from among the first plurality of transmission modules may comprise a power amplifier configured to modulate the power received from the corresponding photovoltaic cell at the oscillation frequency. Each transmission module from among the first plurality of transmission modules may comprise an oscillator configured to provide the oscillation frequency to the corresponding power amplifier. Each transmission module from among the first plurality of transmission modules may further comprise a controller and one or more sensors, the controller configured to vary the oscillation frequency based on first information from at least one of the one or more sensors. Each transmission module from among the first plurality of transmission modules may comprise a transmission tuning network configured to change under control of the corresponding controller at least a phase of the power provided by the transmission module to the corresponding transmitter resonator based on second information from at least one of the one or more sensors.

The system may further comprise a fifth plurality of power conditioning units, each power conditioning unit from among the fifth plurality of power conditioning units electrically connected between the corresponding photovoltaic cell from among the array of solar cells and the corresponding transmission module from among the first plurality of transmission modules and configured to adapt the power from the corresponding photovoltaic cell to a format compatible with the corresponding transmission module. Each transmission module from among the first plurality of transmission modules may comprise small signal electronic circuitry and the corresponding power conditioning unit from among the fifth plurality of power conditioning units may be further configured for providing power to the small signal electronic circuitry. Each transmitter resonator from among the second plurality of transmitter resonators may be disposed on a surface of the corresponding photovoltaic cell from among the array of photovoltaic cells opposing an active solar radiation receiving surface of the cell.

In a further embodiment a near-field wireless system is presented for transferring power from an array of photovoltaic cells to a power load, the system comprising: a first plurality of transmission modules, each transmission module in wired electrical communication with a corresponding photovoltaic cell in the array, each transmission module configured to convert the power from the corresponding photovoltaic cell into an oscillating electrical power signal having an oscillation frequency; a second plurality of transmitter resonators, each transmission resonator in wired electrical communication with a corresponding transmission module from the first plurality of transmission modules and configured to resonate at the oscillation frequency; a third plurality of receiver resonators fewer in number than the plurality of transmitter resonators and configured to resonate at the oscillation frequency, each receiver resonator from among the third plurality of receiver resonators disposed to receive power from a portion of the plurality of transmitter resonators via at least one of capacitive coupling and magnetic induction; and a fourth plurality of receiver modules, each receiver module in wired electrical communication with a corresponding receiver resonator, the receiver module configured to receive power from the corresponding receiver resonator and to render via wired electrical communication to the power load the received power in direct current form.

Each transmission module from among the first plurality of transmission modules may comprise a power amplifier configured to modulate the power received from the corresponding photovoltaic cell at the oscillation frequency. Each transmission module from among the first plurality of transmission modules may comprise an oscillator configured to provide the oscillation frequency to the corresponding power amplifier. Each transmission module from among the first plurality of transmission modules may further comprise a controller and one or more sensors, the controller configured to vary the oscillation frequency based on first information from at least one of the one or more sensors. Each transmission module from among the first plurality of transmission modules may comprise a transmission tuning network configured to change under control of the corresponding controller at least a phase of the power provided by the transmission module to the corresponding transmitter resonator based on second information from at least one of the one or more sensors.

The system may comprise fifth plurality of power conditioning units, each power conditioning unit from among the fifth plurality of power conditioning units electrically connected between the corresponding photovoltaic cell from among the array of solar cells and the corresponding transmission module from among the first plurality of transmission modules and configured to adapt the power from the corresponding photovoltaic cell to a format compatible with the corresponding transmission module. Each transmission module from among the first plurality of transmission modules may comprise small signal electronic circuitry and the corresponding power conditioning unit from among the fifth plurality of power conditioning units may be further configured for providing power to the small signal electronic circuitry. Each transmitter resonator from among the second plurality of transmitter resonators may be disposed on a surface of the corresponding photovoltaic cell from among the array of photovoltaic cells opposing an active solar radiation receiving surface of the cell.

In a further aspect a method is provided for transferring power from a photovoltaic cell to a power load, the method comprising: converting in a transmission module the power from the photovoltaic cell into an oscillating electrical power signal having an oscillation frequency; transferring the power to a transmitter resonator in wired electrical communication with the transmission module and configured to resonate at the oscillation frequency; receiving power in a receiver resonator configured to resonate at the oscillation frequency and disposed to receive the power from the transmitter resonator via at least one of capacitive coupling and magnetic induction; receiving the power in a receiver module in wired electrical communication with the receiver resonator; and rendering via wired electrical communication to the power load the received power in direct current form.

In a further embodiment of a method for transferring power from an array of photovoltaic cells to a power load, the method comprises: converting in each of a first plurality of corresponding transmission modules the power from each of the photovoltaic cells in the array into an oscillating electrical power signal having an oscillation frequency; transferring the power in each of the transmission modules to a corresponding transmitter resonator from among a second plurality of transmitter resonators each configured to resonate at the oscillation frequency; receiving the power in a receiver resonator configured to resonate at the oscillation frequency and disposed to receive the power from the plurality of transmitter resonators via at least one of capacitive coupling and magnetic induction; receiving the power in a receiver module in wired electrical communication with the receiver resonator; and rendering via wired electrical communication to the power load the received power in direct current form.

In a further embodiment of a method for transferring power from an array of photovoltaic cells to a power load, the method comprises: converting in each of a first plurality of corresponding transmission modules the power from each of the photovoltaic cells in the array into an oscillating electrical power signal having an oscillation frequency; transferring the power from each of the transmission modules to a corresponding transmitter resonator from among a second plurality of transmitter resonators wherein each transmitter resonator is configured to resonate at the oscillation frequency; receiving the power from each transmitter resonator in a corresponding receiver resonator configured to resonate at the oscillation frequency, wherein each receiver resonator is further configured and disposed to receive the power from the transmitter resonator via at least one of capacitive coupling and magnetic induction; receiving the power from each receiver resonator in a corresponding receiver module in wired electrical communication with the receiver resonator; and rendering via wired electrical communication to the power load the received power in direct current form.

In a further embodiment of a method for transferring power from an array photovoltaic cells to a power load, the method comprises: converting in each of a first plurality of corresponding transmission modules the power from each of the photovoltaic cells in the array into an oscillating electrical power signal having an oscillation frequency; transferring the power from each of the transmission modules to a transmitter resonator from among a second plurality of transmitter resonators wherein each transmitter resonator is configured to resonate at the oscillation frequency; receiving the power from each transmitter resonator in any proximate receiver resonator among a third plurality of receiver resonators configured to resonate at the oscillation frequency, wherein each receiver resonator is further configured and disposed to receive the power from the transmitter resonator via at least one of capacitive coupling and magnetic induction; sharing the received power among the third plurality of receiver resonators; and rendering via wired electrical communication to the power load the received power in direct current form from one or more of the third plurality of receiver resonators via a corresponding one or more receiver modules. The method may further comprise converting a voltage and a current of the power from each photovoltaic cell to a voltage and a current adapted to the corresponding transmission module before converting the power into an oscillating electrical power signal.

An electrical power transfer system is provided for supplying power from a direct current source to a power load, the system comprising: a radio frequency power amplifier in wired electrical communication with the power source and configured to convert direct current voltage from the source into an alternating voltage signal having an oscillation frequency; an adjustable phase radio frequency rectifier in wired electrical contact with the power load and in radio frequency communication with the power amplifier; the rectifier configured to receive power transferred from the amplifier; and a receiver controller in communication with the rectifier, the receiver controller configured for adjusting an efficiency of power transfer from the amplifier to the rectifier by adjusting a current-voltage phase characteristic of the rectifier. The rectifier may be a differential self-synchronous radio frequency rectifier.

The receiver controller may be configured for automatically adjusting the current-voltage phase characteristic of the rectifier. The power transfer system may further comprise a load management system in wired communication with the load and power signal-wise disposed between the load and the rectifier, the load management system configured for increasing an efficiency of the power transfer by adjusting an input impedance of the rectifier. The load management system may be configured for automatically adjusting the current-voltage phase characteristic of the rectifier.

The power transfer system may further comprise a transmitter controller in communication with the amplifier, the transmitter controller configured increasing an efficiency of the power transfer by adjusting a current-voltage phase characteristic of the amplifier. The transmitter controller may be configured to automatically adjust the current-voltage phase characteristic of the amplifier to increase the efficiency of the power transfer.

The power transfer system may further comprise an oscillator in communication with the amplifier and the transmitter controller. The transmitter controller may be configured for adjusting the oscillation frequency via the oscillator.

The power amplifier may be in directly wired radio frequency communication with the adjustable phase radio frequency rectifier. The power amplifier may be in wireless near-field radio frequency communication with the adjustable phase radio frequency rectifier. The power transfer system may comprise a transmitter resonator in wired radio frequency communication with the power amplifier and a receiver resonator in wired radio frequency communication with the rectifier. The transmitter resonator and receiver resonator may be in wireless near-field radio frequency communication with each other. The power amplifier may be in at least one of capacitive near-field wireless and inductive near-field wireless radio frequency communication with the rectifier. The power amplifier may be in bimodal near-field wireless radio frequency communication with the rectifier.

The direct current source may comprise a rechargeable battery and the load may comprise an electric motor. The load may comprise a computer monitor. A resonant structure of the system may comprise at least one electrically conductive mechanical load bearing structural component of the system.

The system may further comprise a power conditioning unit electrically disposed between the source and the power transfer system, the power conditioning unit configured for adjusting at least one of a current and a voltage from the source to improve the efficiency of the power transfer.

A method is further provided for power transfer from a direct current power source to a power load, the method comprising: providing a power transfer system in wired electrical communication with the power source, the power transfer system comprising a radio frequency power amplifier in radio frequency communication with an adjustable phase radio frequency rectifier in wired electrical contact with the power load; converting the power from the direct current source into a radio frequency oscillating power signal in the amplifier; converting the radio frequency oscillating power signal to direct current power signal in the rectifier; and adjusting an efficiency of the power transfer by adjusting a current-voltage phase characteristic of the rectifier. Providing the adjustable phase radio frequency rectifier may comprise providing a differential self-synchronous radio frequency rectifier.

The method may further comprise adjusting the efficiency of the power transfer by adjusting a direct current equivalent input resistance of the amplifier. Providing the power transfer system may comprise providing a load management system in wired communication between the rectifier and the load. Adjusting the direct current equivalent input resistance of the amplifier may comprise adjusting an input impedance of the rectifier by adjusting the load management system. Adjusting the load management system may comprise automatically adjusting the load management system.

The method may further comprise adjusting the efficiency of the power transfer by adjusting a current-voltage phase characteristic of the power amplifier. The providing the power transfer system may comprise providing a transmitter controller in communication with the power amplifier for controlling the power amplifier. Adjusting the current-voltage phase characteristic of the power amplifier may be performed by the transmitter controller. Adjusting the current-voltage phase characteristic of the power amplifier may be performed automatically by the transmitter controller.

The method may further comprise adjusting the efficiency of the power transfer by changing an oscillation frequency of the power amplifier.

Providing a power transfer system may comprise providing a receiver controller in communication with the rectifier for controlling the rectifier. Adjusting the current-voltage phase characteristic of the rectifier may be performed by the receiver controller. Adjusting the current-voltage phase characteristic of the rectifier may performed automatically by the receiver controller.

Providing the power transfer system may comprise providing the power amplifier in directly wired radio frequency communication with adjustable phase radio frequency rectifier. Providing the power transfer system may comprise providing the power amplifier in wireless near-field radio frequency communication with the adjustable phase radio frequency rectifier.

Providing the power transfer system may comprise providing a transmitter resonator in wired radio frequency communication with the power amplifier and a receiver resonator in wired radio frequency communication with the radio frequency rectifier. The method may further comprise operating the transmitter resonator and receiver resonator in wireless near-field radio frequency communication with each other. Providing the power transfer system may comprise providing the power amplifier in at least one of capacitive near-field wireless and inductive near-field wireless radio frequency communication with the rectifier. Providing the power transfer system may comprise providing the power amplifier in bimodal wireless near-field communication with the rectifier.

The method may further comprise: providing a power conditioning unit electrically disposed between the power source and the power transfer system; and adjusting the power conditioning unit to adjust at least one of a current and a voltage from the source to improve the efficiency of the power transfer.

A method is further provided for transferring power from a direct current power source to a power load, the method comprising: providing a power transfer system in wired electrical communication with the power source, the power transfer system comprising: an oscillator capable of oscillating at an oscillation frequency; a power amplifier and a transmitter tuning network both under control of a transmitter controller; and a receiver tuning network and a load management system both under control of a receiver controller, the load management system being in wired electrical communication with the power load; converting in the power amplifier the power from the power source into an oscillating electrical power signal having the oscillation frequency; transferring under control of the transmitter controller the power signal from the power amplifier to the load management system via the transmitter tuning network and the receiver tuning network; adjusting at least one of the oscillation frequency, an input DC equivalent resistance of the power amplifier, the transmitter tuning network, the receiver tuning network, and the load management system to change a rate of power transfer; and rendering in direct current form via wired electrical communication to the power load the power received by the load management system.

Transferring the power signal via the transmitter tuning network and the receiver tuning network may comprise transferring power by wired communication. Transferring the power signal via the transmitter tuning network and the receiver tuning network may comprise transferring power by wireless communication. Transferring power by wireless communication may comprise transferring power by near-field wireless communication. Transferring power by near-field wireless communication may comprise transferring power by at least one of capacitive and inductive coupling.

Transferring power from a direct current power source may comprise transferring power from at least one solar cell. Transferring power from a direct current power source may comprise transferring power from at least one solar cell battery. Transferring power from a direct current power source may comprise transferring power from a power source with varying voltage.

In another embodiment, an electrically powered system comprises: a mechanical load bearing structure having a first portion that is electrically conductive; an electrical power load; and an electrical power transfer system comprising at least one radio frequency resonator configured for near-field wireless power transfer, wherein the resonator comprises at least in part the electrically conductive first portion. The electrically powered system may further comprise a rechargeable battery and the electrical power load may comprise an electric motor. The electrically powered system may be an electric vehicle and the mechanical load bearing structure may comprise a chassis of the vehicle. The electrically powered system may be a display monitor and the mechanical load bearing structure may be at least one of a frame and a base of the monitor.

The electrically powered system may further comprise a power source. The electrical power transfer system may comprise: a radio frequency power amplifier in wired electrical communication with the power source and configured to convert direct current voltage from the source into an alternating voltage signal having an oscillation frequency; an adjustable phase radio frequency rectifier in wired electrical contact with the power load and in radio frequency communication with the power amplifier; the rectifier configured to receive power transferred from the amplifier; and a receiver controller in communication with the rectifier, the receiver controller configured for adjusting an efficiency of power transfer from the amplifier to the rectifier by adjusting a current-voltage phase characteristic of the rectifier.

In another embodiment, an apparatus comprises: a mechanical load bearing structure having a first portion that is electrically conductive; an electrical power source; an electrical power load; and an electrical power transfer system comprising: a radio frequency power amplifier in wired electrical communication with the power source and configured to convert direct current voltage from the source into an alternating voltage signal having an oscillation frequency; an adjustable phase radio frequency rectifier in wired electrical contact with the power load and in radio frequency communication with the power amplifier; the rectifier configured to receive power transferred from the amplifier; and a receiver controller in communication with the rectifier, the receiver controller configured for adjusting an efficiency of power transfer from the amplifier to the rectifier by adjusting a current-voltage phase characteristic of the rectifier; wherein the electrically conductive first portion is disposed to carry a radio frequency signal at least one of from the amplifier and to the rectifier.

The apparatus may further comprise a load management system in wired communication with the load and power signal-wise disposed between the load and the rectifier, the load management system configured for increasing an efficiency of the power transfer by adjusting an input impedance of the rectifier. The apparatus may further comprise a transmitter controller in communication with the amplifier, the transmitter controller configured for increasing efficiency of the power transfer by adjusting a current-voltage phase characteristic of the amplifier. The apparatus may further comprise an oscillator in communication with the amplifier and the transmitter controller, wherein the transmitter controller is configured for adjusting the oscillation frequency via the oscillator.

The power amplifier may be in directly wired radio frequency communication with the rectifier via the electrically conductive first portion. The power amplifier may be in wireless near-field radio frequency communication with the rectifier. The power transfer system may comprise a transmitter resonator in wired radio frequency communication with the power amplifier and a receiver resonator in wired radio frequency communication with the rectifier and one of the transmitter resonator and the receiver resonator may comprise the electrically conductive first portion. The transmitter resonator and receiver resonator may be in wireless near-field radio frequency communication with each other. The power amplifier may be in at least one of capacitive near-field wireless and inductive near-field wireless radio frequency communication with the rectifier. The power amplifier may be in bimodal near-field wireless radio frequency communication with the rectifier. The direct current source may comprise a rechargeable battery and the load may comprise an electric motor.

In some embodiments, a sealed bidirectional power transfer circuit device comprises a plurality of terminals disposed for communicating electrically with devices external to the sealed device, the sealed device comprising within a sealed interior: a multiterminal power switching device having at least one DC terminal, at least one AC terminal, and at least one control terminal, the multiterminal power switching device adjustable between an amplifying condition and a rectifying condition, and arranged for: bidirectionally communicating, via the at least one DC terminal, a DC voltage and a DC current and bidirectionally communicating, via the at least one AC terminal, a radio frequency power signal having an amplitude, a frequency, and a phase; in wired data communication with a controller a phase, frequency, and duty cycle adjustment circuit in wired electrical communication with the power switching device via the at least one control terminal, the controller arranged for: establishing at the at least one control terminal of the power switching device a radio frequency oscillating signal having the frequency and the phase of the radio frequency power signal; and adjusting the power switching device between the amplifying condition and the rectifying condition by adjusting under instruction of the controller the phase of the radio frequency oscillating signal. In some embodiments, the controller may be disposed within the sealed interior of the sealed bidirectional power transfer circuit device. The plurality of terminals of the sealed power transfer circuit device may include terminals for data communication between the controller and devices exterior to the sealed interior.

The radio frequency power signal may have a duty cycle and the phase, frequency, and duty cycle adjustment circuit may be further arranged for adjusting the duty cycle of the radio frequency power signal by adjusting a duty cycle of the radio frequency oscillating signal. The phase, frequency, and duty cycle adjustment circuit may comprise a radio frequency oscillator for producing under instruction from the controller the radio frequency oscillating signal.

The sealed power transfer circuit device may further comprise, within the sealed interior in wired data communication with the controller, a tuning network in wired electrical communication with the power switching device via the at least one AC terminal, the tuning network arranged for adjusting under instruction from the controller the radio frequency power signal to a tuned radio frequency power signal. The bidirectional power transfer circuit device may comprise a modulator configured for modulating information onto the radio frequency power signal. The modulator may comprise the tuning network. The modulator may be configured for modulating the radio frequency power signal with information provided by the controller. The tuning network may comprise a harmonic termination network circuit arranged for suppressing harmonics of the radio frequency oscillating signal in the radio frequency power signal. The harmonic termination network may comprise one or more inductors and one or more of a first harmonic termination, a second harmonic termination, and a third harmonic termination. The sealed power transfer circuit device may further comprise within the sealed interior in wired data communication with the controller an amplitude/ frequency/phase detector disposed in wired electrical communication with the tuning network and arranged to determine an amplitude, a frequency and a phase of any radio frequency power signal communicated between the tuning network and an AC load/source external to the sealed device. The tuning network may further comprise one or more of a compensation network, a matching network, and a filter.

The phase, frequency, and duty cycle adjustment circuit may be arranged to receive instructions from the controller based on measurement data communicated by the amplitude/frequency/phase detector to the controller. The phase, frequency, and duty cycle adjustment circuit may be arranged to adjust the radio frequency oscillating signal based on a feedback signal received directly from the amplitude/frequency/phase detector. The tuning network may comprise a voltage-current tuner for adjusting a phase difference between a voltage and a current of the tuned radio frequency power signal based on measurement data from the amplitude/frequency/phase detector when the power switching device is in the amplifying condition.

The sealed power transfer circuit device may further comprise within the sealed interior in wired electrical communication between the power switching device and a DC power source/load external to the sealed device a power management circuit arranged for impedance matching the power switching device and the external DC power source/load and for adjusting DC power communicated between the power switching device and the DC power source/load based on a feedback signal received directly from the amplitude/frequency/phase detector. In other embodiments, the sealed power transfer circuit device may further comprise within the sealed interior in wired data communication with the controller and in wired electrical communication between the power switching device and a DC power source/load external to the sealed device a power management circuit arranged for impedance matching the power switching device and the external DC power source/load and for adjusting DC power communicated between the power switching device and the DC power source/load based on measurement data communicated by the amplitude/frequency/phase detector to the controller.

The sealed power transfer circuit device may further comprise within the sealed interior in wired data communication with the controller a voltage/current-detector disposed to determine a DC voltage and DC current passed between the power switching device and the power management circuit. The phase, frequency, and duty cycle adjustment circuit may be arranged to receive instructions from the controller based on measurement data communicated by the voltage/current-detector to the controller. In other embodiments, the phase, frequency, and duty cycle adjustment circuit may be arranged to adjust the radio frequency oscillating signal based on a feedback signal received directly from the voltage/current-detector.

The sealed power transfer circuit device may further comprise within the sealed interior a memory in wired data communication with the controller, with the amplitude/frequency/phase detector, and with the voltage/current detector wherein the memory is arranged to receive and store measurement data from the two detectors and to provide the signal data from the two detectors to the controller.

The sealed power transfer circuit device may further comprise, within the sealed interior in wired electrical communication between the power switching device and the AC power source/load external to the sealed device, a power management circuit arranged for matching an amplitude, a frequency, and a phase of the power switching device and the external AC power source/load and for adjusting AC power communicated between the power switching device and the AC power source/load based on a feedback signal received directly from the amplitude/frequency/phase detector.

The sealed power transfer circuit device may further comprise, within the sealed interior in wired data communication with the controller and in wired electrical communication between the power switching device and the AC power source/load external to the sealed device, a power management circuit arranged for matching an amplitude, a frequency, and a phase of the power switching device and the external AC power source/load the power switching device and for adjusting AC power communicated between the power switching device and the AC power source/load based on measurement data communicated by the amplitude/frequency/phase detector to the controller.

The sealed power transfer circuit device may further comprise, within the sealed interior in wired data communication with the controller, a voltage/current-detector disposed to determine a DC voltage and DC current passed between the power switching device and the power management circuit.

In some embodiments, the phase, frequency, and duty cycle adjustment circuit is arranged to receive instructions from the controller based on measurement data communicated by the voltage/current-detector to the controller. In some embodiments, the phase, frequency, and duty cycle adjustment circuit is arranged to adjust the radio frequency oscillating signal based on a feedback signal received directly from the voltage/current-detector.

The sealed power transfer circuit device may further comprise, within the sealed interior, a memory in wired data communication with the controller, with the amplitude/frequency/phase detector, and with the voltage/current detector wherein the memory is arranged to receive and store measurement data from the two detectors and to provide the signal data from the two detectors to the controller.

The sealed power transfer circuit device may further comprise within the sealed interior at least one of a Bluetooth communication circuit, a WiFi communication circuit, a Zigbee communication circuit and a cellular communications technology circuit for communicating information between the controller and devices external to the sealed power transfer circuit device. The communication circuit may be in bidirectional wired communication with at least one communications antenna arranged to communicate with devices external to the sealed power transfer circuit device. The antenna for the communication circuit may be disposed within the sealed interior of the sealed device.

The bidirectional power transfer circuit device may comprise a modulator configured for modulating information onto at least one of the radio frequency power signal and the DC voltage. The modulator may comprise the power switching device. The modulator may be configured for modulating the at least one of the radio frequency power signal and the DC voltage with information provided by the controller. The modulator may further comprise the phase, frequency, and duty cycle adjustment circuit.

In some embodiments, all circuit elements of the bidirectional power transfer circuit device may be monolithically integrated in a silicon single crystal wafer. In some embodiments, at least a portion of circuit elements of the device may be integrated by flip-chip technology.

In one specific embodiment, the electronic circuit of the sealed bidirectional power transfer circuit device may be implemented within a single silicon single crystal wafer jointly with at least one photovoltaic cell serving as a DC Source/Load. In a further embodiment, the electronic circuit of the sealed bidirectional power transfer circuit device may be implemented within a single silicon single crystal wafer jointly with at least one photovoltaic cell serving as DC Source/Load and a resonator structure serving as AC Load/Source on a surface of the silicon single crystal wafer. The antenna for use with Bluetooth, WiFi, Zigbee and Cellular technology may also be integrated on the same single silicon single crystal wafer.

In another aspect, a power transfer system is provided for transferring power between a DC source and a variable load. First and second self-synchronous radio frequency rectifiers/amplifiers are configured to extract first and second high frequency (HF) power signals from the DC source at respectively first and second HF frequencies. An HF power link system is configured to receive and mix the first and second HF power signals to produce a transferred power signal. A power signal conversion circuit in communication with the HF power link system and the variable load is configured to produce from the transferred power signal an output power signal and supply the output power signal to the variable load.

The power transfer system further comprises an HF switching signal generator configured to supply to the first and second rectifiers/amplifiers first and second switching signals at the respective first and second HF frequencies and to establish and control a mutual phase relationship between the first and second switching signals.

The power signal conversion circuit comprises: a switched mode rectifier configured to receive the transferred power signal from the HF power link system and rectify the transferred power signal to produce a rectified power signal; and an unfolding circuit configured to receive the rectified power signal from the switched mode rectifier and unfold the rectified power signal to produce the output power signal.

The first and second self-synchronous radio frequency rectifiers/amplifiers may be configured to operate in a rectifying mode and the switched mode rectifier may be configured to operate in an always-on mode, thereby allowing power to be extracted from the variable load and transferred to the DC source via the power signal conversion circuit and the HF power link system.

The unfolding circuit may be configured to receive a reference signal from the variable load to unfold the rectified power signal synchronous with a signal in the variable load. The power signal conversion circuit, the HF power link system, and the plurality of pairs of self-synchronous radio frequency rectifiers/amplifiers may be configured to communicate control information to the HF switching signal generator from the rest of the system. The system may further comprise one or more controllers in data communication with a plurality of elements of the system and configured to control the plurality of elements. The system may further comprise an isolatable load information circuit configured to communicate to the HF switching signal generator information about at least one of a DC level, a frequency and a phase of a power signal in the variable load. The load information circuit may comprise a phase lock loop. The load information circuit may further comprise an isolator system which may comprise an air gap. The HF power link system may comprise a wireless power link system, which may be a bimodal wireless HF power link system. The HF power link system may comprise a wired power link system.

In two phase-difference based implementations, the first and second HF frequencies are the same frequency; and the first and second switching signals may have a mutual phase difference adjustable by the HF switching signal generator. In a first phase-difference based implementation the HF switching signal generator is configured to adjust the mutual phase difference between the first and second switching signals based on the DC level in the variable load to thereby produce from the HF power link system the transferred power signal as a DC signal correspondingly adjusted in amplitude. In a second phase-difference based implementation the HF switching signal generator is configured to modulate the mutual phase difference between the first and second switching signals at a phase modulation frequency that is derived from the frequency of the power signal in the variable load to thereby produce from the HF power link system the transferred power signal as an AC power signal modulated at the frequency of the power signal in the variable load.

In a frequency-difference based implementation, the first and second HF frequencies differ by a difference frequency $\Delta f$. In this implementation the HF switching signal generator is configured to determine the first and second HF frequencies and to set the difference frequency $\Delta f$ to double the frequency of the power signal in the variable load. The HF power link system is arranged to produce the transferred power signal at the difference frequency $\Delta f$ and the power signal conversion circuit is configured to supply the output power signal to the variable load at the frequency of the power signal in the variable load.

In a further aspect, a method is provided for transferring power between a DC source and a variable load, the method comprising: extracting from the DC source at first and second HF frequencies corresponding first and second high frequency (HF) power signals via corresponding first and second self-synchronous radio frequency rectifiers/amplifiers; receiving and mixing in an HF power link system the first and second HF power signals to produce a transferred power signal; producing in a power signal conversion circuit in communication with the HF power link system and the variable load an output power signal from the transferred power signal; and supplying the output power signal to the variable load.

The method may further comprise: generating in an HF switching signal generator and communicating to the first and second rectifiers/amplifiers first and second switching signals at the respective first and second HF frequencies; and establishing and controlling in the HF switching signal generator a mutual phase relationship between the first and second switching signals. The method may further comprise: receiving and rectifying in a switched mode rectifier of the power signal conversion circuit the transferred power signal from the HF power link system; and receiving and unfolding in an unfolding circuit of the power signal conversion circuit the rectified power signal from the switched mode rectifier. The method may further comprise: setting the first and second self-synchronous radio frequency rectifiers/amplifiers to a rectifying mode; setting the switched mode rectifier to an always-on mode; extracting power from the variable load; and transferring the extracted power to the DC source via the power signal conversion circuit and the HF power link system.

The method may further comprise: unfolding the rectified power signal synchronous with a signal in the variable load based on a reference signal from the variable load; communicating control information to the HF switching signal generator from the rest of the system, via the power signal conversion circuit, the HF power link system, and the first and second self-synchronous radio frequency rectifiers/amplifiers; controlling the plurality of elements of the system by means of one or more controllers in data communication with the plurality of elements; and communicating to the HF switching signal generator information about at least one of a DC level, a frequency and a phase of a power signal in the variable load using an isolatable load information circuit comprising a phase lock loop and an optional isolator system. The transferring the power signal in the HF power link system may comprise wirelessly transferring, bimodal wirelessly transferring, wired transferring the power signal.

Two methods for transferring power from the DC source to the variable load employ a phase difference between switching signals. In these implementations, the first and second switching signals may have the same frequency and a mutual phase difference adjustable by the HF switching signal generator. The method for the first of these implementations comprises: adjusting the mutual phase difference between the first and second switching signals based on the DC level in the variable load to produce from the HF power link system the transferred power signal as a DC signal correspondingly adjusted in amplitude. The method for the second of these implementations comprises: modulating the mutual phase difference between the first and second switching signals at a phase modulation frequency that is derived from the frequency of the power signal in the variable load to produce from the HF power link system the transferred power signal as an AC power signal modulated at the frequency of the power signal in the variable load.

A method for the frequency-difference based implementation comprises: determining the first and second HF frequencies of the corresponding first and second switching signals; and setting the difference frequency equal to double the frequency of the power signal in the variable load. The method further comprises: producing the transferred power signal from the HF power link system at the difference frequency; and supplying the output power signal to the variable load at the frequency of the power signal in the variable load.

The power transfer systems described herein employing either a phase difference or a frequency difference between switching signals supplied to a pair of self-synchronous radio frequency rectifiers/amplifiers to transfer either AC or DC power from a DC source to a variable load may be extended to transferring power from a single DC source to a single variable load via multiple pairs of rectifiers/amplifiers, and to transferring power from a plurality of DC sources to a single variable load using multiple pairs of rectifiers/amplifiers. Apparatus and methods for achieving these ends are described. These apparatus and methods in some implementations also allow the simultaneous transfer of DC and AC power to a load.

In one aspect, a solar panel system is presented for transferring power from at least one DC power source to a variable load, the system comprising: disposed proximate and in electrical communication with each of the at least one DC power source a corresponding high frequency power module, and a single aggregator configured for receiving via all of the at least one high frequency power modules power from the corresponding at least one DC power source. Each of the at least one high frequency power modules may comprise an HF switching signal generator and one pair of differential self-synchronous radio frequency rectifier/amplifiers, both rectifier/amplifiers in the pair being in wired electrical communication with the DC power source corresponding to the at least one high frequency power module and configured to extract power from the corresponding DC power source. The HF switching signal generator may be configured to provide switching signals to the corresponding pair of differential self-synchronous radio frequency rectifier/amplifiers.

All the high frequency power modules may be mutually phase-locked. They may be mutually phase-locked via a phase lock loop to an AC power signal in the variable load. The phase lock loop may be incorporated in the corresponding high frequency power module.

Each of the at least one high frequency power modules may comprise in wired electrical communication with both differential self-synchronous radio frequency rectifier/amplifiers an HF link to receive and mix power signals from the two differential self-synchronous radio frequency rectifier/amplifiers and to transmit on a wired basis a mixed power signal. Each of the at least one high frequency power modules may comprise a switched mode rectifier in wired electrical communication with the HF link, wherein the switched mode rectifier is disposed and configured to receive and rectify the mixed power signal and to transmit on a wired basis a rectified power signal. Each of the at least one high frequency power modules may comprise an unfolding circuit disposed and configured to receive from the switched mode rectifier the rectified power signal, to unfold the rectified signal and to transmit on a wired basis an unfolded power signal.

The system may comprise a bimodal wireless near-field HF link system, wherein each of the at least one high frequency power modules comprises one primary side of the HF link system in wired electrical communication with both differential self-synchronous radio frequency rectifier/amplifiers in the at least one high frequency power module. The system may comprise a single collective secondary side of the HF link system configured to receive power from all of the at least one HF link primary sides and the secondary side may comprise a single receiver resonator and a single receiver module. The receiver module may be contained in the aggregator along with a switched mode rectifier and an unfolding circuit, wherein the switched mode rectifier is in wired electrical communication with the receiver module and the unfolding circuit to receive and rectify a mixed power signal from the receiver resonator, and the unfolding circuit is in wired electrical communication with a junction unit and is configured to receive and unfold a rectified power signal from the rectifier and provide it to the variable load. The switching signals provided to the two differential self-synchronous radio frequency rectifier/amplifiers by the HF switching signal generator may differ by one of a predetermined frequency difference and a predetermined phase difference. The system may comprise a controller, wherein the controller is configured to communicate to the HF switching signal generator at least one of a frequency and a phase determined by the controller based on information about the load and about the DC source. The high frequency power module may comprise the controller.

In some embodiments, the at least one DC source may be a photovoltaic cell and the system may comprise: a planar transparent solar cover having planar first and second solar cover surfaces; and a frame for mounting the transparent solar cover, wherein the at least one photovoltaic cell is disposed on the first solar cover surface with a planar light-sensitive surface of the at least one photovoltaic cell facing the first solar cover surface. Each high frequency power module may comprise a high frequency power circuit on a printed circuit board in wired electrical communication with the corresponding at least one photovoltaic cell. The high frequency power circuit may be disposed on a planar surface of the printed circuit board facing away from the first solar cover surface.

The system may comprise a conformal encapsulation layer bound to the first solar cover surface and covering the at least one photovoltaic cell and the corresponding high frequency power module. The system may further comprise a dielectric protective cap over the high frequency power circuit. The protective cap may be disposed over or under the conformal encapsulation layer. A perimeter of the protective cap may disposed under and sealed to the conformal encapsulation layer with the protective cap protruding through the conformal encapsulation layer.

The printed circuit board may be disposed proximate the corresponding at least one photovoltaic cell. In some implementations, the printed circuit board may be disposed on an insulating layer disposed on the rear surface of the photovoltaic cell. That at least one photovoltaic cell may be arranged in an array. The planar first solar cover surface may comprise an optically transparent polymeric layer.

A method is provided for making a solar panel, the method comprising: disposing on a planar surface of a transparent solar cover at least one photovoltaic cell having a light-sensitive surface facing the planar surface of the transparent solar cover and a corresponding high frequency power module comprising on a printed circuit board a high frequency power circuit in wired communication with the at least one photovoltaic cell for collecting power from the at least one photovoltaic cell, wherein the high frequency power circuit is disposed on a planar surface of the PC board facing away from the transparent solar cover; arranging on an opposing side of the at least one photovoltaic cell from the transparent solar cover a thermally deformable polymeric sheet extending over the surface area of the transparent solar cover to form a lamination stack in a plane; transferring the lamination stack to a vacuum oven; establishing a vacuum in the vacuum oven to remove air between layers of the lamination stack; heating the lamination stack to a deformation temperature of the thermally deformable polymeric sheet; applying mechanical pressure to the stack normal to the plane; restoring an ambient air pressure in the vacuum oven to bond the thermally deformable polymeric sheet onto the transparent solar cover and to force the thermally deformable polymeric sheet conformally onto the at least one photovoltaic cell and the high frequency power module to form a packaged array of photovoltaic modules; and mounting the packaged array of photovoltaic modules in a frame.

The method may further comprise disposing a transparent thermally cross-linkable polymer sheet on the transparent solar cover before disposing on the transparent solar cover the at least one photovoltaic cell and the high frequency power module.

Arranging the thermally deformable polymeric sheet may comprise arranging a thermally deformable cross-linkable polymer sheet. Arranging the thermally deformable cross-linkable polymer sheet may comprise arranging a sheet comprising one or more layers of one or more of polyethylene terephthalate; biaxially oriented polyethylene terephthalate; ethylene vinyl acetate; fluorinated polyester; polyvinyl fluoride; polyvinylidene fluoride; polyethylene vinyl acetate; polyethylene naphthalate; ethylene tetrafluoroethylene; fluoroethylene vinyl ether; tetrafluoroethylene hexafluoropropylene vinylidene fluoride copolymer; polyamide; polypropylene; polyethylene; and polyvinylidene fluoride-short sugar palm fiber.

BRIEF DESCRIPTION OF FIGURES

Exemplary embodiments are illustrated in referenced figures of the drawings. In the drawings, which are not necessarily drawn to scale, numerals may describe similar components in different views. Like numerals having different letter suffixes may represent different instances of similar components. The drawings illustrate generally, by way of example, but not by way of limitation, various embodiments discussed in the present document. It is intended that the embodiments and figures disclosed herein are to be considered illustrative rather than restrictive.

FIG. 11 shows a flow chart of a near-field resonant wireless method for transferring power bimodally according to an adjustable transfer mode ratio at a resonant power signal oscillation frequency according to one example embodiment.

FIG. 24 shows a drawing of a flow chart for another method of wirelessly transferring electrical power from a photovoltaic solar cell array to an electrical power load.

FIG. 25 shows a drawing of a flow chart for another method of wirelessly transferring electrical power from a photovoltaic solar cell array to an electrical power load.

FIG. 26 shows a drawing of a flow chart for another method of wirelessly transferring electrical power from a photovoltaic solar cell array to an electrical power load.

FIG. 31 shows a flow chart for a method of transferring power between transmit-receive modules in a bimodal resonant near-field radio frequency power transfer system.

FIG. 38 shows a rectified power signal in the form of a train of halfwaves and the result of unfolding the power signal.

Figure 1:
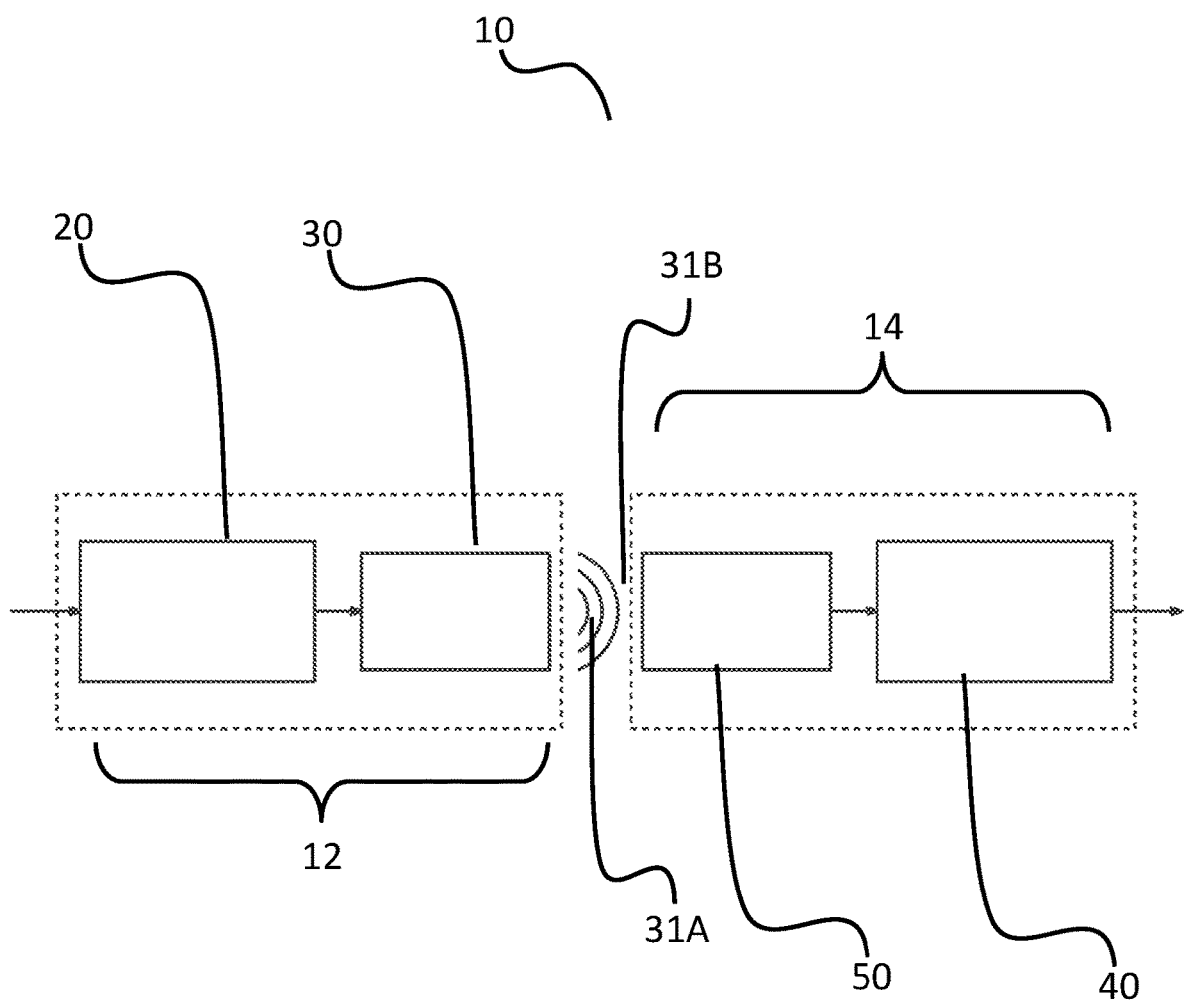
FIG. 1 is a schematic diagram of a wireless power transfer system according to one example embodiment.

Corresponding reference characters indicate corresponding parts throughout the several views. Although the drawings represent embodiments of the present invention, the drawings are not necessarily to scale and certain features may be exaggerated in order to better illustrate and explain the present invention. The flow charts are also representative in nature, and actual embodiments of the invention may include further features or steps not shown in the drawings. The exemplification set out herein illustrates an embodiment of the invention, in one form, and such exemplifications are not to be construed as limiting the scope of the invention in any manner.

DETAILED DESCRIPTION OF THE INVENTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the disclosure provides a wireless power transfer system comprising a transmitter (also referred to as a primary side) and a receiver (also referred to as a secondary side). Another aspect provides wireless power transmitters that may be employed as part of other wireless power transfer systems. Another aspect provides wireless power receivers that may be employed as part of other wireless power transfer systems. A transmitter according to some embodiments may comprise a resonator configured to transmit power by inductive power transfer and/or by capacitive power transfer. Similarly, a receiver according to some embodiments may comprise a resonator configured to receive power by inductive power transfer and/or by capacitive power transfer.

FIG. 1 is a simplified schematic diagram of a wireless power transfer (WPT) system 10 comprising a primary side 12 and a secondary side 14. Primary side 12 may also be referred to as a transmitter and secondary side 14 may also be referred to as a receiver. Primary side 12 comprises a transmitter module 20 and a transmitter resonator 30 and secondary side 14 comprises a receiver module 40 and a receiver resonator 50.

Transmitter module 20 receives, as input, power comprising, for example, direct current (DC) power. Although not depicted, transmitter module 20 may comprise, for example, an inverter, a transmitter compensation network and/or other components as are described further herein. Transmitter module 20 delivers, as output, power comprising, for example, alternating current (AC) power to transmitter resonator 30.

Transmitter resonator 30 receives, as input, power from transmitter module 20 and may output a magnetic field 31A (for example, a time-varying magnetic field) and/or an electric field 31B (for example, a time-varying electric field). In some embodiments, transmitter resonator 30 outputs magnetic field 31A for the purpose of IPT. In some embodiments, transmitter resonator 30 outputs electric field 31B for the purpose of CPT. In some embodiments, resonator 30 simultaneously outputs magnetic field 31A and electric field 31B for the purpose of simultaneous transfer of power through CPT and IPT. In some embodiments, resonator 30 may switch between outputting electric field 31B for the purpose of CPT, outputting magnetic field 31A for the purpose of IPT and simultaneously outputting magnetic field 31A and electric field 31B for the purpose of simultaneous transfer of power through CPT and IPT.

The adjective term "bimodal" is used herein to describe a system configured for simultaneous capacitive signal transfer and inductive signal transfer.

In the presence of magnetic field 31A, a current may be induced in receiver resonator 50 for the purpose of IPT. In the presence of electric field 31B, an alternating potential may be induced on receiver resonator 50 (or one or more antennas thereof).

When a current is induced in receiver resonator 50 by magnetic field 31A, such current may be outputted to receiver module 40. Similarly, when an alternating potential is induced on receiver resonator 50 by electric field 31B, a current may be caused to flow into receiver module 40 by receiver resonator 50.

Receiver module 40 may receive, as input, from receiver resonator 50 power (for example, AC power) and may output power (for example, DC power) to a load. A load may be a charge for an electric storage device such as a battery or supercapacitor. By way of non-limiting example, the load may comprise or be an element of an electric bicycle (also referred to as an e-bicycle or e-bike) such as an e-bicycle that is part of a bike-share fleet, an automobile, a boat, etc. Although not depicted, receiver module 40 may comprise, for example, a rectifier, a receiver compensation network and/or other components as are discussed further herein.

WPT system 10 may be configured to adjust a ratio of power transferred from transmitter module 20 to receiver module 40 via CPT to power transferred by transmitter module 20 to receiver module 40 via IPT (the "transfer mode ratio"), for various reasons. For example, the transfer mode ratio may be adjusted to increase a proportion of power delivered by CPT when distance between transmitter resonator 30 and receiver resonator 50 increases; to increase a proportion of power delivered by IPT when a living being (for example, a human or an animal) is within proximity of WPT system 10; to increase a proportion of power delivered by CPT when an object (for example, a metal object) is within proximity of WPT system 10; to increase a proportion of power delivered by CPT when alignment between transmitter resonator 30 and receiver resonator 50 worsens; and/or to do any combination of the foregoing.

In some embodiments, the transfer mode ratio may be adjusted according to a maximum power point tracking technique such as, but not limited to, "observe and perturb" as is sometimes employed for wind turbines and solar panels (see, for example, S. Dehghani, S. Abbasian and T. Johnson, "*Adjustable Load With Tracking Loop to Improve RF Rectifier Efficiency Under Variable RF Input Power Conditions*," in IEEE Transactions on Microwave Theory and Techniques, vol. 64, no. 2, pp. 343-352, February 2016). In some embodiments, the transfer mode ratio may be adjusted according to a machine learned algorithm. For example, in some embodiments, if WPT system 10 determines that a WPT efficiency is undesirably low, WPT system 10 may increase a proportion of power delivered by CPT (or IPT). If the WPT efficiency is negatively impacted by increasing reliance on CPT (or IPT), then WPT system 10 may decrease the reliance on CPT (or IPT). This process may be repeated iteratively until a desirable/maximum WPT efficiency is attained.

Each of transmitter resonator 30 and receiver resonator 50 may comprise a plurality of antennas 80 arranged in various configurations.

Figure 2A:
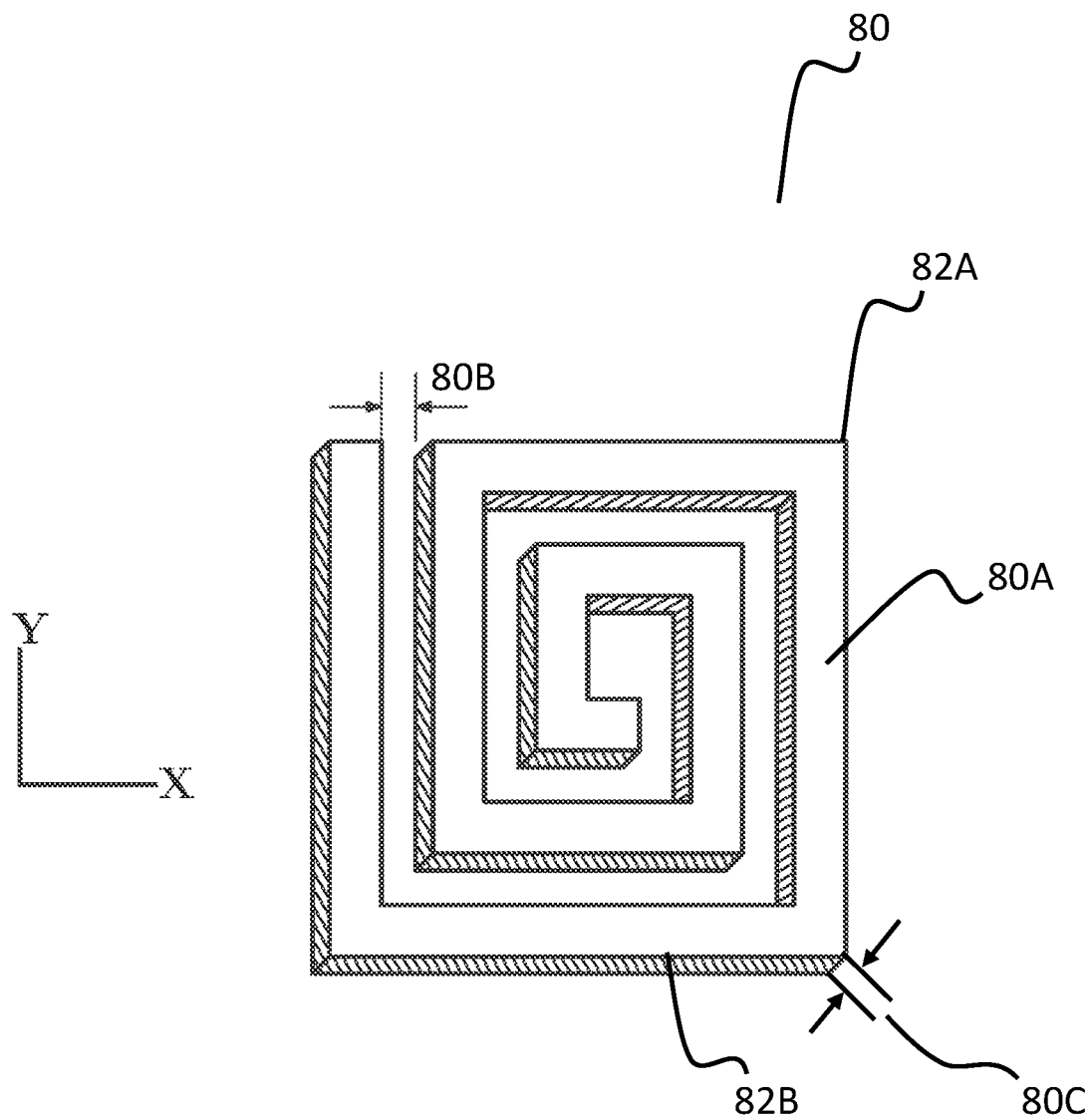
FIGS. 2A, 2B and 2C depict antennas that may be used in various example embodiments or on their own or in combination with other disclosed elements.
Figure 2B:
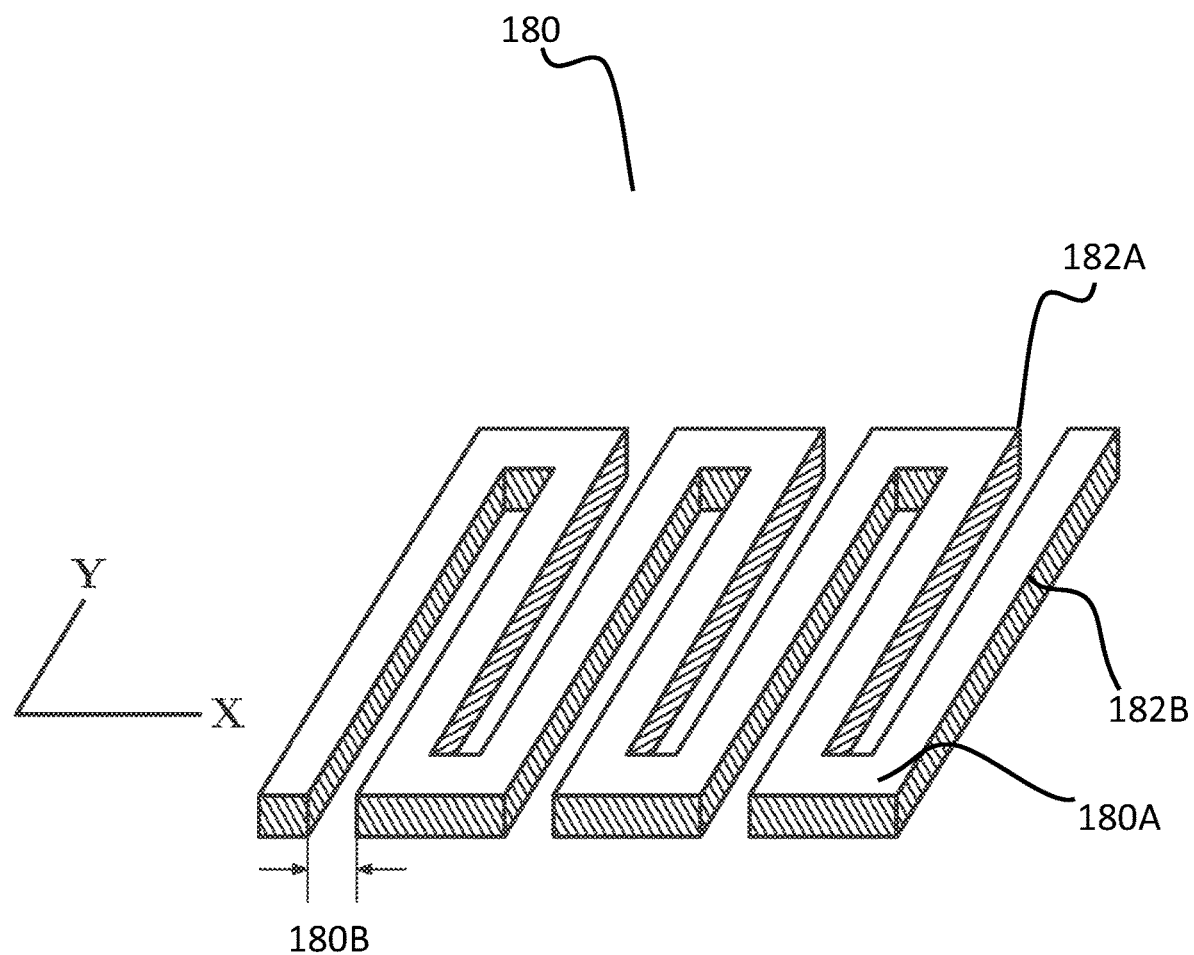
Figure 2C:
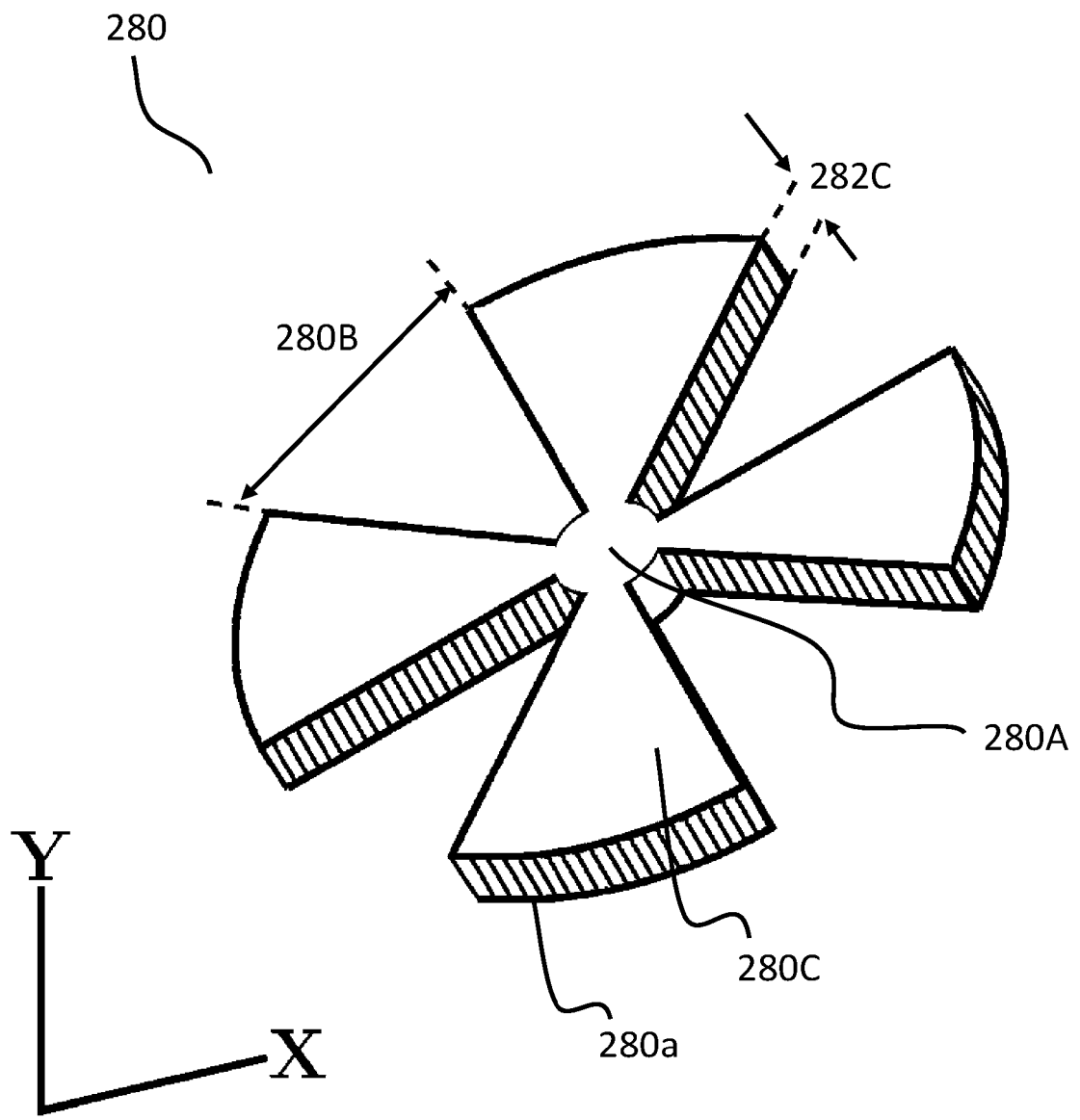

Antenna 80 may comprise any suitable antenna having a high self-inductance and a high self-capacitance that is capable of creating both magnetic field 31A and electric field 31B (separately and/or simultaneously) for the purpose of CPT and IPT. FIGS. 2A, 2B and 2C depict non-limiting examples of antennas 80, 180, 280. For the purposes herein, a "high self-inductance" is a self-inductance that is sufficiently great to allow the antenna to generate a magnetic field suitable for the purposes of IPT. Similarly, for the purposes herein "high self-capacitance" is a self-capacitance that is sufficiently great to allow the antenna to generate an electric field suitable for the purposes of CPT.

FIG. 2A depicts antenna 80 according to some embodiments. Antenna 80 may comprise any suitable conductive material. For example, antenna 80 may comprise copper, gold, silver, aluminum, other suitable material, or a combination thereof. As can be seen from FIG. 2A, antenna 80 comprises an elongated element 80A having a rectangular (for example, square) cross-section that has been bent or formed in the shape of a generally planar rectangular (in the XY plane) coil such that adjacent wrappings of elongated element 80A are spaced apart by a gap 80B. While gap 80B is depicted as being generally constant along the length of elongated element 80, this is not mandatory.

To increase self-inductance of antenna 80, the size of gap 80B may be reduced. To increase self-capacitance of antenna 80, the number of bends (for example, bend 82A) of elongated element 80A may be increased, the number of corners and edges (for example, edge 82B) of elongated element 80A may be increased, the length of elongated element 80A may be increased and/or the thickness 80C of elongated element 80A may be increased.

FIG. 2B depicts another non-limiting example of antenna 180 according to some embodiments. Antenna 180 is substantially like first antenna 80 except that instead of being bent or formed in the shape of a generally planar rectangular coil, elongated element 180A is bent or formed in the shape of a generally planar zig-zag shape having square corners, as depicted in FIG. 2B. Like antenna 80, adjacent zigs or zags of elongated element 180A are spaced apart by a gap 180B. While gap 180B is depicted as being generally constant along the length of elongated element 180, this is not mandatory.

To increase self-inductance of antenna 180, the size of gap 180B may be reduced. To increase self-capacitance of antenna 180, the number of bends (for example, bend 182A) of elongated element 180A may be increased, the number of corners and edges (for example, edge 182B) of elongated element 180A may be increased and/or thickness 180C of elongated element 180A may be increased.

FIG. 2C depicts another non-limiting example of antenna 280 according to some embodiments. Antenna 280 is substantially like first antenna 80 except that instead of being bent or formed in the shape of a generally planar rectangular coil, elongated element 280A is bent or formed in a generally planar circular shape (in the XY plane) with hub element 280A from which sector elements 280C extend radially outwardly. Adjacent sector elements 280C are spaced apart from one another by gaps 280B.

To increase self-inductance of antenna 280, the size of gaps 280B may be reduced. To increase self-capacitance of antenna 280, the number of sectors 280C may be increased, the number of corners and edges (for example, edge 282A) of hub 280A and/or sectors 280C may be increased and/or thickness 280C of elongated hub 280A and/or sectors 280C may be increased.

While FIGS. 2A, 2B and 2C depict exemplary non-limiting embodiments of antennas 80, 180, 280, it should be understood that many other shapes and configurations of suitable antennas 80 may be employed in the resonators described herein. Non-limiting examples of changes that could be made to the depicted antennas include changing the cross-sectional shape of elongated elements 80A, 180A to be other than rectangular (for example, triangular, circular, hexagonal, etc.), changing 90° bends 82A, 182A to be non-90° or to be rounded, changing the XY plane shapes of first transmitter antennas 80 to be other than rectangular or circular, using non-repeating patterns of bends and corners, etc.

Figure 3A:
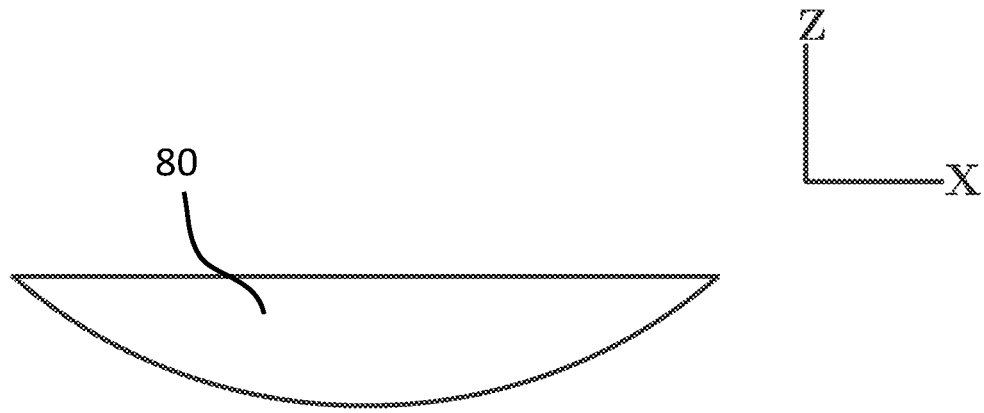
FIGS. 3A and 3B depict side profile views of antennas that may be used in various example embodiments or on their own or in combination with other disclosed elements.
Figure 3B:
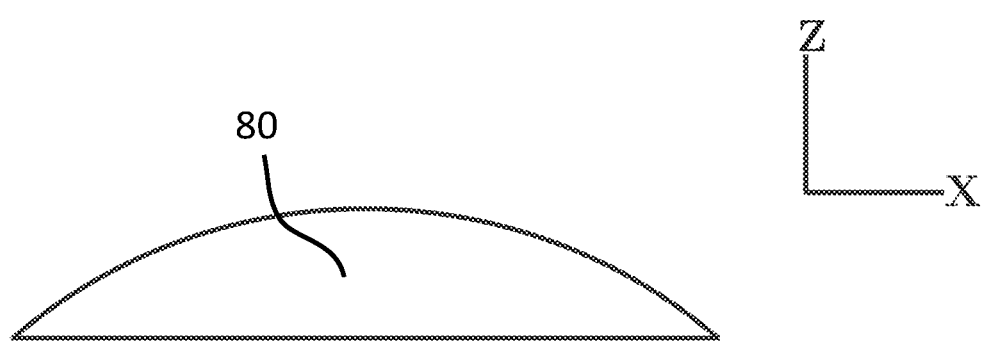

While antennas 80, 180, 280 are described and depicted herein as being relatively flat or planar (for example, not varying substantially in thickness in the Z direction), this is not mandatory. In some embodiments, antenna 80, 180, 280 may have a conical concave or conical convex shape as depicted in FIGS. 3A and 3B. For example, antennas herein could have a conical helix shape (not depicted). In some embodiments, antenna 80 could have a rectangular conical helix shape such that the inner windings of antenna 80 are spaced apart in the Z direction from the outer windings of antenna 80. Such conical shapes may allow a resonator to be used for a broader range of resonant frequencies. In other embodiments, a thickness in the Z direction of first transmitter antenna may vary in other ways.

Figure 4A:
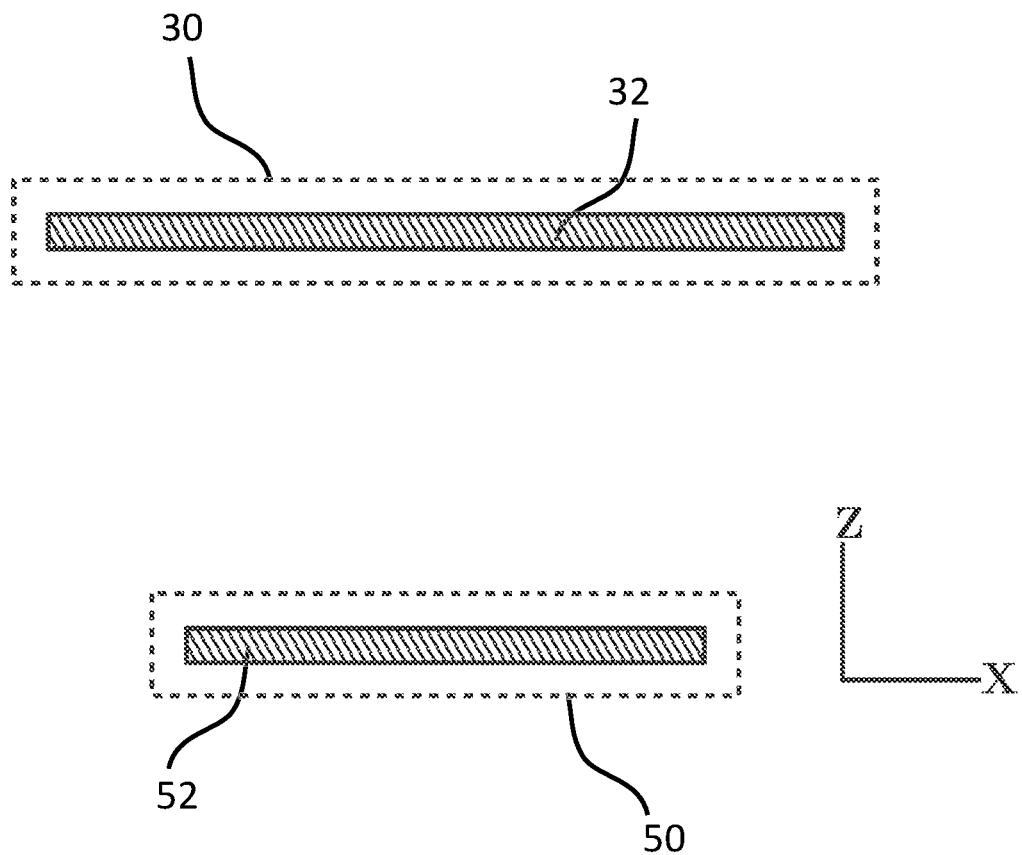
FIGS. 4A, 4B, 4C and 4D depict side profile views of example resonators that may be used in various example embodiments or on their own or in combination with other disclosed elements.

Antennas 80, 180, 280 may be, for example, arranged in configurations similar to those of plates in a CPT WPT system. For example, in a two antenna WPT system according to some embodiments, transmitter resonator 30 may comprise first transmitter antenna 32 arranged parallel to a first receiver antenna 52 of receiver resonator 50 as shown in FIG. 4A. For the purpose of CPT, the mutual capacitance between antennas 32, 52 provides a path for the current to flow forward to the receiver side, and a conductive path (for example, ground) would allow the current to flow back to the transmitter side. For the purpose of IPT, by driving a current through first transmitter antenna 32, magnetic field 31A is generated that may induce a current in first receiver antenna 52. For the purpose of CPT, a voltage may be applied to first transmitter antenna 32 to create a potential difference between first transmitter antenna 32 and first receiver antenna 52 thereby creating electric field 31B.

First transmitter antenna 32 may comprise any suitable antenna having a high self-inductance and a high self-capacitance that is capable of creating both magnetic field 31A and electric field 31B (separately and/or simultaneously). For example, first transmitter antenna may comprise one of antennas 80, 180, 280 or any other antenna described herein.

First receiver antenna 52 may comprise any suitable antenna having a high self-inductance and a high self-capacitance that is capable of having a current induced therein by magnetic field 31A and of having a potential difference thereon due to electric field 31B (separately and/or simultaneously). In some embodiments, first receiver antenna 52 may be substantially similar to first transmitter antenna 32 (for example, first receiver antenna 52 may have the same characteristics of any of the antennas described or depicted herein or otherwise). In some embodiments, antennas 32, 52 may be different from one another (for example, first transmitter antenna 32 may comprise antenna 80 while first receiver antenna 52 may comprise antenna 180).

In some embodiments, an XY planar area of first transmitter antenna 32 is smaller than an XY planar area of first receiver antenna 52 to improve coupling between first transmitter antenna 32 and first receiver antenna 52.

Figure 4B:
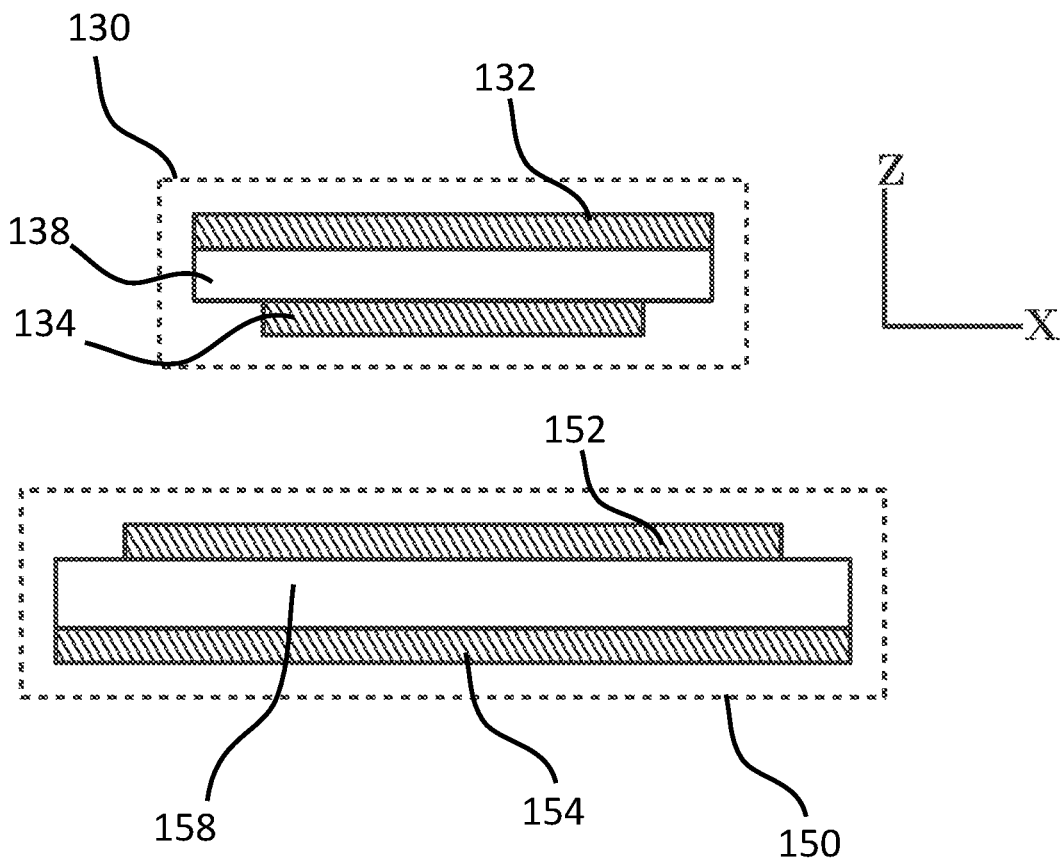

FIG. 4B depicts another example of a configuration of antennas 80, 180, 280. In some embodiments, FIG. 4B depicts a four-antenna stacked (or four-antenna vertical) WPT system. Each of transmitter resonator 130 and receiver resonator 150 comprises two antennas. Together, one antenna of transmitter resonator 30 and one antenna of receiver resonator 150 provide a forward path for power and together the other antenna of transmitter resonator 130 and the other antenna of receiver resonator 150 provide a return path for power.

For the purpose of IPT, by driving a current through antennas 132, 134 of the transmitter, a magnetic field is generated that may induce a current in first and second receiver antennas 152, 154. For the purpose of CPT, a potential difference may be applied between first and second antennas 132, 134 to generate an electric field (31B shown in FIG. 1) to induce a potential across first and second receiver antennas 152, 154.

As depicted in FIG. 4B, transmitter resonator 130 comprises first transmitter antenna 132 and second transmitter antenna 134 separated in the Z direction by spacer 138.

First transmitter antenna 132 may comprise any suitable antenna having a high self-inductance and a high self-capacitance that is capable of creating both magnetic field 31A and electric field 31B (separately and/or simultaneously). For example, first transmitter antenna may comprise one of antennas 80, 180, 280 or any other antenna described herein.

Spacer 138 may comprise any suitable material. For example, spacer 138 may comprise air, a dielectric material, ferrite or some combination thereof. Spacer 138 may have a permittivity constant chosen to change electric field 31A and/or it may have a permeability constant chosen to change magnetic field 31B. Spacer 138 may comprise a high permittivity material to increase the capacitance of transmitter resonator 130. The thickness and planar area of spacer 138 may be dependent on the thickness and/or planar area of first and second transmitter antennas 132, 134. In some embodiments, electrical isolation may be desirable and a low permittivity material may be employed for spacer 138 (for example, for shielding).

Second transmitter antenna 134 may comprise any suitable antenna having a high self-inductance and a high self-capacitance that is capable of creating both magnetic field 31A and electric field 31B (separately and/or simultaneously). In some embodiments, second transmitter antenna 134 may be substantially similar to first transmitter antenna 132 (for example, second transmitter antenna 134 may have the same characteristics of any of the antennas described or depicted herein or otherwise). In some embodiments, first and second transmitter antennas 132, 134 and first and second receiver antennas 152, 154 may be different from one another (for example, first and second transmitter antennas 132, 134 may be like antenna 80 while first and second receiver antennas 152, 154 may be like antenna 180).

In some embodiments the XY planar area of second transmitter antenna 134 may be a different size than the XY planar area of first transmitter antenna 132. In some embodiments the XY planar area of second transmitter antenna 134 may be smaller than the XY planar area of first transmitter antenna 132 to ensure coupling between each pair of antennas. In some embodiments the XY planar area of second transmitter antenna 134 may be larger than the XY planar area of first transmitter antenna 132.

Figure 5:
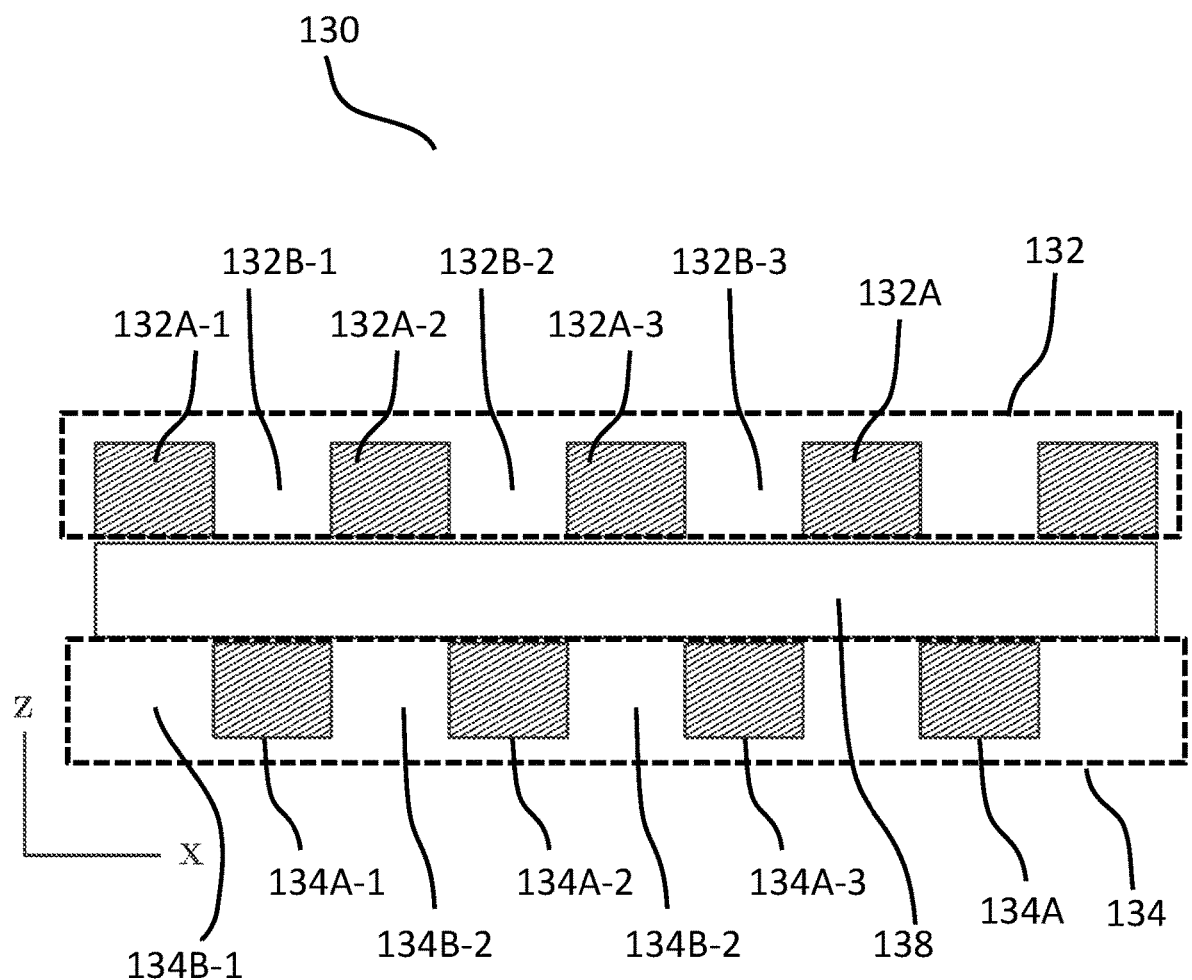
FIG. 5 depicts a cross-section of an example resonator that may be used in various example embodiments or on its own or in combination with other disclosed elements.

In some embodiments, second transmitter antenna 134 is substantially complementary to first antenna 132 in size and/or shape such that first transmitter antenna 132 does not substantially overlap in the Z direction with second transmitter antenna 134. FIG. 5 depicts a schematic representation of an XZ plane cross-section of a portion of a transmitter resonator 130 where first transmitter antenna 132 and second transmitter antenna 134 are each substantially shaped like first transmitter antenna 180 in FIG. 2B. As can be seen, portions 132A-1, 132A-2, 132A-3 of elongated element 132A of first transmitter antenna 132 overlap in the Z direction with gaps 134B-1, 134B-2, 134B-3 of second transmitter antenna 134 (for example, a line oriented in the Z direction that passes through portion 132A-1 of elongated element 132A of first antenna 132 passes through gap 134B-1 of second antenna 134) and portions 134A-1, 134A-2, 134A-3 of elongated element 134A of second transmitter antenna 134 overlap in the Z direction with gaps 132B-1, 132B-2, 132B-3 of first transmitter antenna 132 (for example, a line oriented in the Z direction that passes through portion 134A-1 of elongated element 134A of second antenna 134 passes through gap 132B-1 of second antenna 134). The complementary shapes of first transmitter antenna 132 and second antenna 134 may reduce parasitic energy loss experienced by transmitter resonator 130. In some embodiments, first and second transmitter antennas 132, 134 may not be completely complementary but may have one or more complementary portions.

Receiver resonator 150 comprises first receiver antenna 152 and second receiver antenna 154 separated in the Z direction by spacer 158. First receiver antenna 152 may be substantially similar to any of antennas 80, 180, 280 or otherwise described herein. Second receiver antenna 154 may also be substantially similar to any of antennas 80, 180, 280 or otherwise described herein. Like first and second transmitter antennas 132, 134, first and second receiver antennas 152, 154 may be complementary (or partially complementary) in size and/or shape.

In some embodiments, an XY planar area of first and second receiver antennas 152, 154 is different from an XY planar area of first and second transmitter antennas as depicted in FIG. 4B in order to adjust the self-inductance or self-capacitance of receiver resonator 150. For example, in some embodiments, an XY planar area of first and second receiver antennas 152, 154 is greater than an XY planar area of first and second transmitter antennas 132, 134 as depicted in FIG. 2A. Such XY planar area differential may improve the ability of receiver resonator 150 to capture more of magnetic field 31A and/or electric field 31B.

Spacer 158 may comprise any suitable spacer. Spacer 158 may comprise the same or similar materials to spacer 138 or different materials from spacer 138. As compared to spacer 158, spacer 138 may have a smaller Z direction dimension to achieve a desired self-capacitance and/or self-inductance. This may effectively change coupling coefficient of the link between primary side 12 and secondary side 14 and the impedance of primary side 12. Different compensation networks may be employed in both primary and secondary sides 12, 14 to accommodate such coupling coefficient and impedance changes.

Figure 4C:
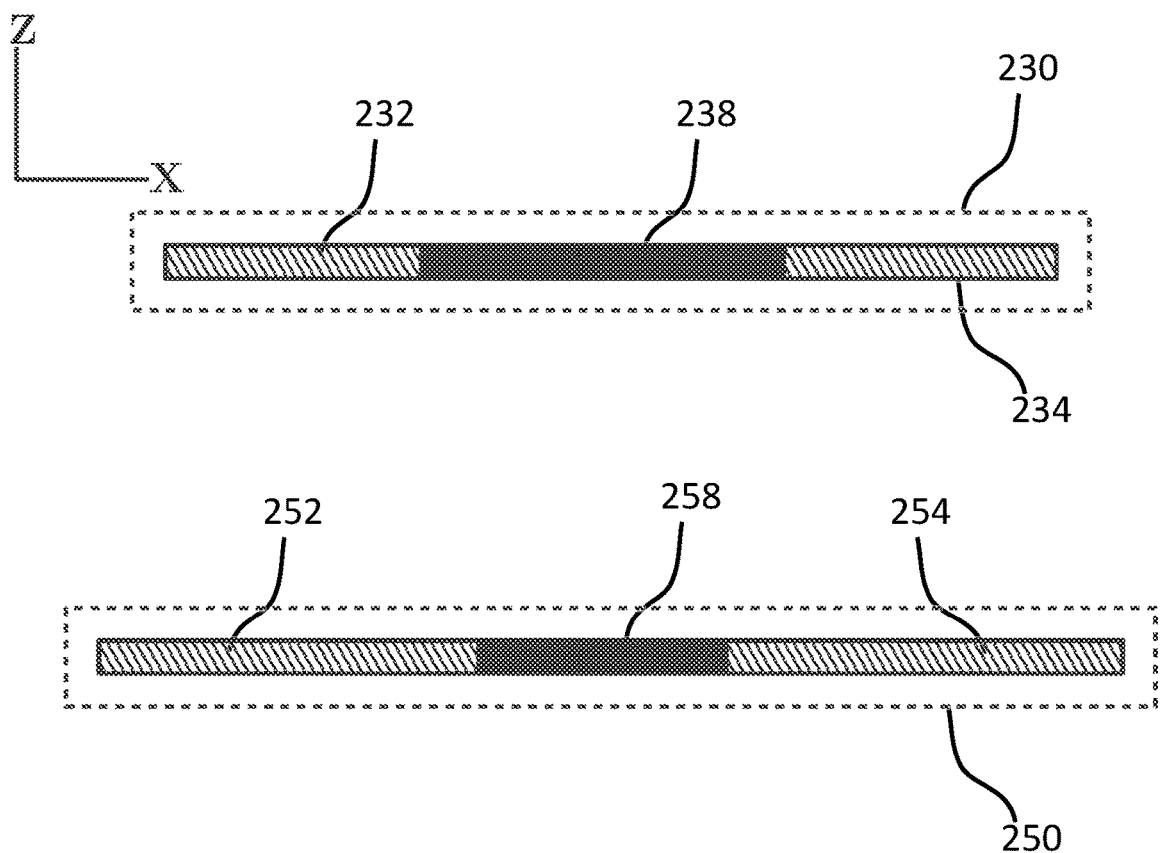

As compared to the four-antenna parallel structure depicted in FIG. 4C, the FIG. 4B stacked configuration is much more compact in the XY plane. In addition, since all the antennas may be center aligned, this configuration is robust to angular misalignment. Specifically, when the antennas are in circular shape, angular rotation has no influence on the coupling capacitances. However, as compared to the four-antenna parallel structure depicted in FIG. 4C, the mutual conductance of the FIG. 4B stacked configuration may be lower due to increased cross-coupling capacitances.

FIG. 4C depicts another example of a configuration of antennas 80, 180, 280. In some embodiments, FIG. 4C depicts a four-antenna parallel (or four-antenna horizontal) WPT system. Each of transmitter resonator 230 and receiver resonator 250 comprises two antennas. Together, one antenna of transmitter resonator 230 and one antenna of receiver resonator 250 provide a forward path for power and together the other antenna of transmitter resonator 230 and the other antenna of receiver resonator 250 provide return path for power.

For the purpose of IPT, by driving a current through antennas 232, 234 of the transmitter, a magnetic field is generated that may induce current in first and second receiver antennas 252, 254. For the purpose of CPT, a potential difference may be created between first and second antennas 232, 234 to generate electric field 31B to induce a potential across first and second receiver antennas 252, 254.

As compared to transmitter and receiver resonators 130, 150, shown in FIG. 4B, transmitter and receiver resonators 230, 250, having a horizontal arrangement of antennas, may be desirable in applications where there is a limitation on the Z direction dimension of the resonators.

Transmitter resonator 230 comprises first transmitter antenna 232 and second transmitter antenna 234 separated in the X direction by a spacer 238. By separating first and second transmitter antennas 232, 234 in the X direction, parasitic energy loss may be reduced. First and second transmitter antennas 232, 234 may be substantially similar to first and second transmitter antennas 132, 134 and spacer 238 may be substantially similar to spacer 138. Like transmitter resonator 130, first transmitter antenna 232 may have a greater XY plane area than that of second transmitter antenna 234 to improve the forward path for power transfer.

Spacer 238 may comprise any suitable material. For example, spacer 238 may comprise air, a dielectric material, ferrite or a combination thereof. Spacer 238 may have a permittivity constant chosen to change electric field 31A and/or it may have a permeability constant chosen to change magnetic field 31B. Spacer 238 may comprise a high permittivity material to increase the capacitance of transmitter resonator 230. The thickness and planar area of spacer 238 may be dependent on the thickness and/or planar area of first and second transmitter antennas 232, 234. In some embodiments, electrical isolation may be desirable, and a low permittivity material may be employed for spacer 238 (for example, for shielding).

Receiver resonator 250 comprises first receiver antenna 252 and second receiver antenna 254 separated in the X direction by spacer 258. By separating first and second receiver antennas 252, 254 in the X direction, parasitic energy loss may be reduced. First and second receiver antennas 252, 254 may be substantially similar to first and second receiver antennas 152, 154 and spacer 258 may be substantially similar to spacer 138. Like receiver resonator 150, first receiver antenna 252 may have a greater XY plane area than that of second receiver antenna 254.

Spacer 258 may comprise any suitable spacer. Spacer 258 may comprise the same or similar materials to spacer 238 or different materials from spacer 238. As compared to spacer 258, spacer 238 may have a smaller Z direction dimension to achieve a desired self-capacitance and/or self-inductance. This may effectively change coupling coefficient of the link between primary side 12 and secondary side 14 and the impedance of primary side 12. Different compensation networks may be employed in both primary and secondary sides 12, 14 to accommodate such coupling coefficient and impedance changes.

In some embodiments, the XY plane area of spacer 258 may be different from the XY plane area of spacer 238 in order to vary the self-inductance or self-capacitance of transmitter resonator 230 or receiver resonator 250. For example, as compared to spacer 258, spacer 238 may have a smaller XY plane area as depicted.

Figure 4D:
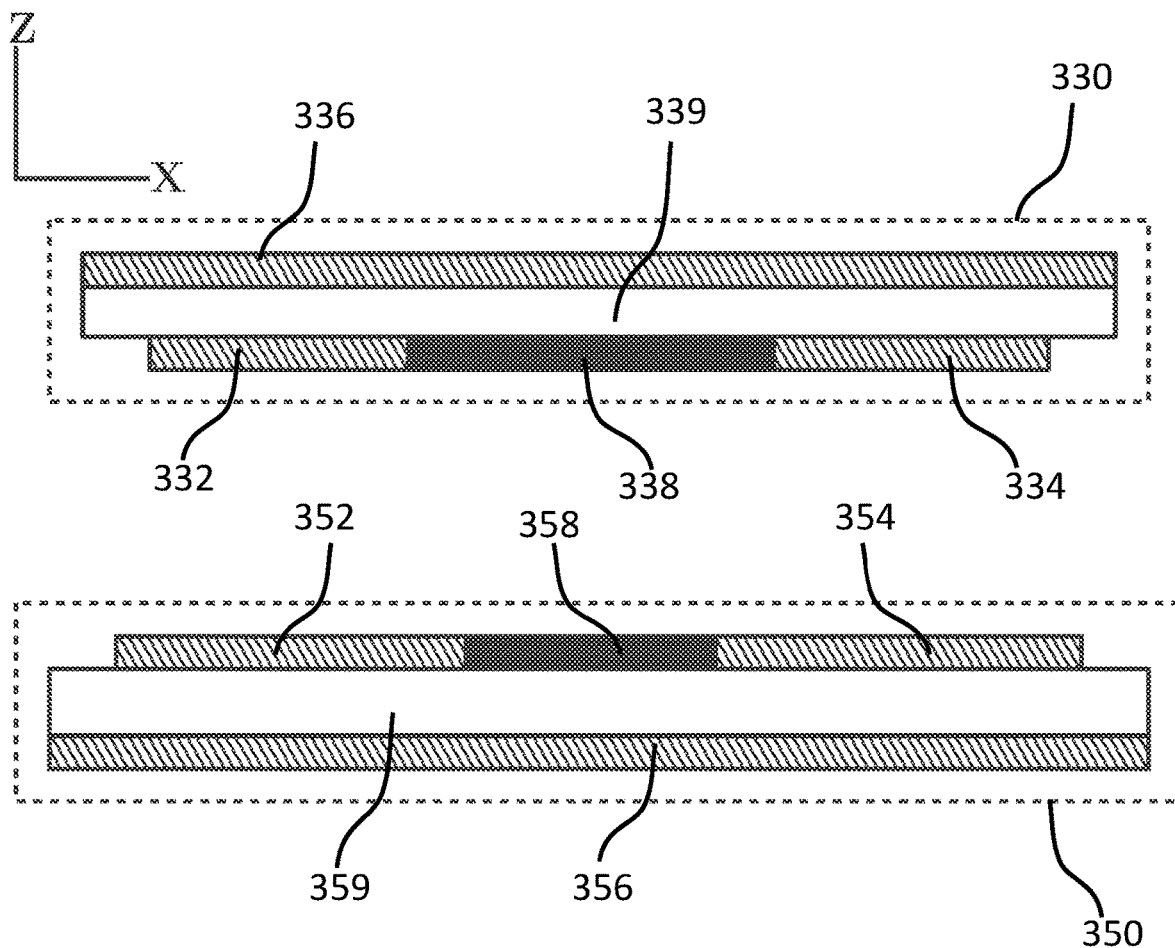

FIG. 4D depicts another example of a configuration of antennas 80, 180, 280. In some embodiments, FIG. 4D depicts a six antenna WPT system which combines the stacked configuration of FIG. 4B and the parallel configuration of FIG. 4C. Each of transmitter resonator 130 and receiver resonator 150 comprises three antennas. Together, one antenna of first and second transmitter antennas 332, 334 and one of first and second receiver antennas 352, 354 provide a forward path for power and together the other of first and second transmitter antennas 332, 334 and the other of first and second receiver antennas 352, 354 provide a return path for power. Third transmitter and receiver antennas 336, 356 work as auxiliary antennas to increase the equivalent self-capacitance and serve as electric field shielding. In some embodiments, third transmitter and receiver antennas 336, 356 are passive (for example, a potential difference is not applied between third transmitter and receiver antennas 336, 356 and/or current is not driven through third transmitter and receiver antennas 336, 356). For the purpose of IPT, by driving a current through one or more of antennas 332, 334, 336 of the transmitter, a magnetic field is generated that may induce a current in first receiver antennas 352, 354, 356. For the purpose of CPT, a voltage may be applied to first transmitter antenna 332, second transmitter antenna 334 and/or third transmitter antenna 336 to create a potential difference between any of first, second and third transmitter antennas 332, 334, 336 thereby creating electric field 31B.

Transmitter resonator 330 comprises first transmitter antenna 332 and second transmitter antenna 334 separated in the X direction by spacer 338 and third transmitter antenna 336 separated from first and second transmitter antennas and spacer 338 by second spacer 339. Third transmitter antenna 336 may provide electric field shielding to reduce undesirable escape of electric fields from transmitter resonator 330. Third transmitter antenna 336 may contain a ferrite sheet or surface to provide magnetic field shielding to reduce undesirable escape of magnetic fields from transmitter resonator 330. Shielding or shaping of electric or magnetic fields may also be possible by changing the spacer 339.

First and second and third transmitter antennas 332, 334, 336 may be substantially similar to any of first and second transmitter antennas 132, 134. Spacers 338, 339 may be substantially similar to spacer 138. Like transmitter resonator 130, first transmitter antenna 332 may have a greater XY plane area than that of second transmitter antenna 334. Third transmitter antenna 336 may have a greater XY plane area than either of first and second transmitter antennas 334, 332.

Spacers 338, 339 may comprise any suitable material. For example, spacers 338, 339 may comprise air, a dielectric material, ferrite or a combination thereof. Spacers 338, 339 may have a permittivity constant chosen to change electric field 31A and/or it may have a permeability constant chosen to change magnetic field 31B. Spacers 338, 339 may comprise a high permittivity material to increase the capacitance of transmitter resonator 230. The thickness and planar area of spacers 338, 339 may be dependent on the thickness and/or planar area of First and second and third transmitter antennas 332, 334, 336. In some embodiments, electrical isolation may be desirable, and a low permittivity material may be employed for spacers 338, 339 (for example, for shielding).

Receiver resonator 350 comprises first receiver antenna 352 and second receiver antenna 354 separated in the X direction by spacer 358 and third receiver antenna 356 separated from first and second receiver antennas and spacer 358 by second spacer 359. Third receiver antenna 356 may provide electric field shielding to reduce undesirable escape of electric fields from receiver resonator 350. Third receiver antenna 356 may contain a ferrite sheet or surface to provide magnetic field shielding to reduce undesirable escape of magnetic fields from transmitter. Shielding or shaping of electric or magnetic fields may also be possible by changing the spacer 359. First and second and third receiver antennas 352, 354, 356 may be substantially similar to any of first and second receiver antennas 152, 154. Spacers 358, 359 may be substantially similar to spacer 158. Like receiver resonator 150, first receiver antenna 352 may have a greater XY plane area than that of second receiver antenna 354. Third receiver antenna 356 may have a greater XY plane area than either of first and second receiver antennas 354, 352.

Spacers 358, 359 may comprise any suitable spacer. Spacers 358, 359 may comprise the same or similar materials to spacers 338, 339 or different materials from spacers 338, 339. As compared to spacers 358, 359, spacers 338, 339 may have a smaller Z direction dimension to achieve a desired self-capacitance and/or self-inductance. This may effectively change coupling coefficient of the link between primary side 12 and secondary side 14 and the impedance of primary side 12. Different compensation networks may be employed in both primary and secondary sides 12, 14 to accommodate such coupling coefficient and impedance changes.

In some embodiments, the XY plane area of spacer 358 may be different from the XY plane area of spacer 338 in order to vary the self-inductance or self-capacitance of transmitter resonator 330 or receiver resonator 350. For example, as compared to spacer 358, spacer 338 may have a smaller X direction dimension. In some embodiments, the Z direction dimension of spacer 359 may be different from the Z direction dimension of spacer 339 in order to vary the self-inductance or self-capacitance of transmitter resonator 330 or receiver resonator 350. For example, as compared to spacer 359, spacer 339 may have a smaller Z direction dimension. This may effectively change coupling coefficient of the link between primary side 12 and secondary side 14 and the impedance of primary side 12. Different compensation networks may be employed in both primary and secondary sides 12, 14 to accommodate such coupling coefficient and impedance changes.

In some embodiments, magnetic shielding may be provided around one or more of transmitter resonator 30 and receiver resonator 50. For example, ferrite may be employed as magnetic shielding and to reduce undesirable eddy currents in nearby metallic objects. Ferrite (or another suitable material) may also be employed to isolate transmitter resonator 30 and/or receiver resonator 50 from surrounding metal objects and may therefore serve to increase the self-inductance of the antennas and/or mutual inductance of the resonators.

Figure 6:
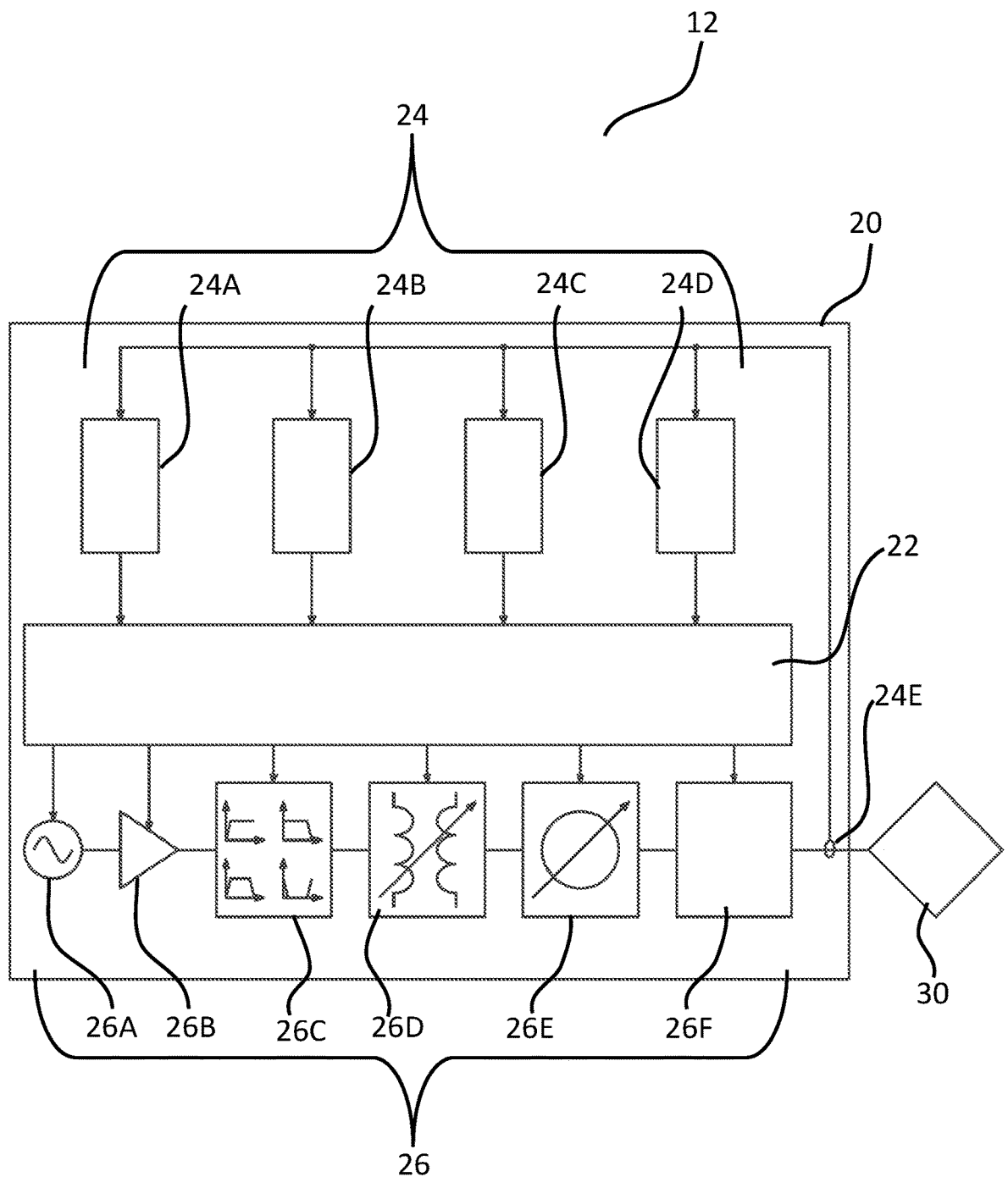
FIG. 6 is a schematic depiction of a primary side of a wireless power transfer system according to one example embodiment.

FIG. 6 depicts a schematic diagram of primary side 12 comprising transmitter module 20 and transmitter resonator 30 according to some embodiments. Transmitter resonator 30 may comprise any of transmitter resonators 30, 130, 230, 330 or otherwise described herein.

Transmitter module 20 comprises controller 22. Controller 22 is configured to receive various inputs from sensors 24 (for example, load detector 24A, transmitter power sensor 24B, surrounding object detector 24C and/or distance detector 24D) and output control signals to various components 26 (for example, oscillator 26A, power amplifier 26B, filter network 26C, matching network 26D, compensation network 26E and V/I tuner 26F).

Load detector 24A is configured to detect the presence of load 70 (shown in FIG. 7) connected to secondary side 14. Load 70 may be, for example, a battery of an electric vehicle such as an e-bicycle or an electric car, or any other suitable item that requires a power input. Load detector 24A may be implemented with a physical sensor (for example without limitation, an optical sensor, a pressure sensor, an infrared sensor, or a proximity sensor.) and suitable software or firmware. For example, in some embodiments, power (for example, current and voltage) is measured at, for example, point 24E to determine power being drawn by transmitter resonator 30 (for example, as measured by transmitter power sensor 24B). If the amount of power that is being drawn by transmitter resonator 30 increases above a baseline, load detector 24A may signal to controller 22 that load 70 is present.

In other embodiments, load detector 24A may be configured to measure the input impedance of transmitter resonator 30 experienced at point 24E by transmitter module 20. The presence of a resonant load proximate to transmitter resonator 30, including for example secondary side 14 configured to drive load 70, will change the input impedance of transmitter resonator 30. This change in impedance, as provided by load detector 24A to controller 22, may be used by transmitter controller 22 to determine whether or not a co-operative receiver is present proximate transmitter resonator 30. The impedance changes induced in transmitter resonator 30 by different receivers are so distinct and so characteristic, that it is possible for controller 22 to not only detect the presence or absence of a receiver proximate to transmitter resonator 30, but to also identify the kind of receiver, including, for example without limitation, different models of mobile phones or digital tablets.

Transmitter power sensor 24B may measure the power (for example, measure the current and voltage) at point 24E to determine how much power is being drawn by transmitter resonator 30. Such information may be used, for example, by load detector 24A or to determine whether there is desirably efficient coupling between transmitter resonator 30 and receiver resonator 50.

Surrounding object detector (SOD) 24C is configured to determine if an object (for example, a living being such as a human or an animal or an inanimate object such as a piece of metal or otherwise) is proximate to transmitter resonator 30. SOD 24C may be implemented with a physical sensor (for example without limitation, an optical sensor, a pressure sensor, an infrared sensor, a proximity sensor, RADAR, or LIDAR.) or by way of suitable software or firmware. For example, if the power being drawn by transmitter resonator 30 (as measured by transmitter power sensor 24B) drops during IPT, software of SOD may determine that a piece of metal (or any electrical conductor) is proximate to transmitter resonator 30 or receiver resonator 50 and SOD may provide a signal to controller 22 indicating such presence. In some embodiments, controller 22 may cause transmitter module 20 to increase a proportion of power delivered by CPT if a metal object is detected proximate to transmitter resonator 30 or receiver resonator 50. In the absence of a living being as detected by SOD 24C, controller 22 may be configured to increase the power feed to transmitter resonator 30 (for example, higher than a regulated level in the presence of living beings) or in the proximity of a living being as detected by SOD 24C, controller 22 may be configured to decrease the power feed to transmitter resonator 30 to below a regulated level.

Distance detector 24D is configured to determine a distance between transmitter resonator 30 and receiver resonator 50. Distance detector 24D may be implemented with a physical sensor (for example without limitation, an optical sensor, an ultrasonic sensor, an infrared sensor, a proximity sensor, RADAR, or LIDAR.) or by suitable software or firmware. For example, distance detector 24D may be configured to determine the distance between transmitter resonator 30 and receiver resonator 50 based on changes in transmission power as measured by transmitter power sensor 24B.

In an embodiment, one or more temperature sensors may monitor temperatures at the transmitter resonator 30 or receiver resonator 50. If the temperature exceeds a predetermined limit the controller 22 may cause transmitter module 20 to decrease the proportion of power delivered by IPT, decrease overall power feed to the transmitter resonator 30, or shut off the power supply to transmitter resonator 30 to prevent a fire hazard or thermal runaway.

Oscillator 26A may be configured to control the frequency band, and/or bandwidth, and/or duty cycle (phase) (for example 5% to 50%) of the current being delivered to transmitter resonator 30 in response to a signal of controller 22.

Power amplifier 26B may be employed to convert DC power to AC power. Power amplifier 26B may be employed to adjust the power provided to transmitter resonator 30 in response to a signal of controller 22. In some embodiments, controller 22 may send a signal to power amplifier 26B to adjust reflection coefficients of the power amplifier 26B. In some embodiments, controller 22 may send a signal to power amplifier 26B to turn off (or sleep) when load detector 24A does not detect a load or to turn on when load detector 24A does detect a load.

Figure 8:
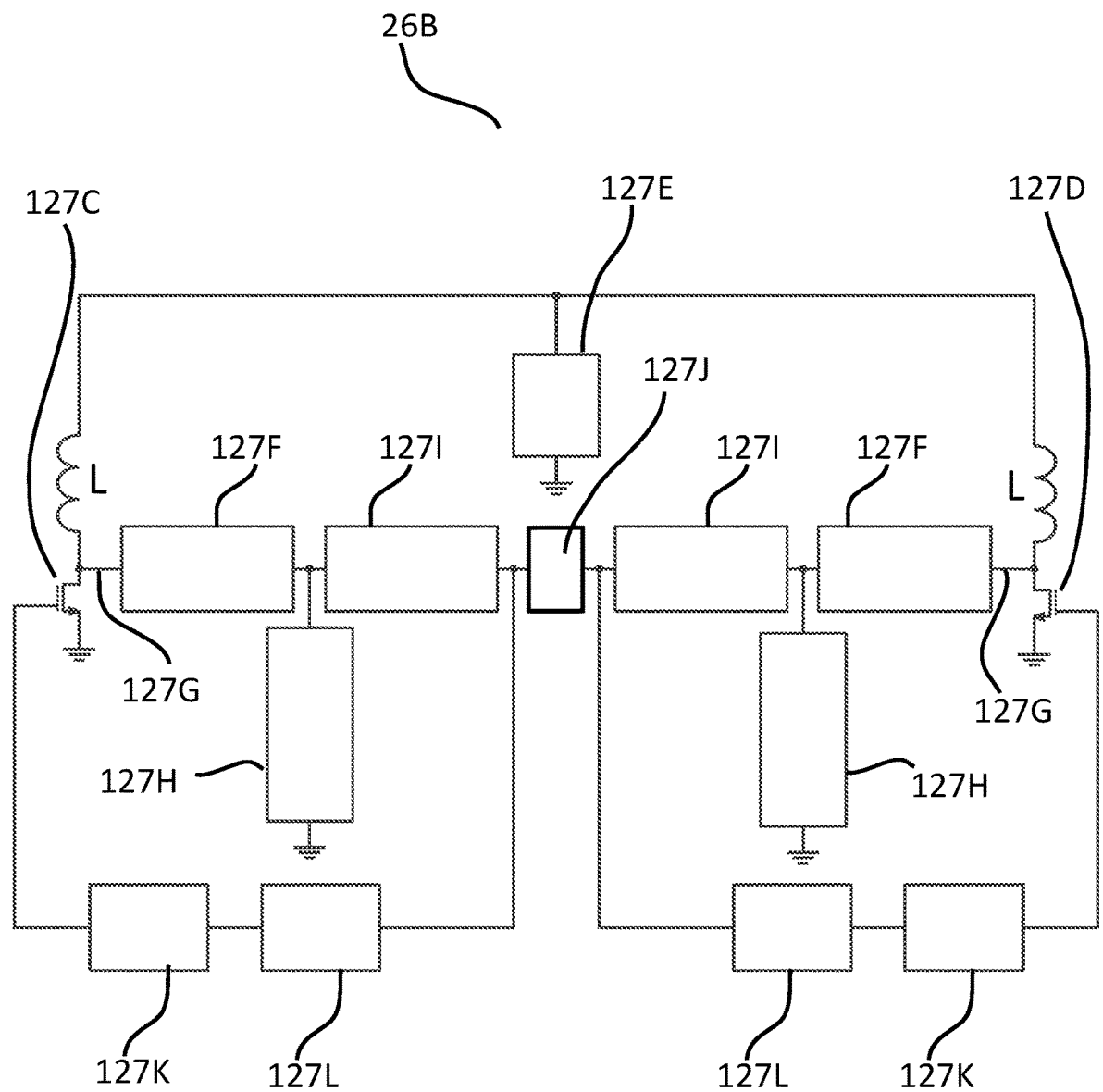
FIG. 8 is a schematic depiction of an exemplary power amplifier that may be used in various example embodiments or on its own or in combination with other disclosed elements.

Power amplifier 26B may comprise a switched-mode power amplifier (in single-ended mode or a differential configuration) that may be configured to receive a square (sine) wave from oscillator 26A and generate a sine wave of the specific frequency desired to drive the transmitter resonator 30. FIG. 8 is a schematic diagram of exemplary power amplifier 26B that may be used in transmitter 30. Power amplifier 26B may be a differential switched-mode amplifier. Power amplifier 26B has three inputs, namely: two input signals that drive the active devices (transistors) 127C, 127D with the frequency set at resonant frequency and DC voltage of source 127E that is used to control the output power and operation region of the active devices.

Different load terminations are used to improve the performance (for example output power, power conversion efficiency) and reduce the unnecessary harmonics level. In some embodiments, 3rd harmonic terminations 127F are located in series branches to shape the voltage waveforms at the drain nodes 127G. 2nd harmonic terminations 127H are located in parallel branches to shape the voltage waveform at the drain nodes 127G. 1st harmonic terminations 127I are located in series branches to shape the voltage waveform at the drain nodes 127G. The effect of 3rd harmonic terminations may be considered in 2nd and 1st harmonic terminations 127H, 127I. The effect of 2nd harmonic terminations may be considered in 1st harmonic terminations 127I. For the differential configuration of power amplifier 26B, the AC load 127J (that receives the output power) is placed in series. A charging rate of AC load 127J may be a function of transmitter resonator 30, receive resonator 50 and/or their alignment and position. Power amplifier 26B may be configured to generate sufficient power to transmitter resonator 30 such that the E-field, or H-field, or any combination of E-field and H-field may be generated by transmitter resonator 30 and captured by receiver resonator 50.

Amplifier 26B may comprise two phase shifters 127L in the differential configuration (but only one phase shifter in a single-ended configuration). Phase shifters 127L adjust the appropriate phase difference between the AC signal overload 127J and gate signal of transistors 127C, 127D. The phase difference between the gate signals and AC signal overload 127J may change the power amplifier's performance, for example, power conversion efficiency and operation region of the transistors. It also may change the output impedance of transistors 127C and 127D and/or the optimum AC load 127J of power amplifier 26B.

Amplifier 26B may comprise two level shifters 127K in the differential configuration (but only one level shifter in a single-ended configuration). Level shifters 127K may adjust the appropriate amplitude for gate signal of transistors 127C, 127D. The amplitude level at gate signals may change the amplifier's performance (for example, power conversion efficiency and operation region of transistors).

Amplifier 26B may be reconfigurable to function as a rectifier, in some embodiments as a self-synchronous rectifier. As part of such reconfiguration, integrated phase shifters 127L and integrated level shifters 127K (see FIG. 8) may be adjusted so as to allow amplifier 26B to function as rectifier 26B based on the inherent amplification and switching function of transistors 127C, 127D. This re-configurability of amplifier 26B between operating as an amplifier and as a rectifier allows transmitter module 20 to controllably reconfigure between respectively a transmitter mode and a receiver mode. The reconfiguring may take place under instruction from controller 22. When amplifier 26B reconfigures from an amplifier to a rectifier, AC load 127J changes to AC source 127J. Correspondingly, when amplifier 26B reconfigures from an amplifier to a rectifier, DC source 127E reconfigures to DC load 127E. The application of transmitter module 20 in its receiver mode will be treated below once we have described secondary side 14 and its receiver module, both shown in more detail in FIG. 7.

Filter network 26C may adjust the frequency responses such as the bandwidth, cut-off frequency, 3 dB frequency, gain provided to transmitter resonator 30 in response to a signal of controller 22. Filter network 26C may be configured to adjust the shape of the waveform of the power in transmitter module 20 to increase the efficiency of transmitter module 20.

Matching network 26D may be configured to adjust impedance to match the output of power amplifier 26B to transmitter resonator 30.

Compensation network 26E may be provided to drive transmitter resonator 30 at a desired resonant frequency (for example, the resonant frequency of receiver resonator) to thereby increase the mutual flux, reduce heat generation and improve power transfer efficiency. Compensation network 26E may comprise one or more capacitors for increasing capacitance and one or more inductors for increasing inductance. Compensation network 26E may be configured to increase capacitance (and/or decrease inductance) and increase inductance (and/or decrease capacitance) as desired. When the transfer mode ratio is 100% CPT, compensation network 26E may function in a similar manner to any known CPT compensation network (for example, compensation network 26E may function to increase inductance). Similarly, when the transfer mode ratio is 100% IPT, compensation network 26E may function in a similar manner to any known IPT compensation network (for example, compensation network 26E may function to increase capacitance). However, when the transfer mode is part CPT and part IPT, less compensation may be required since the capacitance of transmitter resonator 30 will naturally provide compensation for the inductance of transmitter resonator 30 and the inductance of transmitter resonator 30 will naturally provide compensation for the capacitance of transmitter resonator 30. For example, at approximately 50% IPT and 50% CPT (for example, transfer mode ratio equal to one), compensation network may not be needed at all or the use of compensation network may be substantially limited thereby increasing the efficiency of WPT system 10.

As another example, between approximately 40-60% IPT and 40-60% CPT, compensation network may not be needed at all or the use of compensation network may be substantially limited thereby increasing the efficiency of WPT system 10. For this reason, compensation network 26E may comprise fewer or small inductors and/or capacitors as compared to CPT WPT systems and/or pure IPT WPT systems which require significant compensation. In some embodiments, if the capacitance of transmitter resonator 30 is sufficiently low, additional compensation by way of compensation network 26E may be provided. Similarly, if the inductance of transmitter resonator 30 is sufficiently low, additional compensation may be provided by way of compensation network 26E. Controller 22 may signal to compensation network 26E how much and what type of compensation is required based on, for example, the transfer mode ratio, a distance between transmitter resonator 30 and receiver resonator 50, the amount of power being drawn by transmitter resonator 30, the power transmission efficiency, etc.

In some embodiments, a magnitude of the compensation (for example, increase in capacitance or increase in inductance) by compensation network 26E is proportional to the absolute value of the difference between the transfer mode ratio and one. For example, if the transfer mode ratio is greater than one, compensation network 26E may function to increase inductance and as the transfer mode ratio increases by more above one, the amount of increase of inductance may increase. Similarly, if the transfer mode ratio is less than one, compensation network 26E may function to increase capacitance and as the transfer mode ratio decreases by more below one, the increase of capacitance may increase.

In some embodiments, compensation network 26E may be configured to modulate the signal provided to transmitter resonator 30 with information and may thereby serve as source transmission modulator. The information with which to modulate the signal provided to transmitter resonator 30 may be provided to compensation network 26E by controller 22. The information may comprise control data destined for controller 42 of the receiver module 40 via receiver resonator 50. Controller 42 is described in more detail below with reference to FIG. 7. In other embodiments power amplifier 26B may serve as source transmission modulator. In yet further embodiments, oscillator 26A may serve as source transmission modulator. The modulation employed by the chosen source transmission modulator may be any one of amplitude modulation, frequency modulation, and phase modulation. The information may be modulated onto the signal provided to transmitter resonator 30 in digital form or in analog form. The information may be modulated onto the resonant frequency of the power signal provided to the transmitter resonator 30 by the source transmission modulator. In other embodiments, the information may be modulated onto a frequency different from that of the power transfer. In other embodiments, the information may be modulated onto a harmonic of the resonant frequency of the power signal provided to the transmitter resonator 30. In yet further embodiments, the resonant frequency of the power signal provided to the transmitter resonator 30 may be a harmonic of the frequency of the signal onto which the information is modulated. The V/I tuner 26F, described in more detail below, may be configured to transmit the information signal to the transmitter resonator 30 and to thereby be transparent as regards the information being transmitted. The information transmitted in the fashion described here, may comprise without limitation, mode of operation of module 20, number and type of receivers 40, surrounding object sensor information, and load status monitoring information, including for example battery charge status, load voltage, and load current.

Figure 10:
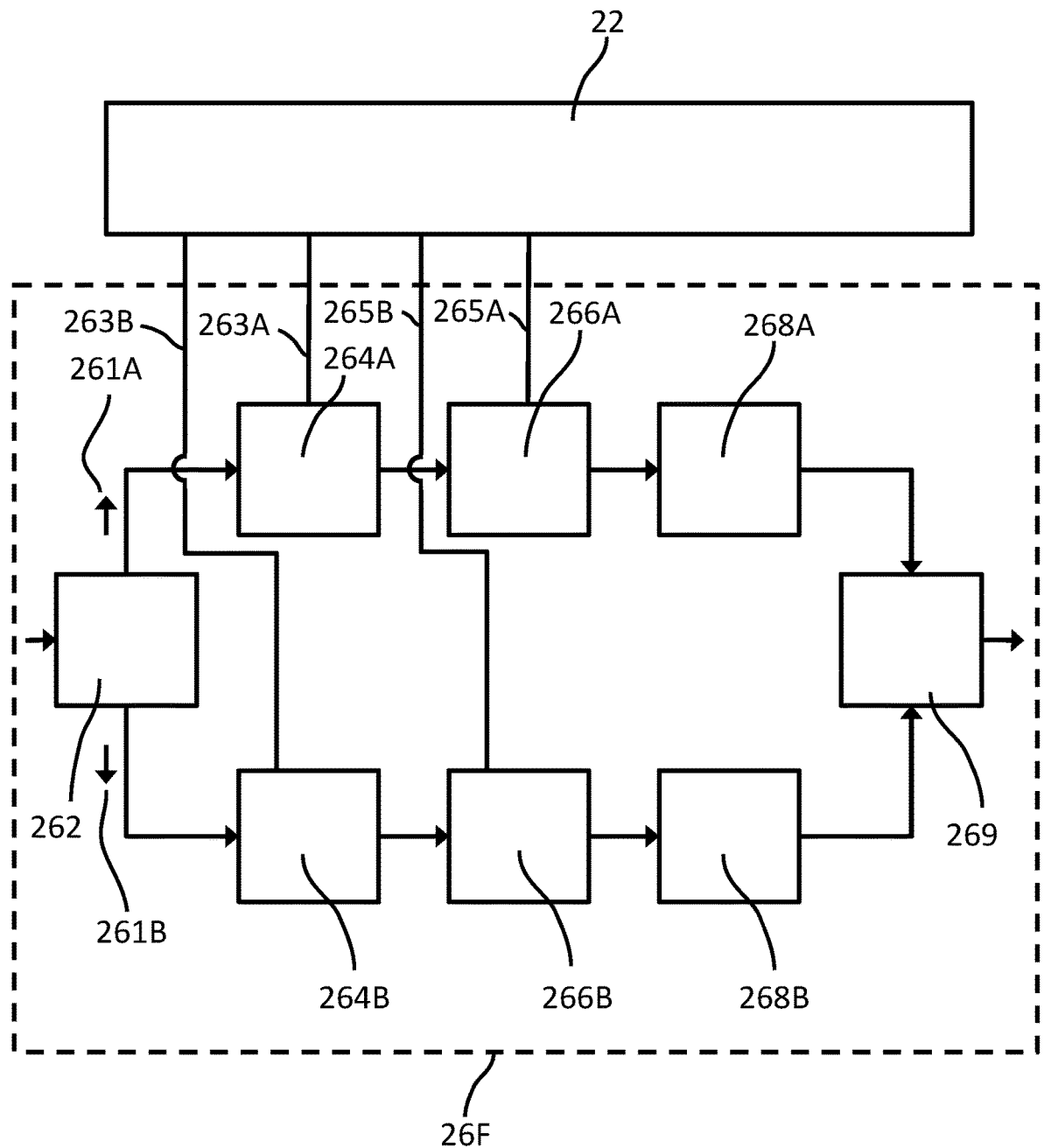
FIG. 10 shows a more detailed schematic depiction of a V/I tuner as per FIG. 6 used to adjust a power signal to a transmitter resonator according to one example.

An embodiment of V/I tuner 26F is shown in more detail in FIG. 10. The input signal of V/I tuner 26F received from matching network 26E (in FIG. 6) is split by a splitter 262 in order to have two mutually asymmetrical paths 261A and 261B for the input signal. First phase shifter 264A and second phase shifter 264B create a phase difference between the input voltage and the input current of transmitter resonator 30 (in FIG. 6). First phase shifter 264A is controlled by controller 22 (in FIG. 6) via first phase splitter control line 263A and second phase shifter 264B is controlled by controller 22 (See FIG. 6) via second phase splitter control line 263B. First and second active switches 266A and 266B receive the signals from first and second phase shifters 264A and 264B, respectively, and are controlled by controller 22 via first and second active switch control line 265A and 265B respectively. First and second active switches 266A and 266B serve to adjust the imaginary parts of the signals received from first and second phase shifters 264A and 264B respectively. Passive signal shaping networks 268A and 268B receive the adjusted signals from first and second active switches 266A and 266B respectively. Passive signal shaping networks 268A and 268B serve to fine tune the signals received from first and second active switches 266A and 266B respectively and, in some embodiments, serve to reduce any harmonics in those signals before passing them to combiner 269. The signals provided along the two mutually asymmetric paths 261A and 261B are combined by combiner 269 and provided to transmitter resonator 30. In other embodiments first and second phase shifters 264A and 264B may be combined as one phase shifter that receives the input signal to V/I tuner 26F and the combined phase shifter may have two separate outputs serving active switches 266A and 266B.

V/I tuner 26F adjusts the transfer mode ratio by adjusting the phase difference between the input current and the input voltage to transmitter resonator 30 in response to signals from controller 22. The real part of the impedance seen by transmitter module 20 is adjusted by means of phase shifters 264A and 264B, and its imaginary part may be adjusted by switches 266A and 266B. For example, a 90-degree phase shift for every 3 milliseconds out of every 10 milliseconds, may lead to 30% of magnetic power transfer and 70% of electric power transfer.

V/I tuner 26F may be configured to adjust the current through each transmitter antenna (for example, first and second transmitter antennas 32, 132, 232, 332, 134, 234, 334 or third transmitter antenna 336) and the potential applied to each transmitter antenna (for example, first and second transmitter antennas 32, 132, 232, 332, 134, 234, 334 or third transmitter antenna 336).

If current is caused to pass through both of first and second transmitter antennas 132, 134, they will each generate magnetic field 31A for the purpose of IPT. If the current delivered to second transmitter antenna 134 is reduced as compared the current delivered to first transmitter antenna 132, a potential difference will be generated between first and second transmitter antennas 132, 134 and an electric field 31B is generated for the purpose of CPT. To modulate between CPT and IPT, the current delivered to second antenna 134 may be modulated (for example, when less current is allowed to pass through second antenna 134, then less IPT will occur and when more current is allowed to pass through second antenna, more CPT will occur). For example, when it is desired to transfer power via IPT, I/V tuner 26F may be configured to act as a short circuit connecting the first and second transmitter antennas together to thereby create a series LC resonator that allows current to flow therein. Conversely, when it is desired to transfer power by CPT, I/V tuner 26F may be configured to act as an open circuit that dumps current, thereby generating a potential difference between first and second transmitter antennas. I/V tuner 26F may thereby be configured to control whether first and second transmitter antennas 132, 134 are effectively connected in series or in parallel.

Alternatively, when first and second transmitter antennas 132, 134 are connected in parallel, first and second transmitter antennas 132, 134 may be floated to cause an electric field 31B to be generated for the purpose of CPT with substantially no magnetic field 31A generated. To change the transfer mode ratio (for example, to modulate between CPT and IPT), I/V tuner 26F may be configured (by means of a multiplexer, or the like, of I/V tuner 26F) to alternate between (1) floating first and second transmitter antennas 132, 134 to cause CPT and (2) driving current through first and second transmitter antennas 132, 134 to cause IPT. The alternation may be implemented in milliseconds or at frequencies between 10 Hz and 10 kHz. With more time allocated to floating first and second transmitter antennas 132, 134, the transfer mode ratio will be biased toward more CPT and with more time allocated to driving current through first and second transmitter antennas 132, 134, the transfer mode will be biased toward more IPT.

In some embodiments, elements 26 may be discrete elements in transmitter module 20 while in other embodiments, one or more of elements 26 may be part of an integrated circuit design.

Figure 7:
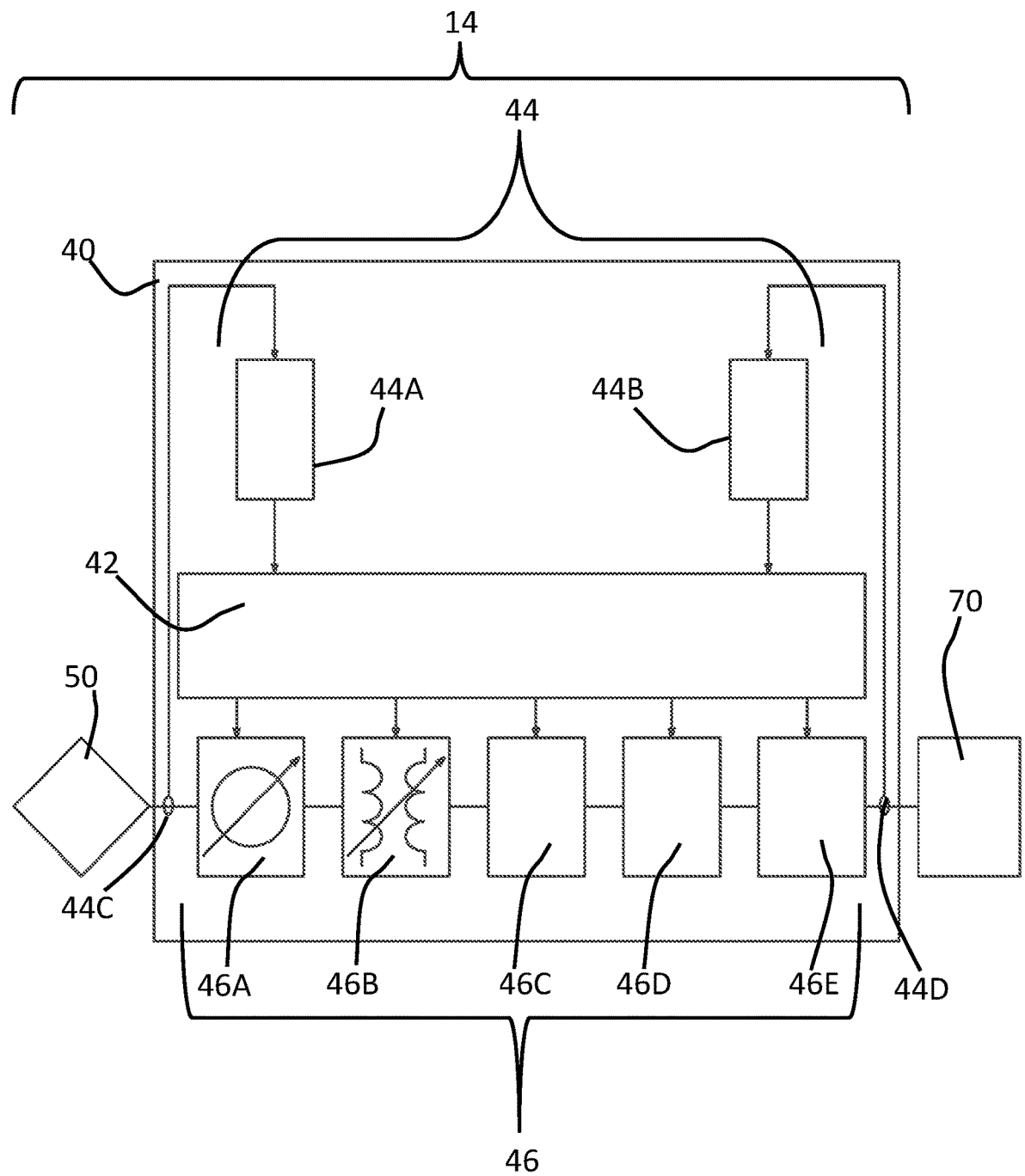
FIG. 7 is a schematic depiction of a secondary side of a wireless power transfer system according to one example embodiment.

FIG. 7 is a schematic depiction of load 70 and secondary side 14 (as shown in FIG. 1) comprising receiver resonator 50 and receiver module 40 according to some embodiments.

Receiver resonator 50 may comprise any of receiver resonators 50, 150, 250, 350 or otherwise described herein. Receiver resonator 50 may be configured to capture power with the frequency set by an oscillating signal in transmitter module 20 such as, for example without limitation between 1 MHz and 1 GHz. In some embodiments, the frequency set by the oscillating signal in transmitter module 20 is about 1 MHz to about 100 MHz, about 1 MHz to about 200 MHz, about 1 MHz to about 300 MHz, about 1 MHz to about 400 MHz, about 1 MHz to about 500 MHz, about 1 MHz to about 600 MHz, about 1 MHz to about 700 MHz, about 1 MHz to about 800 MHz, about 1 MHz to about 900 MHz, about 1 MHz to about 1 GHz, about 100 MHz to about 200 MHz, about 100 MHz to about 300 MHz, about 100 MHz to about 400 MHz, about 100 MHz to about 500 MHz, about 100 MHz to about 600 MHz, about 100 MHz to about 700 MHz, about 100 MHz to about 800 MHz, about 100 MHz to about 900 MHz, about 100 MHz to about 1 GHz, about 200 MHz to about 300 MHz, about 200 MHz to about 400 MHz, about 200 MHz to about 500 MHz, about 200 MHz to about 600 MHz, about 200 MHz to about 700 MHz, about 200 MHz to about 800 MHz, about 200 MHz to about 900 MHz, about 200 MHz to about 1 GHz, about 300 MHz to about 400 MHz, about 300 MHz to about 500 MHz, about 300 MHz to about 600 MHz, about 300 MHz to about 700 MHz, about 300 MHz to about 800 MHz, about 300 MHz to about 900 MHz, about 300 MHz to about 1 GHz, about 400 MHz to about 500 MHz, about 400 MHz to about 600 MHz, about 400 MHz to about 700 MHz, about 400 MHz to about 800 MHz, about 400 MHz to about 900 MHz, about 400 MHz to about 1 GHz, about 500 MHz to about 600 MHz, about 500 MHz to about 700 MHz, about 500 MHz to about 800 MHz, about 500 MHz to about 900 MHz, about 500 MHz to about 1 GHz, about 600 MHz to about 700 MHz, about 600 MHz to about 800 MHz, about 600 MHz to about 900 MHz, about 600 MHz to about 1 GHz, about 700 MHz to about 800 MHz, about 700 MHz to about 900 MHz, about 700 MHz to about 1 GHz, about 800 MHz to about 900 MHz, about 800 MHz to about 1 GHz, or about 900 MHz to about 1 GHz. In some embodiments, the frequency set by the oscillating signal in transmitter module 20 is about 1 MHz, about 100 MHz, about 200 MHz, about 300 MHz, about 400 MHz, about 500 MHz, about 600 MHz, about 700 MHz, about 800 MHz, about 900 MHz, or about 1 GHz. In some embodiments, the frequency set by the oscillating signal in transmitter module 20 is at least about 1 MHz, about 100 MHz, about 200 MHz, about 300 MHz, about 400 MHz, about 500 MHz, about 600 MHz, about 700 MHz, about 800 MHz, or about 900 MHz In some embodiments, the frequency set by the oscillating signal in transmitter module 20 is at most about 100 MHz, about 200 MHz, about 300 MHz, about 400 MHz, about 500 MHz, about 600 MHz, about 700 MHz, about 800 MHz, about 900 MHz, or about 1 GHz.

For some applications, frequencies in the Industrial, Scientific and Medical (ISM) frequency bands may be preferred. For the purposes of the present disclosure, the ISM bands are to be understood as being 6.765 MHz to 6.795 MHz; 13.553 MHz to 13.567 MHz; 26.957 MHz to 27.283 MHz; 40.66 MHz to 40.70 MHz; 83.996 MHz to 84.004 MHz; 167.992 MHz to 168.008 MHz; 433.05 MHz to 434.79 MHz; and 886 MHz to 906 MHz For other applications, frequencies in officially reserved application bands may be preferred, for example without limitation, Police Communication or Military bands. Receiver resonator 50 may be configured to capture power from magnetic field 31A or electric field 31B or any combination of these two fields at that frequency.

Receiver module 40 comprises controller 42. Controller 42 is configured to receive various inputs from sensors 44 (for example, receiver power sensor 44A and load detector 44B) and output control signals to various elements 46 (for example, compensation network 46A, matching network 46B, rectifier 46D, filter 46C, and load manager 46E).

Receiver power sensor 44A may measure the power (for example, measure the current and voltage) at point 44C to determine how much power is being received by receiver resonator 50.

Load detector 44B is configured to detect the presence of load 70. Load detector 44B may be implemented with a physical sensor (for example without limitation, an optical sensor, a pressure sensor, an infrared sensor, or a proximity sensor.) or by way of suitable software or firmware. For example, in some embodiments, current and voltage is measured by load detector 44B at, for example, point 44D to determine power being received by load 50. If the amount of power that is being measured at point 44D increases above a baseline, load detector 44B may signal to controller 42 that a load 70 is present.

Compensation network 46A may be configured to maintain a desired resonant frequency of receiver resonator 50 in response to a signal from controller 42 to thereby improve the efficiency of power transfer from transmitter resonator 30 to receiver resonator 50. Compensation network 46A may be and may function substantially like compensation network 26E of transmitter module 20.

Matching network 26D may be configured to adjust an input impedance of rectifier 46D to match a desirable impedance of resonator 30 to achieve maximum power transfer.

Rectifier 46D may be configured to convert AC power received by receiver antenna 50 to DC power to provide to load 70.

Filter 46C may be configured to shape the waveform of power output from rectifier 46D according to a signal from controller 42 in order to improve the overall power efficiency of receiver module 40.

Load manager 46E may be configured to provide suitable voltage and current for load 70 and/or to extract the maximum power from rectifier 46D by adjusting its input impedance (for example, the output impedance of rectifier 46D).

In some embodiments, load manager 46E or another component may be configured to communicate (wirelessly or wired) with external devices (for example, load 70) to provide appropriate information for data analysis. Such information may include, for example without limitation, presence of load 70, a charge level of load 70, a charging rate of load 70, status of load 70, a present voltage, capacity, and/or remaining time to charge load 70. Load manager 46E may employ such information (or relay such information to controller 42 or controller 22) to adjust, for example, the transfer mode ratio to achieve optimal energy transfer between primary side 12 and secondary side 14. Load manager 46E may also provide such information to a user via a display. Such a display may be built into one or more of primary side 12 and secondary side 14 or may be accessible via software on a mobile device such as, for example, an app on a mobile phone or tablet that is in wireless (or wired) communication with load manager 46E or controller 22 or controller 42.

In some embodiments, components 46 are discrete elements in receiver module 40 while in other embodiments, one or more of components 46 are part of an integrated circuit design.

In some embodiments, primary side 12 may comprise a plurality of transmitter resonators 30 and/or secondary side 14 may comprise a plurality of receiver resonators 50. In such embodiments, each of transmitter resonators 30 and/or receiver resonators 50 may be controlled in a similar manner. In other embodiments, each of transmitter resonators 30 and/or receiver resonators 50 may be controlled individually. For example, in some embodiments, primary side 12 may rely more heavily on transmitter resonators 30 that are experiencing less interference (for example, due to a nearby metal object), that are not near a living being or that are transferring power more efficiently and/or similarly, secondary side 14 may rely more heavily on receiver resonators 50 that are experiencing less interference (for example, due to a nearby metal object), that are not near a living being or that are receiving power more efficiently. Such control may be provided or facilitated by, for example, transmitter module 20 and receiver module 40 and/or communication therebetween.

Figure 9:
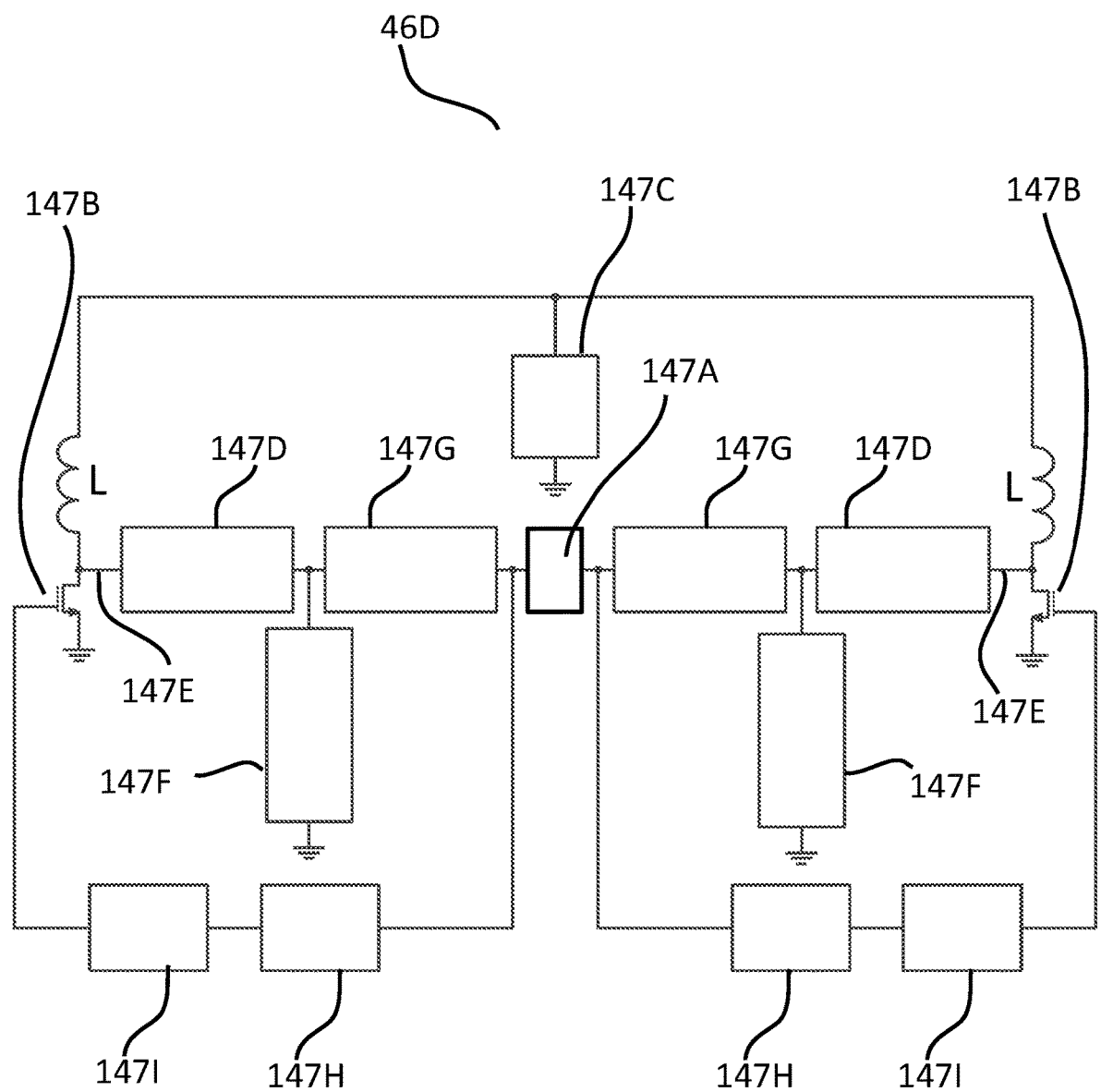
FIG. 9 is a schematic depiction of an exemplary self-synchronous rectifier that may be used in various example embodiments or on its own or in combination with other disclosed elements.

FIG. 9 is a schematic depiction of a rectifier 46D having an integrated phase shifter. In some embodiments, rectifier 46D comprises a discrete phase shifter.

Rectifier 46D may be a switched-mode self-synchronous rectifier (in single-ended mode or a differential configuration) that may be configured to receive a sine wave (for example, AC power) from receiver resonator 50 at a specific resonant frequency. Rectifier 46D may be a differential switched-mode self-synchronous rectifier. Rectifier 46D may capture sufficient power from receiver resonator 50 such that E-field, or H-field, or any combination of E-field and H-field may be captured by receiver resonator 50.

Rectifier 46D has input 147A (for example, AC power) that drives active devices 147B (for example, transistors) with the frequency set at resonant frequency and has output 147D (for example, DC voltage) across the DC load (that is used to control the output power, input impedance and operation region of the active devices). In this design, different load terminations are used to improve the performance (for example, output power and power conversion efficiency). 3rd harmonic terminations 147D are located in series branches to shape the voltage waveforms at drain nodes 147E. 2nd harmonic terminations 147F are located in parallel branches to shape the voltage waveform at drain nodes 147E. 1st harmonic terminations 147G are located in series branches to shape the voltage waveform at drain nodes 147E. The effect of 3rd harmonic terminations may be considered in 2nd and 1st harmonic terminations. The effect of 2nd harmonic terminations may be considered in 1st harmonic terminations.

For the differential configuration, AC source 147A is placed in series. AC source 147A may be a function of a power received by receiver resonator 50 and the alignment and position of receiver resonator 50 relative to transmitter resonator 30. DC load 147C may be a single-ended load.

Rectifier 46D may comprise two phase shifters 147H in the differential configuration (but only one phase shifter in a single-ended configuration). Phase shifters 147H adjust the appropriate phase difference between the AC source and gate signal of transistors 147B. The phase difference between gate signals and AC source 147A may change the self-synchronous rectifier's performance (for example, power conversion efficiency and operation region of transistors). It also may change the input impedance of self-synchronous rectifier 46D and/or the optimum DC load 147C of rectifier 46D.

Rectifier 46D may comprise two level shifters 147I in the differential configuration (but only one level shifter in a single-ended configuration). Level shifters 147I may adjust the appropriate amplitude for gate signal of transistors 147B. The amplitude level at gate signals may change the self-synchronous rectifier's performance (for example, power conversion efficiency and operation region of transistors).

Rectifier 46D may be reconfigurable to function as an amplifier. As part of such reconfiguration, integrated phase shifters 147H and integrated level shifters 147I (see FIG. 9) may be adjusted so as to allow rectifier 46D to function as an amplifier based on the inherent amplification and switching function of transistors 147B. This reconfigurability of rectifier 46D between operating as a rectifier and as an amplifier allows receiver module 40 to controllably reconfigure between respectively a receiver mode and a transmitter mode. The reconfiguring may take place under instruction from controller 42. When rectifier 46D reconfigures from a rectifier to an amplifier, AC source 147A changes to AC load 147A. Correspondingly, when rectifier 46D reconfigures from a rectifier to an amplifier, DC load 147C reconfigures to DC source 147C.

In some embodiments, when receiver module 40 is in transmitter mode, compensation network 46A may be configured to modulate the signal provided to resonator 50 with information and may thereby serve as source transmission modulator. The information with which to modulate the signal provided to resonator 50 may be provided to compensation network 46A by controller 42. The information may comprise control data destined for controller 22 of transmitter module 20 via resonator 30. In some embodiments, when receiver module 40 is in transmitter mode and rectifier 46D is configured as an amplifier, amplifier 46D may serve as the modulator for module 40. The modulation employed may be any one of amplitude modulation, frequency modulation, phase modulation, and combinations thereof. The information may be modulated onto the signal provided to transmitter resonator 50 in digital form or in analog form. The information may be modulated onto the resonant frequency of the power signal provided to transmitter resonator 50 by the source transmission modulator. In other embodiments, the information may be modulated onto a frequency different from that of the power transfer. In other embodiments, the information may be modulated onto a harmonic of the resonant frequency of the power signal provided to transmitter resonator 50. In yet further embodiments, the resonant frequency of the power signal provided to transmitter resonator 50 may be a harmonic of the frequency of the signal onto which the information is modulated. The information transmitted in the fashion described here, may comprise for example without limitation, presence of load 70, a charge level of load 70, power transfer efficiency, a charging rate of load 70, status of load 70, a present voltage, charge capacity, remaining time to charge load 70.

Having described above how both module 20 and module 40 may be reconfigured between operating in transmitter mode and receiver mode, and having described how signals from both module 20 and module 40 may be modulated, it is clear that system 10 of FIG. 1 may function as a full-duplex transmit-receive system for transmitting information in both directions via resonators 30 and 50. System 10 of FIG. 1 may comprise further secondary sides similar to secondary side 14 of FIG. 1 and FIG. 7. When additional secondary sides are present, the arrangement described above allows communication of information among the various secondary sides.

In some embodiments, primary side 12 and secondary side 14 may communicate via Bluetooth (for example, 2.4 GHz) or a signal frequency similar to that of GPS (for example, 10 GHz). In some embodiments, there may be an additional unit that may collect data separately and transfer data back and forth between primary side 12 and/or secondary side 14. In some embodiments, WiFi may be employed to upload data from primary side 12 and/or secondary side 14 to an online portal (for example, a website or mobile application associated with primary side 12 and/or secondary side 14).

In some embodiments, it may be desirable to transfer power between two receiver modules 40 (for example, peer-to-peer power transfer). For example, if a first e-bicycle with a first receiver has a dead or low battery and a second e-bicycle with a second receiver and an at least partially charged battery is nearby, it may be desirable to transfer power from the second e-bicycle to the first e-bicycle. Such a situation may pertain when, for example, no transmitter is nearby. The facility of at least one of two receiver modules 40 involved to reconfigure into a transmitter module makes possible such peer-to-peer power transfer. In general, it makes possible the forwarding of power among a plurality of secondary sides 14.

In other embodiments, there may be a need for power to be transmitted at certain times in the reverse direction, that is, from the load side to the source side of FIG. 1, FIG. 6 and FIG. 7. The ability of both module 20 and module 40 to be reconfigured between operating in transmitter mode and receiver mode allows such transfer of power in the "reverse" direction from module 40 to module 20. The system therefore allows bidirectional power transfer. Given the fact that devices 26B and 46D of FIG. 8 and FIG. 9 respectively may be reconfigured to function as amplifier or rectifier, we may refer to these devices collectively as "differential self-synchronous radio frequency power amplifier/rectifiers". Given the bidirectionality of power transmission, transmitter resonator 30 and receiver resonator 50 may both be described as "transmitter-receiver resonators" and modules 20 and 40 may both be termed "power transmit-receive modules". Such arrangements are useful in electric vehicles in which kinetic energy is converted during braking and needs to be transferred to batteries. Other systems, conditions, and arrangements in which such changed direction of power transfer applies, include for example without limitation, a number of mobile phones that may have varying levels of remaining battery charge, and may use this arrangement to at least partially recharge one another. In a more general case, when a transmitting system and a receiving system both do not have permanent energy sources, for example grid power, then the bidirectional functionality may be employed to transfer the energy in either direction.

In a further aspect, described with respect to FIG. 31, a near-field radio frequency method is provided for transferring power via a power signal at a power signal frequency [2200], the method comprising: providing [2210] a bimodal resonant near-field radio frequency power transfer system comprising a plurality of power transmit-receive modules wherein each of the plurality of power transmit-receive modules is in wired communication with a transmitter-receiver resonator disposed to exchange power with at least one other of the plurality of power transmit-receive modules; and operating [2220] the power transfer system for simultaneous capacitive power transfer and inductive power transfer according to an adjustable transfer mode ratio.

Providing [2210] the power transfer system may comprise providing a first of the plurality of power transmit-receive modules having a power signal tuner module and operating [2420] the power transfer system may comprise changing the transfer mode ratio by adjusting the power signal tuner module.

Providing [2210] the power transfer system may comprise providing among the plurality of power transmit-receive modules at least one power transmit-receive module in wired communication with an associated transmitter-receiver resonator and having a modulator, and operating [2220] the power transfer system may comprise: exchanging a radio frequency signal between the associated transmitter-receiver resonator and a transmitter-receiver resonator in wired communication with at least one other of the plurality of power transmit-receive modules; and modulating information onto the exchanged radio frequency signal. When a power load is present at an output of one of the plurality of power transmit-receive modules, the information modulated on the exchanged signal may include, for example without limitation, one or more of a presence of the power load, a charge level of the power load, a power transfer efficiency, a charging rate of the power load, a status of the power load, a presence of a voltage over the power load, a charge capacity of the power load, and a remaining time to charge the power load.

The information may be modulated onto the exchanged radio frequency signal by amplitude modulation, frequency modulation, or phase modulation. Modulating the information onto the exchanged radio frequency signal may comprise modulating digital information or analog information onto the exchanged radio frequency signal.

Modulating the information onto the exchanged radio frequency signal may comprise modulating the information onto the power signal. Modulating the information onto the exchanged radio frequency signal may comprise modulating the information onto a signal with a frequency different from the power signal frequency. Modulating the information onto the exchanged radio frequency signal may comprise modulating the information onto a signal with a frequency that is a harmonic of the power signal frequency. Modulating the information onto the exchanged radio frequency signal may comprise modulating the information onto a signal that has the power signal frequency as a harmonic.

Modulating the information onto the exchanged radio frequency signal may comprise modulating according to the information a reflective characteristic of the associated wire-connected transmitter-receiver resonator to impose the information on a signal reflected by the wire-connected transmitter-receiver resonator. Modulating the information onto the exchanged radio frequency signal may comprise modulating according to the information a signal provided to the associated transmitter-receiver resonator.

Method [2200] may comprise operating the power signal tuner module of the first of the plurality of power transmit-receive modules to modulate the information onto the exchanged radio frequency signal. Each of the power transmit-receive modules provided may comprise a compensation network and the compensation network may comprise the modulator, allowing the compensation network to be operated to modulate the information onto the exchanged radio frequency signal. A least one of the power transmit-receive modules may comprise a radio frequency oscillator providing a signal at the power signal frequency to the at least one power transmit-receive module, and the radio frequency oscillator may comprise the modulator; allowing the information to be modulated onto the exchanged radio frequency signal in the oscillator.

Each of the plurality of power transmit-receive modules provided may be reconfigurable between a power transmitter mode and a power receiver mode; and the method may further comprise reconfiguring at least two of the plurality of power transmit-receive modules between a power transmitter mode and a power receiver mode to reverse a direction of power transmission between the at least two transmit-receive modules. Each of the power transmit-receive modules provided may comprise a differential self-synchronous radio frequency power amplifier/rectifier capable of reconfiguring between an amplifier condition and a rectifier condition corresponding respectively to the power transmitter mode and the power receiver mode of the power transmit-receive module; and the method may comprise reconfiguring the differential self-synchronous radio frequency power amplifiers/rectifiers of the at least two transmit-receive modules between the amplifier condition and the rectifier condition. Each differential self-synchronous radio frequency power amplifier/rectifier may comprise a phase shifter adjustable for reconfiguring the differential self-synchronous radio frequency power amplifier/rectifier between the amplifier condition and the rectifier condition; and the method may comprise adjusting a phase shifter of each of the differential self-synchronous radio frequency power amplifiers/rectifiers of the at least two transmit-receive modules.

WPT system 10, including the transmitters and/or the receivers described herein may be integrated into various applications such as, but not limited to, electric vehicles, electric boats, electric planes, electric trucks, e-bicycles, electric scooters, electric skateboards, etc. One exemplary non-limiting application is a bike-sharing fleet where various docking stations are provided that integrate one or more transmitters (for example, primary sides 12) and e-bicycles which comprise receivers (for example, secondary sides 14) and batteries (as loads 70) may be charged at the docking stations.

In some applications, primary side 12 or secondary side 14 may be configured to transfer power with other systems not described herein and may adjust the transfer mode ratio from CPT to IPT to provide compatibility with other CPT systems and/or IPT systems even if they were not specifically designed to work with the power transfer systems described herein.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

In a first aspect, each of the system(s) described above and depicted in FIGS. 1-10 forms bimodal near-field resonant wireless electrical power transfer system 10 configured for simultaneous capacitive power transfer and inductive power transfer according to an adjustable transfer mode ratio at a variable resonant power signal oscillation frequency, system 10 comprising: transmitter subsystem 12 comprising transmitter antenna subsystem 32, 132, 232, 332, 134, 234, 334, 336 and power signal tuner module 26F, tuner module 26F configured for adjusting the transfer mode ratio by adjusting a power signal provided by tuner module 26F to transmitter antenna subsystem 32, 132, 232, 332, 134, 234, 334, 336; and receiver subsystem 14 comprising receiver antenna subsystem 52, 152, 252, 352, 154, 254, 354, 356 configured for receiving electrical power from transmitter antenna subsystem 32, 132, 232, 332, 134, 234, 334, 336 at the transfer mode ratio.

Tuner module 26F may be configured for adjusting the power signal by adjusting a phase difference between the current and the voltage of the power signal provided to transmitter antenna subsystem 32, 132, 232, 332, 134, 234, 334, 336. Transmitter subsystem 12 may further comprise controller 22 and at least one sensor 24, wherein controller 22 is configured for receiving sensor information from at least one sensor 24 and for automatically providing a tuning instruction to tuner module 26F based on the sensor information; and tuner module 26F is configured to adjust according to the tuning instruction the phase difference between the current and the voltage of the power signal provided to transmitter antenna subsystem 32, 132, 232, 332, 134, 234, 334, 336.

System 10 resonates at a resonant frequency that is free to vary within a predetermined band, based on the degree of coupling between transmitter subsystem 12 and receiver subsystem 14. The predetermined band may be, for example without limitation, an officially designated and reserved Industrial, Scientific and Medical (ISM) band or a band dedicated for a user. The quality factor (Q) of system 10 may be decreased to a degree that allows the power signal oscillation frequency to vary within opposing limits of the predetermined frequency band. A decreased value of Q allows system 10 to employ any of a number of different resonant frequencies within the predetermined frequency band during the process of power transfer. The coupling between transmitter subsystem 12 and receiver subsystem 14 and the associated absorption of power by the resonant receiver subsystem 14 ensures that little electromagnetic radiation is emitted into the far-field domain when system 10 is in operation. The arrangement as described herein with reference to FIGS. 1-10, along with the immediately foregoing frequency aspects, render system 10 a bimodal near-field resonant wireless electrical power transfer system. It is to be noted that in wireless power transfer system 10 power is transferred from the primary subsystem to the secondary subsystem via capacitive or inductive coupling or both, and not to any substantial degree via electromagnetic radiation.

In a further aspect, described with reference to the foregoing drawings and the flow chart in FIG. 11, near-field wireless method [1000] is provided for of transferring power bimodally according to an adjustable transfer mode ratio at a variable resonant power signal oscillation frequency, the method comprising providing [1010] transmitter subsystem 12 comprising power signal tuner module 26F and transmitter antenna subsystem 32, 132, 232, 332, 134, 234, 334, 336 configured for resonating at the resonant power signal oscillation frequency; providing [1020] receiver subsystem 14 comprising receiver antenna subsystem 52, 152, 252, 352, 154, 254, 354, 356 configured for resonating at the resonant power signal oscillation frequency; providing [1030] a power signal from tuner module 26F to transmitter antenna subsystem 32, 132, 232, 332, 134, 234, 334, 336 at the power signal oscillation resonant frequency; adjusting [1040] the transfer mode ratio by adjusting the power signal from tuner module 26F to transmitter antenna subsystem 32, 132, 232, 332, 134, 234, 334, 336; and receiving [1050] transferred power in receiver subsystem 14 at the power signal oscillation resonant frequency via receiver antenna subsystem 52, 152, 252, 352, 154, 254, 354, 356 at the transfer mode ratio. Adjusting [1040] the transfer mode ratio may comprise adjusting a phase difference between the current and the voltage of the power signal provided to transmitter antenna subsystem 32, 132, 232, 332, 134, 234, 334, 336.

Providing [1010] transmitter subsystem 12 may further comprise providing controller 22 and at least one sensor 24 and adjusting the phase difference between the current and the voltage may be done by tuner module 26F via command of controller 22 based on sensor information received by controller 22 from at least one sensor 24. Command of controller 22 may be automatically issued to tuner module 26F upon receipt by controller 22 of the sensor information; and tuner module 26F may automatically execute the command from controller 22 to change the phase difference.

Method [1000] may further comprise allowing [1060] the resonant power signal oscillation frequency to vary within a predetermined frequency band. The predetermined frequency band may be an Industrial, Scientific and Medical (ISM) frequency band. Providing [1010] a transmitter subsystem may comprise providing a transmitter subsystem detuned to a degree that allows the resonant power signal oscillation frequency to vary within opposing limits of the predetermined frequency band.

Figure 12:
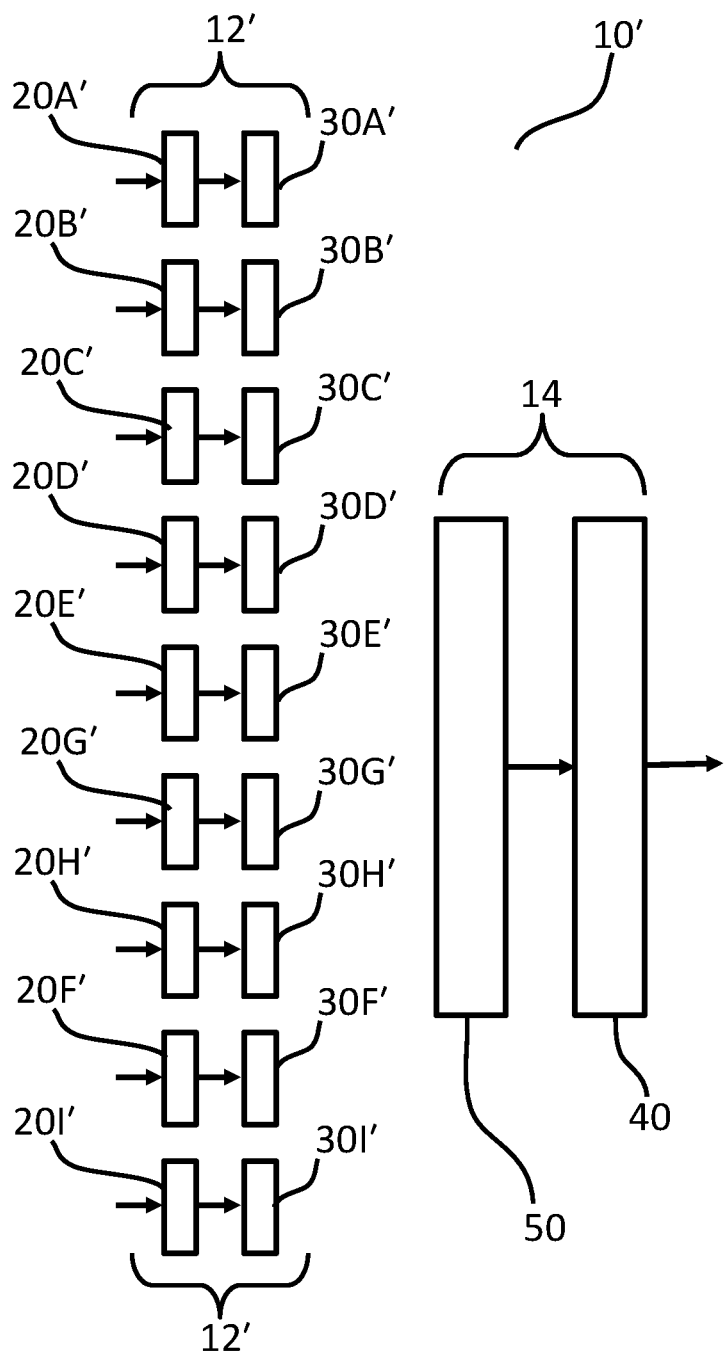
FIG. 12 is a schematic representation of a multi-transmitter near-field resonant wireless electrical power transfer system for transferring power to a single receiver subsystem.
Figure 13A:
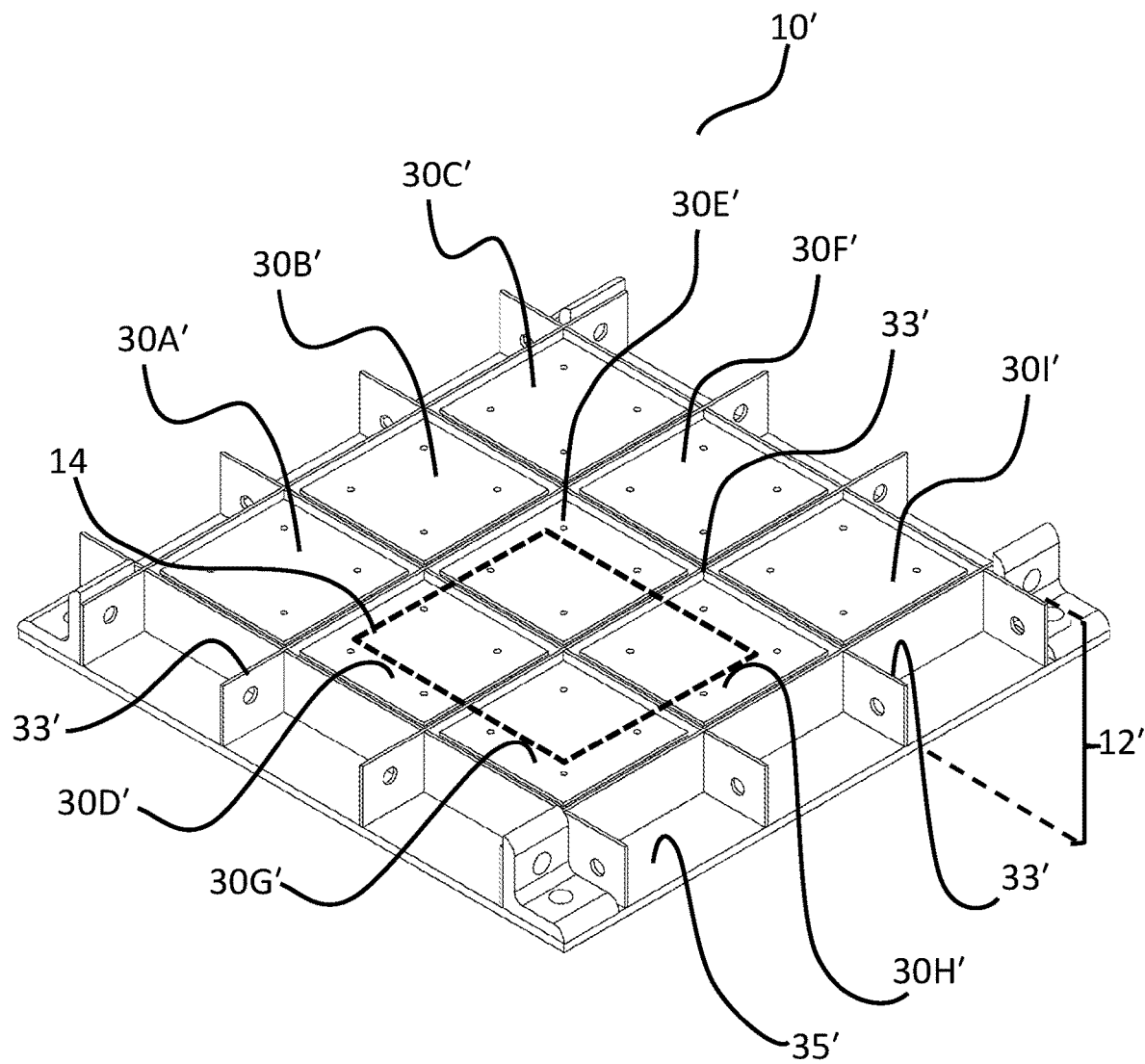
FIGS. 13A and 13B depict a multi-transmitter near-field resonant wireless electrical power transfer system for transferring power to a single receiver subsystem.
Figure 13B:
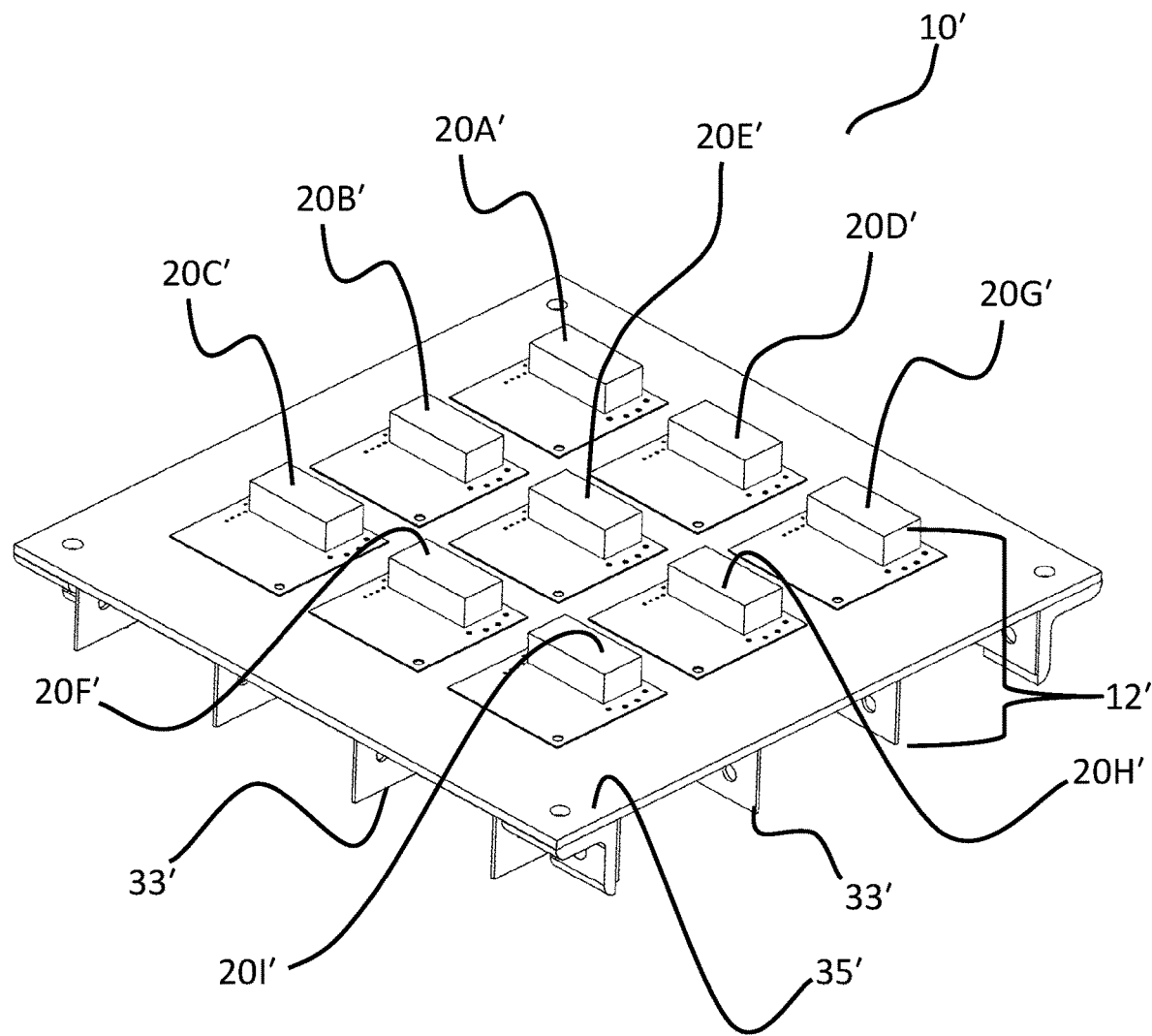

In a further embodiment, described with reference to FIGS. 12, 13A and 13B and with reference to FIGS. 1 to 10, multi-transmitter bimodal near-field resonant wireless electrical power transfer system 10' is configured for simultaneous capacitive power transfer and inductive power transfer according to an adjustable transfer mode ratio at a variable resonant power signal oscillation frequency. System 10' comprises multi-transmitter subsystem 12' comprising a plurality of transmitter resonators 30A' to 30I' each driven by a corresponding dedicated transmitter module 20A' to 20I' wherein each transmitter resonator and corresponding transmission module (for example, 30E' and 20E' respectively) may conform to the descriptions given above and with reference to FIGS. 1 to 10. FIG. 12 is a schematic representation of an embodiment of system 10' in which transmitter resonators 30A' to 30I' are presented as nine resonators in a column but are not depicted in their formal spatial locations. An embodiment of the spatial layout of multi-transmitter subsystem 12' is shown in FIGS. 13A and 13B and described below. In system 10', resonant receiver subsystem 14 may be the same or substantially similar to the resonant receiver system described above and referenced by FIGS. 1-10. In the embodiment shown in FIG. 12, resonant receiver subsystem 14 may be, for example without limitation, implemented in a mobile phone or digital "tablet". Resonant receiver subsystem 14 is depicted in broken outline in FIG. 13A for the sake of clarity. In an embodiment, each working transmitter resonator 30A' to 30I' and each corresponding transmitter module 20A' to 20I' may function in the same or a substantially similar manner as transmitter resonator 30 and transmitter module 20 described above and depicted in FIGS. 1-10. An embodiment of a spatial layout of multi-transmitter subsystem 12' is depicted in FIGS. 13A and 13B. FIG. 13B is a view of multi-transmitter subsystem 12' in an inverted orientation with respect to its orientation in FIG. 13A.

In the example embodiment of system 10' shown in FIGS. 12, 13A and 13B, multi-transmitter subsystem 12' comprises nine pairs of transmitter resonators 30A' to 30I' and corresponding transmitter modules 20A' to 20I' arranged in a square array. Transmitter modules 20A' to 20I' are obscured in FIG. 13A by grounded baseplate 35' but may be seen in FIG. 13B. In a more general embodiment, other numbers of pairs of resonators and transmitter modules may be employed, and the resonator array need not be square or rectangular. By way of example without limitation, the resonator array may have a hexagonal arrangement. In some embodiments, the arrays are preferably close-packed within the constraints of having a grounded shield grid separating and bounding the transmitter resonators 30A' to 30I'. Grounded shield grid 33' laterally confines the array of transmitter resonators 30A' to 30I'. Grounded shield grid 33' is disposed at a consistent distance 37' from the perimeter of each of transmitter resonators 30A' to 30I' to ensure consistent electric field behavior and associated capacitance between transmitter resonators 30A' to 30I' and grounded shield grid 33'. The term "shield distance" is used herein to describe this distance between resonators 30A' to 30I' and grounded shield grid 33'.

In an embodiment, grounded shield grid 33' ensures that the electric fields of transmitter resonators 30A' to 30I' will be fully spatially decoupled and thereby spatially independent. Transmitter resonators 30A' to 30I' may have magnetic fields that are chosen to be mutually decoupled by virtue of spatial orientation. In other embodiments, grounded shield grid 33' may be formed of or coated with a high conductivity ferrite material in order to decouple the magnetic fields generated by transmitter resonators 30A' to 30I'.

As shown in FIGS. 13A and 13B, transmitter resonators 30A' to 30I' and their corresponding transmitter modules 20A' to 20I' may be mounted substantially in line with each other on opposing faces of grounded base plate 35' with each transmitter resonator (for example, 30E') proximate its corresponding transmitter module (20E'). In other embodiments, there may be no fixed spatial relationship between transmitter resonators and their corresponding transmitter modules. The array of transmitter resonators 30A' to 30I' shares a common transmission surface defined by the collective upper surfaces of transmitter resonators 30A' to 30I' in FIG. 13A. For reasons of aesthetics and protection, the array of transmitter resonators 30A' to 30I' may be covered with a dielectric plate, not shown in FIG. 13A. The dielectric plate separates receiver subsystem 14 and transmitter resonators 30A' to 30I'.

In FIGS. 12 and 13A, an embodiment of resonant receiver subsystem 14 is schematically shown as overlapping a subset of the plurality of transmitter resonators 30A' to 30I'. As per FIGS. 12 and 13A, overlapped transmitter resonators are shown as being 30D', 30E', 30G' and 30H'. In FIG. 13A, resonant receiver subsystem 14 is shown as a broken line rectangle over mutually adjoining transmitter resonators 30D', 30E', 30G' and 30H'. Controllers of any of transmitter modules 20A' to 20I' may determine the presence or absence of resonant receiver subsystem 14 in proximity to or overlapping their corresponding transmitter resonators 30A' to 30I' and, based on these detections, controllers may turn on or turn off the power signal to their corresponding transmitter resonators 30A' to 30I'.

If power amplifiers of transmitter modules 20A' to 20I' are supplying power signals to transmitter resonators 30A' to 30I' so that transmitter resonators 30A' to 30I' are transmitting power, and the controllers of transmitter modules 20A', 20B', 20C', 20F' and 20I' determine the absence of a resonant receiver within their frequency range proximate transmitter resonators 30A', 30B', 30C', 30F' and 30I', those controllers may turn off the power signal to transmitter resonators 30A', 30B', 30C', 30F' and 30I'.

If power amplifiers of transmitter modules 20A' to 20I' are not supplying power signals to transmitter resonators 30A' to 30I', controllers for transmitter resonators 30D', 30E', 30G' and 30H' may determine the presence of resonant receiver subsystem 14 overlapping and proximate resonators 30D', 30E', 30G' and 30H', and turn on transmittable power provided by transmitter modules 20D', 20E', 20G' and 20H' to transmitter resonators 30D', 30E', 30G' and 30H'. This arrangement ensures that only transmitter resonators in proximity to resonant receiver subsystem 14 are drawing power and transmitting power to resonant receiver subsystem 14.

The input impedance of transmitter resonator 30A' to 30I' may be employed to detect the presence or absence of resonant receiver subsystem 14 proximate the transmitter resonator. The transmitter resonator input impedance varies with the absence or presence of resonant receiver subsystem 14 proximate the transmitter resonator. As explained above, with reference to FIG. 6, the effects of specific resonant receiver subsystems 14 are distinct as to allow not only the presence and absence of the receivers to be detected but are also characteristic such that the type of receiver may be identified by its effect on transmitter resonator input impedance. The size of the receiver resonator, in some embodiments, has a profound effect on the input impedance of a transmitter resonator 30A' to 30I'.

In an embodiment of system 10', transmitter module 20E', as depicted in FIGS. 12 and 13B, is the transmitter module associated with one of four transmitter resonators 30D', 30E', 30G' and 30H' overlapped by resonant receiver subsystem 14. The detailed structure of each of transmitter modules 20A' to 20I' is provided in FIG. 6 and FIG. 8. The process is initiated with power amplifier 26B of transmitter modules 20A' to 20I' providing no power signal to corresponding transmitter resonators 30A' to 30I'.

Focusing now on transmitter module 20E', its load detector 24A in this embodiment is configured to measure the input impedance of transmitter resonator 30E'. Load detector 24A provides the input impedance measurement result to controller 22. A default input impedance measurement value is stored in a register in controller 22 representing the input impedance of transmitter resonator 30E' in the absence of any resonant receiver subsystem proximate transmitter resonator 30E'. The disposition of resonant receiver subsystem 14 proximate transmitter resonator 30E', as shown in FIG. 12, leads to a new different input impedance measurement by load detector 24A of which the result is supplied to controller 22 by load detector 24A. Controller 22 compares the new input impedance measurement, referred to herein as the "first input transmitter resonator impedance change" or "primary transmitter resonator input impedance change", with the default impedance measurement value stored in the register. Based on this first input impedance change, controller 22 makes a determination as to whether a receiver resonator, for example, the resonator of resonant receiver subsystem 14, is present proximate transmitter resonator 30E'. In order to make the determination of absence or presence of receiver resonator proximate transmitter resonator 30E' controller 22 may be preprogrammed with a minimum input impedance change that has to be exceeded before controller 22 deems a receiver resonator to be present.

If controller 22 determines that a receiver resonator, for example, the resonator of resonant receiver subsystem 14, is present proximate transmitter resonator 30E', then controller 22 instructs the power amplifier to assume an "ON" state. Power is thereby provided to transmitter resonator 30E' and power is in turn transferred to resonant receiver subsystem 14. If controller 22 determines that a receiver resonator, for example, the resonator of resonant receiver subsystem 14, is not present proximate transmitter resonator 30E', then controller 22 instructs the power amplifier to assume on "OFF" state. Power is thereby not provided to transmitter resonator 30E' and power is in turn not transferred to resonant receiver subsystem 14. The same process is conducted independently by every transmitter module 20A' to 20I' with respect to their corresponding transmitter resonators 30A' to 30I'. As a result, the power amplifiers of transmitter modules 30D', 30E', 30G' and 30H' overlapped by resonant receiver subsystem 14 are turned on and the power amplifiers of transmitter modules 30A', 30B', 30C', 30F' and 30I' not overlapped by resonant receiver subsystem 14 are turned off.

It is to be noted that differently sized receiver resonators present drastically different impedances at point 24A to load detector 24A of transmitter module 20. The impedance differences measured when a given receiver resonator partially overlaps a transmitter resonator as compared with when it completely overlaps that transmitter resonator do not differ as drastically as what the impedances differ with receiver resonator size. This allows controller 22 of any transmitter module 20A' to 20I' to differentiate between small and large receiver resonators proximate corresponding transmitter resonator 30A' to 30I'.

According to an embodiment, the setting of power signal frequency and phase among those transmitter resonators (for example 30D', 30E', 30G' and 30H') overlapped by a resonant receiver subsystem, for example resonant receiver subsystem 14, is described herein. For maximally efficient transfer of power from the combination of transmitter resonators 30D', 30E', 30G' and 30H' that are receiving power, the power signals in resonators 30D', 30E', 30G' and 30H' need to have the identical frequency and moreover be mutually in phase. Given that the frequencies of the power signals in transmitter resonators 30D', 30E', 30G' and 30H' may differ within an allowed band, as described earlier above and with reference to FIGS. 1 to 10, the requirement in this present embodiment of FIGS. 12, 13A and 13B is for the frequencies of the power signals in transmitter resonators 30D', 30E', 30G' and 30H' to be adjusted to be identical and for their phases then to be locked together so that the power signals from transmitter resonators 30D', 30E', 30G' and 30H' will be fully synchronized and in phase.

In an embodiment, to ensure that controllers 22 of overlapped transmitter resonators 30D', 30E', 30G' and 30H' all set their corresponding oscillators 26A to the same frequency, controllers 22 of transmitter modules 20A' to 20I' are all provided with an identical table of frequencies selected within any given allowed band, for example an ISM band. Within that ISM band, a number of discrete frequencies are selected for inclusion in the frequency table. The number of tabulated frequencies within that ISM band is therefore finite and limited and the tabulated frequencies are interspaced widely enough that the various controllers 22 of transmitter modules 20D', 20E', 20G' and 20H' may determine a power signal frequency from the first impedance difference described above. Despite small variations in those impedances, all controllers 22 of transmitter modules 20D', 20E', 20G' and 20H' select for the power signal of their respective oscillators 26A and power amplifiers 26B the same discrete frequency from among the allowed ones in the band.

In an embodiment, to ensure that resonators 30D', 30E', 30G' and 30H' all have not only the same power signal frequency, but also to the same phase, the following procedure is adopted and programmed into the software of each controller 22 of transmitter modules 20A' to 20I'. Statistically, a first of independent controllers 22 among those of transmitter modules 20D', 20E', 20G' and 20H' will turn its corresponding oscillator 26A and power amplifier 26B on first to supply power via its transmitter resonator to resonant receiver subsystem 14. A second of the other independent controllers 22 among those of transmitter modules 20D', 20E', 20G' and 20H' will measure the input impedance of its corresponding transmitter resonator and detect by means of its corresponding load detector 24A a small secondary change in that impedance due to the functioning of the first transmitter resonator. In effect, second controller 22 is seeing a reflection of the impedance of the first transmitter resonator via the interaction of the latter with resonant receiver subsystem 14. Second controller 22 is programmed to conclude that, based on the secondary impedance change, another controller has turned on its oscillator 26A and power amplifier 26B first. Having made this deduction, second controller 22 then turns on its oscillator 26A and power amplifier 26B and varies the phase of its power signal while measuring power transmitted by its corresponding transmitter resonator using its transmitter power sensor 24B. Second controller 22 then varies the phase of its oscillator and searches for the phase at which maximum power transfer occurs and sets the phase of the oscillator to that value. The oscillator phase determined in this fashion will ensure that the phase of the power signal transferred by the second transmitter resonator equals the phase of the power signal transferred by the first transmitter resonator to resonant receiver subsystem 14. In an embodiment, the setting of the oscillator phase is based on substantially maximizing power transfer, rather than absolutely equalizing power signal phases.

In another embodiment, again based on transmitter resonators 30D', 30E', 30G' and 30H' being overlapped by resonant receiver subsystem 14, the detection of the proximity of resonant receiver subsystem 14 is based on test signal power drawn through transmitter resonators 30D', 30E', 30G' and 30H'. In this embodiment, low amplitude power signals are initially maintained by the oscillators and power amplifiers corresponding to all transmitter resonators 30A' to 30I'. Controllers 22 of all transmitter modules 20A' to 20I' then sense power drawn by their corresponding transmitter resonators 30 using their corresponding transmitter power sensors 24B. Using their corresponding transmitter power sensors 24B, controllers 22 of transmitter modules 20D', 20E', 20G' and 20H' sense that power is being drawn via their corresponding transmitter resonators 30D', 30E', 30G' and 30H'. Based on detection of the test signal power drawn, controllers 22 of transmitter modules 20D', 20E', 20G' and 20H' turn on full power of their corresponding power amplifiers 26B. The term "first test signal power draw" is used herein to describe this power drawn from the test signal via transmitter resonators 30D', 30E', 30G' and 30H'. The test power signals of power amplifiers 26B of transmitter modules 30A', 30B', 30C', 30F' and 30I' not overlapped by resonant receiver subsystem 14 may be turned off after a suitable test period.

Equivalent to the impedance-based embodiment described above, controllers 22 of transmitter modules 20D', 20E', 20G' and 20H' may require a threshold power draw in order to deem resonant receiver subsystem 14 present proximate their corresponding their corresponding transmitter resonators 30D', 30E', 30G' and 30H'.

In an embodiment, to ensure that controllers 22 of overlapped transmitter resonators 30D', 30E', 30G' and 30H' all set their corresponding oscillators 26A to the same frequency, controllers 22 of transmitter modules 20A' to 20I' are all provided with an identical table of frequencies selected within any given allowed band, for example an ISM band. Within that ISM band, a number of discrete frequencies are selected for inclusion in the frequency table. The number of tabulated frequencies within that ISM band is therefore finite and limited and the tabulated frequencies are interspaced widely enough that the various controllers 22 of transmitter modules 20D', 20E', 20G' and 20H' may determine a power signal frequency from the first test signal power draw described above. Despite small variations in those power draw values, all controllers 22 of transmitter modules 20D', 20E', 20G' and 20H' select for the power signal of their respective oscillators 26A and power amplifiers 26B the same discrete frequency from among the allowed ones in the band.

In an embodiment, to ensure that resonators 30D', 30E', 30G' and 30H' all have not only the same power signal frequency, but also to the same phase, the following procedure is adopted and programmed into the software of each controller 22 of transmitter modules 20A' to 20I'. Statistically, a first of independent controllers 22 among those of transmitter modules 20D', 20E', 20G' and 20H' will turn on its corresponding oscillator 26A and power amplifier 26B first to supply power via its transmitter resonator to resonant receiver subsystem 14. A second of the other independent controllers 22 among those of transmitter modules 20D', 20E', 20G' and 20H' will measure the power draw of its corresponding transmitter resonator and detect by means of its corresponding transmitter power sensor 24B a small secondary change in that power draw due to the functioning of the first transmitter resonator. In effect, second controller 22 is seeing a reflection of the impedance of the first transmitter resonator via the interaction of the latter with resonant receiver subsystem 14. Second controller 22 is programmed to conclude that, based on the secondary change in power draw, another controller has turned on its oscillator 26A and power amplifier 26B first. Having made this deduction, second controller 22 then turns on its oscillator 26A and power amplifier 26B and varies the phase of its power signal while measuring the power transmitted by its corresponding transmitter resonator using its transmitter power sensor 24B. Second controller 22 then searches for the phase at which maximum power transfer occurs and sets the oscillator to that phase. The oscillator phase set in this fashion ensures that the phase of the power signal transferred by the second transmitter resonator to resonant receiver subsystem 14 equals the phase of the power signal transmitted by the first transmitter resonator to resonant receiver subsystem 14. In the embodiment, the setting of the oscillator phase is based on substantially maximizing power transfer, rather than absolutely equalizing power signal phases.

In an embodiment, when two different resonant receiver subsystems are proximate multi-transmitter subsystem 12' and overlap differing ones or combinations of transmitter resonators 30A' to 30I', then there is no a priori reason why the two different transmitter resonators, or two different groups of transmitter resonators overlapped by the two resonant receiver systems should be operating at the same frequency or phase, nor is there a requirement for them to do so. Grounded shield grid 33' ensures this multi-way independence by decoupling all the individual transmitter resonators 30A' to 30I' from one another. However, the transmitter resonators overlapped by one specific resonant receiver subsystem need to have their corresponding power signal amplifiers actively synchronized by their controllers as described above. This may result in the two different transmitter resonators, or two different groups of resonators, operating at two specific different locked-in frequencies in a band, with all signals in a particular group being mutually in phase.

Figure 14:
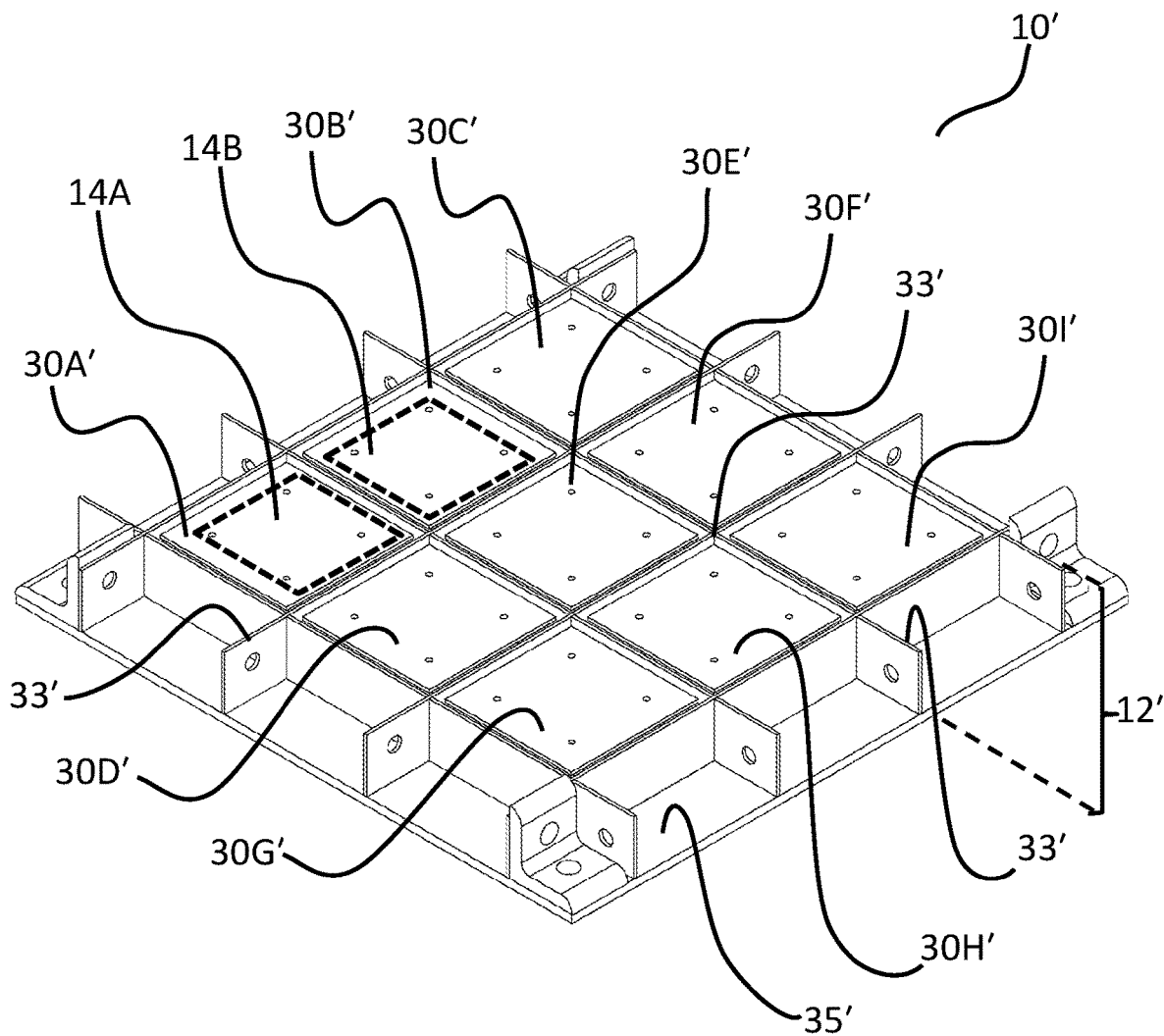
FIG. 14 depicts a multi-transmitter near-field resonant wireless electrical power transfer system for transferring power to more than one receiver subsystem.

In the foregoing, it has been described how two transmitter resonators transferring power to the same receiver resonator may be programmed to behave in order to ensure the two transmitter resonators bear power signals that are in phase to thereby ensure maximal power transfer. A different situation arises when two neighboring transmitter resonators, say 30A' and 30B' in FIG. 14, are transmitting to two substantially similar corresponding receiver subsystems 14A and 14B. Both transmitter resonators 30A' and 30B' have fringing fields of which the field lines extend from, for example, transmitter resonator 30A' to receiver subsystem 14B' and from transmitter resonator 30B' to receiver subsystem 14A. There is in general no specific physical structure in system 10' to keep the fields of, for example, transmitter resonator 30A' from interacting with the receiver resonator of receiver subsystem 14B.

In an embodiment, when transmitter resonators 30A' and 30B' are both serving the same large receiver resonator overlapping both transmitter resonators 30A' and 30B' (as in FIG. 13A), the fringing fields are not inherently a problem, because both transmitter resonators 30A' and 30B' will be running the same frequency power signal at the same phase. In the case of the situation depicted in FIG. 14, the requirement is to ensure that any fringing fields of a given transmitter resonator, for example 30A', interacting with a receiver subsystem (for example 14B intended for accepting power from a neighboring transmitter resonator 30B') do not allow power to be parasitized from transmitter resonator 30A'. One way to achieve this goal is to drive the two neighboring transmitter resonators 30A' and 30B' 180° out of phase with each other, so that the overlapping fringing fields from transmitter resonators 30A' and 30B' will in large part be mutually cancelling.

Since either of transmitter resonators 30A' and 30B' will be experiencing the other of transmitter resonators 30A' and 30B' as parasitic when their power signals are not 180° out of phase, the controller 22 of each of transmitter resonators 30A' and 30B' may increment the phase of the signal from the corresponding oscillator of each while measuring the power transmitted by the corresponding transmitter resonator 30A', 30B' using the corresponding transmitter power sensor 24B. Controllers 22 may then search for the adjusted oscillator phase that provides maximum transmitted power via the corresponding transmitter resonator 30A', 30B', and then set the phase of the oscillator to that corresponding phase.

The arrangements of frequencies and phases per resonant receiver system, whether of similar size or of different sizes, as described above ensure that both resonant receiver systems receive maximal transferred power. In a general embodiment, there may be a large number of transmitter resonators and several different resonant receiver subsystems may be receiving power, each resonant receiver subsystem receiving power from its own corresponding individual group of transmitter resonators at a frequency and phase selected by the controllers corresponding to the transmitter resonators in the group. Neighboring transmitter resonators transferring power to differing receiver subsystems may be operating 180° out of phase as a result of maximizing of the power transfer for each of the neighboring transmitter resonators. The process of maximizing the power transfer adjusts the oscillator phase. Since the impedances of the various transmitter modules are complex with slight variations in resistance, inductance and capacitance, the phase angles of the different oscillators at the points of maximal power transfer may not be quite equal (or differ by exactly 180°) when the power signals in the transmitter resonators are in fact equal (or differ by exactly 180°).

To the extent that system 10' comprises one circuit with an air gap between primary and secondary sides, any power transfer measured or maximized in a transmitter resonator, for example at point 24E in FIG. 6 based on measurement by transmitter power sensor 24B, could just as well be measured or maximized in the secondary circuit, for example at point 44C in FIG. 7 based on measurement by receiver power sensor 44A. The measurement may be provided by transmitter power sensor 24B to controller 42 of receiver module 40, which may in turn communicate the measurement to controller 22 of transmitter module 20 by one of the means already described in the foregoing.

The concept of a multi-transmitter near-field resonant wireless electrical power transfer system has been explained above with reference to system 10' configured for simultaneous capacitive power transfer and inductive power transfer according to an adjustable transfer mode ratio at a variable resonant power signal oscillation frequency. In a more general embodiment, a multi-transmitter near-field resonant wireless electrical power transfer system need not be specifically a bimodal system and may be a purely capacitive or a purely inductive power transfer system.

Figure 15:
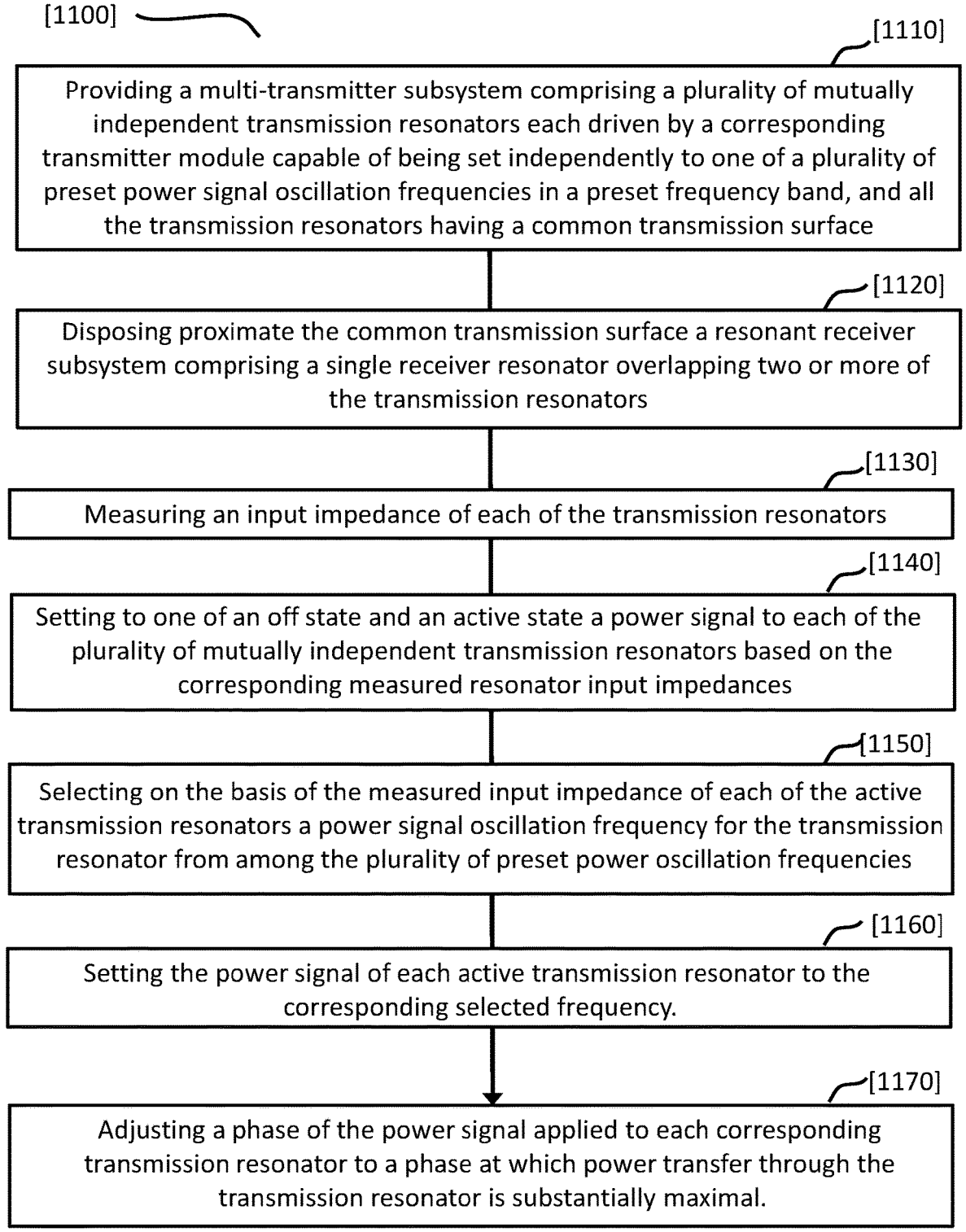
FIG. 15 shows a flow chart for a wireless near-field method for transferring power at a variable resonant power signal oscillation frequency from a multi-transmitter subsystem to a single resonant receiver subsystem.

In a further aspect, depicted in the flow chart of FIG. 15, a wireless near-field method [1100] for transferring power at a variable resonant power signal oscillation frequency from multi-transmitter subsystem 12' to single resonant receiver subsystem 14 comprises: providing [1110] multi-transmitter subsystem 12' comprising a plurality of mutually independent transmitter resonators 30A' to 30I', each of the transmitter resonators driven by a corresponding transmitter module 20A' to 20I', each transmitter module 20A' to 20I' capable of being set independently to one of a plurality of preset power signal oscillation frequencies in a preset frequency band, and all the transmitter resonators 30A' to 30I' having a common transmission surface; disposing [1120] proximate the common transmission surface resonant receiver subsystem 14 comprising single receiver resonator 50 overlapping two or more of transmitter resonators (30D', 30E', 30G', and 30H in FIG. 13A); measuring [1130] input impedances of each of transmitter resonators 30A' to 30I'; and setting [1140] to one of an off state and an active state a power signal to each of the plurality of mutually independent transmitter resonators 30A' to 30I' based on the corresponding measured resonator input impedances.

Method [1100] may further comprise [1150] selecting on the basis of the measured input impedance of each of the active transmitter resonators (resonators 30D', 30E', 30G', and 30H in FIG. 13A) a power signal oscillation frequency for the corresponding transmitter resonator (30D', 30E', 30G', and 30H' in FIG. 13A) from among the plurality of preset power signal oscillation frequencies.

Method [1100] may further comprise setting [1160] the power signal of each active transmitter resonator (30D', 30E', 30G', and 30H' in FIG. 13A) to the corresponding selected frequency.

Method [1100] may further comprise adjusting [1170] a phase of the power signal applied to each corresponding transmitter resonator (resonators 30D', 30E', 30G', and 30H in FIG. 13A) to a phase at which power transfer through the transmitter resonator (30D', 30E', 30G', and 30H' in FIG. 13A) is substantially maximal.

Figure 16:
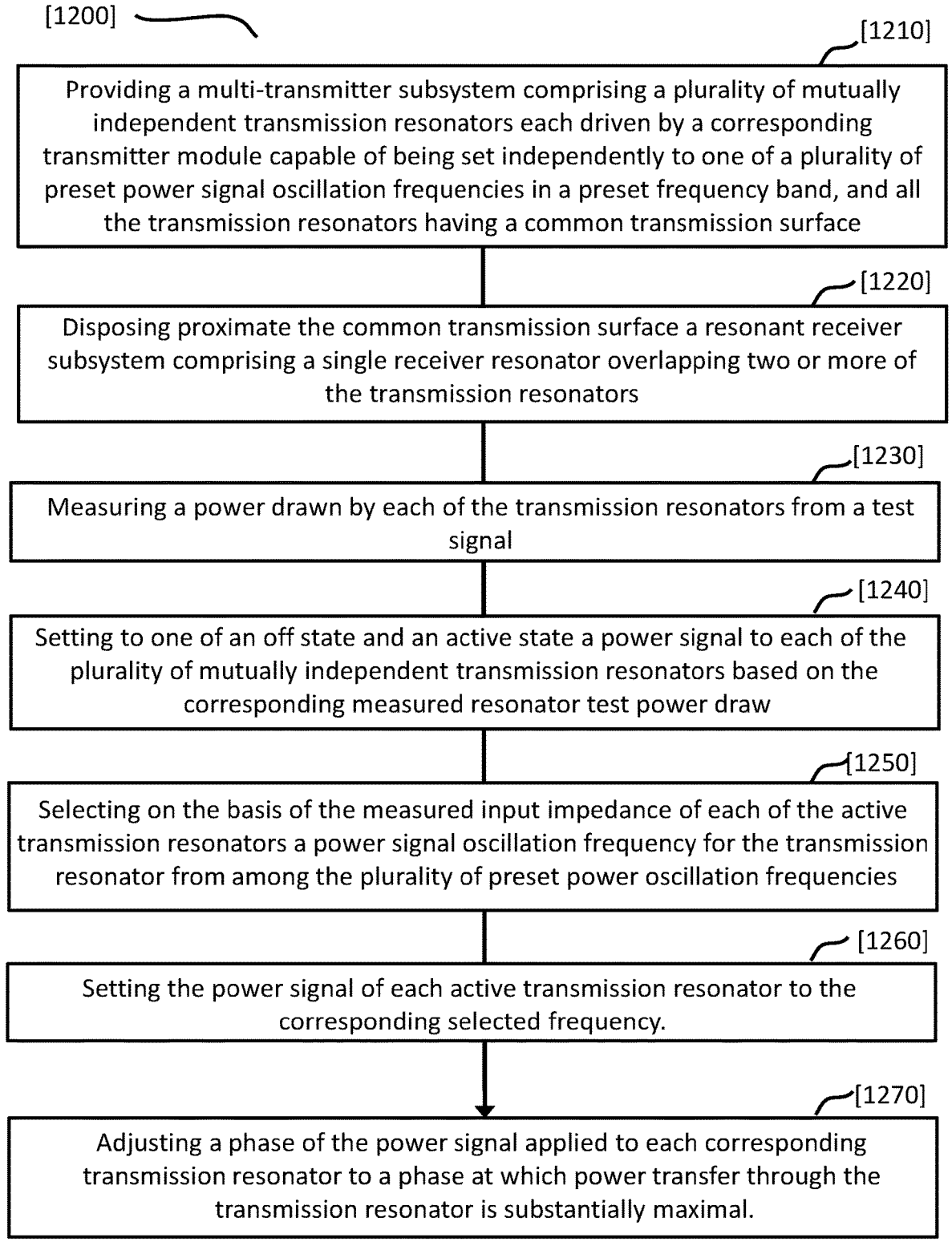
FIG. 16 shows a flow chart for another wireless near-field method for transferring power at a variable resonant power signal oscillation frequency from a multi-transmitter subsystem to a single resonant receiver subsystem.

In a further aspect, depicted in the flow chart of FIG. 16, wireless near-field method [1200] for transferring power at a variable resonant power signal oscillation frequency from multi-transmitter subsystem 12' to single resonant receiver subsystem 14 comprises: providing [1210] multi-transmitter subsystem 12' comprising a plurality of mutually independent transmitter resonators 30A' to 30I', each of the transmitter resonators driven by a corresponding transmitter module 20A' to 20I', each transmitter module 20A' to 20I' capable of being set independently to one of a plurality of preset power signal oscillation frequencies in a preset frequency band, and all the transmitter resonators 30A' to 30I' having a common transmission surface; disposing [1220] proximate the common transmission surface resonant receiver subsystem 14 comprising single receiver resonator 50 overlapping two or more of transmitter resonators (30D', 30E', 30G', and 30H' in FIG. 13A); measuring [1230] power drawn by each of transmitter resonators 30A' to 30I' from a test signal; and setting [1240] to one of an off state and an active state a power signal to each of the plurality of mutually independent transmitter resonators 30A' to 30I' based on the corresponding measured resonator test power draw.

Method [1200] may further comprise selecting [1250] on the basis of the measured test power drawn by each of active transmitter resonators (resonators 30D', 30E', 30G', and 30H in FIG. 13A) a power signal oscillation frequency for corresponding transmitter resonator (30D', 30E', 30G', and 30H in FIG. 13A) from among the plurality of preset power signal oscillation frequencies.

Method [1200] may further comprise setting [1260] the power signal of each active transmitter resonator (30D', 30E', 30G', and 30H in FIG. 13A) to the corresponding selected frequency.

Method [1200] may further comprise adjusting [1270] a phase of the power signal applied to each corresponding transmitter resonator (resonators 30D', 30E', 30G', and 30H in FIG. 13A) to a phase at which power transfer through transmitter resonator (30D', 30E', 30G', and 30H in FIG. 13A) is substantially maximal.

Figure 17:
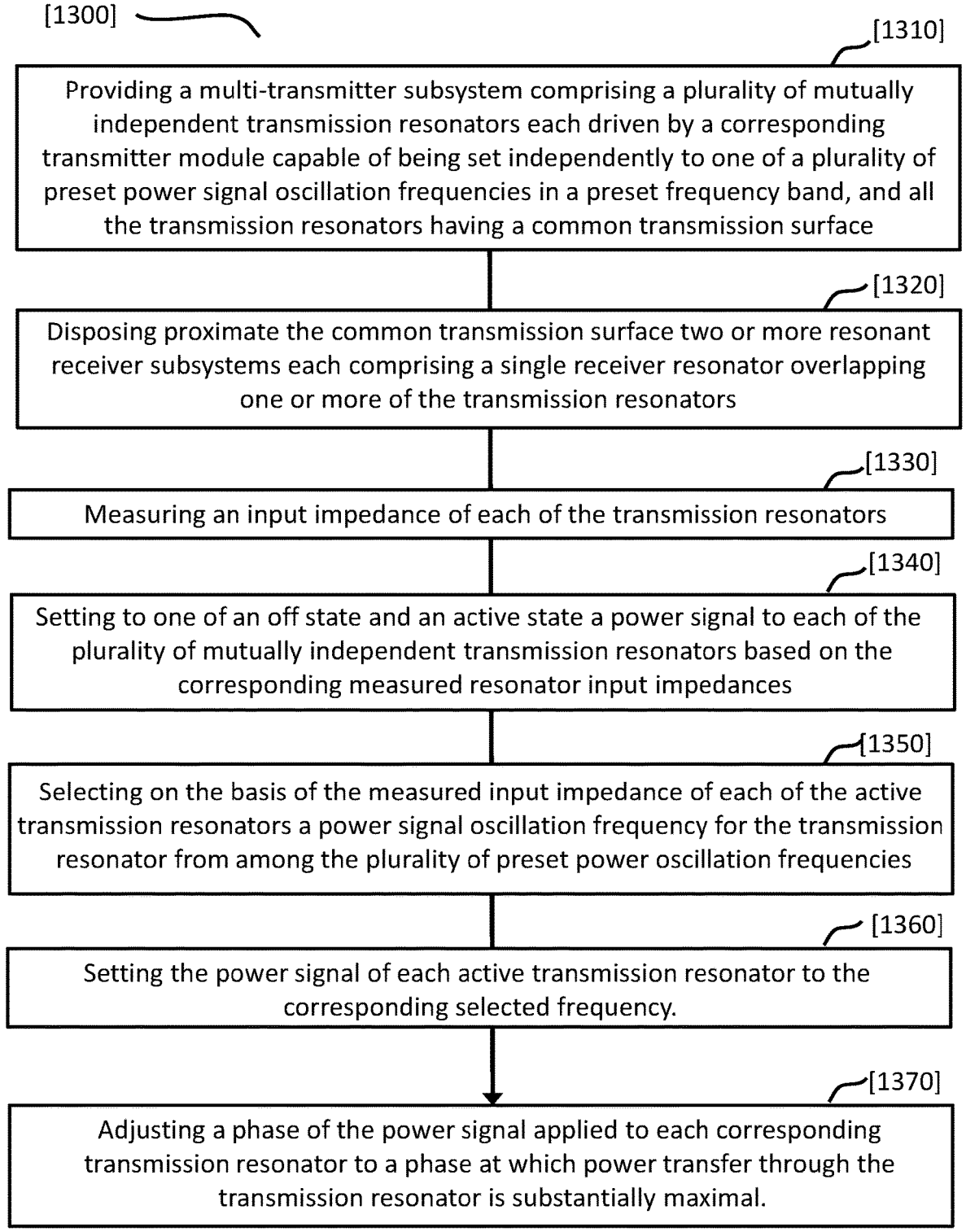
FIG. 17 shows a flow chart for a wireless near-field method for transferring power at a variable resonant power signal oscillation frequency from a multi-transmitter subsystem to a more than one resonant receiver subsystem.

In a further aspect, depicted in the flow chart of FIG. 17, wireless near-field method [1300] for transferring power at a variable resonant power signal oscillation frequency from multi-transmitter subsystem 12' to two or more receiver subsystems 14A, 14B (in FIG. 14) comprises: providing [1310] multi-transmitter subsystem 12' comprising a plurality of mutually independent transmitter resonators 30A' to 30I' (in FIG. 14), each of transmitter resonators driven by a corresponding transmitter module 20A' to 20I' (See FIG. 13B), each transmitter module 20A' to 20I' capable of being set independently to one of a plurality of preset power signal oscillation frequencies in a preset frequency band, and all transmitter resonators 30A' to 30I' having a common transmission surface; disposing [1320] proximate the common transmission surface the two or more resonant receiver subsystems 14A, 14B each comprising a single receiver resonator overlapping one or more of transmitter resonators (transmitter resonators 30A', 30B' in FIG. 14); measuring [1330] input impedances of each of transmitter resonators 30A', 30B'; and setting [1340] to one of an off state and an active state a power signal to each of the plurality of mutually independent transmitter resonators 30A' to 30I' based on the corresponding measured resonator input impedances.

Method [1300] may further comprise [1350] selecting on the basis of the measured input impedance of each of the active transmitter resonators (resonators 30A', 30B' in FIG. 14) a power signal oscillation frequency for the corresponding transmitter resonator 30A', 30B' from among the plurality of preset power signal oscillation frequencies.

Method [1300] may further comprise setting [1360] the power signal of each active transmitter resonator 30A', 30B' to the corresponding selected frequency.

Method [1300] may further comprise adjusting [1370] a phase of the power signal applied to each corresponding transmitter resonator 30A', 30B' to a phase at which power transfer through the transmitter resonator 30A', 30B' (in FIG. 14) is substantially maximal.

Figure 18:
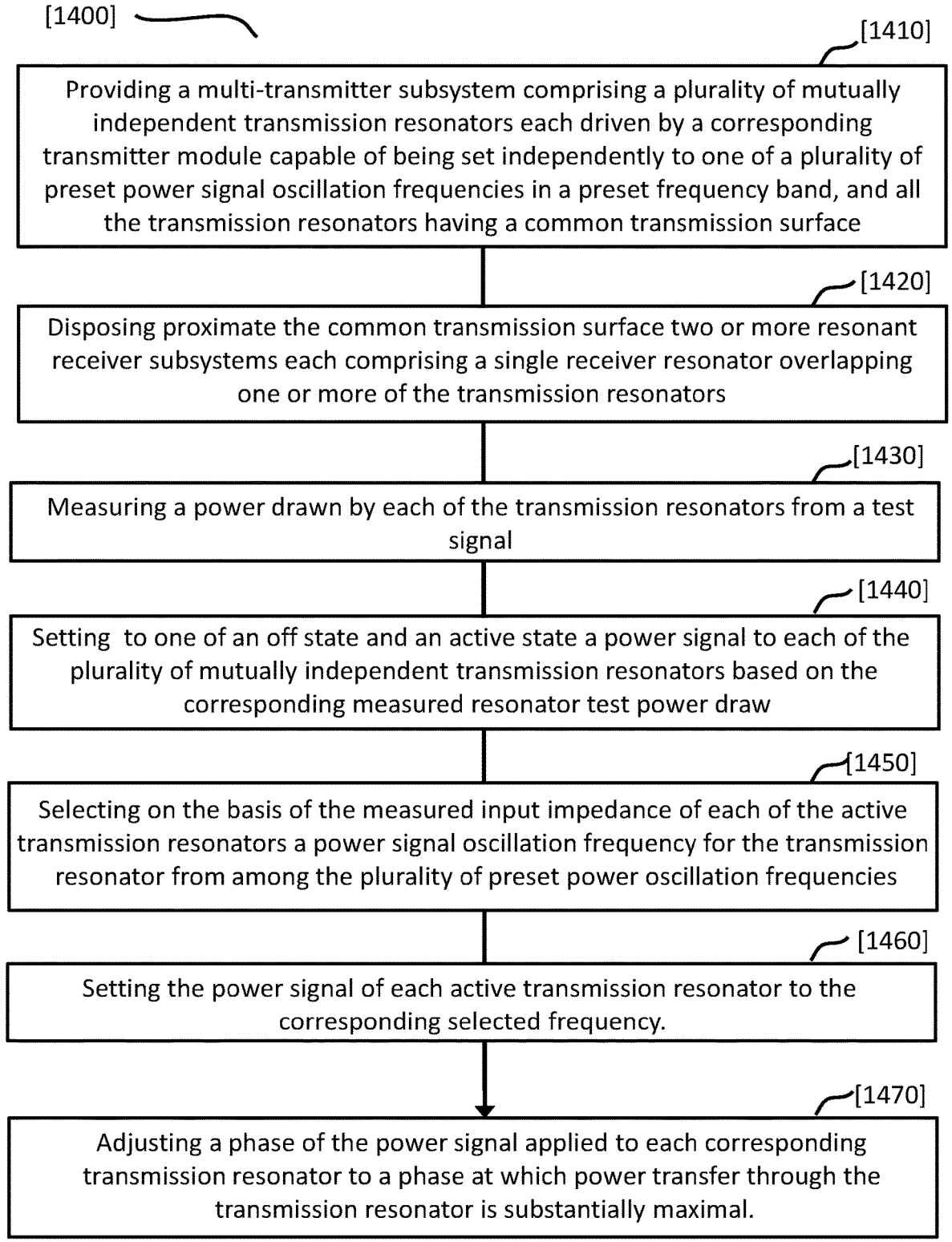
FIG. 18 shows a flow chart for another wireless near-field method for transferring power at a variable resonant power signal oscillation frequency from a multi-transmitter subsystem to a more than one resonant receiver subsystem.

In a further aspect, depicted in the flow chart of FIG. 18, wireless near-field method [1400] for transferring power at a variable resonant power signal oscillation frequency from multi-transmitter subsystem 12' to two or more receiver subsystems 14A, 14B (in FIG. 14) comprises: providing [1410] multi-transmitter subsystem 12' comprising a plurality of mutually independent transmitter resonators 30A' to 30I' (in FIG. 14), each of transmitter resonators driven by corresponding transmitter module 20A' to 20I' (See FIG. 13B), each transmitter module 20A' to 20I' capable of being set independently to one of a plurality of preset power signal oscillation frequencies in a preset frequency band, and all transmitter resonators 30A' to 30I' having a common transmission surface; disposing [1420] proximate the common transmission surface the two or more resonant receiver subsystems 14A, 14B each comprising a single receiver resonator overlapping one or more of transmitter resonators (transmitter resonators 30A', 30B' in FIG. 13); measuring [1430] power drawn by each of transmitter resonators 30A' to 30I' from a test signal; and setting [1440] to one of an off state and an active state a power signal to each of the plurality of mutually independent transmitter resonators 30A' to 30I' based on the corresponding measured resonator test power draw.

Method [1400] may further comprise [1450] selecting on the basis of the measured input impedance of each of the active transmitter resonators (resonators 30A', 30B' in FIG. 14) a power signal oscillation frequency for corresponding transmitter resonator 30A', 30B' from among the plurality of preset power signal oscillation frequencies.

Method [1400] may further comprise setting [1460] the power signal of each active transmitter resonator 30A', 30B' to the corresponding selected frequency.

Method [1400] may further comprise adjusting [1470] a phase of the power signal applied to each corresponding transmitter resonator 30A', 30B' to a phase at which power transfer through transmitter resonator 30A', 30B' (in FIG. 14) is substantially maximal.

In a further aspect, described with reference to FIGS. 20A and 20B, FIGS. 21A and 21B, and FIGS. 22A and 22B, and based on the systems of FIG. 1 to FIG. 10 and FIG. 12 to FIG. 14, near-field resonant wireless electrical power transfer system 10" is presented as per the schematic drawing of FIG. 19A for wirelessly transferring electrical power from photovoltaic solar cell 420 to an electrical power load 70". An accented numbering system is used for the labels on FIG. 19A, so that the parallels with FIG. 13A and FIG. 13B are clear, and thereby also the parallels with FIG. 6 and FIG. 7 are clear. By this numbering scheme, DC power is supplied from solar cell 420 to transmitter module 20" via power conditioning unit (PCU) 430. PCU 430, beyond converting the DC voltage and DC current to levels that may be transmitted further by power amplifier 26B", also provides suitably conditioned levels of voltage and current to drive the rest of the system components, including small signal electronic components, in transmitter module 20". PCU 430 represents an adaptively varying load to solar cell 420 in order to adapt to the varying power provided by solar cell 420 and the varying output impedance presented by solar cell 420 to PCU 430. This allows PCU 430 to absorb power from solar cell 420 at a maximum possible rate at all times and temperatures despite the variation in that power from solar cell 420.

Oscillator 26A" may be used to modulate power amplifier 26B" at frequencies amenable to wireless power transfer as already described above. Power amplifier 26B" may be of the same design as amplifier 26B shown in FIG. 8, with the DC power being supplied from PCU 430 instead of as DC voltage 127E. In alternative embodiments, power amplifier 26B" may be suitably provided with circuitry to sustain an oscillation in itself, as is well-known in the field of radio systems, thereby obviating the oscillator 26A".

Figure 19A:
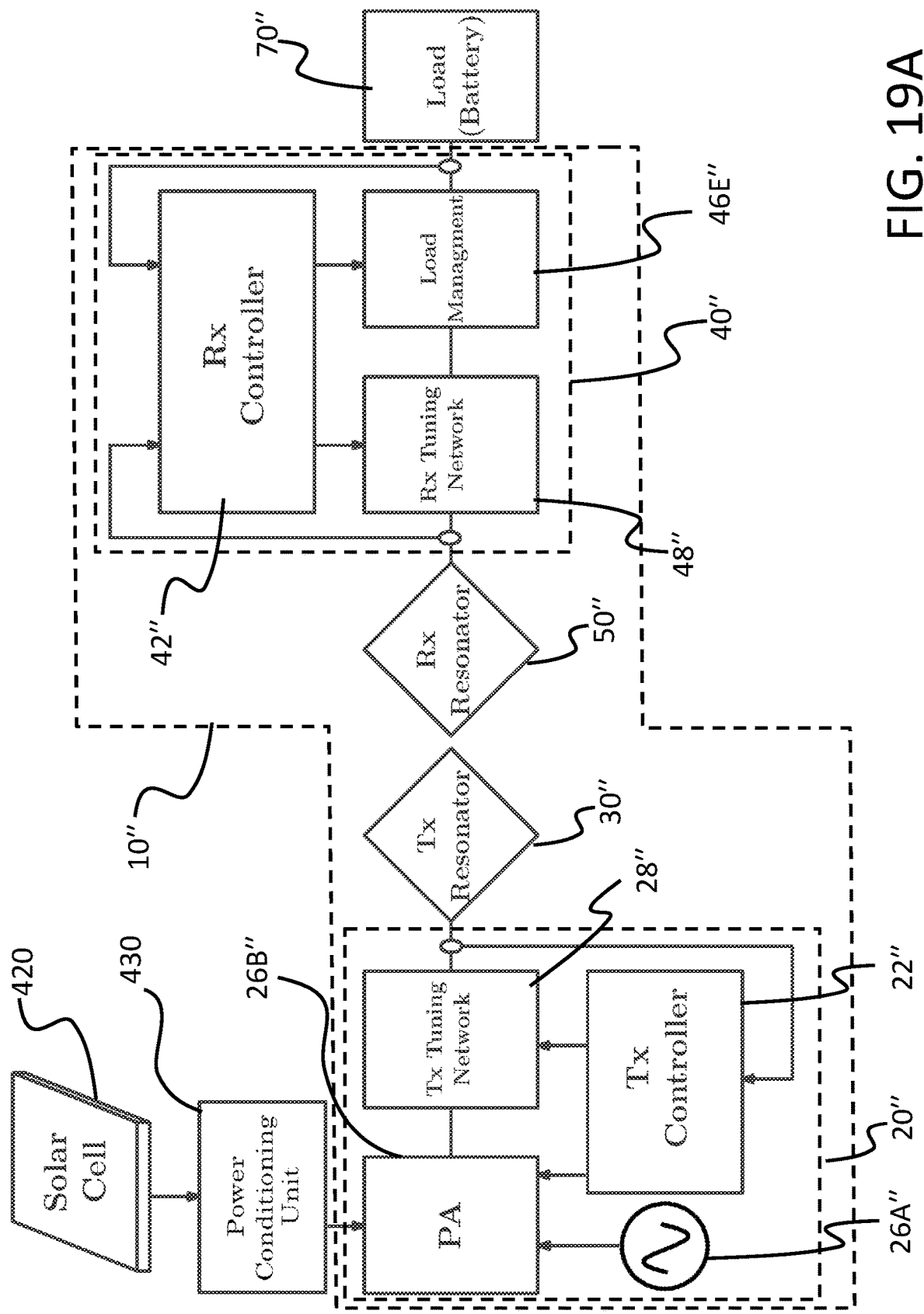
FIG. 19A shows a near-field resonant wireless electrical power transfer system for wirelessly transferring electrical power from a photovoltaic solar cell to an electrical power load.

Power may be transferred to transmission resonator 30" via transmission tuning network 28" which, in FIG. 19A, is a consolidation of signal conditioning and tuning components 26C, 26D, 26E, and 26F of FIG. 6. Transmitter resonator 30" may have a surface area that has an extent that may be at least a major fraction of the extent of the active solar radiation receiving surface of solar cell 420. All these components of transmitter module 20" are under the control of controller 22", just as the corresponding components of transmitter module 20 in FIG. 6 are under the control of controller 22. In the interest of clarity, not all the components of transmitter module 20" are shown in FIG. 19A. The sensors and detectors 24A, 24B, 24C, and 24D of FIG. 6 may also in equivalent form be present in transmitter module 20" and connected to controller 22" and may fulfill the same roles as already described with reference to FIG. 6.

Power may be transferred wirelessly from transmitter module 20" to receiver module 40" via transmission resonator 30" and receiver resonator 50". From receiver module 40" power may then be transferred to DC load 70". Transmission of the power between transmission resonator 30" and receiver resonator 50" may be by means of near-field wireless transfer, as described above with reference to FIGS. 6 to 10. The near-field wireless power transfer as per FIG. 19A is not limited to being bimodal and may be purely capacitive or purely inductive.

Receiver module 40" may have the same components as receiver 40 of FIG. 7. For the sake of clarity, a reduced set of those components are shown in FIG. 19A. Sensor 44A and detector 44B of FIG. 7 are not shown in equivalent form in FIG. 19A but may be present. Receiver tuning network 48" in FIG. 19A may be a consolidation of compensation network 46A, matching network 46B, rectifier 46D, and filter 46C. Power may be transferred from receiver tuning network 28" to load manager 46E", both of which may be under the control of receiver controller 42".

Regarding rectifier 46D, shown in more detail in FIG. 7, the input impedance of this device is directly dependent on the load experienced by the output of the device.

In operation, near-field resonant wireless electrical power transfer system 10" may function in the same way as near-field resonant wireless electrical power transfer system 10 of FIG. 1, and FIGS. 6 to 10, with the difference that the applied voltage VDD on each power amplifier 26B" is replaced by the power signal from power conditioning unit (PCU) 430, which, in turn, receives its power from the relevant power source, being in this embodiment solar cell 420.

In another embodiment, power conditioning unit 430 may be omitted from the system shown in FIG. 19A and power transfer system 10" instead configured or operated to also serve as a power conditioning system. This may be achieved by configuring controller 22", for example without limitation in software, to adjust an input DC equivalent resistance of power amplifier 26B" based on a power level measured by power sensor 24B of FIG. 6. The term "input DC equivalent resistance" is used here to describe the ratio of DC voltage to DC current at the DC terminal of power amplifier 26B. Although controller 22" would do the adjustments based on a power measurement, it is anticipated that the maximum power point for transferred power would be attained when the input impedance of power amplifier 26B" matches the output impedance of the solar cell 420. In this embodiment, system 10" is functioning as what is known in industry as a "maximum power point tracker" and ensures that power is always transferred at a rate more suitable to the power consuming load than which would be obtained if the supply of power were unregulated. In another embodiment, controller 22" may be configured to measure the output impedance of the power source, being solar cell 420 in this embodiment, and then adjust the input impedance of power amplifier 26B" based on the measured output impedance of solar cell 420.

Over and above the adjustment of the input impedance of power amplifier 26B", controller 22" may also adjust one or more of the settings of transmitter tuning network 28" and the frequency of oscillator 26A". Furthermore, transmitter controller 22" may make the adjustments already described above based on measurements by load detector 24A shown in FIG. 6, which gives greater detail on the circuitry of transmitter modules 20 and 20". Load detector 24A senses at point 24E of FIG. 6 the effects of load 70".

Receiver controller 42" may also adjust one or more of the settings of receiver tuning network 48" and load management system 46E" in order to improve efficiency of the power transfer based on measurement by receiver power sensor 44A and load detector 44B (both shown in FIG. 7).

Figure 19B:
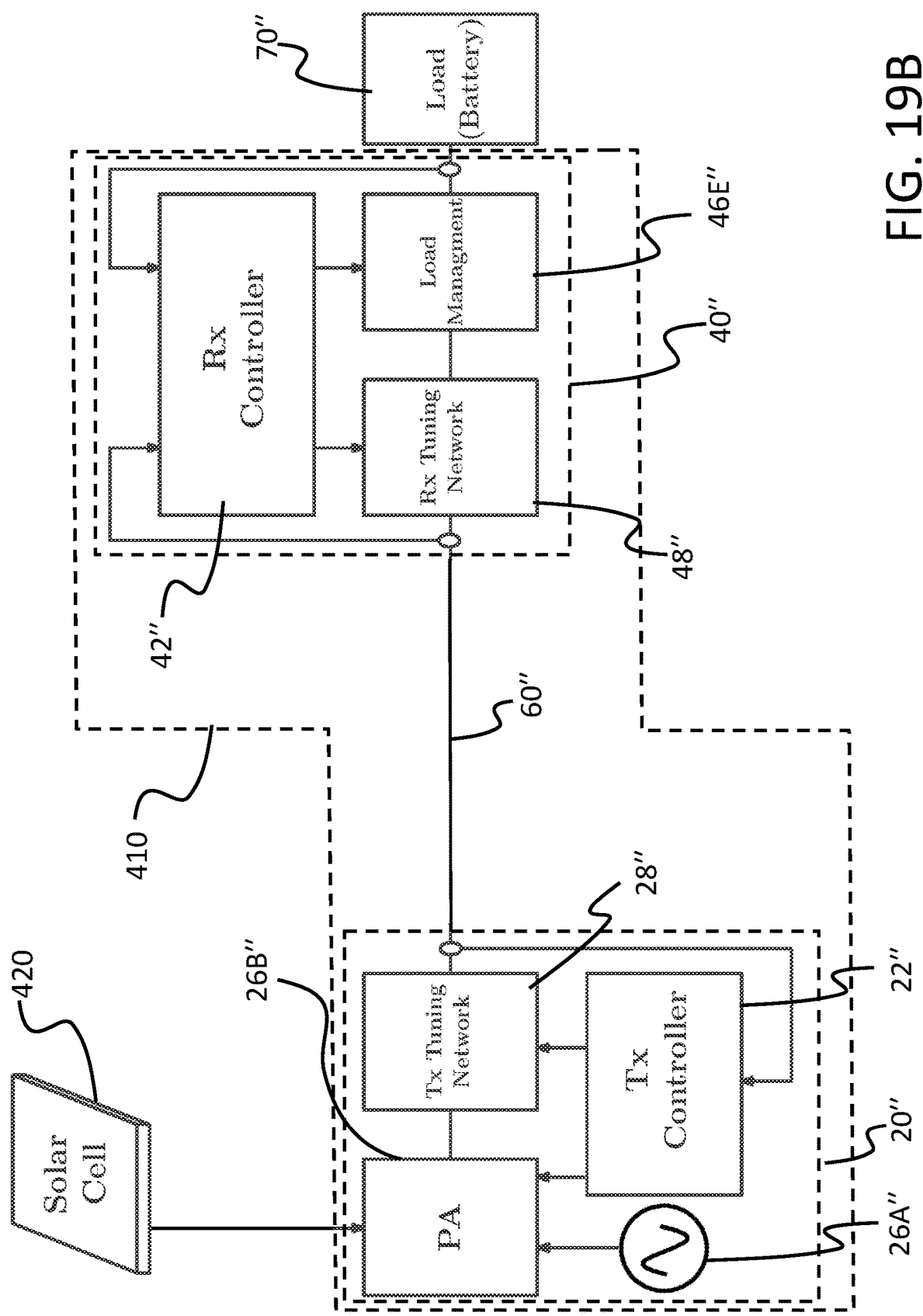
FIG. 19B shows a power transfer system for transferring electrical power from a photovoltaic solar cell to an electrical power load.

In considering the power conditioning function of system 10", it may be appreciated that there is no a priori reason why the power transfer function of the system should be confined to near-field wireless transmission across an air gap as in FIG. 19A. Thus, in another embodiment, power conditioning unit 410 is shown in FIG. 19B based on the elements of system 10" of FIG. 19A. Transmitter tuning network 28" is directly in electrical communication with receiver tuning network 48" via suitable non-air-gap connection 60". This communication is via a radio frequency power signal and constitutes the power being transferred in and by the system. Electronic components of suitable reactance may be employed in well-known configurations to decouple any DC voltage and current levels in transmitter module 20" from such levels in receiver module 40". Transmitter resonator 30" and receiver resonator 50" are absent from this embodiment and are obviated by the direct communication connection between transmitter tuning network 28" and receiver tuning network 48".

The functioning of the power transfer systems of FIG. 19A and FIG. 19B as power conditioning systems may be better appreciated by considering FIG. 19B, in which the absence of transmitter resonator 30" and receiver resonator 50" simplify the power conditioning concepts, though these apply equally with these resonators present (as in FIG. 19A). The systems of FIGS. 19A and 19B have four independent control parameters that may be adjusted during operation to condition the power being transferred to the receiver module 40", and thereby to the load 70". Typical commercial power conditioning units are generally known as "boost converters" by virtue of raising their output voltage above that of the source voltage. These devices have only two control parameters.

The first independent control parameter that may be adjusted during operation to condition the power being transferred to receiver module 40", and thereby to load 70", is the oscillation frequency of power amplifier 26B", which is adjustable by controller 22A" in oscillator 26A".

The second independent control parameter that may be adjusted during operation to condition the power being transferred to receiver module 40", and thereby to load 70", is the output load on rectifier 46D of receiver module 40". That output load in turn directly determines the input impedance of rectifier 46D and thereby of receiver module 40". This, in turn, is the load experienced by transmitter module 20" and directly determines the input DC equivalent resistance of power amplifier 26B". Manipulation of output load on rectifier 46D is done via load management system 46E" of receiver module 40" (See FIG. 19A) under control of receiver controller 42". This second independent control parameter is a property of the receiver module, but it innately controls the load experienced by the power source. The control point for manipulating this parameter is load management system 46E" of receiver module 40".

The third and fourth independent control parameters that may be adjusted during operation to condition the power being transferred to receiver module 40", and thereby to load 70", are a property of rectifier 46D of receiver module 40" (see FIG. 7) and a property of power amplifier 26B" (FIG. 19A) and are similar in nature, but mutually completely independent. Both rectifier 46D and power amplifier 26B" comprise multiterminal amplification devices, relying on the modulation of the passage of a current between two terminals through the multiterminal device by a voltage signal applied to a third terminal of each device. The simplest multiterminal amplification device that may be used in each of rectifier 46D power amplifier 26B" is a transistor. This allows there to be a phase difference between voltage signal and current signal produced by or in the device. That voltage-current phase difference is adjustable via the applied voltage. Rectifier 46D may be an adjustable phase radio frequency rectifier of which the voltage-current phase difference may be adjusted via receiver controller 42". In the case of power amplifier 26B", the voltage-current phase difference may be adjusted via transmitter controller 22". Rectifier 46D may usefully comprise a differential self-synchronous radio frequency rectifier. Rectifier 46D may comprise a differential switched-mode self-synchronous radio frequency rectifier.

The examples of FIGS. 19A and 19B are based on transferring power from a solar cell, or, by extension, from a solar cell array, in which the power delivered by solar cell 420 may vary drastically down to zero depending on sunlight. There are many other power sources that suffer from variable output, both in terms of power and in terms of voltages generated. Among these are power generation turbines, wind turbines, and various batteries and accumulators. Wind turbines may vary drastically in their generation of power and the various batteries may have a wide range of power depletion curves. Given the efficiency of power transfer of systems either of these systems 10" and 410 may be configured to receive power from, for example without limitation, a commercial battery that has a slow open circuit voltage decay curve. Load management system 46E" may be configured to change the input DC equivalent resistance of power amplifier 26B" as already explained above and controllers 22" and 42" may be configured to render a required voltage level to load 70" until such voltage may no longer be sustained by the power transmitted and the adjustability of parameters of systems 10" and 410.

Figure 20A:
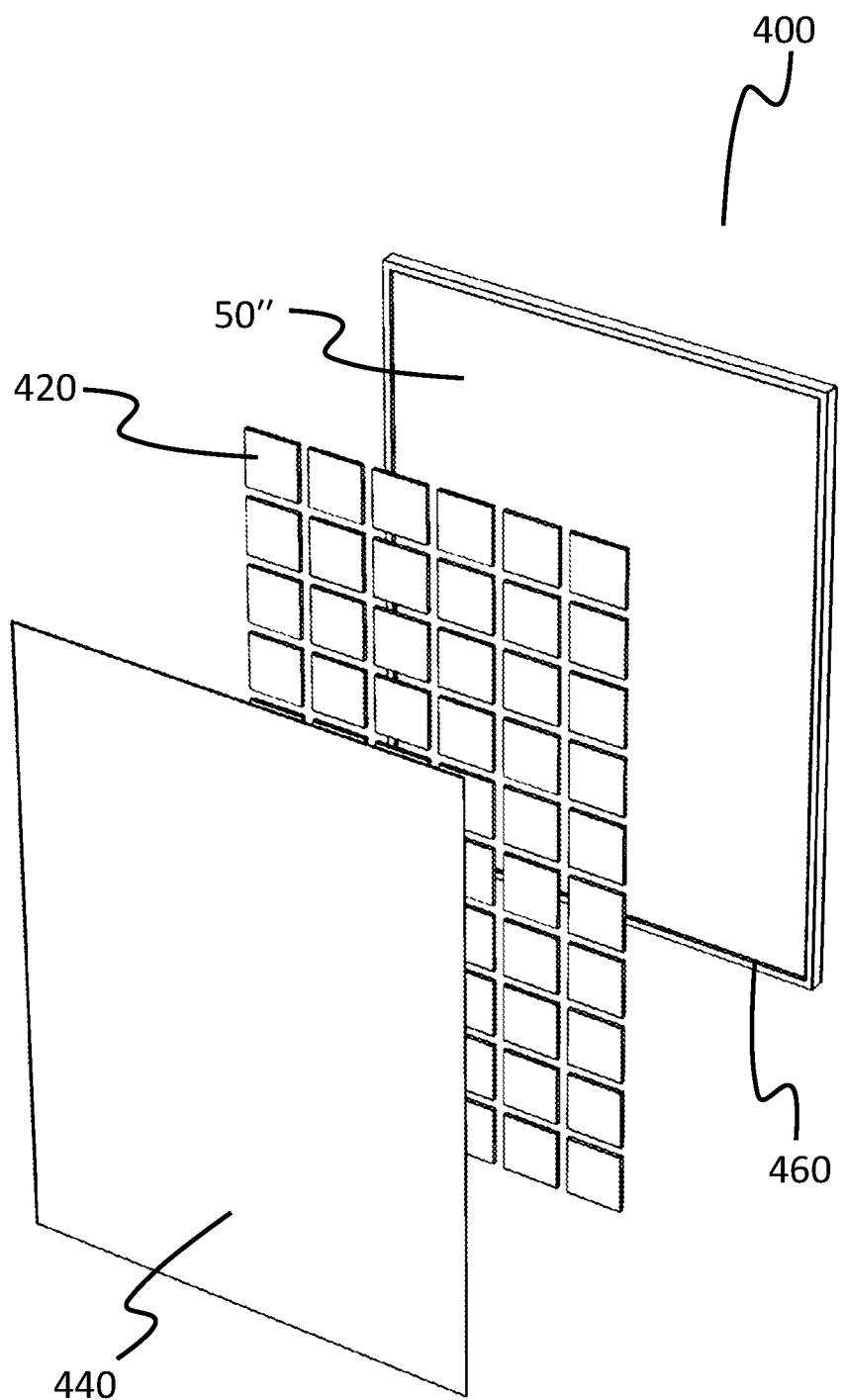
FIGS. 20A and 20B show front and rear views of solar cell array configured for using the near-field resonant wireless electrical power transfer system of FIG. 19A in a many-to-one configuration.
Figure 20B:
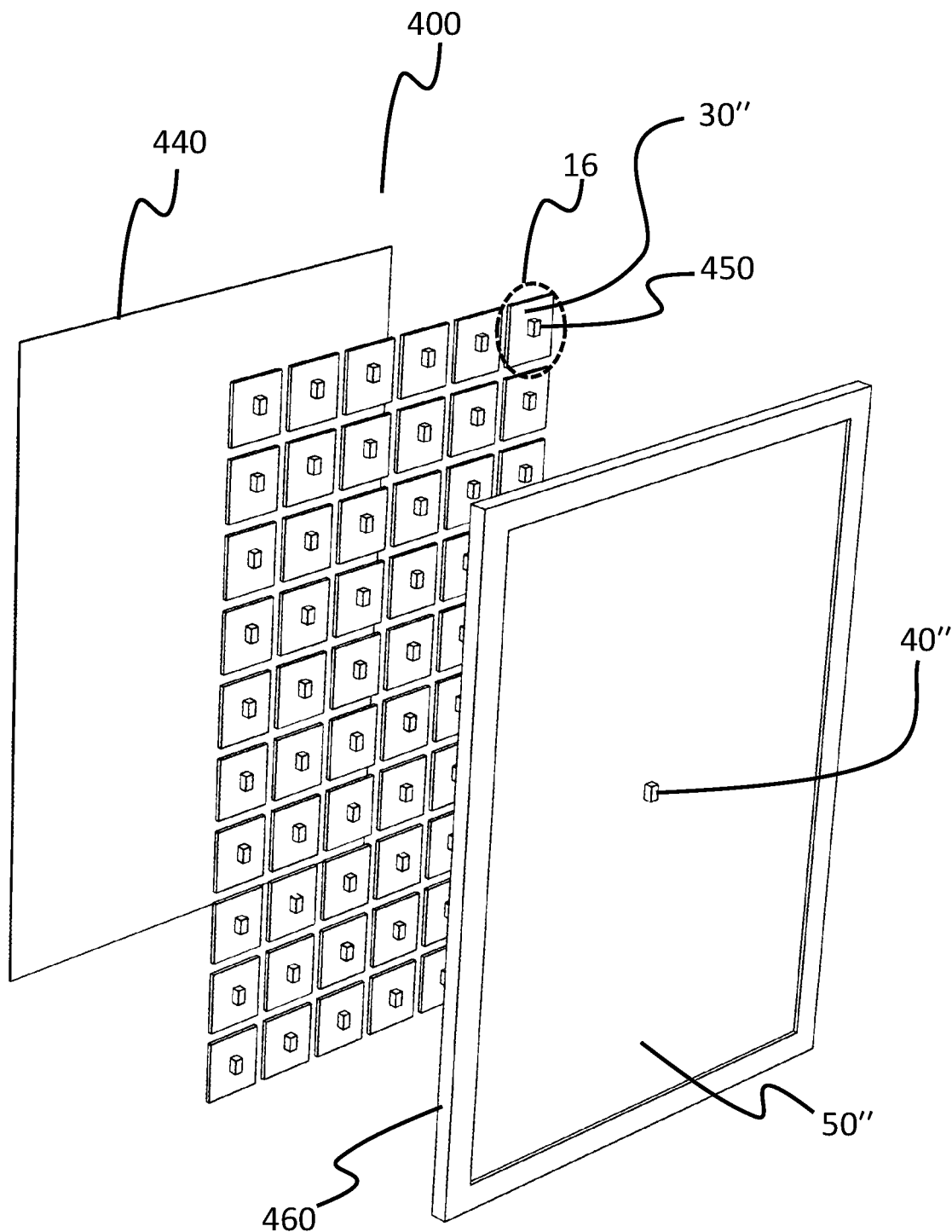

FIG. 19A and its associated descriptive text address the near-field wireless transfer of power from single solar cell 420 to single load 70", being typically a battery. In practical implementations of larger solar cell power systems, arrays of cells are typically employed, so that a power transfer scheme similar to that described with reference to FIG. 12, FIG. 13A and FIG. 13B may be employed, there being a plurality of transmitter subsystems and typically a single receiver subsystem. This situation is shown in FIGS. 20A and 20B, being respectively exploded front and rear views of solar panel 400 with transparent solar cover 440 having one near-field wireless power transmission subsystem per solar cell 420, and thereby comprising, by way of example, sixty near-field wireless power transmission subsystems 16, each transmission subsystem 16 comprising transmitter resonator 30", transmitter module 20", and power conditioning unit 430 as described with reference to FIG. 19A. To avoid cluttering, transmission subsystem 16 is not labeled in FIG. 19A, but is indicated and labeled in FIGS. 20B, 21B and 22B, as described further below.

In an embodiment, the coupling of each individual solar cell, of a solar panel comprised of a plurality of solar cells, to a power transfer and management system allows for cell level power management. By providing a power management at each individual cell, power collection may be optimized for each cell, resulting in improved efficiency for the entire solar panel system. In such an embodiment, the effects due to failure of individual cells or of a poor connection among the cells will be mitigated. Power collection at the individual cell level allows for maximum power harvest, even in less than ideal conditions, such as rain, shade, or when debris is covering a portion of the solar panel.

For the sake of avoiding clutter, only one near-field wireless power transmission subsystem 16 is labeled in FIG. 20B. In FIGS. 20A and 20B, transmitter resonator 30" of each transmission subsystem 16 may be located on the back of its corresponding solar cell 420. The flat area of the solar cell, as seen from the front of the panel in FIG. 20A, represents the active solar radiation receiving and energy converting semiconductor device itself, and is correspondingly labeled 420, while the flat area of the device as seen from the back in FIG. 20B represents the transmitter resonator, and is correspondingly labeled 30". Transmitter resonator 30" may have a surface area that has an extent that may be at least a major fraction of the extent of the active solar radiation receiving surface of solar cell 420. Transmitter module 20" and power conditioning unit 430 of each near-field wireless power transmission subsystem 16 are consolidated together in FIG. 20B and labeled 450. To avoid cluttering, consolidated components 450 are not labeled in FIG. 19A, but are indicated as a unit and labeled in FIGS. 20B, 21B and 22B, as described further below. Single receiver resonator 50" may be fitted in frame 460 of solar panel 400. Single receiver module 40" may be mounted directly on the back of receiver resonator 50".

In operation, near-field resonant wireless electrical power transfer system 10" may function in the same way as near-field resonant wireless electrical power transfer system 10' of FIG. 12, FIG. 13A and FIG. 13B, with the difference that the applied voltage VDD on every one of power amplifiers 26B" is replaced by the power signal from power conditioning unit (PCU) 430, which, in turn, receives its power from the relevant solar cell 420.

In another embodiment of the system of FIGS. 20A and 20B, frame 460 may be configured to be a suitable receiver resonator to receive power from all transmitter resonators 30" and receiver module 40" may be located on frame 460. In this embodiment, the plate within the frame is not a resonator and may be a simple flat sheet of non-conductive material.

Figure 21A:
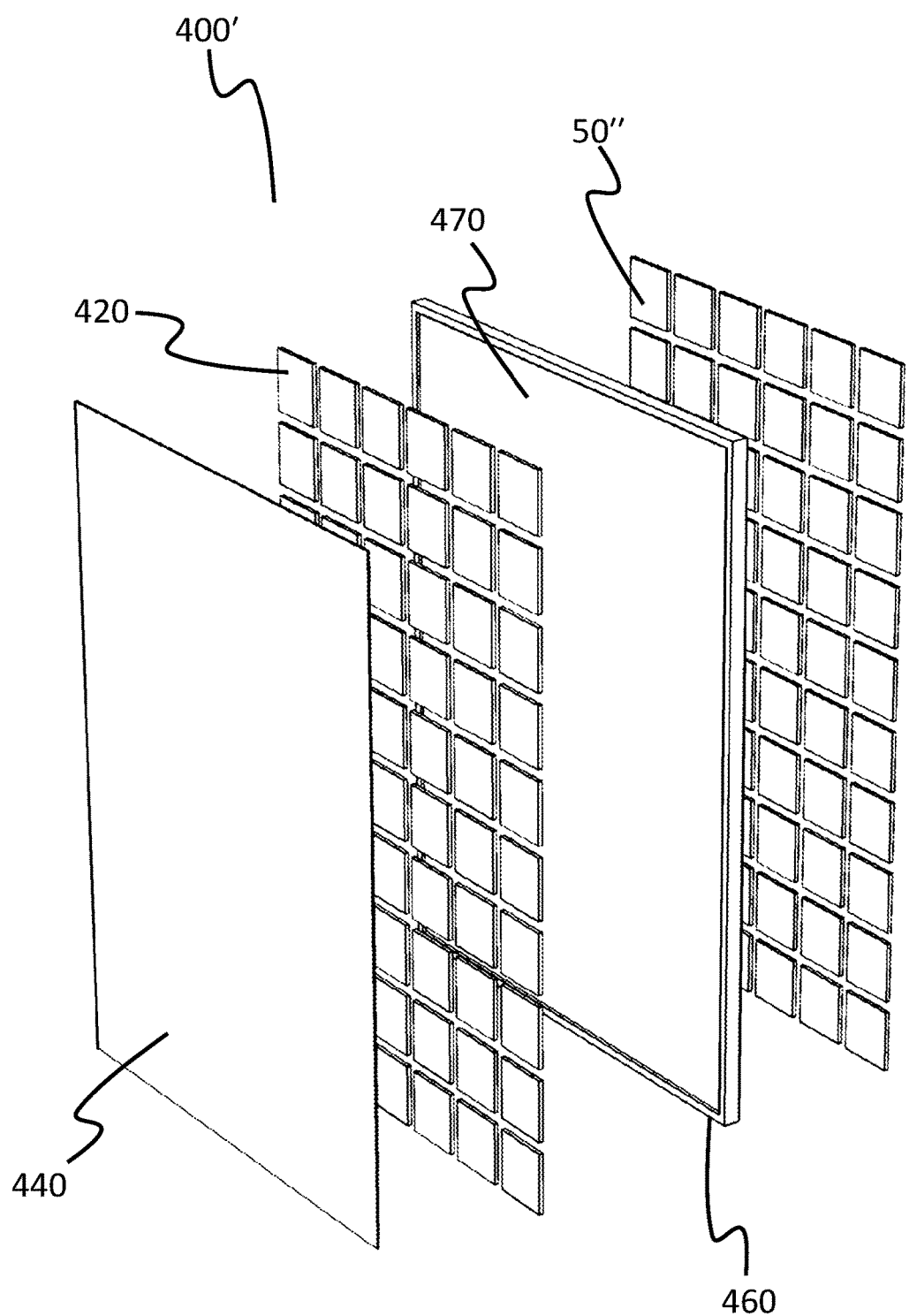
FIGS. 21A and 21B show front and rear views of solar cell array configured for using the near-field resonant wireless electrical power transfer system of FIG. 19A in a one-to-one configuration.
Figure 21B:
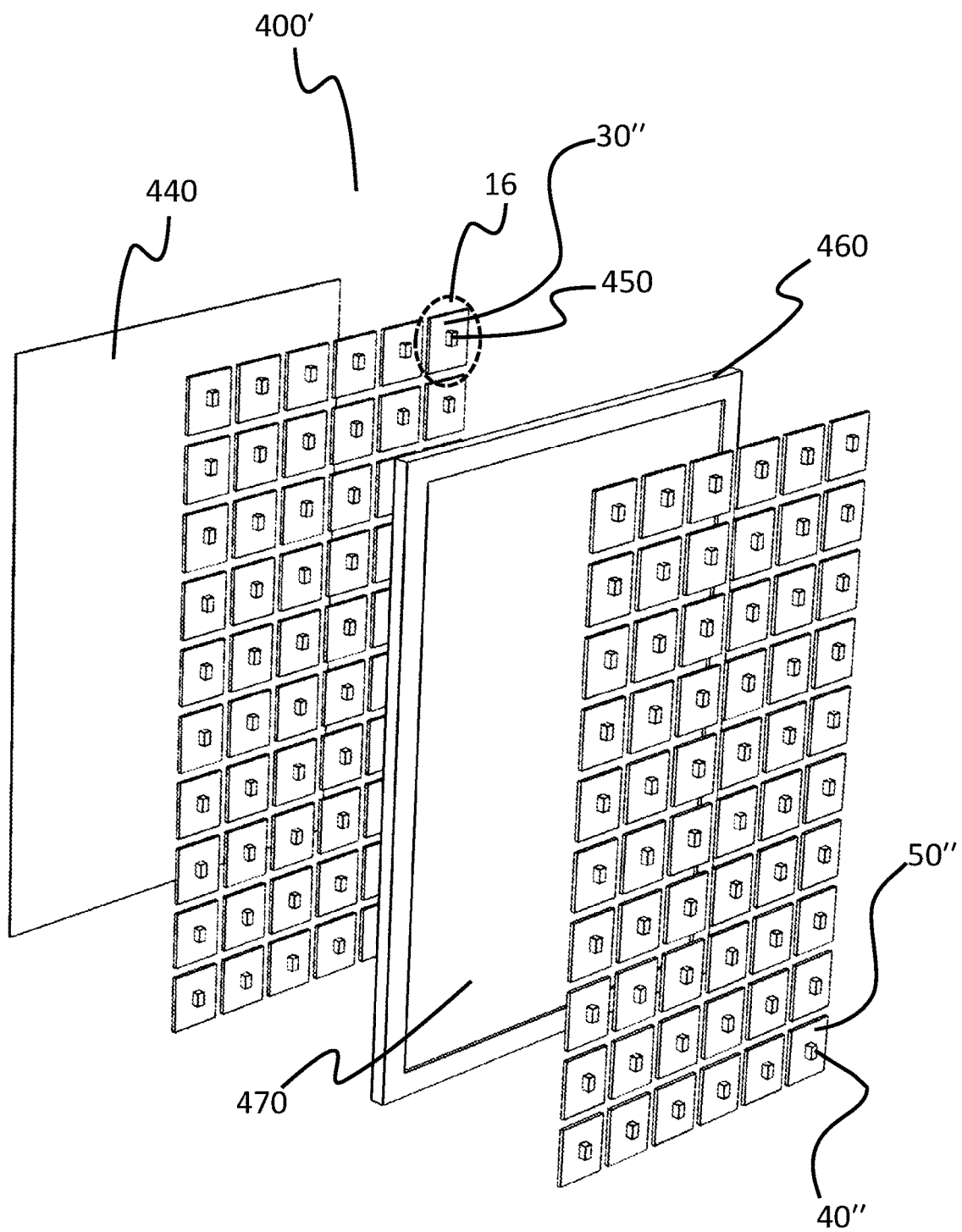

In another implementation, solar panel 400', shown in front and rear views in FIGS. 21A and 21B respectively, has each near-field wireless power transmission subsystem transfer power to one near-field wireless power receiver subsystem. While frame 460 is shown as being filled by opaque plate 470, plate 470 may not be part of either the near field electrical or magnetic circuit. For the sake of clarity, we employ the same components numbering on the transmit side as in FIGS. 20A and 20B. On the receive side, we employ the numbering of FIG. 19A. Again, to avoid clutter, only one receive side device is labeled.

In operation, solar panel arrangement 400' of FIG. 21A and FIG. 21B may have individual transmitter modules 20" linked by hardwire (not shown) so that they may be in phase, thereby allowing least power loss in transmission. In other embodiments, transmitter modules 20" may be independent and function as explained at the hand of FIG. 14, FIG. 17 and FIG. 18.

Figure 22A:
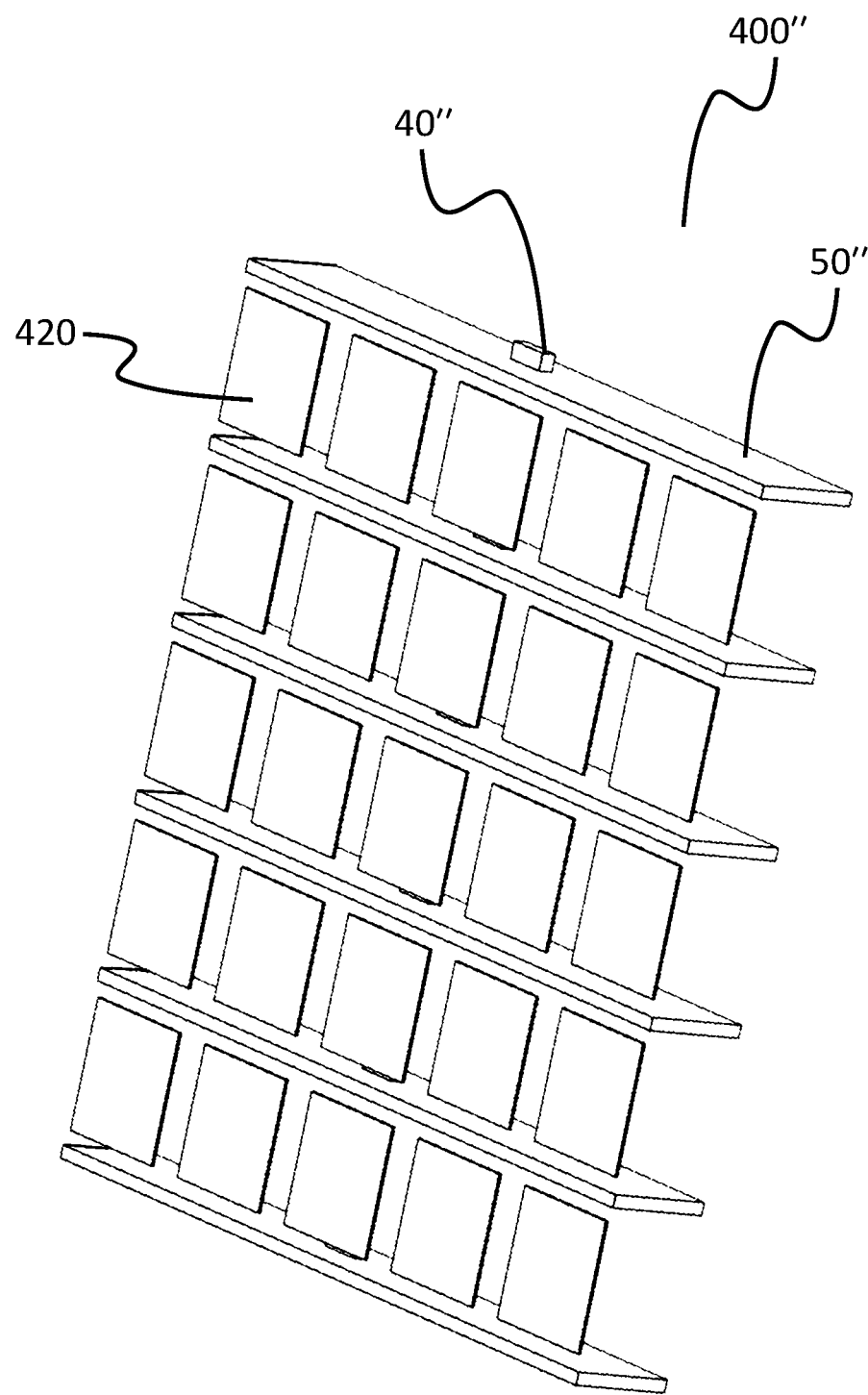
FIGS. 22A and 22B show front and rear views of solar cell array configured for using the near-field resonant wireless electrical power transfer system of FIG. 19A in a row-based configuration.
Figure 22B:
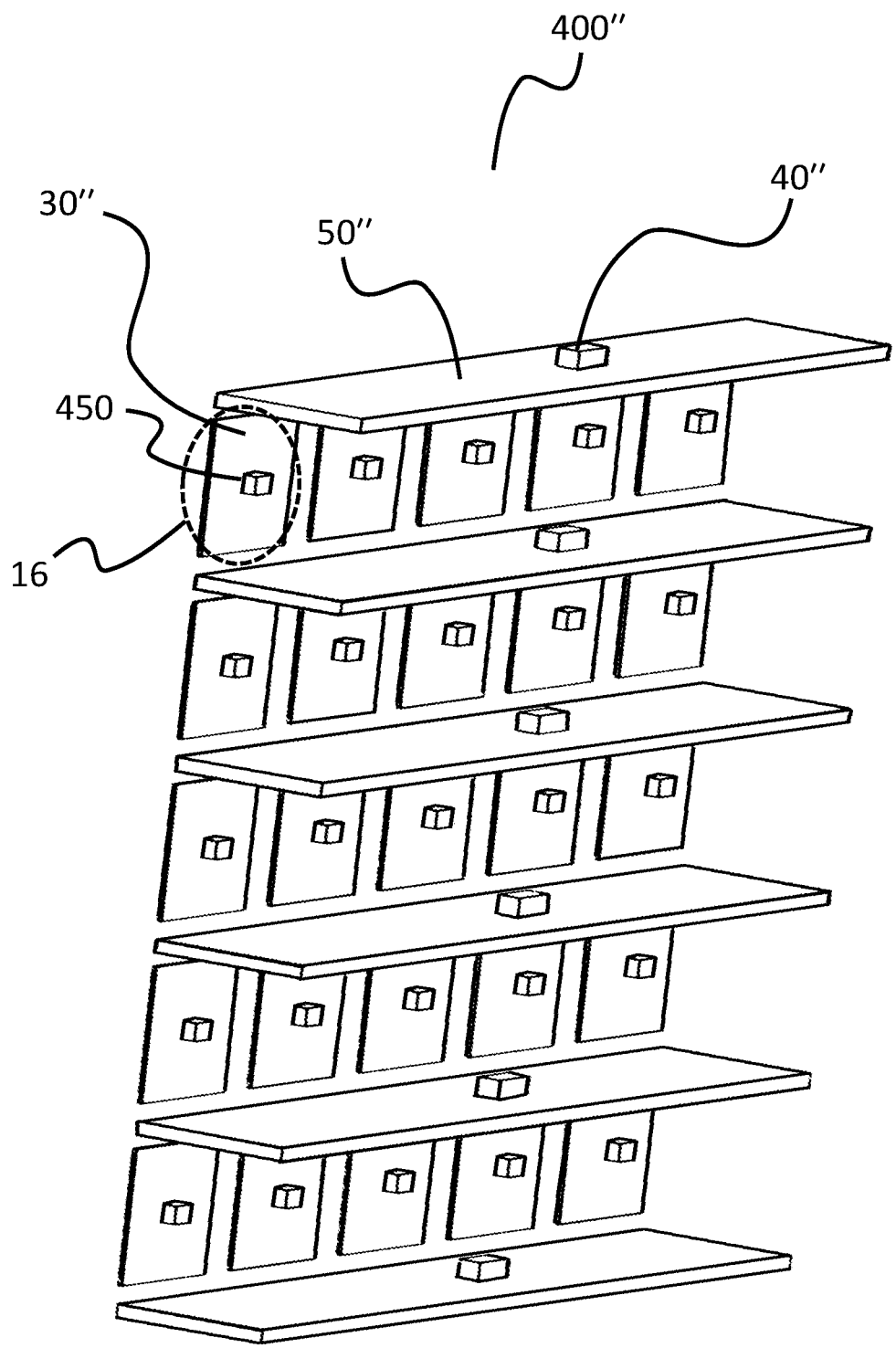

In yet a further implementation, shown as solar panel arrangement 400" in front view and rear view in FIGS. 22A and 22B respectively, an array of, for example, twenty-five solar cells, is shown, arranged in five rows of five cells 420 each. Each solar cell 420 has at its rear transmitter resonator 30" and unit 450 comprising its corresponding transmitter module 20" and power conditioning unit 430. At the bottom and top of the array and between each two rows of solar cells is receiver resonator 50", arranged in a plane substantially perpendicular to a plane of solar cells 420, each receiver resonator 50" in wired electrical communication with its corresponding receiver module 40". As with the previous solar panel embodiments, one example of each component is labeled. As with the implementations shown in FIGS. 20A and 20B, and FIGS. 21A and 21B, solar panel arrangement 400" may in some embodiments also have frame 460. For the sake of clarity, frame 460 is not shown in FIGS. 22A and 22B.

In operation, transmitter resonators 30" of solar cells 420 in a row of system 400" transmit power to receiver resonators 50" both above and below them. In this embodiment there is, however, the additional mechanism of the various nearest neighbor receiver resonators 50" being resonantly coupled and sharing collected power among them. The collected power gathered by all receiver resonators 50" of the array may therefore be tapped via any one or more of various receiver modules 40". In some embodiments, power collected by all receiver modules 40" may, by way of example, be tapped via only bottom-most receiver module 40". Any one of receiver modules 40" on any resonator 50" may act as a receiver module to collect the power of a row of solar cells 420 whilst also functioning as a transmitter module to transmit the collected power via its associated resonator 50" to another resonator 50" proximate it. This action may be repeated down the array to transfer the power to bottom-most receiver module 40".

In another embodiment of the system of FIGS. 22A and 22B, a frame, similar to frame 460 of FIGS. 20A and 20B, surrounding the planar perimeter of the solar cell array of FIGS. 22A and 22B may be a receiver resonator bearing receiver module 40" and may receive power from various resonators 50". In this way, the total power generated by all solar cells 420 in the array may be received by resonator frame 460 and tapped for further electrical transmission via receiver module 40".

Power collection at the individual solar cell level may be accomplished with a wired connection. However, use of a wireless transmission system in the solar panel allows for a reduction of wiring, and therefore a reduction in manufacturing costs.

Figure 23:
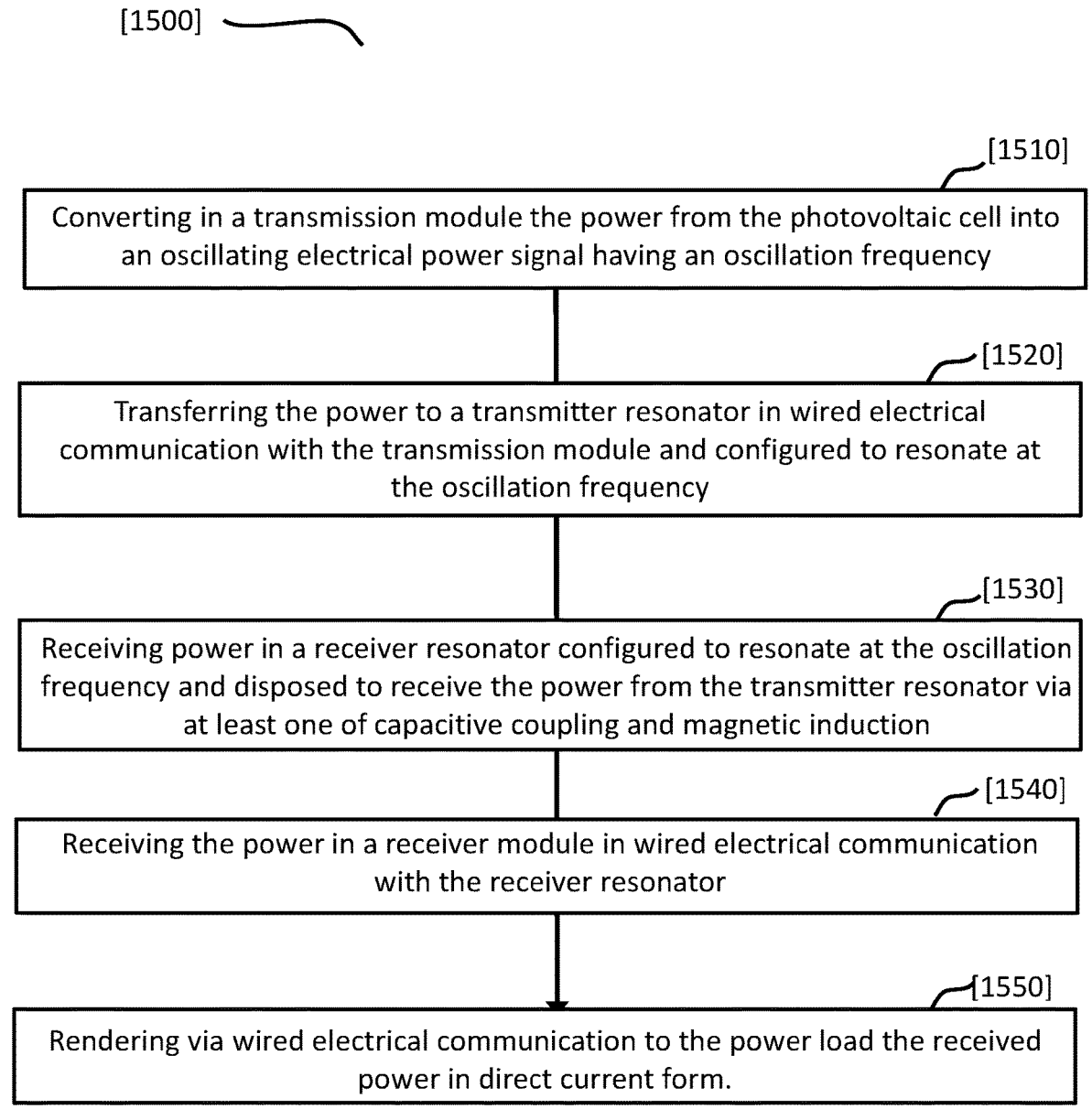
FIG. 23 shows a drawing of a flow chart for a method of wirelessly transferring electrical power from a photovoltaic solar cell to an electrical power load.

In a further aspect, described with reference to the flow chart in FIG. 23, a method [1500] is provided for transferring power from photovoltaic cell 420 to power load 70", the method comprising: converting [1510] in transmission module 20" the power from photovoltaic cell 420 into an oscillating electrical power signal having an oscillation frequency; transferring [1520] power to transmitter resonator 30" in wired electrical communication with transmission module 20" and configured to resonate at the oscillation frequency; receiving [1530] power in receiver resonator 50"

configured to resonate at the oscillation frequency and disposed to receive power from transmitter resonator 30" via at least one of capacitive coupling and magnetic induction; receiving [1540] power in receiver module 40" in wired electrical communication with receiver resonator 50"; and rendering [1550] via wired electrical communication to power load 70" received power in direct current form. The method may further comprise converting a voltage and a current of the power from photovoltaic cell 420 to a voltage and a current adapted to transmission module 20" before converting power into an oscillating electrical power signal.

In a further embodiment of the method, described with reference to FIG. 19A and the flow chart in FIG. 24, a method [1600] is provided for transferring power from array 400 of photovoltaic cells 420 to power load 70", the method comprising: converting [1610] in each of a first plurality of corresponding transmission modules 20" power from each of photovoltaic cells 420 in array 400 into an oscillating electrical power signal having an oscillation frequency; transferring [1620] power in each of transmission modules 20" to corresponding transmitter resonator 30" from among a second plurality of transmitter resonators 30" each configured to resonate at the oscillation frequency; receiving [1630] the power in receiver resonator 50" configured to resonate at the oscillation frequency and disposed to receive the power from the plurality of transmitter resonators 30" via at least one of capacitive coupling and magnetic induction; receiving [1640] the power in receiver module 40" in wired electrical communication with receiver resonator 50"; and rendering [1650] via wired electrical communication to power load 70" received power in direct current form. The method may further comprise converting a voltage and a current of the power from each photovoltaic cell 420 to a voltage and a current adapted to the corresponding transmission module 20" before converting the power into an oscillating electrical power signal. Receiving [1630] the power in receiver resonator 50" may comprise receiving the power in a receiver resonator disposed around a planar perimeter of array 400 of photovoltaic cells.

In a further embodiment of the method, described with reference to FIG. 19A and the flow chart in FIG. 25, a method [1700] is provided for transferring power from array 400' of photovoltaic cells 420 to power load 70", the method comprising: converting [1710] in each of a first plurality of corresponding transmission modules 20" power from each of photovoltaic cells 420 in array 400' into an oscillating electrical power signal having an oscillation frequency; transferring [1720] power from each of transmission modules 20" to corresponding transmitter resonator 30" from among a second plurality of transmitter resonators 30" wherein each transmitter resonator 30" is configured to resonate at the oscillation frequency; receiving [1730] power from each transmitter resonator 30" in corresponding receiver resonator 50" configured to resonate at the oscillation frequency, wherein each receiver resonator 50" is further configured and disposed to receive power from transmitter resonator 30" via at least one of capacitive coupling and magnetic induction; receiving [1740] power from each receiver resonator 50" in a corresponding receiver module 40" in wired electrical communication with receiver resonator 50"; and rendering [1750] via wired electrical communication to power load 70" received power in direct current form. The method may further comprise converting a voltage and a current of power from each photovoltaic cell 420 to a voltage and a current adapted to the corresponding transmission module 20" before converting the power into an oscillating electrical power signal.

In a further embodiment, described with reference to FIG. 19A and the flow chart in FIG. 26, a method [1800] is provided for transferring power from array 400" of photovoltaic cells 420 to power load 70" (in FIG. 19A), the method comprising: converting [1810] in each of a first plurality of corresponding transmission modules 20" power from each of photovoltaic cells 420 in array 400" into an oscillating electrical power signal having an oscillation frequency; transferring [1820] power from each of transmission modules 20" to transmitter resonator 30" from among a second plurality of transmitter resonators 30" wherein each transmitter resonator 30" is configured to resonate at the oscillation frequency; receiving [1830] power from each transmitter resonator 30" in any proximate receiver resonator 50" among a third plurality of receiver resonators 50" configured to resonate at the oscillation frequency, wherein each receiver resonator 50" is further configured and disposed to receive power from transmitter resonator 30" via at least one of capacitive coupling and magnetic induction; sharing [1840] received power among the third plurality of receiver resonators 50"; and rendering [1850] via wired electrical communication to power load 70" received power in direct current form from one or more of the third plurality of receiver resonators 50" via a corresponding one or more receiver modules 40". The method may further comprise converting a voltage and a current of the power from each photovoltaic cell 420 to a voltage and a current adapted to the corresponding transmission module 20" before converting the power into an oscillating electrical power signal.

Figure 27A:
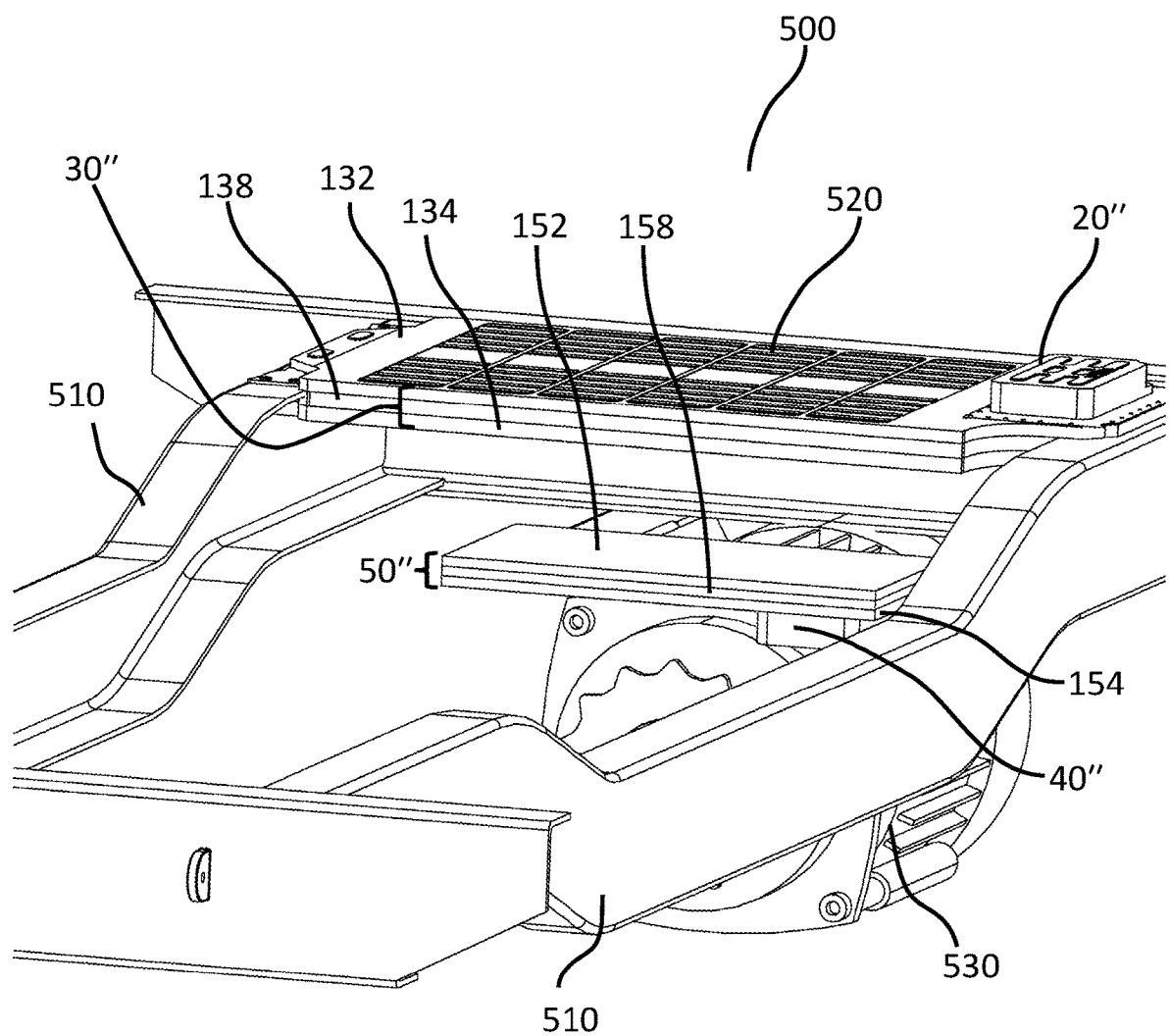
FIG. 27A shows a drawing of a portion of an electric vehicle using an embodiment of a power transfer system.

FIG. 27A shows a representative portion 500 of an extended near-field wireless electrical power distribution system in an electrically powered vehicle with electrically conducting chassis 510. In this embodiment of the general system 10" of FIG. 19A, the power source is rechargeable battery 520 rather than solar cell 420 and load 70" is electric motor 530 rather than a battery as in FIG. 19A. The system shown in FIG. 14A may optionally comprise power conditioning unit 430 as in FIG. 19A. In other embodiments, transmitter module may jointly function to provide power conditioning as explained above with reference to FIG. 19B.

The system shown in FIG. 27A and described in more detail below may operate by Capacitive Power Transfer, Inductive Power Transfer, or by Bimodal Power Transfer. With reference to FIG. 4B and FIG. 19A, transmitter resonator 30" comprises dielectric element 138 sandwiched between conductive antennas 132 and 134. With reference to FIG. 4B and FIG. 19A, receiver resonator 50" comprises dielectric element 158 sandwiched between conductive antennas 152 and 154. Transmitter module 20" is shown directly mounted to antenna 132, which also serves as frame or holder for battery 520. Transmitter module 20" may be electrically connected between battery 520 and transmitter resonator 30". Receiver module 40" is shown directly mounted to electric motor 530. Receiver module 40" may be electrically connected between receiver resonator 50" and motor 530.

Figure 27B:
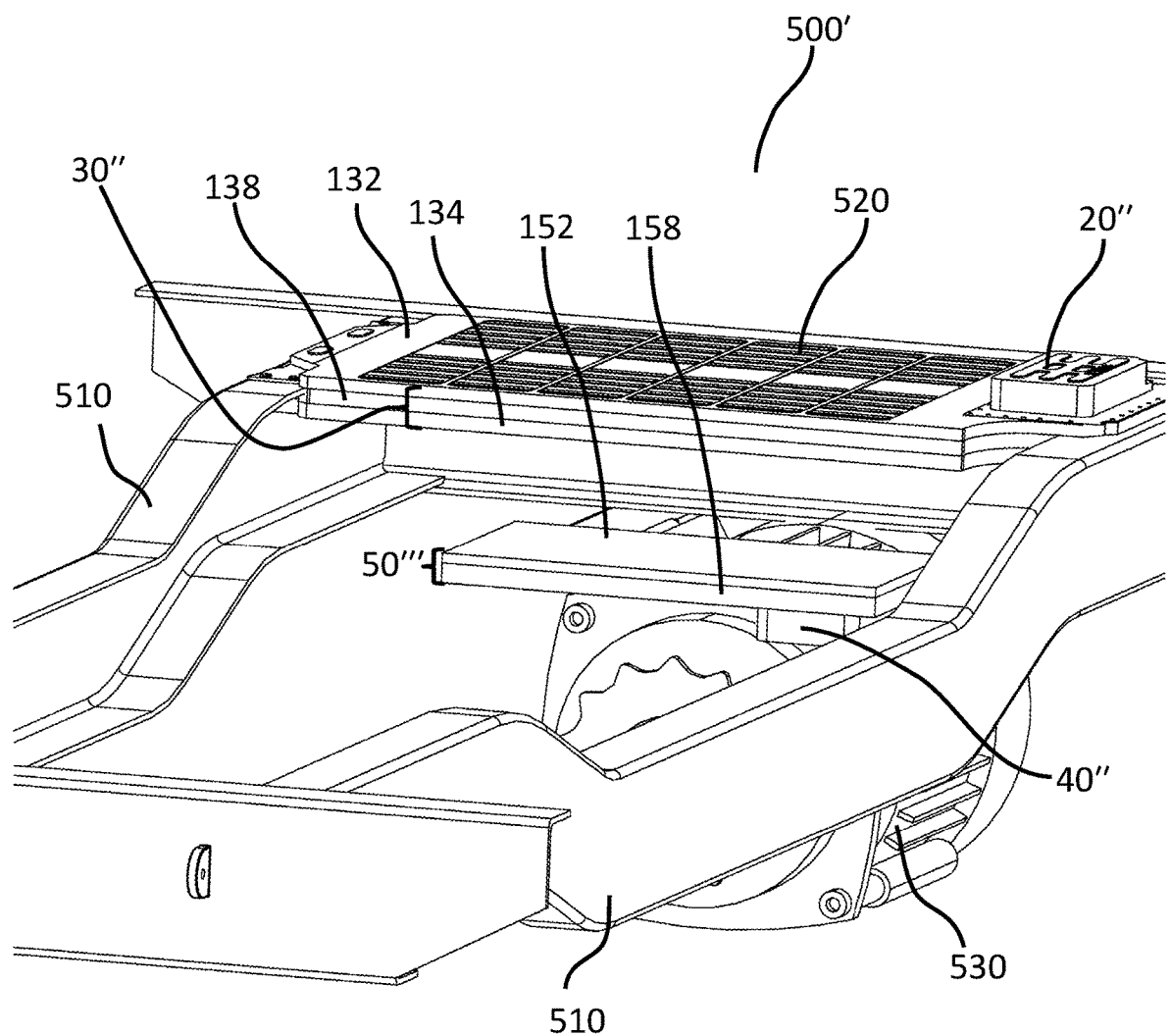
FIG. 27B shows another drawing of a portion of an electric vehicle using an embodiment of a power transfer system.

FIG. 27B shows representative portion 500' of an extended near-field wireless electrical power distribution system in an electrically powered vehicle with electrically conducting chassis 510. In this embodiment of the general system 10" of FIG. 19A, the power source is again, as in FIG. 27A, rechargeable battery 520 rather than solar cell 420 and load 70" is electric motor 530 rather than a battery as in FIG. 19A. The system shown in FIG. 27B may optionally comprise power conditioning unit 430 as in FIG. 19A. In other embodiments, transmitter module 20" and receiver module 40" may jointly function to provide power conditioning as explained above with reference to FIG. 19B.

The system shown in FIG. 27B and described in more detail below may operate by Capacitive Power Transfer, Inductive Power Transfer, or by Bimodal Power Transfer. With reference to FIG. 4B and FIG. 19A, transmitter resonator 30" comprises dielectric element 138 sandwiched between conductive antennas 132 and 134. With reference to FIG. 4B and FIG. 19A, receiver resonator 50'" comprises dielectric element 158 and conductive antenna 152, antenna 154 of FIG. 27A being absent from resonator 50'" in this embodiment. Transmitter module 20" is shown directly mounted to antenna 132, which also serves as frame or holder for battery 520. Transmitter module 20" may be electrically connected between battery 520 and transmitter resonator 30". Receiver module 40" is shown directly mounted to electric motor 530. In this embodiment, receiver module 40" may be electrically connected between motor 530 and chassis 510. In this arrangement, there is enough coupling between chassis 510 and antenna 152 for power transfer at suitably high efficiency. Electrically conducting mechanical components of the system, that is, components that have, for example load bearing structural functions in the system, may hereby form part of the resonant structure of the electrical power transfer system.

In the embodiments shown in FIGS. 27A and 27B, the focus is specifically on the electrical power supplied to electrical motor 530 driving one of the wheels of the vehicle, but the equivalent arrangement may be implemented for any electrical subsystem on the vehicle, using a plurality of suitably adapted receiver modules 40", all provided with power by transmitter module 20".

The arrangements of FIG. 27A and FIG. 27B for power transfer from a battery to the electrical subsystems of a vehicle obviates in large part the hugely complex automotive wire harness that creates difficulty during vehicle manufacture and is the source of considerable manufacturing costs. The embodiments in FIG. 27A and FIG. 27B, together with their extensions to the other electrical subsystems of the vehicle, may be described as "extended near-field wireless electrical power distribution systems".

Beyond the other wheels of the electric vehicle, this arrangement may extend to the headlights and other vehicle accessories including without limitation, interior lights, dashboard displays, gauges, digital electronics, navigation systems, warning systems, and the like. Nor is the application limited to electric vehicles. It may be applied to hybrid or internal combustion vehicles to distribute electrical power as and where required. It may similarly be applied to other vehicles employing any electrical systems requiring electrical power. Examples without limitation include motorized and non-motorized bicycles, aircraft, boats, and other vehicles employing on-board electrical power sources. The battery or power source need not be limited to being on-board the vehicle. The principles explained with respect to FIGS. 1 to 11, 19A-19B, and 27A-27B apply also to stationary and vehicular systems requiring electrical power to be supplied from a geostationary source, for example without limitation a fixed rail for supplying power to a moving vehicle.

Figure 28A:
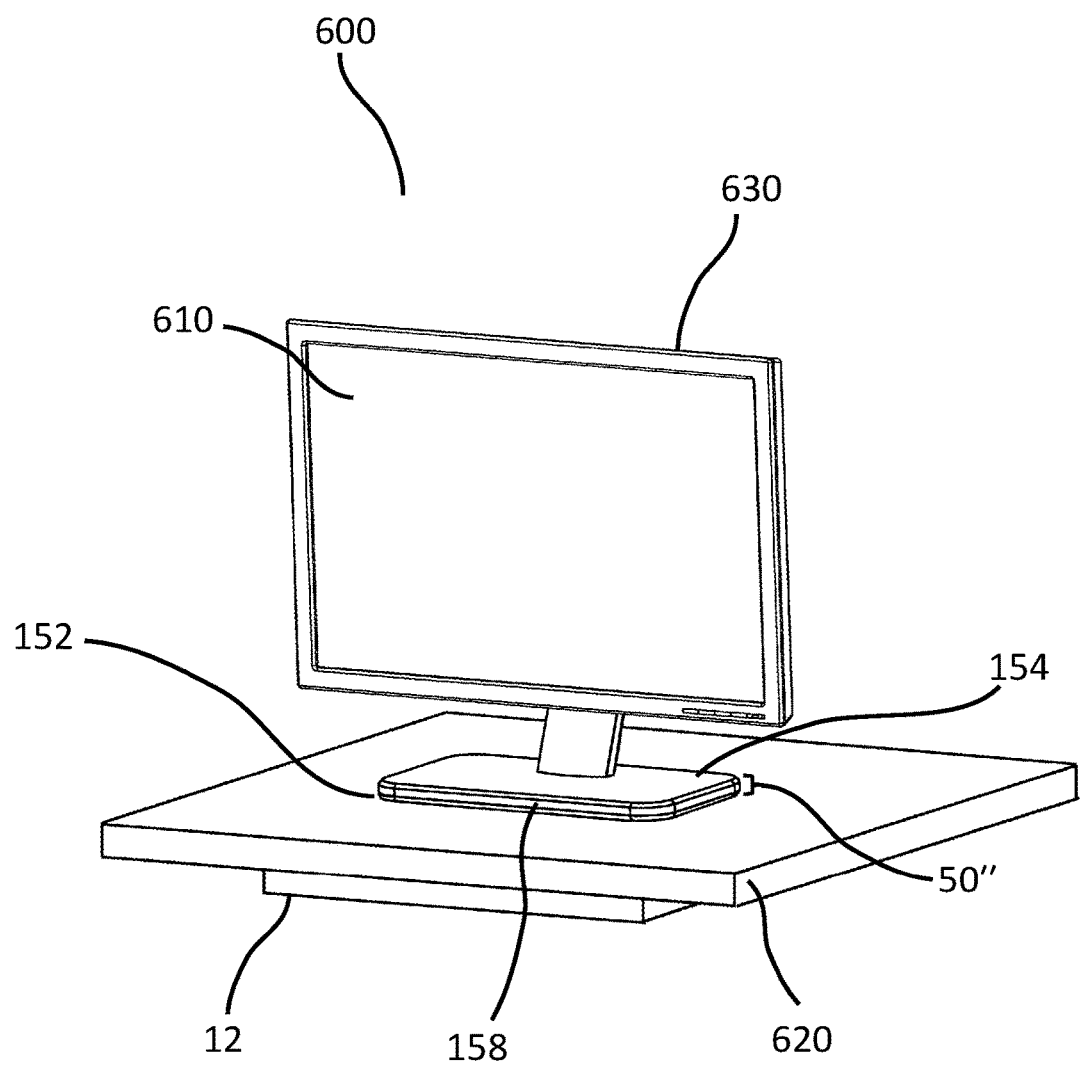
FIG. 28A shows a drawing of computer monitor using an embodiment of a power transfer system.

FIG. 28A shows another embodiment of general system 10" of FIG. 19A in power supply system 600 for supplying power to computer monitor 610, positioned on tabletop 620 of a desk, with electrical power from a suitable source via primary side 12 as per FIG. 1 and, in more detail, FIG. 6. In system 600, transmitter module 20" and transmission resonator 30" of FIG. 19A are both incorporated in primary side 12. In the arrangement of system 600, receiver resonator 50'" as per FIG. 19A forms the base of monitor 610. Receiver module 40" of FIG. 19A may be incorporated in the base of monitor 610. Alternatively, receiver module 40" of FIG. 19A may be incorporated inside monitor 610 itself. With reference to FIG. 4B, antenna 152 forms the bottom of the base of monitor 610 and is separated from antenna 154 by dielectric 158.

The housing and structural frame 630 of monitor 610 may be at least in part electrically conductive and serve as one contiguous conductor to electrically supply power signal from antenna 154 via receiver module 40" (see FIG. 19A) to the circuitry of monitor 610 representing load resonator 70" of FIG. 19A. The other electrical connector from antenna 152 to the circuitry of monitor 610 runs from antenna 152 and up the pedestal of monitor 610. In other embodiments, housing and structural frame 630 of monitor 610 may be non-conductive polymer and a separate conductor runs from antenna 154 to the circuitry of monitor 610 representing load resonator 70" of FIG. 19A.

Figure 28B:
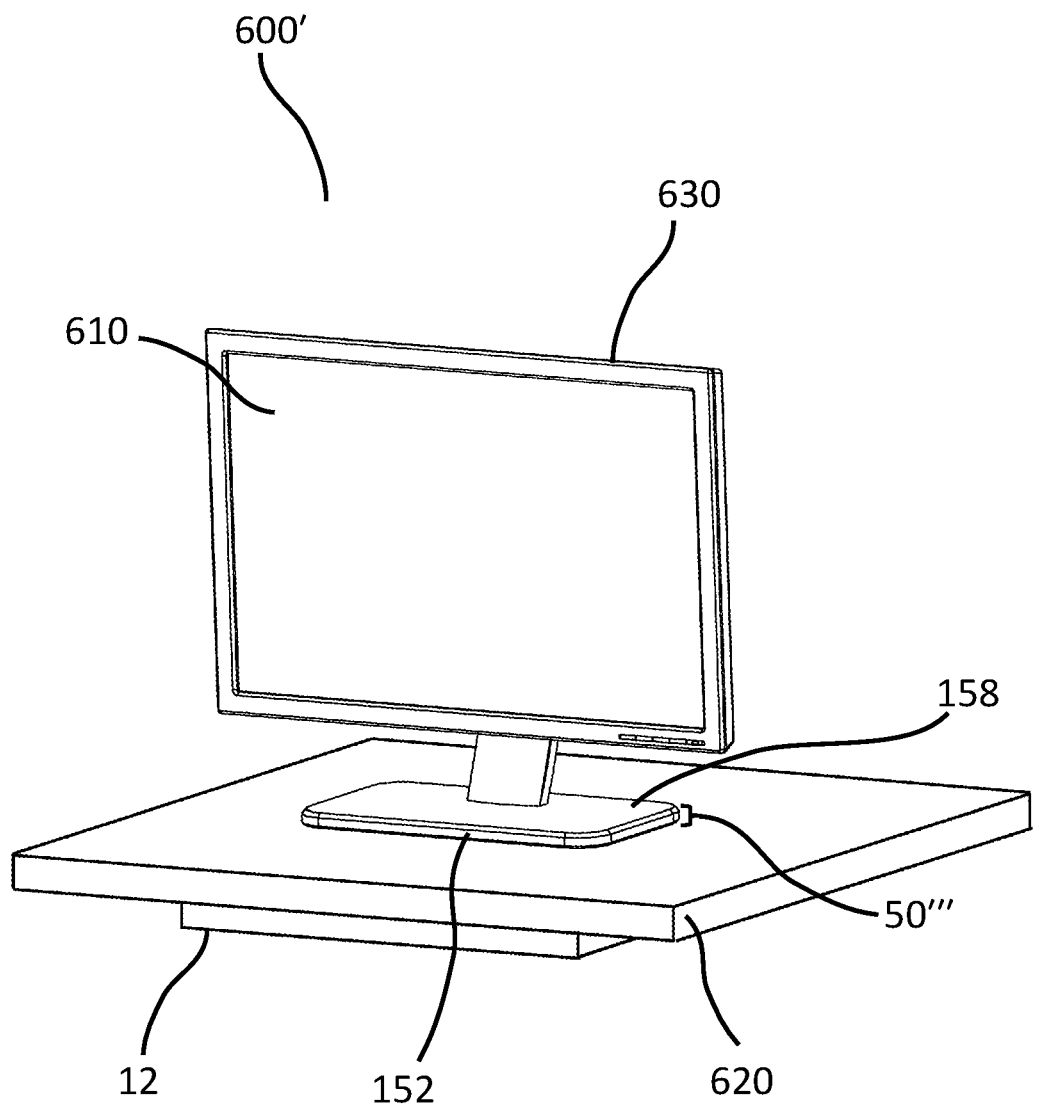
FIG. 28B shows a computer monitor using another embodiment of a power transfer system.

As shown in another embodiment of a power supply system 600' for supplying power to computer monitor 610 in FIG. 28B, the base of monitor 610 may comprise only antenna 152 and dielectric 158. In this embodiment, a metallic conductive portion of monitor housing or frame 630 serves as antenna instead of antenna 154, and housing or frame 630 has enough coupling with antenna 152 underneath dielectric 158 to provide adequately efficient power transfer. Receiver module 40" of FIG. 19A may be incorporated in the base of monitor 610. Alternatively, receiver module 40" of FIG. 19A may be incorporated inside monitor 610 itself. Housing and structural frame 630 of monitor 610 may serve as one contiguous electrical conductor to supply a power signal via receiver module 40" to the circuitry of monitor 610 representing load resonator 70" of FIG. 19A.

System 600 may optionally comprise power conditioning unit 430 as in FIG. 19A. In some embodiments, transmitter module 20" and receiver module 40" may jointly function to provide power conditioning as explained with reference to FIG. 19A, though using near-field wireless power transfer. The near-field wireless power transfer system of FIG. 28A removes the need for cumbersome power cables to supply power to monitor 610 and employs the mechanical structural elements of the system as integral electrical/electronic components in the power transfer arrangement.

Figure 29:
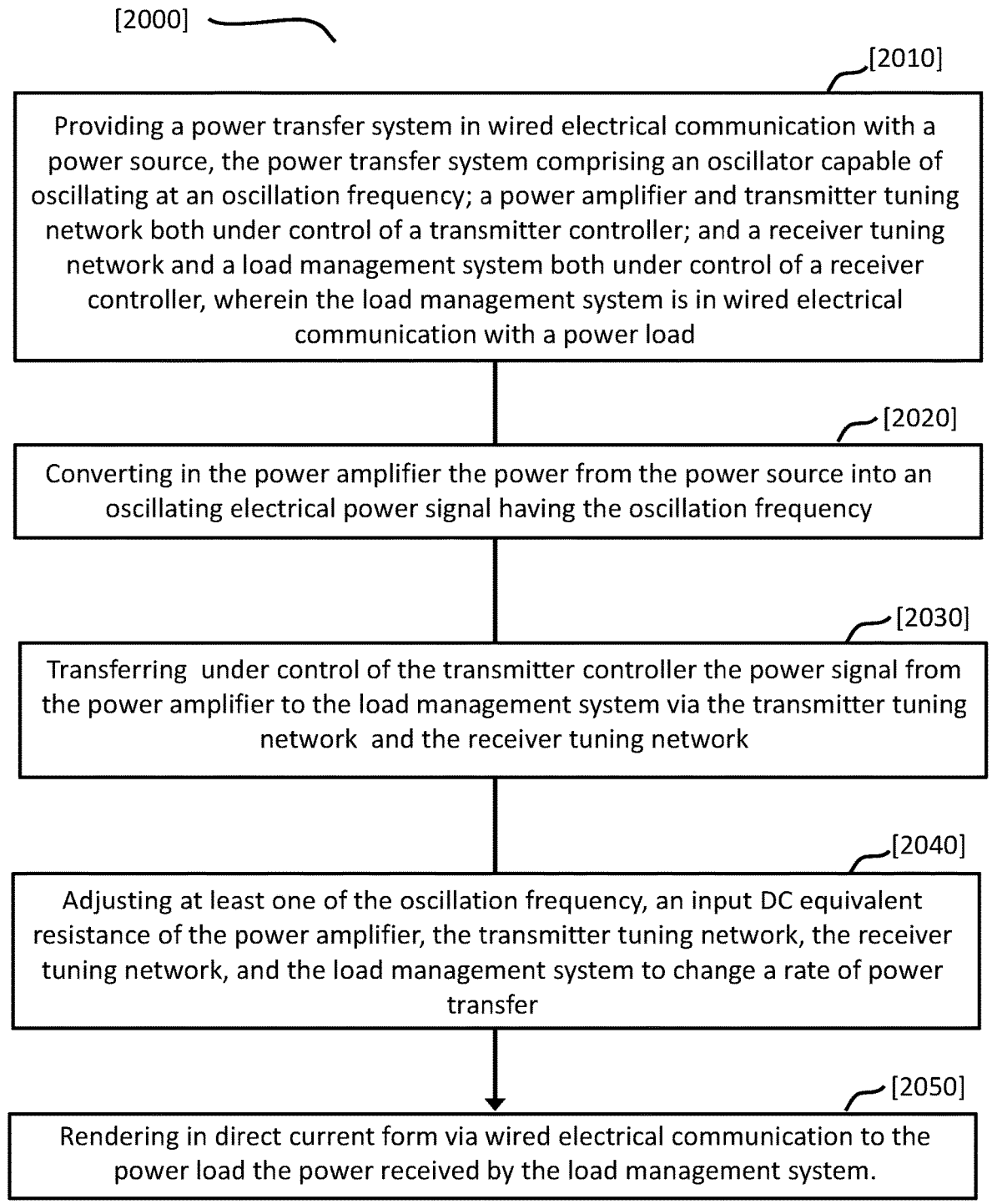
FIG. 29 shows a flow chart for a method of transferring power from a direct current source to a power load.

As described with reference to the flow chart in FIG. 29 and the systems of FIG. 19A and FIG. 19B, a method [2000] is provided for transferring power from direct current power source 420 to power load 70", the method comprising: providing [2010] power transfer system 10", 410 in wired electrical communication with power source 420, power transfer system 10", 410 comprising oscillator 26A" capable of oscillating at an oscillation frequency; power amplifier 26B" and transmitter tuning network 28", both under control of transmitter controller 22"; and receiver tuning network 48" and load management system 46E" both under control of receiver controller 42", wherein load management system 46E" is in wired electrical communication with power load 70"; converting [2020] in power amplifier 26B" power from power source 420 into an oscillating electrical power signal having the oscillation frequency; transferring [2030] under control of transmitter controller 22" the power signal from power amplifier 26B" to load management system 46E" via transmitter tuning network 28" and receiver tuning network 48"; adjusting [2040] at least one of the oscillation frequency, an input DC equivalent resistance of power amplifier 26B", transmitter tuning network 28", receiver tuning network 48", and load management system 46E" to change a rate of power transfer; and rendering [2050] in direct current form via wired electrical communication to power load 70" the power received by load management system 46E".

Transferring [2030] the power signal via transmitter tuning network 28" and receiver tuning network 48" may comprise transferring the power by wired communication or by wireless communication. Transferring the power by wireless communication may comprise transferring the power by near-field wireless communication. Transferring the power by near-field wireless communication may comprise transferring the power by at least one of capacitive and inductive coupling. Transferring power from direct current power source 420 may comprise transferring power from at least one solar cell 420. Transferring power from a direct current power source may comprise transferring power from at least one battery. Transferring power from a direct current power source may comprise transferring power from a power source with a varying voltage.

Figure 30:
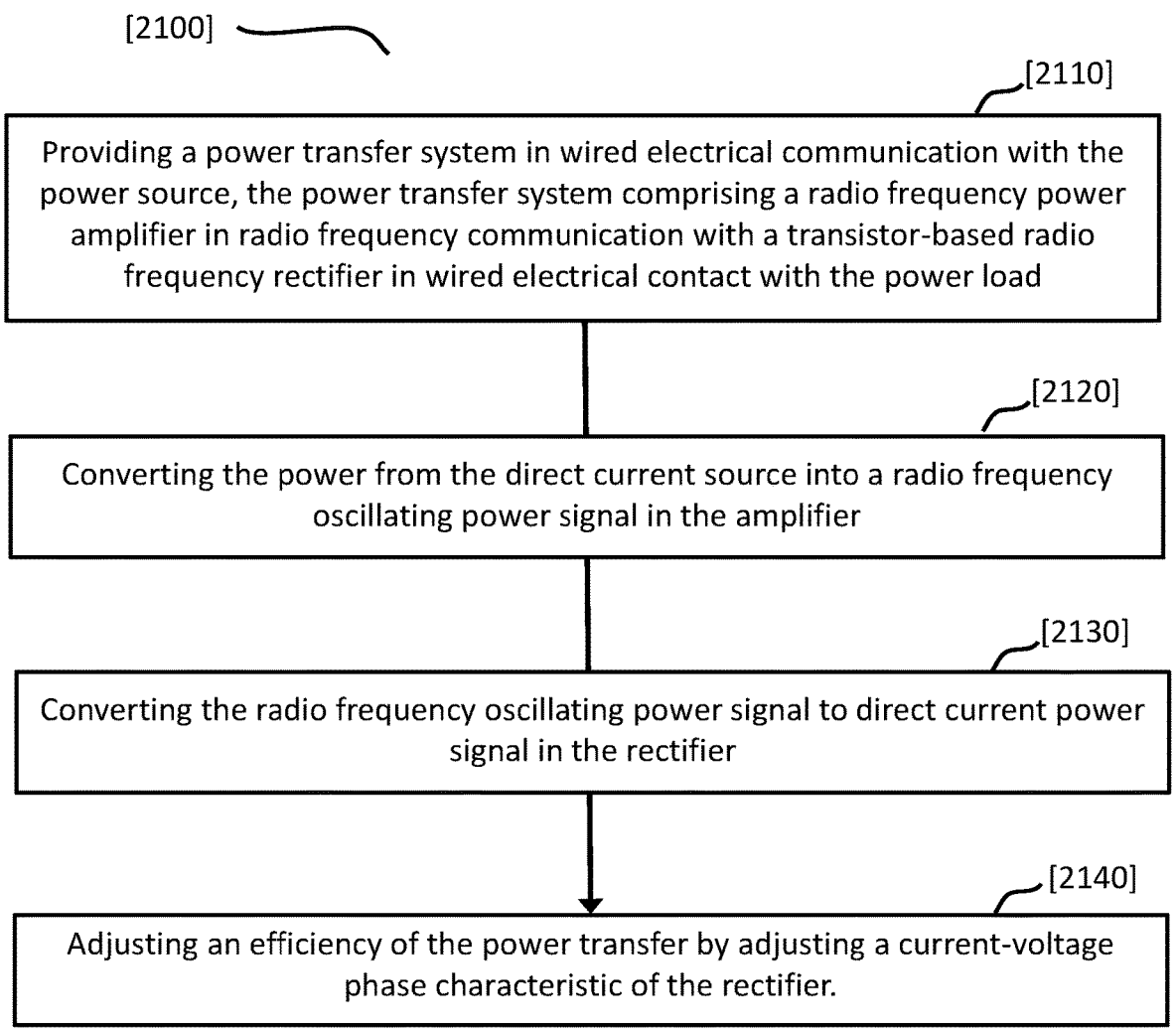
FIG. 30 shows a flow chart for a further method of transferring power from a direct current source to a power load.

In another embodiment described with reference to the flow chart in FIG. 30 and considering the systems of FIG. 19A and FIG. 19B in more depth, a method [2100] is provided for transferring power from direct current power source 420 to power load 70", the method comprising: providing [2110] power transfer system 10",410 in wired electrical communication with power source 420, power transfer system 10",410 comprising radio frequency power amplifier 26B" in radio frequency communication with adjustable phase radio frequency rectifier 46D (see FIG. 7) in wired electrical contact with power load 70"; converting [2120] power from direct current source 420 into a radio frequency oscillating power signal in amplifier 26B"; converting [2130] the radio frequency oscillating power signal to direct current power signal in rectifier 46D; and adjusting [2140] an efficiency of power transfer by adjusting a current-voltage phase characteristic of rectifier 46D. Providing the adjustable phase radio frequency rectifier may comprise providing differential self-synchronous radio frequency rectifier 46D.

Method [2100] may further comprise adjusting the efficiency of the power transfer by adjusting a direct current equivalent input resistance of amplifier 26B". Providing [2110] power transfer system 10",410 may comprise providing load management system 46E" in wired communication between rectifier 46D and load 70". Adjusting the direct current equivalent input resistance of amplifier 26B" may comprise adjusting an input impedance of rectifier 46D by adjusting load management system 46E". Adjusting load management system 46E" may comprise automatically adjusting load management system 46E".

Method [2100] may further comprise adjusting the efficiency of the power transfer by adjusting a current-voltage phase characteristic of power amplifier 26B". Providing [2110] the power transfer system 10", 410 may comprise providing transmitter controller 22" in communication with power amplifier 26B" for controlling power amplifier 26B". Adjusting the current-voltage phase characteristic of power amplifier 26B" may be performed by transmitter controller 22". Adjusting the current-voltage phase characteristic of power amplifier 26B" may be performed automatically by transmitter controller 22".

Method [2100] may further comprise adjusting the efficiency of the power transfer by changing an oscillation frequency of power amplifier 26B".

Providing [2110] power transfer system 10",410 may comprise providing receiver controller 42" in communication with rectifier 46D for controlling rectifier 46D. Adjusting the current-voltage phase characteristic of rectifier 46D may be performed by receiver controller 42". Adjusting the current-voltage phase characteristic of rectifier 46D may be performed automatically by receiver controller 42".

Providing [2110] power transfer system 10",410 may comprise providing power amplifier 26B" in directly wired radio frequency communication with adjustable phase radio frequency rectifier 46D (via connection 60" of FIG. 19B). Providing [2110] power transfer system 10",410 may comprise providing power amplifier 26B" in wireless near-field radio frequency communication with adjustable phase radio frequency rectifier 46D.

Providing [2110] power transfer system 10",410 may comprise providing transmitter resonator 30" in wired radio frequency communication with power amplifier 26B' and receiver resonator 50" in wired radio frequency communication with radio frequency rectifier 46D. Method [2100] may further comprise operating transmitter resonator 30" and receiver resonator 50" in wireless near-field radio frequency communication with each other. Providing [2110] power transfer system 10", 410 may comprise providing power amplifier 26B" in at least one of capacitive near-field wireless and inductive near-field wireless radio frequency communication with rectifier 46D. Providing [2110] the power transfer system 10", 410 may comprise providing power amplifier 26B" in bimodal wireless near-field communication with rectifier 46D.

Method [2100] may further comprise: providing power conditioning unit 430 electrically disposed between power source 420 and power transfer system 10"; and adjusting power conditioning unit 430 to adjust at least one of a current and a voltage from power source 420 to improve the efficiency of power transfer.

Based on a more in-depth consideration of the systems of FIG. 19A and FIG. 19B and with reference to FIG. 7, generalized electrical power transfer system 10", 410 for supplying power from direct current source 420 to power load 70", comprises: radio frequency power amplifier 26B" in wired electrical communication with power source 420 and configured to convert direct current voltage from source 420 into an alternating voltage signal having an oscillation frequency; an adjustable phase radio frequency rectifier in wired electrical contact with power load 70" and in radio frequency communication with the power amplifier, the rectifier configured to receive power transferred from power amplifier 26B"; and receiver controller 42" in communication with rectifier 46D, the receiver controller configured for adjusting an efficiency of power transfer from power amplifier 26B" to rectifier 46D by adjusting a current-voltage phase characteristic of rectifier 46D. Receiver controller 42" may be configured for automatically adjusting the current-voltage phase characteristic of rectifier 46D. The rectifier may be a differential self-synchronous radio frequency rectifier.

Power transfer system 10", 410 may further comprise load management system 46E" in wired communication with load 70" and power signal-wise disposed between load 70" and rectifier 46D, load management system 46E" configured for increasing an efficiency of power transfer by adjusting an input impedance of rectifier 46D. Load management system 46E" may be configured for automatically adjusting the input impedance of rectifier 46D.

Power transfer system 10", 410 may further comprise transmitter controller 22" in communication with amplifier 26B", transmitter controller 22" configured for increasing an efficiency of power transfer by adjusting a current-voltage phase characteristic of amplifier 26B". Transmitter controller 22" may be configured to automatically adjust the current-voltage phase characteristic of amplifier 26B" to increase the efficiency of power transfer.

Power transfer system 10", 410 may further comprise oscillator 26A" in communication with amplifier 26B" and transmitter controller 22". Transmitter controller 22" may be configured for adjusting the oscillation frequency via oscillator 26A".

Power amplifier 26B" may be in directly wired radio frequency communication with adjustable phase radio frequency rectifier 46D (via connection 60" of FIG. 19B). Power amplifier 26B" may be in wireless near-field radio frequency communication with adjustable phase radio frequency rectifier 46D. Power transfer system 10", 410 may comprise transmitter resonator 30" in wired radio frequency communication with power amplifier 26B" and receiver resonator 50" in wired radio frequency communication with rectifier 46D. Transmitter resonator 30" and receiver resonator 50" may be in wireless near-field radio frequency communication with each other. Power amplifier 26B" may be in at least one of capacitive near-field wireless and inductive near-field wireless radio frequency communication with rectifier 46D. Power amplifier 26B" may be in bimodal near-field wireless radio frequency communication with rectifier 46D.

The power transfer system may further comprise power conditioning unit 430 electrically disposed between power source 420 and power amplifier 26B", power conditioning unit 430 configured for adjusting at least one of a current and a voltage from power source 420 to improve the efficiency of power transfer.

In another embodiment, described with reference to FIG. 19A, FIG. 19B, FIGS. 27A and 27B, and FIGS. 28A and 28B, an electrically powered system comprises: mechanical load bearing structure 510, 630 having a first portion that is electrically conductive; an electrical power load; and electrical power transfer system 10", 410 comprising at least one radio frequency resonator 30", 50" configured for near-field wireless power transfer, wherein the resonator comprises at least in part the electrically conductive first portion. The electrically powered system may further comprise rechargeable battery 520 and the electrical power load may comprise electric motor 530. The electrically powered system may be electric vehicle 500, 500' and the mechanical load bearing structure may comprise chassis 510 of vehicle 500. The electrically powered system may be display monitor 610 and the mechanical load bearing structure may be at least one of frame 630 and a base of monitor 610.

The electrically powered system may further comprise a power source. The electrical power transfer system may comprise: radio frequency power amplifier 26B" in wired electrical communication with the power source and configured to convert direct current voltage from the source into an alternating voltage signal having an oscillation frequency; adjustable phase radio frequency rectifier 46D in wired electrical contact with power load 70" and in radio frequency communication with power amplifier 26B"; rectifier 46D configured to receive power transferred from amplifier 26B"; and receiver controller 42" in communication with rectifier 46D and configured for adjusting an efficiency of power transfer from amplifier 26B" to rectifier 46D by adjusting a current-voltage phase characteristic of rectifier 46D.

In another embodiment, as depicted in FIGS. 19A and 19B, FIGS. 27A and 27B, and FIGS. 28A and 28B, an apparatus comprises: mechanical load bearing structure 510, 630 having a first portion that is electrically conductive; an electrical power source; electrical power load 70",530, 610; and electrical power transfer system 10", 410 comprising: radio frequency power amplifier 26B" in wired electrical communication with the power source and configured to convert direct current voltage from the source into an alternating voltage signal having an oscillation frequency; adjustable phase radio frequency rectifier 46D in wired electrical contact with power load 70" and in radio frequency communication with power amplifier 26B"; rectifier 46D configured to receive power transferred from amplifier 26B"; and receiver controller 42" in communication with rectifier 46D, receiver controller 42" configured for adjusting an efficiency of power transfer from amplifier 26B" to rectifier 46D by adjusting a current-voltage phase characteristic of rectifier 46D; wherein the electrically conductive first portion is disposed to carry a radio frequency signal at least one of from amplifier 26B" and to rectifier 46D.

The apparatus may further comprise load management system 46E" in wired communication with load 70" and power signal-wise disposed between load 70" and rectifier 46D, load management system 46E" configured for increasing an efficiency of power transfer by adjusting an input impedance of rectifier 46D. The apparatus may further comprise transmitter controller 22' in communication with amplifier 26B", transmitter controller 22' configured for increasing an efficiency of power transfer by adjusting a current-voltage phase characteristic of amplifier 26B". The apparatus may further comprise oscillator 26A" in communication with amplifier 26B" and transmitter controller 22', wherein transmitter controller 22' is configured for adjusting the oscillation frequency via oscillator 26A".

Power amplifier 26B" may be in directly wired radio frequency communication with rectifier 46D via the electrically conductive first portion. Power amplifier 26B" may be in wireless near-field radio frequency communication with rectifier 46D. Power transfer system 10", 410 may comprise transmitter resonator 30" in wired radio frequency communication with power amplifier 26B" and receiver resonator 50" in wired radio frequency communication with rectifier 46D and one of transmitter resonator 30" and receiver resonator 50" may comprise the electrically conductive first portion. Transmitter resonator 30" and receiver resonator 50" may be in wireless near-field radio frequency communication with each other. Power amplifier 26B" may be in at least one of capacitive near-field wireless and inductive near-field wireless radio frequency communication with rectifier 46D. Power amplifier 26B" may be in bimodal near-field wireless radio frequency communication with rectifier 46D. The direct current source may comprise rechargeable battery 520 and the load may comprise electric motor 530.

Figure 32:
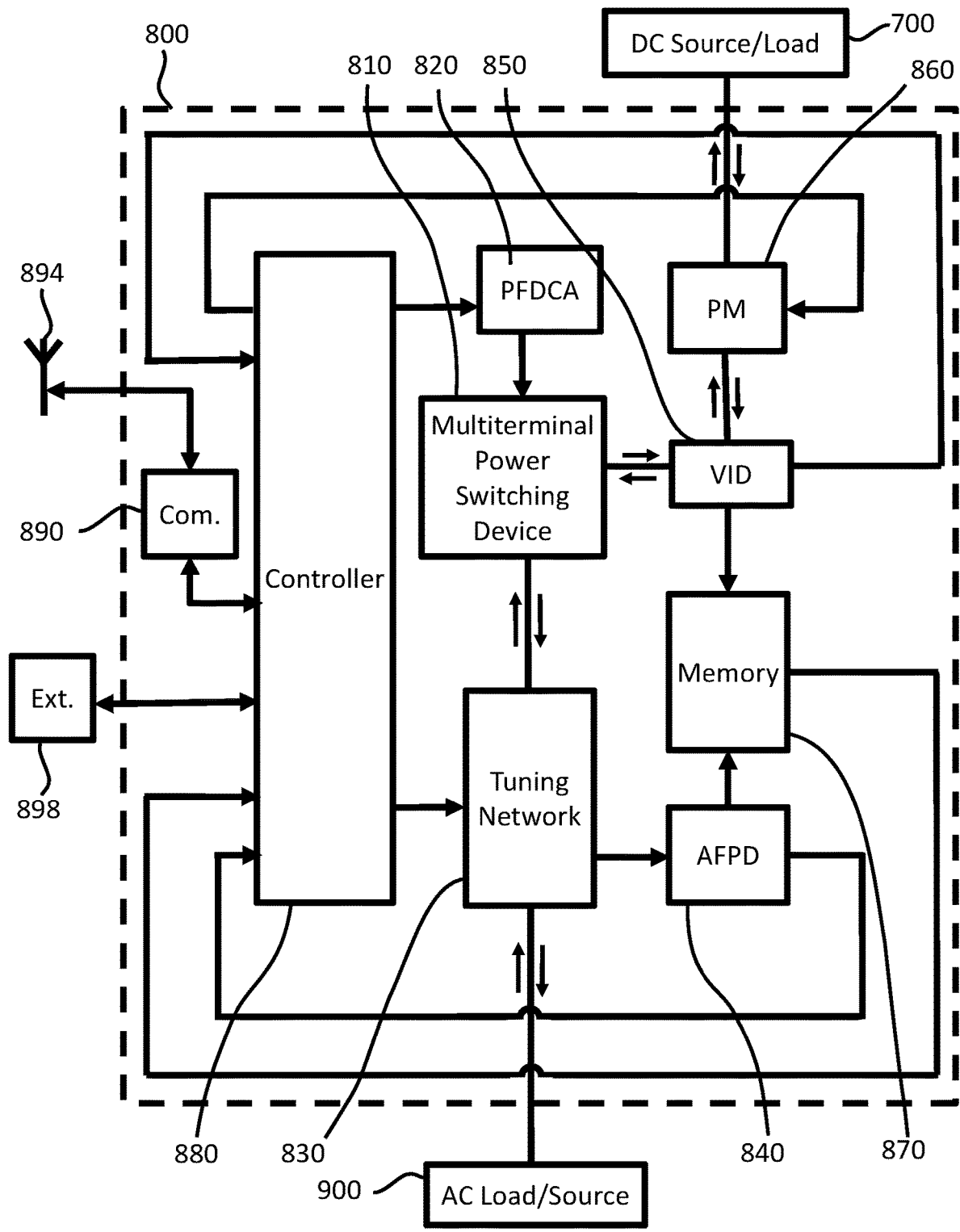
FIG. 32 shows a schematic diagram of a bidirectional power transfer circuit device.

In a further embodiment, shown schematically in FIG. 32, and based on FIG. 6, FIG. 7, FIG. 8 and FIG. 9, sealed bidirectional power transfer circuit device 800 is provided having a plurality of terminals disposed for communicating electrically with devices external to sealed device 800, sealed device 800 comprising within its sealed interior: multiterminal power switching (MPS) device 810 having at least one DC terminal, at least one AC terminal, and at least one control terminal, MPS device 810 being adjustable between an amplifying condition and a rectifying condition, and arranged for bidirectionally communicating via the at least one DC terminal a DC voltage and a DC current; and bidirectionally communicating via the at least one AC terminal a radio frequency power signal having an amplitude, a frequency, and a phase; in wired data communication with a controller 880 a phase, frequency, and duty cycle adjustment (PFDCA) circuit 820 in wired electrical communication with MPS device 810 via the at least one control terminal, PFDCA circuit 820 arranged for establishing at the at least one control terminal of MPS device 810 a radio frequency oscillating signal having the frequency and the phase of the radio frequency power signal and adjusting MPS device 810 between the amplifying condition and the rectifying condition by adjusting under instruction of controller 880 the phase of the radio frequency oscillating signal. PFDCA circuit 820 may be further arranged to establish a duty cycle for the radio frequency oscillating signal. PDFCA circuit 820 may comprise a radio frequency oscillator for producing under instruction from controller 880 the radio frequency oscillating signal. The term "multiterminal power switching device" is used here to describe a device having at least three terminals and capable of switching or modulating a current flowing between at least two terminals of the device based on a signal applied to at least a third terminal of the device. Suitable MPS devices 810 include, but are not limited to, mechanical relay switches, solid state switches, electro-optical switches (also referred to as opto-switches), thyristors, waveguide switches, transistors (including for example MOSFET, MESFET, Group Ill-V semiconductor transistor devices, and BJT devices), and power tube devices, including for example triodes and pentodes.

In some embodiments, the circuit is sealed with a polymeric coating or mold to create a sealing or sealed device. In some embodiments, sealing device protects components provided on an interior of the device. In some embodiments, sealing of the device provides electrical insulation to prevent static discharge, shorting, or other harmful electrical discharge which may damage components of the device. In some embodiments, sealing the device protects internal components from oxidization. In some embodiments, the sealing may create a waterproof barrier or water vapor barrier. In some embodiments, the sealing provides facilitates an electrical connection to the device by providing access to one or more terminals on an exterior of the sealed device.

Sealed power transfer circuit device 800 may further comprise within the sealed interior in wired data communication with controller 880 tuning network 830 in wired electrical communication with MPS device 810 via the at least one AC terminal, tuning network 830 arranged for adjusting under instruction from controller 880 the radio frequency power signal to a tuned radio frequency power signal from tuning network 830 when MPS device 810 is in the amplifying condition. Tuning network 830 may comprise a harmonic termination network circuit of the type shown in FIG. 8 and FIG. 9 arranged for suppressing harmonics of the radio frequency oscillating signal in the radio frequency power signal. As shown in FIG. 8 and FIG. 9, the harmonic termination network may comprise one or more inductors and one or more of first harmonic termination 127I, 147G; second harmonic termination 127H, 147F; and third harmonic termination 127F, 147D.

Sealed power transfer circuit device 800 may comprise within the sealed interior in wired data communication with controller 880, an amplitude/frequency/phase detector (AFPD) 840 disposed in wired electrical communication with the tuning network and arranged to determine an amplitude, a frequency and a phase of any radio frequency power signal communicated between the tuning network and an AC load/source external to the sealed device. To this end AFPD 840 measures the signal amplitude, frequency and phase at the output of tuning network 830 leading out of device 800, as per FIG. 32. PFDCA circuit 820 is arranged to receive instructions from controller 880 based on measurement data communicated by AFPD 840 to controller 880. In other embodiments, not shown in FIG. 32, PFDCA circuit 820 is arranged to adjust the radio frequency oscillating signal and/or at least one of the DC current and the DC voltage based on a feedback signal received directly from AFPD 840.

Tuning network 830 may comprise a voltage-current tuner for adjusting a phase difference between a voltage and a current of the tuned radio frequency signal based on measurement data from AFPD 840 when the power switching device is in the amplifying condition. A suitable voltage-current tuner is described in some detail with reference to FIG. 6. The voltage-current tuner of tuning network 830 is applied to signals destined for the signal connection leading out of device 800, as per FIG. 32. It is thereby functional as tuner when power is transmitted downward through FIG. 32. The voltage-current tuner may be transparent to power being transmitted in the opposing upward direction through device 800 in FIG. 32, power transfer circuit device 800 being bidirectional. In some implementations, tuning network 830 may communicate the tuned radio frequency power signal with AC load/source 900 that may be transmitter resonator 30 and 30", as described with respect to FIG. 6 and FIGS. 19A, 27A and 27B. When AC load/source 900 is such a bimodal transmitter resonator, the voltage-current tuner may serve to adjust a ratio of electric field to magnetic field, as described with respect to FIG. 6.

Sealed power transfer circuit device 800 may further comprise within the sealed interior in wired data communication with controller 880 and in wired electrical communication between MPS 810 and DC power source/load 700 external to sealed device 800 power management (PM) circuit 860 arranged for impedance matching MPS 810 and external DC power source/load 700 and for adjusting DC power communicated between MPS 810 and DC power source/load 700 based on measurement data communicated by AFPD 840 to controller. In other embodiments, not shown in FIG. 32, PM circuit 860 may be arranged for adjusting DC power communicated between MPS 810 and DC power source/load 700 based on a feedback signal received directly from AFPD 840 and/or VID 850.

It is again to be noted that the DC power is transferable in both directions through PM circuit 860 between MPS 810 and DC power source/load 700. Also note that we maintain here a convention by which DC power source/load 700 is described as a "source/load", while external AC load/source 900 communicating AC power with the tuning network is described as a "load/source", thereby emphasizing the point that, when DC power source/load 700 is functioning as a source of DC power, AC load/source 900 is functioning as a load for that power converted into AC power, and vice versa. The arrows depicted proximate and parallel to connectors in FIG. 32 indicate the path and direction of power flow through device 800 when MPS 810 is in either one of its amplifying condition and a rectifying condition. When MPS 810 is in the amplifying condition, the power flow is downward through FIG. 32; when MPS 810 is in the rectifying condition the power flow is upward through FIG. 32.

Sealed power transfer circuit device 800 may further comprise within the sealed interior in wired data communication with controller 880 voltage/current-detector (VID) 850 disposed to determine a DC voltage and DC current passed between MPS 810 and PM circuit 860. When MPS 810 is in the amplifying condition, power transfer circuit device 800 may be adjusted based on the measurements of VID 850 so that device 800 presents to DC source/load 700 an equivalent DC load allowing maximal power extraction from DC source/load 700. DC voltage at the at least one DC terminal of MPS device 810 is thereby adjusted. When MPS 810 is in the rectifying condition, power transfer circuit device 800 may be adjusted based on measurements of VID 850 so that device 800 presents to DC source/load 700 an equivalent DC source impedance allowing maximal power transfer from device 800 to DC source/load 700. DC voltage at a wired connection between device 800 and DC source/load 700 is thereby adjusted.

Sealed power transfer circuit device 800 may further comprise within the sealed interior memory 870 in wired data communication with controller 880, with AFPD 840, and with VID 850, wherein memory 870 is arranged to receive and store signal data from two detectors 840 and 850 and to provide signal data from two detectors 840 and 850 to controller 880. Memory 870 may be capable of storing the complete state of device 800 for a series of consecutive instantaneous times.

Tuning network may further comprise one or more of a compensation network, a matching network, and a filter. Compensation network 26E, matching network 26D, and filter 26C of FIG. 6 are suitable for this purpose, the choices are not limited to the devices of FIG. 6.

Sealed power transfer circuit device 800 may comprise within the sealed interior controller 880. In other embodiments, sealed power transfer circuit device 800 may employ an external controller with suitable input/output facilities to communicate data with the various circuitry incorporated in the sealed interior of device 800 and suitable software or firmware may be programmed into the controller for executing all the control procedures described above.

Sealed power transfer circuit device 800 may further comprise at least one communication circuit 890 functioning on one or more of a Bluetooth, WiFi, Zigbee and Cellular technology for bidirectionally communicating information between the controller 880 and devices external to the sealed power transfer circuit device 800. The at least one communication circuit 890 may be in bidirectional wired communication with one or more suitable antennae 894. While the one or more antennae 894 may be disposed within the sealed interior of device 800, they are generally more usefully disposed outside device 800. One or more of the external devices may be other power transfer circuit devices, including for example other devices 800, and the one or more other devices may form part of a collective power transfer system as explained above in other embodiments, for example FIG. 1.

PFDCA circuit may be arranged to adjust the duty cycle of the radio frequency oscillating signal on the basis of measurements by AFPD 840 and VID 850. In some embodiments, the information on the measurements may be transferred to controller 880 and from there to PFDCA circuit 820, which then adjusts the duty cycle of the radio frequency oscillating signal based on the information received. In other embodiments, not shown in FIG. 32, feedback signals may be passed directly from AFPD 840 and VID 850 to PFDCA circuit 820, which then adjusts the duty cycle of the radio frequency oscillating signal based on the feedback signals received. By changing the duty cycle of the radio frequency oscillating signal, PFDCA circuit 820 may adjust the direction of power flow through device 800. When the power is flowing from DC source/load 700 through device 800 to AC load/source 900, PFDCA circuit 820 may adjust by this procedure the DC power delivered to device 800 by source/load 700 and the AC power delivered from device 800 to AC load/source 900. When power is flowing from AC load/source 900 through device 800 to DC source/load 700, PFDCA circuit 820 may adjust by this process the AC power delivered to device 800 by C load/source 900 and power delivered by device 800 to DC source/load 700.

Controller 880 may be in bidirectional wired communication with external devices and circuitry 898 (labelled Ext. in FIG. 32) disposed external to the sealed interior of device 800. This wired communication may be employed, for example without limitation, to exchange data or to supply controller 880 with a system clock synchronization signal for a system in which device 800 may be incorporated.

Referring to FIG. 6 and FIG. 7, sensors and detectors 24A, 24B, 24C and 24D may be usefully disposed outside the sealed interior of device 800.

Bidirectional power transfer circuit device 800 may also usefully be employed to transmit and/or receive information via the power channel through device 800 by the mechanisms already explained above with reference to FIG. 6 and FIG. 7. The power channel extends physically from the wired connections between DC source/load 700 and PM circuit 860, through PM circuit 860, VID 850, MPS device 810, and tuning network 830, to AC load/source 900. Along the physical power channel, PM circuit 860, MPS device 810, and tuning network 830 are all under the control of controller 880, controller 880 controlling MPS device 810 via PFDCA circuit 820. The controller may modulate the radio frequency power signal in tuning network 830 and/or in MPS device 810 itself. The controller may also be configured to induce modulation of the DC voltage between PM circuit 860 and DC source/load 700. This allows information to be modulated on the radio frequency power signal, the tuned radio frequency power signal, and/or the aforesaid DC voltage, and thereby be communicated to other devices external to device 800. Such other devices may include further bidirectional power transfer circuit devices 800. The information may be modulated onto the radio frequency power signal, the tuned radio frequency power signal, and/or the aforesaid DC voltage in digital form or in analog form. In other embodiments, the information may be modulated onto a frequency different from that of the power transfer. In other embodiments, the information may be modulated onto a harmonic of the frequency of the power signal. In yet further embodiments, the frequency of the radio frequency power signal may be a harmonic of the frequency of the signal onto which the information is modulated. In the description above, we have already explained how subsystems of tuning network 830 may be employed as suitable modulators.

Having described above how device 800 may be reconfigured between operating in transmitter mode and rectifying mode, and having described how the power channel may be modulated, it is clear that device 800 may function as a full-duplex transmit-receive system for transmitting information in both directions. When two devices 800 are employed in modules 20 and 40 of FIG. 1, system 10 of FIG. 1 may comprise further secondary sides similar to secondary side 14 of FIG. 1. When additional secondary sides 14 are present, the arrangement described above allows communication of information among the various secondary sides 14, and thereby with primary side 12. The same full-duplex transmit-receive arrangements are possible among transmitter modules 20" and receiver modules 40" employed in the systems of FIG. 19A and FIG. 19B by using devices 800 of FIG. 32. The same is true of the systems shown in FIGS. 20A to 22B, and FIGS. 27A to 28B.

The information transmitted in the fashion described here, may comprise without limitation, mode of operation of MPS device 810, number and type of further devices 810, surrounding object sensor information, and load status monitoring information, including for example battery charge status, load voltage, and load current.

Figure 33:
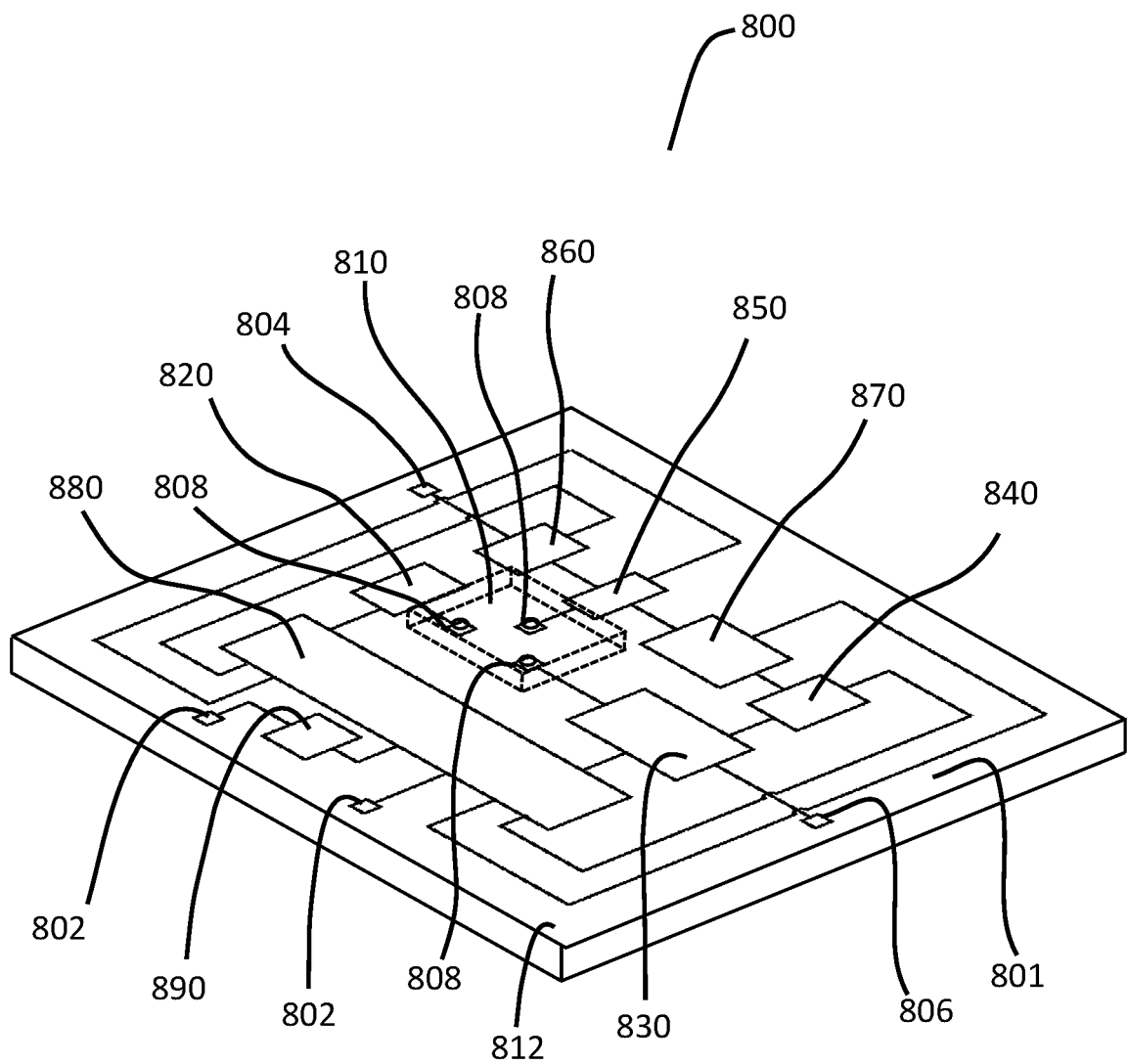
FIG. 33 shows an implementation of a bidirectional power transfer circuit device.

The electronic circuit of sealed bidirectional power transfer circuit device 800 may be implemented in a variety of device manufacturing technologies, including without limitation, as a number of discrete devices on a suitable circuit board, as a hybrid circuit in which devices manufactured in different individual segments of semiconductor material may be bonded or mounted onto a suitable substrate material, as a flip-chip arrangement of one or more individual devices bonded active face-down onto a silicon-based circuit, or as a single monolithic integrated circuit device. FIG. 33 shows a flip-chip arrangement in which bidirectional power transfer circuit device 800 of FIG. 32 comprises a multiterminal power switching (MPS) device 810 implemented in a separate semiconductor crystal and then flip-chip mounted via solder bumps on pads 808. MPS device 810 may, for example without limitation, be fabricated as a discrete higher power device in a wide bandgap semiconductor crystal. Pads 808 are fashioned on silicon wafer 801 that also contains the balance of the subsystems of device 800 of FIG. 32 all monolithically integrated in wafer 801. Two pads 806 are for connections to devices 700 and 900 shown in FIG. 32. Pads 802 are for connecting controller 880 and communication circuit 890 to devices and antennas external to device 800.

Figure 34A:
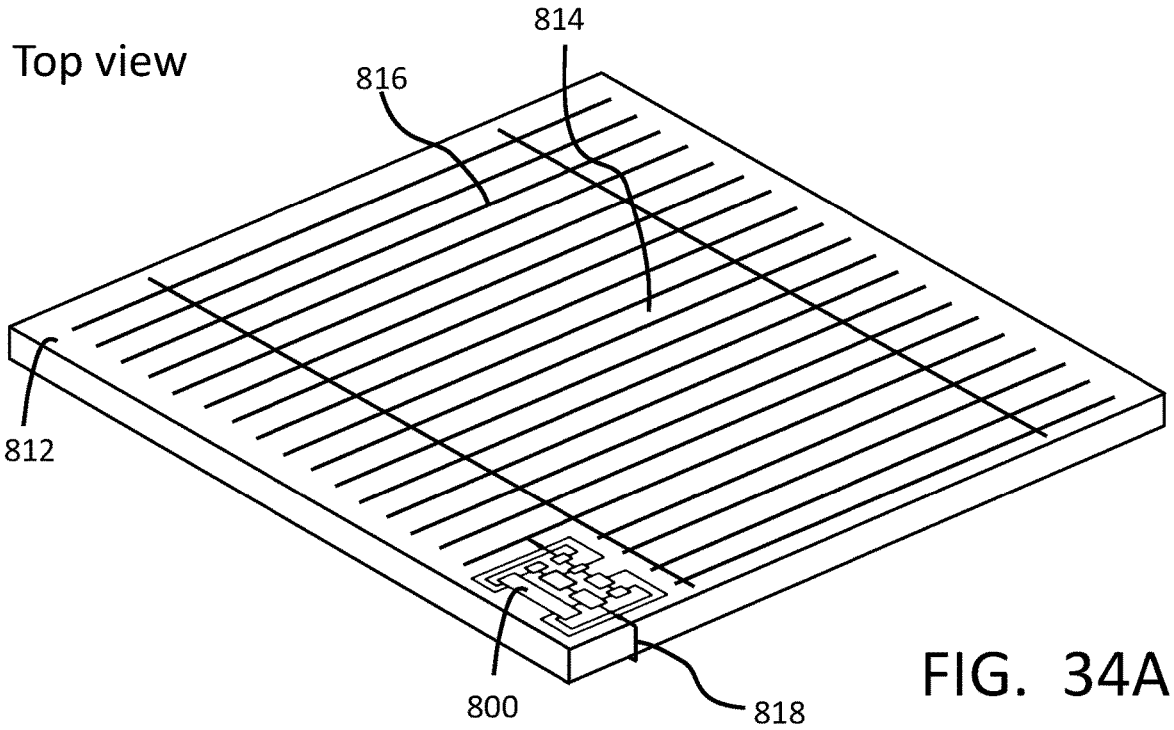
FIG. 34A shows an implementation of bidirectional power transfer circuit device implemented in the same silicon wafer as a photovoltaic cell.

In one specific embodiment, shown in FIG. 34A, the electronic circuit of sealed bidirectional power transfer circuit device 800 may be implemented within single silicon single crystal wafer 812 jointly with at least one photovoltaic cell 814 serving as DC Source/Load 700 of FIG. 32.

Figure 34B:
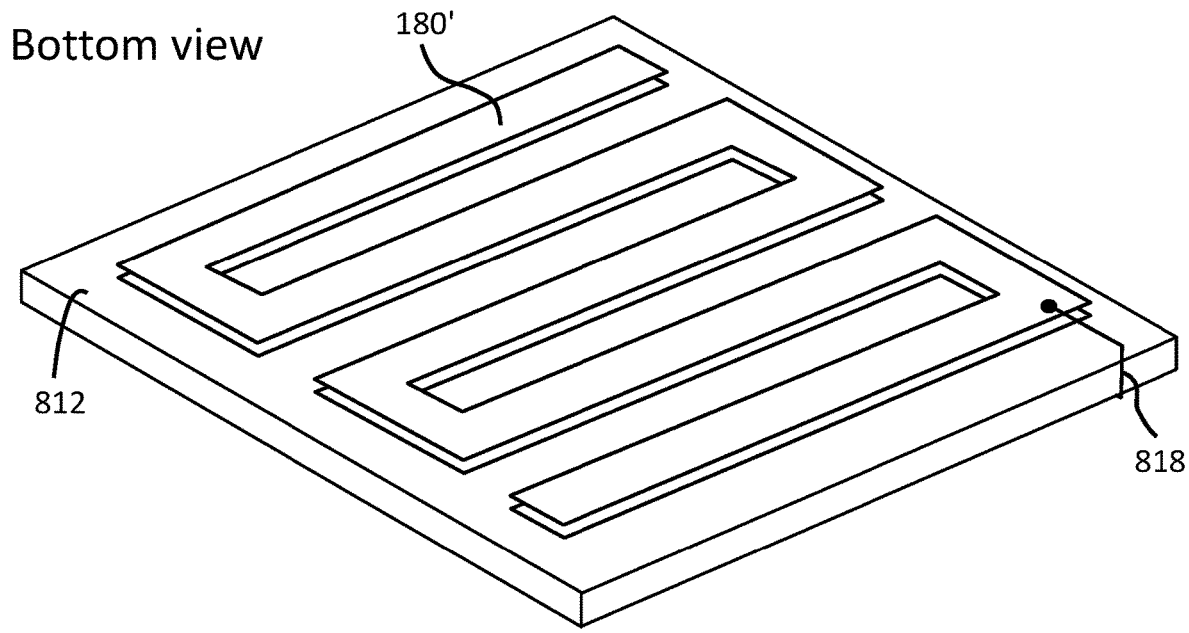
FIG. 34B shows the combined device of FIG. 34A with a resonator on a surface of the silicon wafer.

In a further embodiment, further explained with reference to FIG. 34B, the electronic circuit of sealed bidirectional power transfer circuit device 800 may be implemented, as above, within single silicon single crystal wafer 812 jointly with the at least one photovoltaic cell 814 serving as DC Source/Load 700 of FIG. 32, together with resonator structure 180' of the type described with reference to FIG. 2B and described in more detail with respect to FIG. 2A to FIG. 5 serving as AC Load/Source 900 on a surface of silicon single crystal wafer 812. Antenna 894 for use with Bluetooth, WiFi, Zigbee and Cellular technology may also be integrated on the same single silicon single crystal wafer. Antenna 894 is not shown in FIG. 34B. In FIG. 34A and FIG. 34B, connection 818 connects resonator 180' and tuning network 830 of Device 800. Resonator 180' may serve as a heat sink or heat radiator for heat generated in device 800 or absorbed by photovoltaic cell 814. To this end, resonator 180' may employ air as a dielectric and simultaneously as coolant fluid.

Figure 35A:
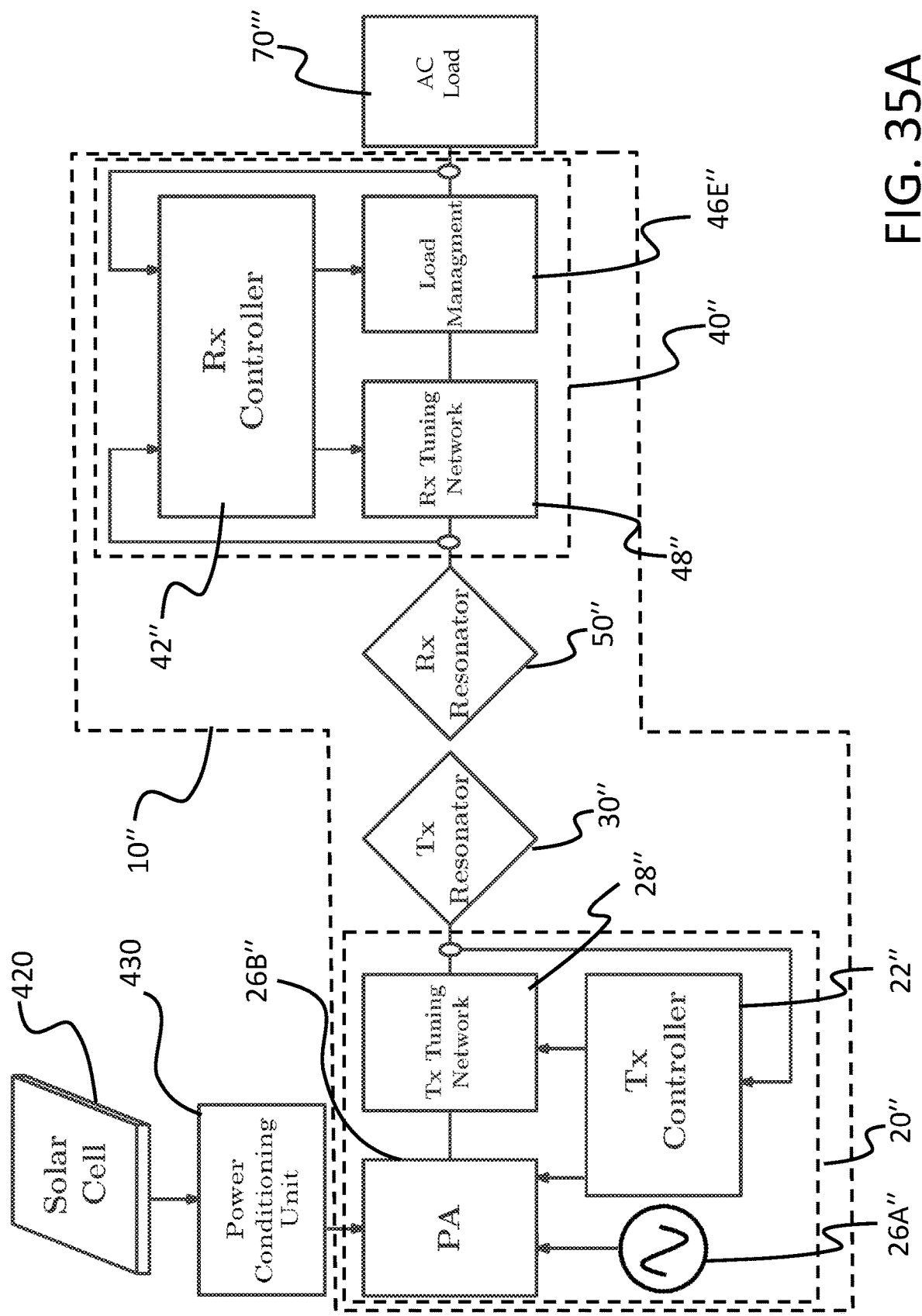
FIG. 35A shows a near-field resonant wireless electrical power transfer system for wirelessly transferring electrical power from a photovoltaic solar cell to an AC electrical power load.
Figure 35B:
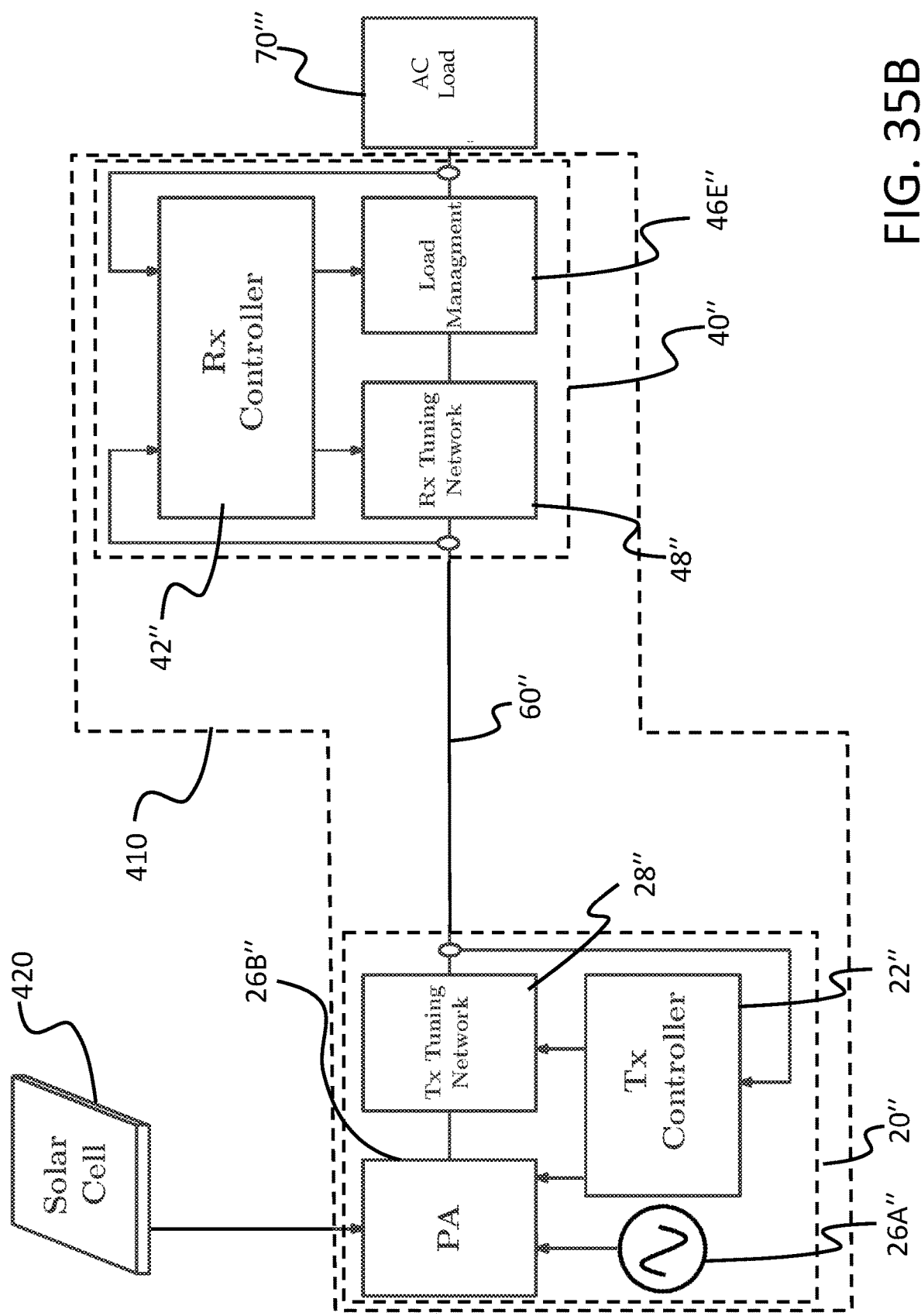
FIG. 35B shows a power transfer system for transferring electrical power from a photovoltaic solar cell to an AC electrical power load.

In other embodiments, DC load 70" of FIG. 19A and FIG. 19B may in both cases be replaced by AC load 70'", as shown in FIG. 35A and FIG. 35B respectively. The rest of systems 10" and 410 of FIG. 35A and FIG. 35B may be the same as systems 10" and 410 of FIG. 19A and FIG. 19B. Oscillator 26A" of FIG. 19A and FIG. 19B may be set to the frequency and phase required by AC load 70'" of FIG. 19A and FIG. 19B In other embodiments, transmitter controller 22" may be programmed to set oscillator 26A" to the frequency and phase required by AC load 70'".

In yet other embodiments of the systems of FIG. 35A and FIG. 35B, AC load 70'" may be an electrical power grid to which the systems of FIG. 35A and FIG. 35B are configured to deliver power. In such grid-supply configurations, it is important to control the frequency, phase and voltage levels of signals fed by the systems of FIG. 35A and FIG. 35B to power grids 70'" involved. To this end the information feedback mechanisms already described above may be employed to transmit back to transmitter controller 22" the information regarding the required frequency, phase and voltage levels of the power grid. This information may be in digital form or in analog form. In some embodiments of the wired system of FIG. 35B, an additional signal line (not shown to avoid clutter) may be taken from AC power grid 70'" to transmitter controller 22" or directly to oscillator 26A" to allow transmitter module 20" to directly track AC load 70'" as regards frequency and phase and to thereby impose on the output signal of the system of FIG. 35B the constraints required by power grid 70'". These constraints may include modulation of the output signal of load management system 46E" to satisfy the requirements of power grid 70'". Modulation may be at a frequency equal to that of the power grid and at a phase and a voltage level that transfers power to power grid 70'".

Figure 36:
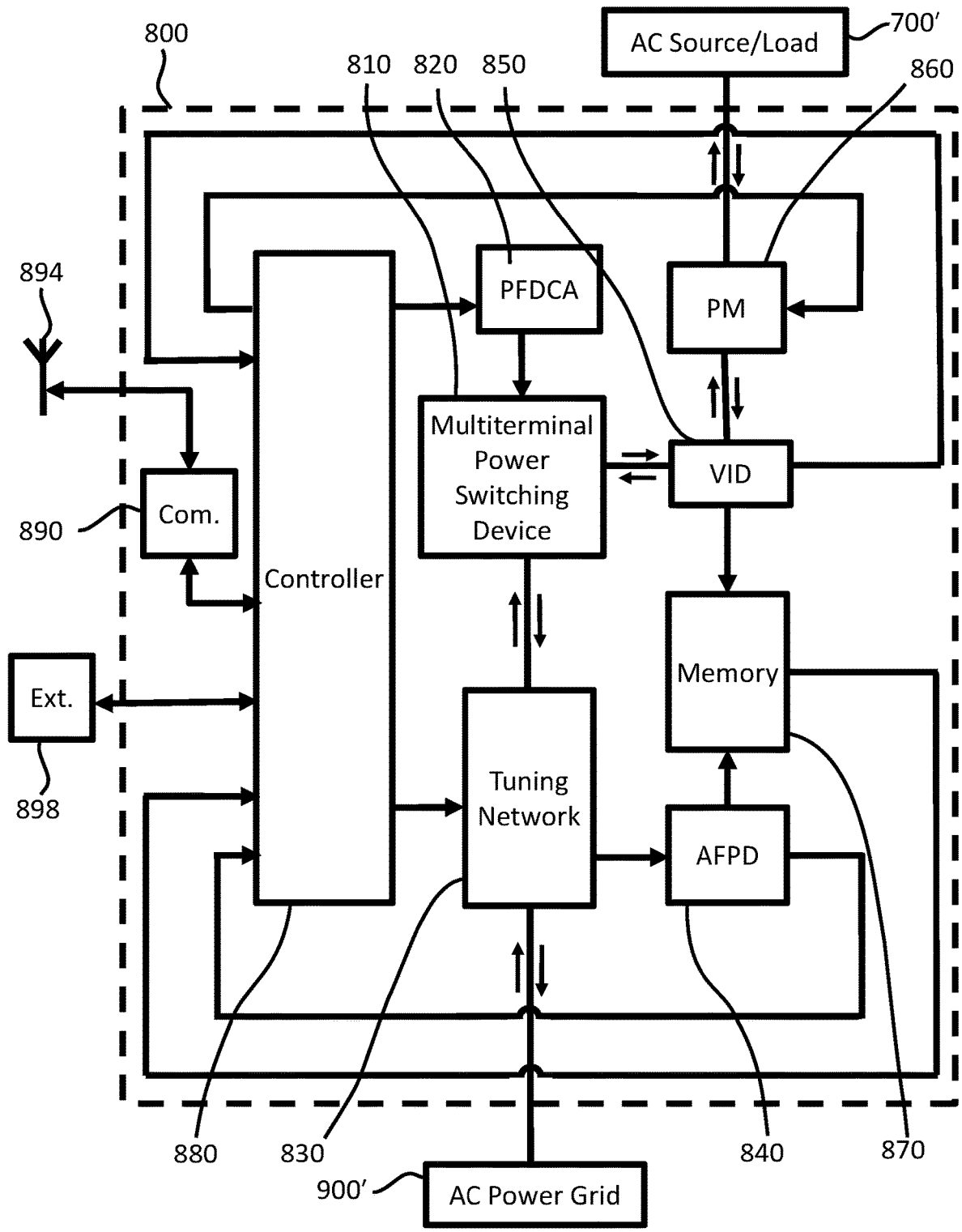
FIG. 36 shows a schematic diagram of a bidirectional power transfer circuit device.

FIG. 36 shows an embodiment of the system of FIG. 32 in which AC Load/Source 900 of FIG. 32 is an AC power grid 900'. In this embodiment, just as with the systems of FIG. 35A and FIG. 35B, information regarding the required frequency, phase and voltage levels of the power grid may be transmitted back to controller 880. This allows controller 880, to adjust via the phase, frequency, and duty cycle adjustment (PFDCA) circuit 820 the signal at the control terminal of MPS device 810 to fulfill the power transfer requirements imposed by power grid 900'. These requirements may include modulation of the output signal of tuning network 830 to satisfy the requirements of power grid 70'". Modulation may be at a frequency equal to that of the power grid and at a phase and a voltage level that transfers power to power grid 70'". The system of FIG. 36, while inherently bidirectional, may by this arrangement serve as a mechanism to transfer power to an AC power grid.

Returning now to FIGS. 20A and 20B, FIGS. 21A and 21B, and FIGS. 22A and 22B, each solar cell 420 may be provided with sensors to determine the operational status of solar cells 420. The operational status may include without limitation, the power level, voltage level, current level, temperature and other performance parameters. This information about operational status may be transmitted to the receiver modules 40" via transmitter module(s) 20" associated with solar cell(s) 420. The operational status of transmitter modules(s) 20" may similarly be sensed and transmitted to receiver modules 40" via transmitter modules 20". With reference to FIG. 33 and FIGS. 34A and 34B, suitable sensors may also sense the performance parameters of sealed bidirectional power transfer circuit device 800 and multiterminal power switching (MPS) device 810. The transmission of load information via MPS device 810 has already been described. Information regarding the performance parameters of devices 800 and 810 Information may similarly be transmitted through the system.

Figure 37A:
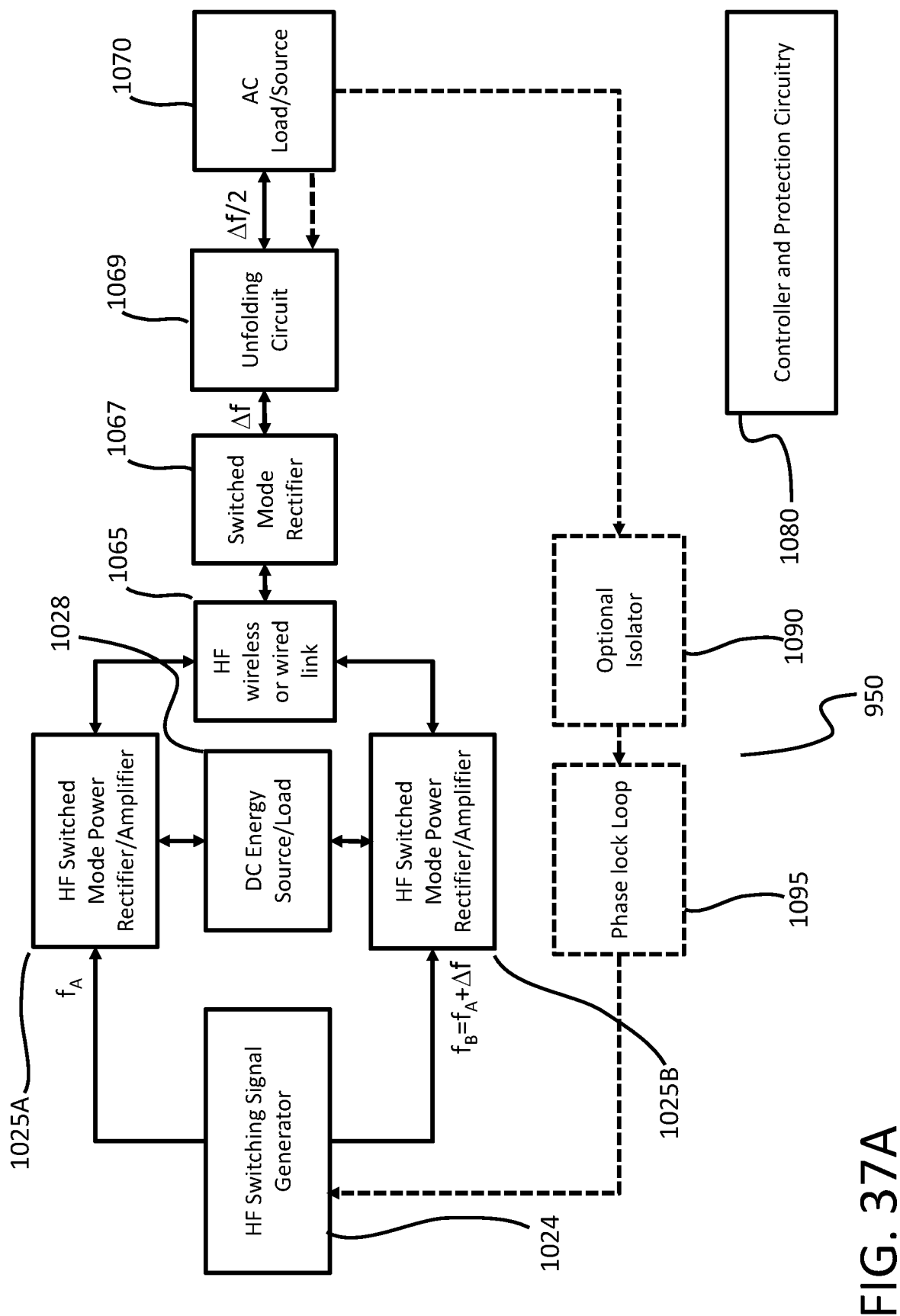
FIG. 37A shows a schematic diagram of a bidirectional power transfer system for transferring power between a DC electrical source and an AC electrical power load using the frequency difference of two high frequency signals.
Figure 37B:
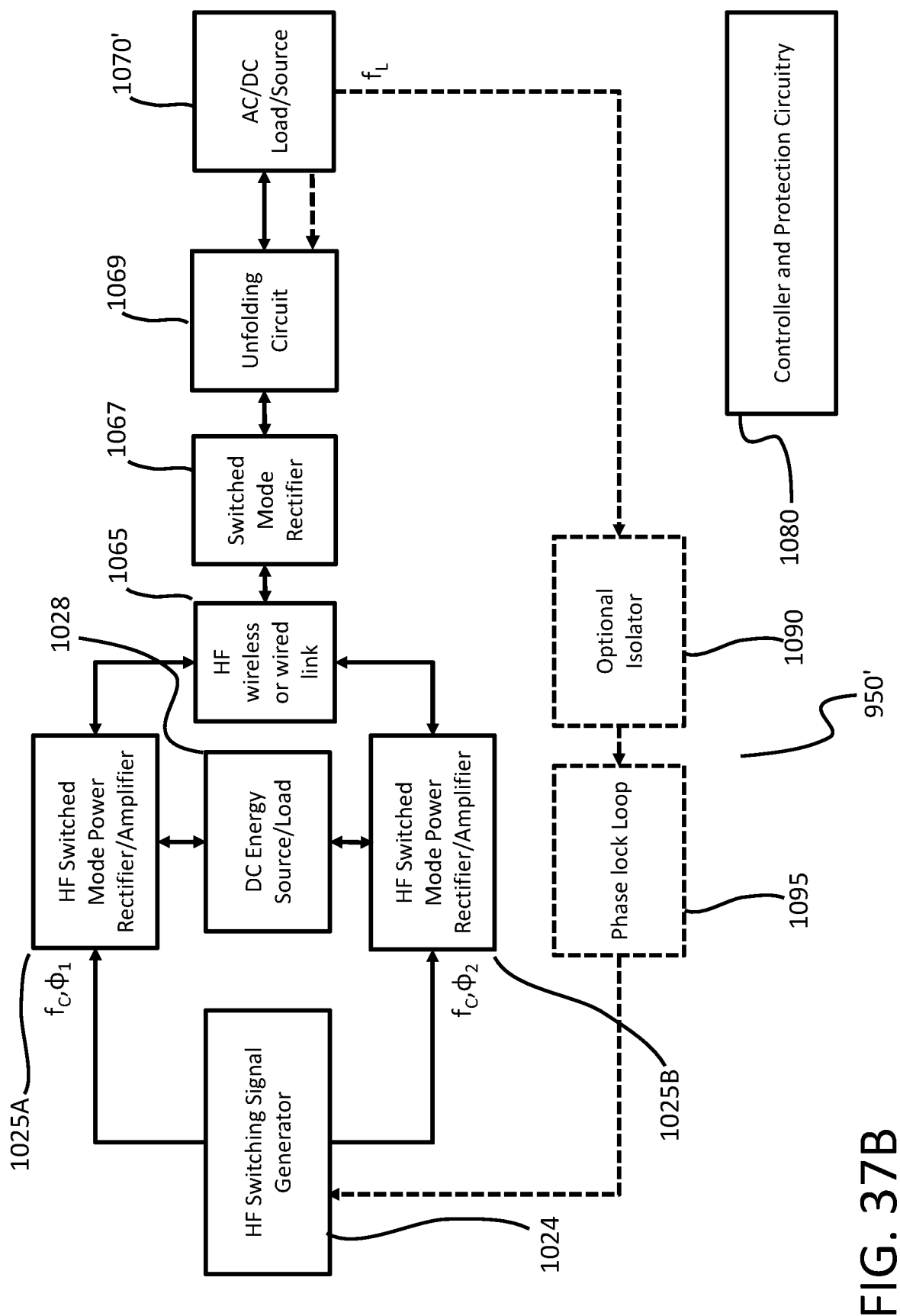
FIG. 37B shows a schematic diagram of a bidirectional power transfer system for transferring power between a DC electrical source and a variable power load which may be AC or DC using the phase difference of two high frequency signals.
Figure 37C:
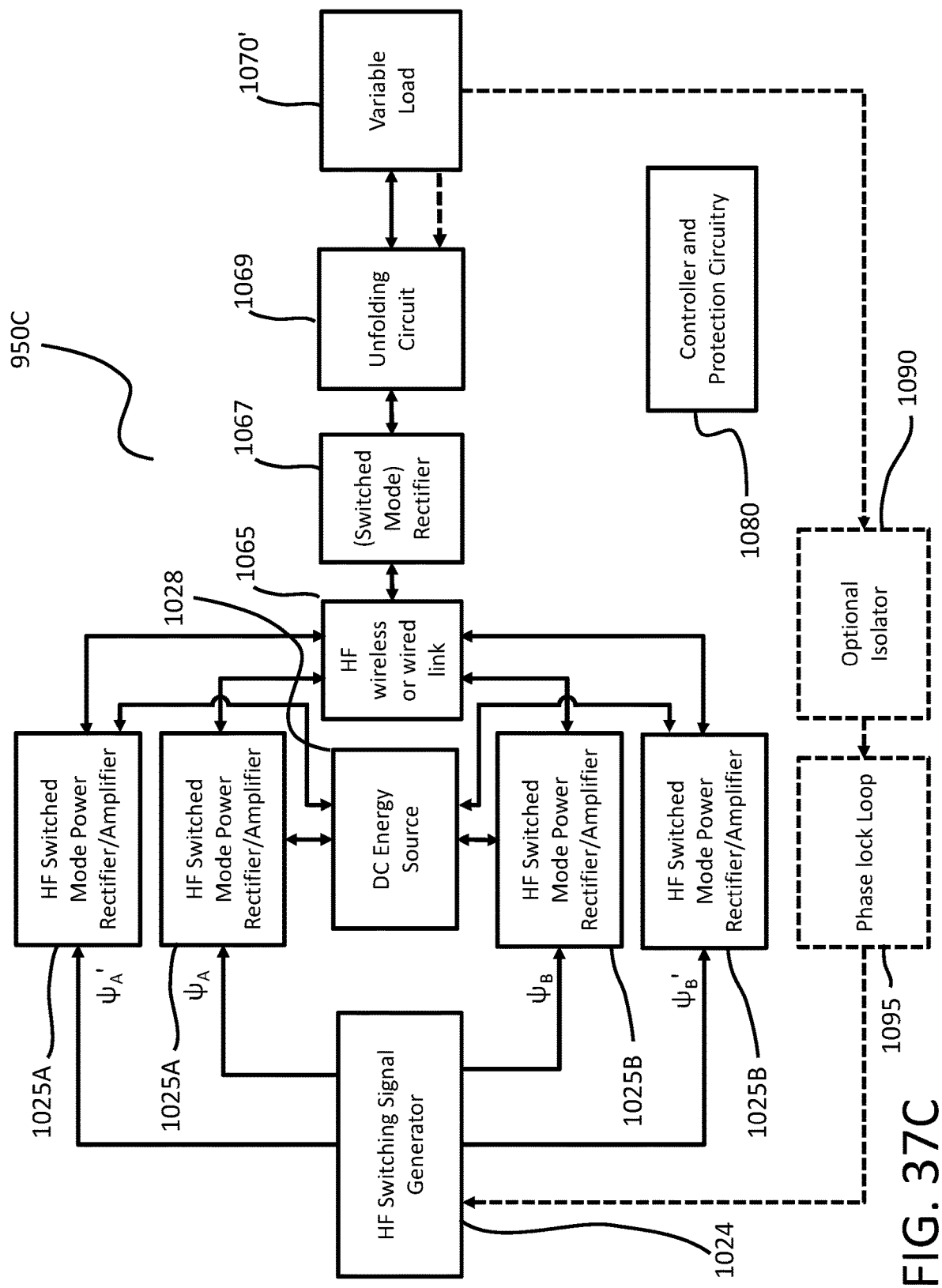
FIG. 37C shows a schematic diagram of a bidirectional power transfer system for transferring power between a DC electrical source and a variable power load which may be AC or DC using the phase difference or frequency difference of two high frequency signals and multiple pairs of rectifiers/amplifiers.
Figure 37D:
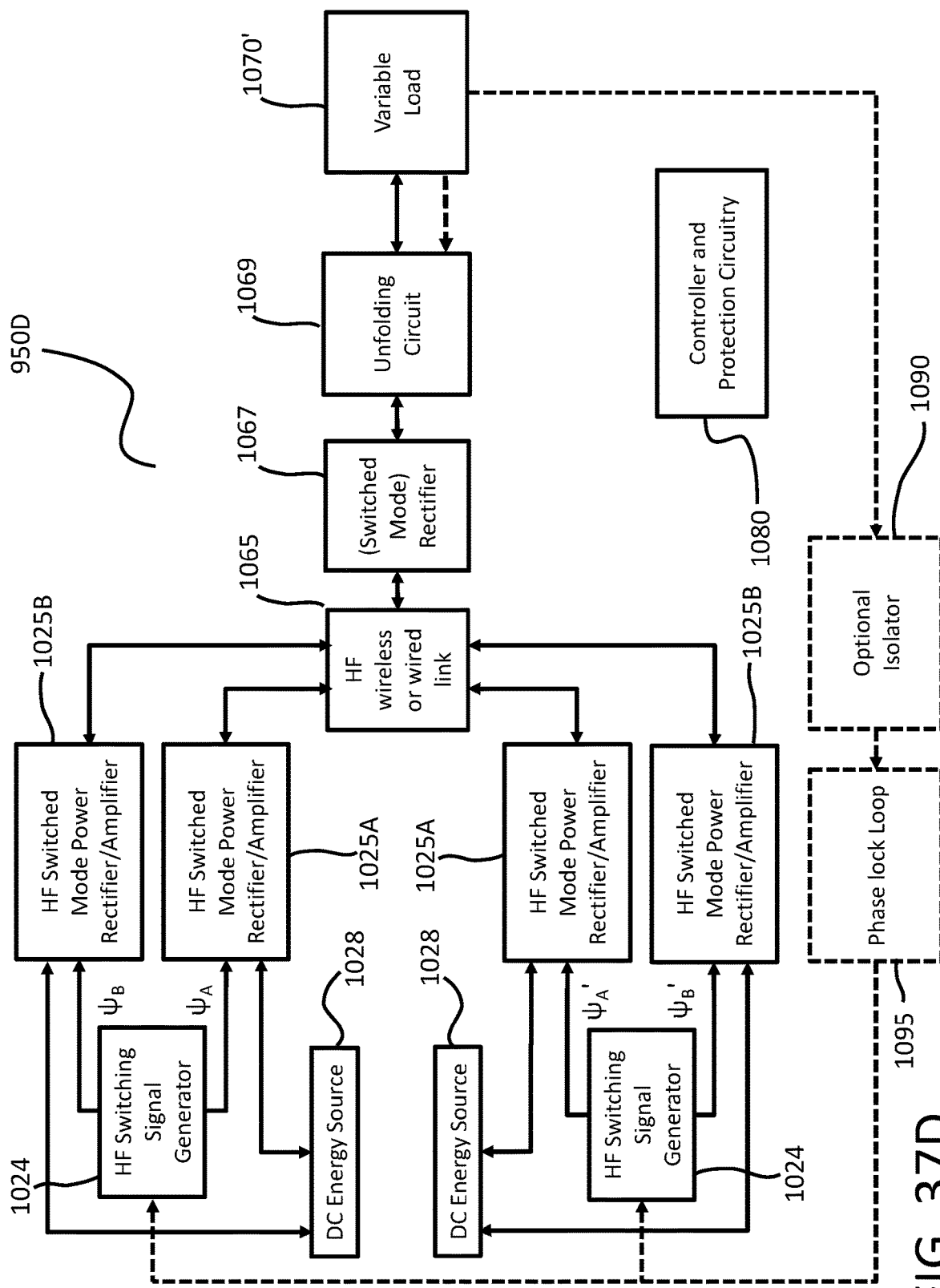
FIG. 37D shows a schematic diagram of a bidirectional power transfer system for transferring power between multiple DC electrical sources and a variable power load which may be AC or DC using the phase difference or frequency difference of two high frequency signals and multiple HF switching signal generators and multiple pairs of rectifiers/amplifiers.

FIGS. 37A and 37B show two configurable bidirectional power transfer systems for transferring power from a DC source, in accordance with some embodiments. FIGS. 37C and 37D show a number of different embodiments of configurable bidirectional power transfer systems for transferring power between a DC source and a variable load. The variable load may be an AC load (in the case of both FIGS.

37A and 37B), a DC load (FIG. 37B) or a load carrying a mix of AC and DC power (FIG. 37B).

FIG. 37A shows system 950 for transferring power between DC source 1028 and AC load 1070, the system being useful in transferring power from a DC source to an AC power grid operating at typical line frequencies of about 50 or about 60 Hz. System 950 may also be configured for transferring power in the opposing direction. As with FIGS. 19A, 19B, 35A, and 35B, system 950 of FIG. 37A is based on the controlled functioning of self-synchronous radio frequency rectifiers/amplifiers 1025A and 1025B, devices 1025A and 1025B being reconfigurable between the mode of amplifier and mode of rectifier. Devices 1025A and 1025B may be the same or similar to self-synchronous radio frequency rectifier/amplifier 26B of FIG. 6 and FIG. 8, and rectifier 46D of FIG. 7 and FIG. 9. Devices 1025A and 1025B may comprise switched-mode self-synchronous radio frequency rectifiers/amplifiers.

In a first embodiment, central controller 1080 is employed. Controller 1080 may comprise protection circuitry for the system. In other embodiments, distributed controllers may be employed for the same purpose. When power is being transferred from DC source/load 1028, devices 1025A and 1025B are placed in amplification mode and their switching actions are driven by switching signals provided by HF switching signal generator 1024. HF switching signal generator 1024 provides the frequencies for the switching signals driving devices 1025A and 1025B, controls the switching duty cycle of devices 1025A and 1025B and ensures that the switching patterns of devices 1025A and 1025B have a controlled mutual phase and pulse-width relationship.

In the systems of FIGS. 37A and 37B, HF switching signal generator 1024 supplies one switching signal to each of devices 1025A and 1025B. In a more general system, such as those described later below with respect to FIGS. 37C and 37D there may be multiple pairs of self-synchronous radio frequency rectifiers/amplifiers being provided with switching signals by HF switching signal generators similar to HF switching signal generator 1024. The number of HF switching signal generators used in any embodiment may vary. For example, one HF switching signal generator may provide switching signals to a pair of self-synchronous radio frequency rectifiers/amplifiers. One HF switching signal generator may provide switching signals to a plurality of pairs of self-synchronous radio frequency rectifiers/amplifiers.

HF switching signal generator 1024 may be controlled by controller 1080 to drive differential self-synchronous radio frequency rectifier/amplifier 1025A (in the amplifier mode) with a first switching signal at a first frequency of $f_A$. Simultaneously, HF switching signal generator 1024 may be controlled by controller 1080 to drive differential self-synchronous radio frequency rectifier/amplifier 1025B (in the amplifier mode) with a second switching signal at a second frequency of $f_B$, where:

$$f_B = f_A + \Delta f \quad \text{(Equation 1)}$$

In Equation 1, the difference frequency $\Delta f$ between the frequencies of the second and first switching signals is double the frequency at which transferred power is intended to be supplied to AC load/source 1070.

In embodiments where AC load 1070 is not carrying a power signal in the absence of system 950, frequencies $f_B$ and $f_A$, and thereby difference frequency $\Delta f$, may simply be set in or by HF switching signal generator 1024. The frequencies $f_B$ and $f_A$, may differ from each other by a difference frequency $\Delta f$ that is twice as large as the frequency of the power signal intended for injection into AC load 1070. In some embodiments, frequencies $f_B$ and $f_A$ may be set in HF switching signal generator 1024 by controller 1080 on the basis of a design choice.

In other embodiments where an existing AC power signal is present in AC load 1070, such as in a residential power grid, switching signal frequencies $f_B$ and $f_A$ may be set in HF switching signal generator 1024 by sensing the operating frequency $f_L$ of AC load/source 1070, and transferring a reference signal of frequency $f_L$ via optional isolator system 1090 and phase lock loop 1095 to HF switching signal generator 1024. In this specification, the term "load information circuit" is used to describe this segment of the circuit. In order to differentiate this additional section of circuitry from that used in the absence of an existing power signal in AC load/source 1070, this load information circuit and its components are shown in broken lines in FIG. 37A. The direction of reference signal flow in that circuit is given by arrows in FIG. 37A. Optional isolator system 1090 may be included under some circumstances, for some territories. Some territories may require by regulation isolation from AC load/source 1070 when the load is not carrying a power signal. Optional isolator system 1090 may comprise an air gap. One of ordinary skill recognizes how to use isolators for providing data and timing signals and details thereof are not described herein. In other embodiments, instead of employing a reference signal, information may be communicated to the HF switching signal generator 1024 about at least one of a DC level, a frequency and a phase of a power signal in the load.

HF switching signal generator 1024 may double the sensed frequency $f_L$ to determine the required difference frequency $\Delta f$ between frequencies $f_B$ and $f_A$, and apply switching signals at the resulting frequencies $f_B$ and $f_A$ to devices 1025A and 1025B. In such an embodiment, the process of sensing the operating frequency $f_L$ of AC load/source 1070, the transfer of signals to HF switching signal generator 1024, and the doubling of that operating frequency $f_L$ may all take place under the control of controller 1080. In order to avoid cluttering FIG. 37A, the control lines running from controller 1080 to the devices that it senses or controls, including devices 1025A and 1025B, are not shown. It is to be noted that the switching signal frequencies $f_B$ and $f_A$ merely have to differ by $\Delta f = 2 f_L$. The difference frequency $\Delta f$ may be obtained according to Equation 1 above. Two suitable frequencies $f_B$ and $f_A$, differing from each other by $\Delta f = 2 f_L$ may be determined in HF switching signal generator 1024. The arrangement described here helps the power supplied from the DC source 1028 to be in phase with the grid load and thereby allows efficient power transfer.

In some embodiments, the switching signals driving devices 1025A and 1025B may be chosen to be in the range of between 1 MHz and 1 GHz. In some embodiments, first and second switching signals of 950 may be chosen to be in the range between 100 kHz and 1 GHz. In some embodiments, they may be chosen to be in the ISM bands already described earlier in this disclosure. We use the term "High Frequency" (HF) herein to describe frequencies between about 100 kHz and 1 GHz. Devices 1025B and 1025A may transmit any power they draw from DC source/load 1028 at frequencies $f_B$ and $f_A$ respectively via HF power link system 1065 to switched mode rectifier 1067. The operation of rectifier 1067 may be controlled by controller 1080 using control lines which, for the sake of clarity, are not shown in FIG. 37A.

HF power link system 1065 may be wired or wireless. In some embodiments, HF power link system 1065 may be a near-field wireless link. In some embodiments, HF power link system 1065 may be a near-field bimodal wireless link. These various types of HF links have already been described earlier in this disclosure. The near-field bimodal wireless links have been described in detail with reference to FIGS. 1-10, FIGS. 19A and 19B, and FIGS. 32-36. Given the intentionally lower quality factor Q of the bimodal links already described above, the power signals emanating from devices 1025B and 1025A at frequencies $f_B$ and $f_A$ respectively may both be transmitted simultaneously over one such near-field bimodal wireless link.

Internally, HF power link system 1065 may comprise a single HF wireless receiver module of the type described with reference to FIG. 7 in communication with one or more HF wireless transmitter modules of the type described in FIG. 6. Given that the amplification and rectification functions in FIG. 37A are performed by devices 1025A, 1025B and 1067, and given that the circuit of FIG. 37A employs single general controller 1080 and single HF switching generator 1024, the corresponding elements 26B, 46D; 22, 42; and 26A of the HF power transmission system of FIGS. 6 and 7, as employed in FIG. 19A, are obviated in HF power link system 1065 of FIG. 37A. In some embodiments, HF power link system 1065 may comprise a single receiver module of the type described with reference to FIG. 19B configured to receive power transmitted by wire from one or more transmitter modules of the type described in FIG. 19B. In some embodiments, HF power link system 1065 may have a single transmitter module and a single receiver module, as required by the system described in FIG. 37A. Even though there may be only a single transmitter module in HF power link system 1065, that transmitter module may be driven differentially by two self-synchronous radio frequency rectifiers/amplifiers 1025A and 1025B. In photovoltaic systems in particular it may be useful to employ a plurality of transmitter modules to communicate power to a single receiver, as already described with reference to FIGS. 20A and 20B.

The system of FIG. 37A requires only one pair of self-synchronous radio frequency rectifiers/amplifiers 1025A and 1025B. Each of devices 1025A and 1025B is shown as having one signal line into HF power link system 1065. In other embodiments to be discussed later below, there may be further pairs of self-synchronous radio frequency rectifiers/amplifiers. Those devices may be operated at the same frequencies as, or different frequencies from, devices 1025A and 1025B of FIG. 37A. It is clear to a practitioner in the art that feeding two signals of identical frequency and phase from two self-synchronous radio frequency rectifiers/amplifiers does not require separate wiring into HF power link system 1065 and that the same physical wiring could be used. In order to reduce both the number of drawings and their complexity in the present specification, we shall show separate wiring for each self-synchronous radio frequency rectifier/amplifier, even if the signals from two separate self-synchronous radio frequency rectifiers/amplifiers may be identical.

HF power link system 1065 of FIG. 37A mixes the two HF signals of frequencies $f_B$ and $f_A$ in its receive side, producing thereby a transferred power signal modulated at frequency $\Delta f/2$, transmitted along with various overtone frequencies resulting from non-linearities, noise, and other non-sinusoidal factors in the components, including devices 1025B and 1025A. Since HF power link system 1065 is a tuned system, all of these signals, except for the carrier signal bearing the modulation at the difference frequency $\Delta f$ may be filtered at the receive side of HF power link system 1065. Rectifier 1067 and unfolding circuit 1069 also further ensure the passage of only the modulation at the difference frequency $\Delta f$ through system 950 to AC load/source 1070.

FIG. 38 shows a waveform of the signal produced by rectifier 1067 of system 950 in FIG. 37A for transfer to AC load/source 1070. The rectified power signal produced by rectifier 1067 is in the form of a train of adjoining halfwaves 1048 of the same polarity with a frequency equal to the difference frequency $\Delta f$. The rectified power signal is received by unfolding circuit 1069 and every second halfwave is inverted to form a generally sinusoidal unfolded output power signal 1049 at a frequency of $\Delta f/2$. The action of unfolding circuit 1069 may be controlled via controller 1080 via control lines which, in order to avoid clutter, are not shown in FIG. 37A. The term "unfolded output power signal" is used to describe the power signal provided to the AC load 1070 by unfolding circuit 1069.

In the case of AC load 1070 that is not carrying an existing power signal in the absence of system 950, HF switching signal generator 1024 may trigger the working of unfolding circuit 1069 to ensure that its unfolding operation is synchronous with the power signal from rectifier device 1067.

In the case where there is a power signal present in AC load 1070 in the absence of system 950, the reference signal from AC load 1070 at operating frequency $f_L$ may optionally be routed directly from AC load 1070 and used to trigger the working of unfolding circuit 1069 to ensure that its unfolding operation is synchronous with the power signal from device 1067. In FIG. 37A, a broken line extending from AC Load 1070 directly back toward unfolding circuit 1069 represents this route for the reference signal from AC load 1070 toward unfolding circuit 1069. The term "power signal conversion circuit" is used to describe the combination of devices 1067 and 1069.

It has already been described in the foregoing portions of this document how power transfer systems of the general type discussed here may be employed to transfer power in the opposite direction to what has been described immediately above. For that operation, devices 1025A and 1025B are set to their rectifier modes and switched mode rectifier 1067 is switched to an always-on mode in which the input of device 1067 is connected directly to its output. This mode-setting may be performed by controller 1080 via its control lines to those devices. It has already been described how links of the type of device 1065 may function to transfer power in the opposing direction to that explained above. The same is true of devices 1025A and 1025B. The net effect is that of power transfer from AC load/source 1070 to DC load/source 1028.

Furthermore, as already explained earlier in this document, information about the source and load sides may be transferred on the actual power signal, either directly between the source and the load, or may be obtained by controller 1080 for the purposes of control of the system. The information transfer via the power signal may be important in some embodiments in which the transmit and receive sides of system 950 are physically housed separately. It may be useful when the HF power link system 1065 is a wireless link.

The use of HF frequencies for the transfer of power between DC sources and AC power grids leads to the use of less bulky high frequency switching devices and creates the opportunity for integrating much of the circuitry into semiconductor integrated circuits. The implementation of such circuits follows the same lines as already presented with respect to FIG. 33 and FIGS. 34A and 34B. In addition, total harmonic distortion generated, for example from the signal conversion, may be controlled and minimized in this arrangement.

FIG. 37B shows a further configurable bidirectional power transfer system 950' for transferring power between DC source/load 1028 and, in this embodiment, load/source 1070' which may be DC or AC. Elements in FIG. 37B bearing the same labels as in FIG. 37A are the same as the corresponding elements in FIG. 37A. System 950' may also be configured for transferring power in the opposing direction. As with systems described with reference to FIG. 37A, system 950' of FIG. 37B is based on the controlled functioning of self-synchronous radio frequency rectifiers/amplifiers 1025A and 1025B, already described in the foregoing text.

In some embodiments, shown in FIG. 37B, central controller 1080 is employed. Controller 1080 may comprise protection circuitry for the system. In some embodiments, distributed controllers may be employed for the same purpose. When power is being transferred from DC source/load 1028, devices 1025A and 1025B are placed in amplification mode. HF switching signal generator 1024 provides a shared switching frequency $f_C$ for devices 1025A and 1025B, and controls the switching duty cycle of devices 1025A and 1025B and ensures that the switching patterns of devices 1025A and 1025B have a controlled mutual phase and pulse-width relationship. In some embodiments, HF switching signal generator 1024 may be used to adjust a mutual phase difference of the two switching signals supplied to devices 1025A and 1025B.

HF switching signal generator 1024 may be controlled by controller 1080 to drive differential self-synchronous radio frequency rectifier/amplifier 1025A (in the amplifier mode) with a first switching signal of frequency $f_C$ and first phase $\phi_1$. Simultaneously or substantially simultaneously, HF switching signal generator 1024 may be controlled by controller 1080 to drive differential self-synchronous radio frequency rectifier/amplifier 1025B (in the amplifier mode) with a second switching signal of the same frequency $f_C$, but having a different second phase given by $$\phi_2 = \phi_1 + \Delta\phi \quad \text{(Equation 2)}$$

wherein $\Delta\phi$ is the mutual phase difference of the first and second switching signals.

Frequency $f_C$ of the first and second switching signals may be set in HF switching signal generator 1024, for example by a predetermined method, or an adaptive method, or other suitable frequency setting methods. In some embodiments, frequency $f_C$ may be set in HF switching signal generator 1024 on the basis of a design choice. In some embodiments, frequency $f_C$ may be set in HF switching signal generator 1024 to a frequency $f_C$ preferred for HF power link system 1065. Whereas, in the case of system 950, as shown in FIG. 37A, frequencies $f_A$ and $f_B$ are at least in part related to the load frequency via their difference frequency $\Delta f$, the frequency $f_C$ of system 950' of FIG. 37B is not based on a frequency of any signal in AC/DC load/source 1070'. Instead, in the case of system 950' of FIG. 37B, HF switching signal generator 1024 imposes on the first and second switching signals the mutual phase difference $\Delta\phi$ on the basis of information obtained from load/source 1070'.

Power is drawn from DC energy source/load 1028 by differential self-synchronous radio frequency rectifier/amplifiers 1025A and 1025B at the frequency $f_C$ to produce two separate HF power signals of frequency $f_C$ and of phases differing by the adjustable mutual phase difference $\Delta\phi$. HF power link system 1065 mixes in its receive side during its operation the two HF power signals from differential self-synchronous radio frequency rectifier/amplifiers 1025A and 1025B to produce a transferred power signal. Transferred power signal at frequency $f_C$ has an amplitude determined by the phase difference $\Delta\phi$ between the first and second switching signals under control of the HF switching signal generator 1024. In the frequency domain it further contains various overtone frequencies resulting from non-linearities, noise, and other non-sinusoidal factors in the components, including devices 1025B and 1025A. Since HF power link system 1065 is a tuned system, it may filter out all signals other than the transferred power signal at frequency $f_C$.

Phase difference $\Delta\phi$, if left unadjusted, results in a transferred power signal at frequency $f_C$ that has a fixed amplitude. By adjusting the phase difference $\Delta\phi$ between first and second switching signals, the amplitude of a resulting signal produced by HF power link system 1065, already described with reference to FIG. 37A, may be adjusted. HF switching signal generator 1024 may be configured to adjust the phase difference to provide a charging signal to the load based on the type of load and its instantaneous level of charge. This charging level may be set and controlled via controller 1080. To this end, controller 1080 may provide coarse settings appropriate to the type or technology of load 1070', for example Ni—Cd, Lithium-Ion, etc., and finer settings to control the charging process for the selected type of load, based on for example the percentage depletion of the charge in the load.

System 950' may be operated to transfer power in AC form to load 1070' in the case where load 1070' is an AC load. By modulating in HF switching signal generator 1024 the phase difference $\Delta\phi$ at a pre-determined phase modulation frequency $f_M$, AC power may be transferred to load 1070'. Thus, in general, by suitable control of phase difference $\Delta\phi$ via HF switching signal generator 1024 power may be transferred from DC source/load 1028 to load/source 1070' as DC of adjustable size and polarity, and/or as an AC power signal.

Next, the modulation of the phase difference $\Delta\phi$ between the first and second switching signals and the pre-determination of phase modulation frequency $f_M$ are considered. In embodiments where an existing AC power signal is present in AC/DC load/source 1070', such as in a residential power grid, pre-determined phase modulation frequency $f_M$ may be set in HF switching signal generator 1024 by sensing the operating frequency $f_L$ of load/source 1070', and transferring a reference signal having frequency $f_L$ via optional isolator system 1090 and phase lock loop 1095 to HF switching signal generator 1024. In this specification, the term "load information circuit" is used to describe this segment of the circuit. In order to differentiate this additional section of circuitry from that used in the absence of an existing AC power signal in load/source 1070', this load information circuit and its components are shown in broken lines in FIG. 37B. The direction of reference signal flow in that circuit is given by arrows in FIG. 37B. Optional isolator system 1090 may be included under some circumstances, for example without limitation, when load/source 1070' is a DC load/source. Some territories may also specifically require by regulation isolation from an AC load/source 1070' when the load is not carrying a power signal. The optional isolator system 1090 may comprise an air gap. Methods of providing data and timing signals via isolators are well known in the art and will not be expanded upon herein.

HF switching signal generator 1024 may determine the phase modulation frequency $f_M$ based on the sensed operating frequency $f_L$ of AC/DC load/source 1070' and apply this modulation to the phase difference Δϕ between the first and second switching signals supplied to devices 1025A and 1025B respectively. In some embodiments, the process of sensing the operating frequency $f_L$ of AC load/source 1070', the transfer of signals to HF switching signal generator 1024, and the determining of the phase modulation frequency $f_M$ may all take place under the control of controller 1080. In order to avoid cluttering FIG. 37B, the control lines running from controller 1080 to the devices that it senses or controls, including devices 1025A and 1025B, are not shown. The power supplied from DC source 1028 may stay in phase with the power signal in AC/DC load/source 1070' and thereby allowing efficient power transfer. This will be explained further below.

The first and second switching signals of 950' for driving devices 1025A and 1025B may be chosen to be in the range between 1 MHz and 1 GHz. In some embodiments, first and second switching signals of 950' may be chosen to be in the range between 100 kHz and 1 GHz. In some embodiments, they may be chosen to be in the ISM bands already described earlier in this disclosure. Devices 1025A and 1025B may transmit any power they draw from DC source/load 1028 at frequency $f_C$ via HF power link system 1065 to switched mode rectifier 1067. Switched mode rectifier 1067 may be of the same or similar arrangement as shown in FIG. 37A. The operation of rectifier 1067 may be controlled by controller 1080 using control lines which, for the sake of clarity, are not shown in FIG. 37B.

HF power link system 1065 may be wired or wireless. In some embodiments, HF power link system 1065 may be a near-field wireless link. In some embodiments, HF power link system 1065 may be a near-field bimodal wireless link. These various HF links have already been described earlier in this disclosure. The near-field bimodal wireless links have been described in detail with reference to FIGS. 1-10, FIGS. 19A and 19B, and FIGS. 32-36. Given the intentionally lower quality factor Q of the bimodal links already described above, the power signals emanating from devices 1025A and 1025B at frequency $f_C$ with phases $\phi_1$ and $\phi_2$ respectively may both be transmitted simultaneously over one such near-field bimodal wireless link.

As already stated earlier, HF power link system 1065 may internally comprise a single HF receiver module of the types described with respect to FIG. 7 and FIG. 19B, and their equivalent modules, in communication with one or more HF transmitter modules of the type described in FIG. 6 and FIG. 19B. HF power link system 1065 of FIG. 37B, being the same power link system 1065 of FIG. 37A, may have a single HF receiver module and a single transmitter module driven differentially by devices 1025A and 1025B.

In the case of system 950' of FIG. 37B, as with system 950 of FIG. 37A, the rectified power signal produced by rectifier 1067 may be in the form of a train of adjoining halfwaves of the same polarity. The rectified power signal is received by unfolding circuit 1069 and every second halfwave is inverted to form a generally sinusoidal unfolded output power signal at the frequency of the signal in the load, if present. As with system 950, the term "unfolded output power signal" is used to describe the power signal provided to AC load 1070' by unfolding circuit 1069.

In the case of load/source 1070' that is not carrying an existing power signal in the absence of system 950', HF switching signal generator 1024 may trigger the working of unfolding circuit 1069 to ensure that its unfolding operation is synchronous with the power signal from rectifier device 1067.

In the case where there is a power signal present in load/source 1070' in the absence of system 950', the reference signal from load/source 1070' at operating frequency $f_L$ may optionally be routed directly from load/source 1070' and used to trigger the working of unfolding circuit 1069 to ensure thereby that its unfolding operation is synchronous with the power signal from device 1067. In FIG. 37B, a broken line extending from load/source 1070' directly back toward unfolding circuit 1069 represents this route for the reference signal from load/source 1070' toward unfolding circuit 1069. The term "power signal conversion circuit" is used to describe the combination of devices 1067 and 1069.

It has already been described in the foregoing portions of this document how power transfer systems of the general type discussed here may be employed to transfer power in the opposite direction to what has been described above. For that operation, devices 1025A and 1025B are set to their rectifier modes and switched-mode rectifier 1067 is switched to an always-on mode. This mode-setting may be performed by controller 1080 via its control lines to those devices. In some embodiments, it has already been described how links of the type of device 1065 may function to transfer power in the opposing direction to that explained above. The same is true of devices 1025A and 1025B. The net effect is that of power transfer from load/source 1070' to DC source/load 1028.

Furthermore, as already explained earlier in this document, information about the source and load sides may be transferred on the actual power signal, either directly between the source or the load, or may be obtained by controller 1080 for the purposes of control of the system. The information transfer via the power signal may be important in those embodiments in which the transmit and receive sides of system 950' are physically housed separately. It may be useful when the HF power link system 1065 is a wireless link.

The use of HF frequencies for the transfer of the power between DC sources and AC power grids leads to a requirement for less bulky HF switching devices and creates the opportunity for integrating much of the circuitry into semiconductor integrated circuits. The implementation of such circuits follows similar lines as already presented with respect to FIG. 33 and FIGS. 34A and 34B. In addition, total harmonic distortion generated, for example from the signal conversion, may be controlled and minimized in this arrangement.

FIG. 37A and FIG. 37B present power transfer systems 950, 950' for transferring power between DC source 1028 and variable load 1070, 1070'. Systems 950 and 950' are structurally similar, but differ in the two embodiments as regards how they are functionally applied, as regards the nature of signals generated and applied, and in whether power is transferred to an AC load or a DC load. First and second self-synchronous radio frequency rectifiers/amplifiers 1025A,1025B are configured to extract first and second high frequency (HF) power signals from the DC source 1028 at respectively first and second HF frequencies. An HF power link system 1065 is configured to receive and mix the first and second HF power signals to produce a transferred power signal. A power signal conversion circuit in communication with the HF power link system 1065 and variable load 1070, 1070' is configured to produce from the transferred power signal an output power signal and supply the output power signal to variable load 1070,1070'.

Power transfer systems 950,950' further comprise HF switching signal generator 1024 configured to supply to first and second rectifiers/amplifiers 1025A, 1025B first and second switching signals at the respective first and second HF frequencies and to establish and control a mutual phase relationship between the first and second switching signals.

Power signal conversion circuit comprises: switched mode rectifier 1067 configured to receive transferred power signal from HF power link system 1065 and rectify transferred power signal to produce a rectified power signal; and unfolding circuit 1069 configured to receive rectified power signal from switched mode rectifier 1067 and unfold rectified power signal to produce the output power signal.

First and second self-synchronous radio frequency rectifiers/amplifiers 1025A, 1025B may be configured to operate in a rectifying mode and switched mode rectifier 1067 may be configured to operate in an always-on mode, thereby allowing power to be extracted from variable load 1070, 1070' and transferred to DC source 1028 via power signal conversion circuit (elements 1067 and 1069) and the HF power link system 1065.

Unfolding circuit may be configured to receive a reference signal from variable load 1070, 1070' to unfold the rectified power signal synchronous with a signal in variable load 1070, 1070'. Power signal conversion circuit (elements 1067 and 1069), HF power link system 1065, and the plurality of pairs of self-synchronous radio frequency rectifiers/amplifiers 1025A, 1025B may be configured to communicate control information to HF switching signal generator 1024 from the rest of system 950,950'. System 950, 950' may further comprise one or more controllers 1080 in data communication with a plurality of elements of system 950, 950' and configured to control the plurality of elements. System 950, 950' may further comprise an isolatable load information circuit configured to communicate to HF switching signal generator 1024 information about at least one of a DC level, a frequency and a phase of a power signal in variable load 1070, 1070'. The load information circuit may comprise phase lock loop 1095. The load information circuit may further comprise isolator system 1090 and isolator system 1090 may comprise an air gap.

HF power link system 1065 of systems 950, 950' may comprise a wireless power link system. Wireless HF power link system 1065 may comprise a bimodal wireless HF power link system. HF power link system 1065 may comprise a wired power link system.

In two phase-difference based implementations specific to power transfer system 950' of FIG. 37B, the first and second HF frequencies are the same frequency; and the first and second switching signals have a mutual phase difference adjustable by HF switching signal generator 1024.

In the first phase-difference based implementation HF switching signal generator 1024 is configured to adjust the mutual phase difference between the first and second switching signals based on the DC level in variable load 1070' to thereby produce from HF power link system 1065 the transferred power signal as a DC signal correspondingly adjusted in amplitude.

In the second phase-difference based implementation HF switching signal generator 1024 is configured to modulate the mutual phase difference between the first and second switching signals at a phase modulation frequency that is derived from the frequency of the power signal in variable load 1070' to thereby produce from HF power link system 1065 the transferred power signal as an AC power signal modulated at the frequency of the power signal in variable load 1070'. Modulation may be based at least in part on a modulation function at the phase modulation frequency including, for example, a sawtooth function.

In the frequency-difference based implementation specific to power transfer system 950 of FIG. 37A, the first and second HF frequencies differ by a difference frequency $\Delta f$. In this implementation HF switching signal generator 1024 is configured to determine the first and second HF frequencies and to set the difference frequency $\Delta f$ to double the frequency of the power signal in variable load 1070. HF power link system 1065 is arranged to produce the transferred power signal at the difference frequency $\Delta f$ and power signal conversion circuit (elements 1067 and 1069) is configured to supply the output power signal to variable load 1070 at the frequency of the power signal in variable load 1070.

Figure 39:
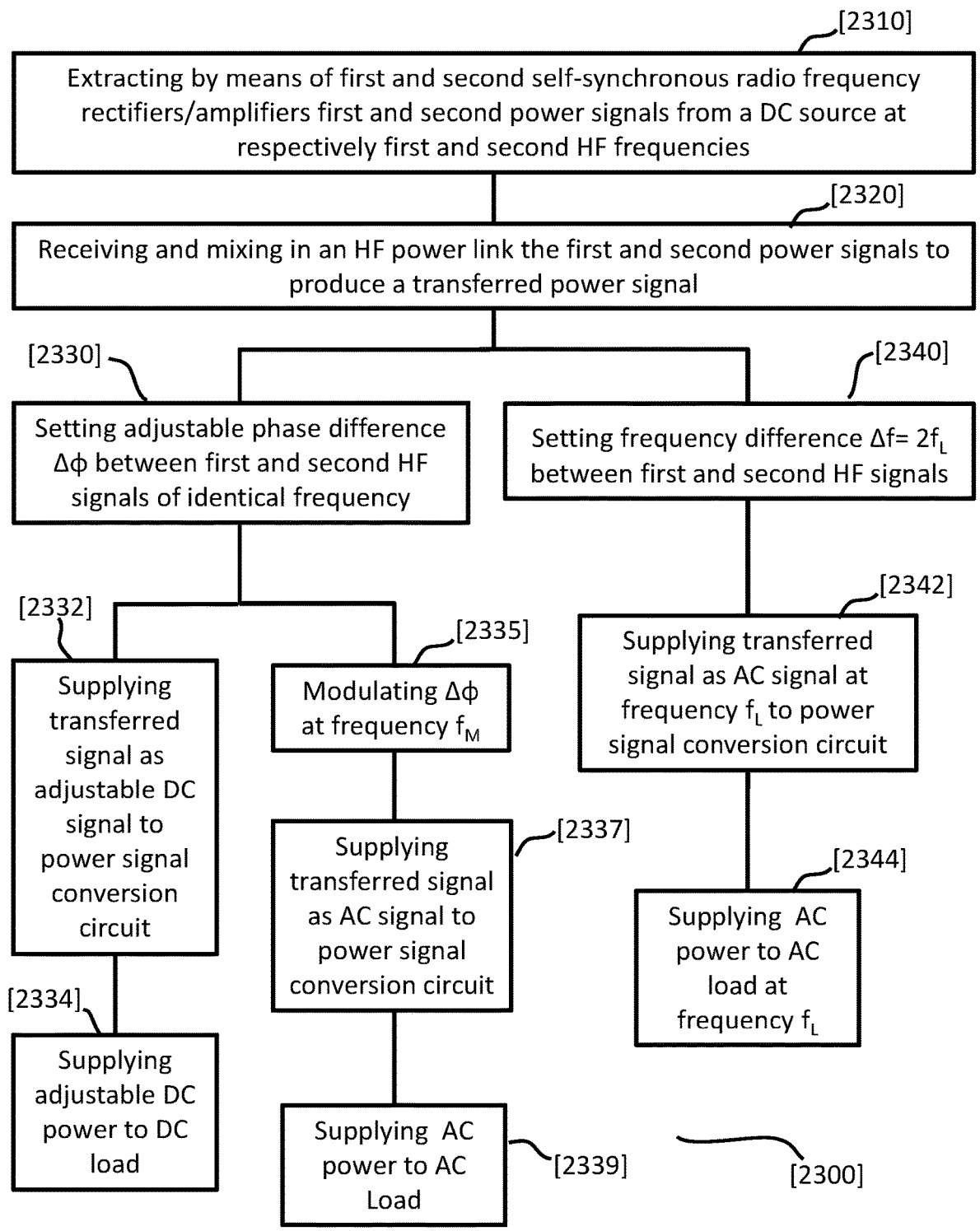
FIG. 39 shows a flow chart of a method for transferring power between a DC electrical source and a variable power load which may be AC or DC.

With reference to FIG. 39, method [2300] is provided for transferring power between DC source 1028 and variable load 1070, 1070', the method comprising: [2310] extracting from DC source 1028 at first and second HF frequencies corresponding first and second high frequency (HF) power signals via corresponding first and second self-synchronous radio frequency rectifiers/amplifiers 1025A, 1025B; [2320] receiving and mixing in HF power link system 1065 the first and second HF power signals to produce a transferred power signal; producing in power signal conversion circuit (elements 1067 and 1069 of FIGS. 37A and 37B) in communication with HF power link system 1065 and variable load 1070, 1070' an output power signal from the transferred power signal; and supplying the output power signal to variable load 1070, 1070' (See steps [2334], [2339], and [2344] of FIG. 39).

The method may further comprise: generating in HF switching signal generator 1024 and communicating to first and second rectifiers/amplifiers 1025A, 1025B first and second switching signals at the respective first and second HF frequencies; and establishing and controlling in HF switching signal generator 1024 a mutual phase relationship between the first and second switching signals.

The method may further comprise: receiving and rectifying in switched mode rectifier 1067 of the power signal conversion circuit the transferred power signal from HF power link system 1065; and receiving and unfolding in unfolding circuit 1069 of the power signal conversion circuit the rectified power signal from switched mode rectifier 1067.

The method may further comprise: setting first and second self-synchronous radio frequency rectifiers/amplifiers 1025A, 1025B to a rectifying mode; setting switched mode rectifier 1067 to an always-on mode; extracting power from variable load 1070, 1070'; and transferring extracted power to DC source 1028 via power signal conversion circuit (elements 1067 and 1069) and HF power link system 1065.

The method may further comprise: unfolding the rectified power signal synchronous with a signal in variable load 1070, 1070' based on a reference signal from variable load 1070, 1070'; communicating control information to HF switching signal generator 1024 from the rest of the system, via power signal conversion circuit (elements 1067 and 1069), HF power link system 1065, and the first and second self-synchronous radio frequency rectifiers/amplifiers 1025A, 1025B; controlling the plurality of elements of the system by use of one or more controllers 1080 in data communication with the plurality of elements; and communicating to HF switching signal generator 1024 information about at least one of a DC level, a frequency and a phase of a power signal in variable load 1070, 1070' using isolatable load information circuit comprising phase lock loop 1095 and optional isolator system 1090.

Transferring power signal in HF power link system 1065 may comprise wirelessly transferring the power signal. Wirelessly transferring the power signal in HF power link system 1065 may comprise bimodal wirelessly transferring the power signal. Transferring the power signal in HF power link system 1065 may comprise wired transferring the power signal.

Two methods for transferring power from DC source 1028 to variable load 1070' of FIG. 37B in which power transfer system 950' employs a phase difference between switching signals are represented by branch [2330] of FIG. 39. In these implementations, the first and second HF frequencies of the first and second switching signals have the same frequency; and the first and second switching signals have a mutual phase difference adjustable by HF switching signal generator 1024.

A first of the two methods comprises: adjusting [2332] the mutual phase difference between the first and second switching signals based on the DC level in variable load 1070' to produce from HF power link system 1065 the transferred power signal as a DC signal correspondingly adjusted [2334] in amplitude.

The second of the two methods comprises: modulating [2335] the mutual phase difference between the first and second switching signals at a phase modulation frequency that is derived from the frequency of the power signal in variable load 1070' to produce from HF power link system 1065 the transferred power signal as an AC power signal modulated at the frequency of the power signal in variable load 1070'. (See steps [2337] and [2339] of FIG. 39).

A method for the frequency-difference based implementation represented by branch [2340] of FIG. 39 comprises: determining the first and second HF frequencies of the corresponding first and second switching signals; and setting [2340] the difference frequency $\Delta f$ equal to double the frequency $f_L$ of the power signal in variable load 1070. The method further comprises: producing [2342] the transferred power signal from HF power link system 1065 at the difference frequency; and supplying [2344] the output power signal to the variable load at the frequency of the power signal in variable load 1070.

A series of implementations pertaining to the use of one or more pairs of first and second self-synchronous radio frequency rectifiers/amplifiers of the type in FIGS. 37A and 37B follow below with reference to FIGS. 37C and 37D. These implementations differ on the basis of whether power is transferred (i) from a single DC source or (ii) a plurality of DC sources, or whether the implementation employs (i) a single HF switching signal generator or (ii) multiple HF switching signal generators of the type described with reference to FIGS. 37A and 37B. These implementations also differ based on whether they rely on (i) a frequency difference between the first and second self-synchronous radio frequency rectifiers/amplifiers in a pair, or (ii) on a phase difference between them, whether modulated, simply adjusted, or not adjusted at all. These implementations lend themselves variously to extracting power from multiple sources to a single variable load and extracting power from a single source to a single variable load via multiple channels to sustain greater power transfer. They also differ in that some transfer AC power, others transfer DC power, and yet others transfer a mix of AC and DC power to the variable load which may be an AC load, a DC load or a load carrying a mix of AC and DC power. The various implementations ultimately boil down to two circuit topologies, being that of FIG. 37C and that of FIG. 37D. Note that all self-synchronous radio frequency rectifiers/amplifiers 1025A, 1025B in both FIG. 37C and FIG. 37D may be identical and it is merely the switching signals triggering them that differ from embodiment to embodiment. HF power link system 1065 of FIGS. 37C and 37D, being of the same type as HF power link system 1065 of FIGS. 37A and 37B, has a single HF receiver module but a plurality of transmitter modules. Each of the plurality of transmitter modules is driven differentially by a dedicated corresponding pair of devices 1025A and 1025B.

In FIG. 37C, multiple pairs of first and second self-synchronous radio frequency rectifiers/amplifiers 1025A and 1025B transfer power between single DC source 1028 and single variable load 1070'. The actual mechanism of transfer and the requirements it imposes on the switching signals to various self-synchronous radio frequency rectifiers/amplifiers 1025A and 1025B in the various pairs differ from embodiment to embodiment, as described below.

In FIG. 37D, multiple pairs of first and second self-synchronous radio frequency rectifiers/amplifiers 1025A and 1025B transfer power between multiple DC sources 1028 and single variable load 1070', there being one pair of first and second self-synchronous radio frequency rectifiers/amplifiers 1025A and 1025B associated with each DC source 1028. The actual mechanism of transfer and the requirements it imposes on the switching signals to various self-synchronous radio frequency rectifiers/amplifiers 1025A and 1025B in the various pairs differ from embodiment to embodiment, as described below.

First, a general description is provided that holds for all the implementations associated with both of FIG. 37C and FIG. 37D. The description then proceeds to delve into more specific implementations, focusing first on implementations with the topology of FIG. 37C and then on implementations with the topology of FIG. 37D.

With reference to FIGS. 37C and 37D, power transfer system 950C, 950D is provided to transfer power between at least one DC source 1028 and variable load 1070', system 950C, 950D comprising: at least one pair of first and second self-synchronous radio frequency rectifiers/amplifiers 1025A, 1025B, each pair of rectifiers/amplifiers configured to extract a corresponding pair of respectively first and second high frequency (HF) power signals from a single one of the at least one DC source 1028 at a corresponding pair of respectively first and second HF frequencies; HF power link system 1065 configured to receive and mix the at least one pair of first and second HF power signals together to produce a transferred power signal; and power signal conversion circuit (elements 1067 and 1069 combined) in communication with HF power link system 1065 and variable load 1070'. The power signal conversion circuit is configured to produce from the transferred power signal an output power signal and supply the output power signal to variable load 1070'.

The system further comprises one or more HF switching signal generators 1024 wherein each of the at least one pair of first and second self-synchronous radio frequency rectifiers/amplifiers 1025A, 1025B is arranged to receive a corresponding pair of first and second switching signals from a single one of the one or more HF switching signal generators 1024 at the corresponding pair of respectively first and second HF frequencies; and each of the one or more HF switching signal generators 1024 is arranged to supply pairs of first and second switching signals to one or more pairs of first and second self-synchronous radio frequency rectifiers/amplifiers 1025A, 1025B; and to establish and control a mutual phase relationship between the first and second switching signals in each pair of switching signals.

It is to be noted that, unless specifically otherwise stated, the first switching signals in the plurality of pairs of HF switching signals do not have to have the same frequency and the corresponding first HF power signals in the plurality of pairs of HF power signals do not have to have the same frequency. The same separately holds true for the second switching signals in the plurality of pairs of switching signals and the corresponding second HF power signals in the plurality of pairs of HF power signals.

As shown in FIG. 37C, in some embodiments (in this case, system 950C), the at least one DC source 1028 may be single DC source 1028; the at least one pair of first and second self-synchronous radio frequency rectifiers/amplifiers 1025A, 1025B may be a plurality of self-synchronous radio frequency rectifiers/amplifiers 1025A, 1025B (two pairs in the example of FIG. 37C) all in communication with the single DC source 1028; and the one or more HF switching signal generators 1024 may be single HF switching signal generator 1024 arranged to provide corresponding pairs of first and second switching signals to the plurality of pairs of first and second self-synchronous radio frequency rectifiers/amplifiers 1025A, 1025B. In FIG. 37C the switching signal pair ($\psi_A$, $\psi_B$) is shown as being provided to a first pair of self-synchronous radio frequency rectifiers/amplifiers 1025A, 1025B and switching signal pair ($\psi_A'$, $\psi_B'$) is shown as being provided to a second pair of self-synchronous radio frequency rectifiers/amplifiers 1025A, 1025B. HF power link system 1065 mixes pairs of the HF power signals from the pairs of self-synchronous radio frequency rectifiers/amplifiers 1025A, 1025B. Several detailed embodiments described below conform to the circuit topology described here with reference to FIG. 37C.

As shown in FIG. 37D, in some embodiments (in this case, system 950D), the at least one DC source 1028 may be a plurality of DC sources 1028; the at least one pair of first and second self-synchronous radio frequency rectifiers/amplifiers 1025A, 1025B may be a corresponding plurality of pairs of self-synchronous radio frequency rectifiers/amplifiers 1025A, 1025B each pair in communication with a corresponding one of the plurality of DC sources 1028; and the one or more HF switching signal generators 1024 may be a plurality of HF switching signal generators 1024 each arranged to provide one corresponding pair of first and second switching signals to a corresponding one of the plurality of pairs of first and second self-synchronous radio frequency rectifiers/amplifiers 1025A, 1025B. In FIG. 37D, as in FIG. 37C, the switching signal pair ($\psi_A$, $\psi_B$) is shown as being provided to a first pair of self-synchronous radio frequency rectifiers/amplifiers 1025A, 1025B and switching signal pair ($\psi_A'$, $\psi_B'$) is shown as being provided to a second pair of self-synchronous radio frequency rectifiers/amplifiers 1025A, 1025B. HF power link system 1065 mixes a pair of switching signals ($\psi_A$, $\psi_B$) from the first pair of self-synchronous radio frequency rectifiers/amplifiers 1025A, 1025B together and mixes a pair of switching signals ($\psi_A'$, $\psi_B'$) from the second pair of self-synchronous radio frequency rectifiers/amplifiers 1025A, 1025B together. When there are additional pairs of self-synchronous radio frequency rectifiers/amplifiers 1025A, 1025B that output additional pairs of switching signals, each of the additional pairs of switching signals may be mixed by HF power link system 1065 and respectively output a power signal that is transferred to unfolding circuit 1069. For example, a first pair of switching signals may be mixed (without mixing the other pairs of switching signals) to produce a first power signal, a second pair of switching signals may be mixed to produce a second power signal, etc. Several detailed embodiments described below conform to the circuit topology described here with reference to FIG. 37D. This topological circuit arrangement is useful in particular in photovoltaic array panel systems, such as described with reference to FIGS. 20A and 20B.

The power signal conversion circuit 950C, 950D of FIGS. 37C and 37D may comprise switched mode rectifier 1067 configured to receive the transferred power signal from HF power link system 1065 and rectify the transferred power signal to produce a rectified power signal; and unfolding circuit 1069 configured to receive the rectified power signal from switched mode rectifier 1067 and unfold the rectified power signal to produce the output power signal.

The first and second self-synchronous radio frequency rectifiers/amplifiers 1025A, 1025B in each pair in FIGS. 37C and 37D may be configured to operate in a rectifying mode and switched mode rectifier 1067 may be configured to operate in an always-on mode, thereby allowing power to be extracted from variable load 1070' and transferred to the at least one DC source 1028 via power signal conversion circuit (elements 1067 and 1069) and HF power link system 1065.

Unfolding circuit (elements 1067 and 1069) in FIGS. 37C and 37D may be configured to receive a reference signal from variable load 1070' to unfold the rectified power signal synchronous with a signal in variable load 1070'. Power signal conversion circuit (elements 1067 and 1069), HF power link system 1065, and the plurality of pairs of self-synchronous radio frequency rectifiers/amplifiers 1025A, 1025B may be configured to communicate control information to the at least one HF switching signal generator 1024 from the rest of system 950C, 950D. System 950C, 950D may further comprise one or more controllers 1080 in data communication with a plurality of elements of system 950C, 950D and configured to control the plurality of elements. The system 950C, 950D may further comprise an isolatable load information circuit configured to communicate to the at least one HF switching signal generator 1024 information about at least one of a DC level, a frequency and a phase of a power signal in variable load 1070'. The load information circuit may comprise phase lock loop 1095. The load information circuit may further comprise isolator system 1090. Isolator system 1090 may comprise an air gap.

HF power link system 1065 of systems 950C, 950D of FIGS. 37C and 37D may comprise a wireless power link system. Wireless HF power link system 1065 may comprise a bimodal wireless HF power link system. HF power link system 1065 may comprise a wired power link system.

In three phase-difference based implementations described immediately hereafter, the first and second HF frequencies within each pair of HF frequencies may be the same frequency and the first and second switching signals within each pair of switching signals may have between them a mutual phase difference $\Delta\phi$ adjustable by the corresponding HF switching signal generator. Note that the first switching signals among the plurality of pairs of switching signals do not have to have the same phase and the corresponding first HF power signals among the corresponding plurality of pairs of HF power signals do not have to have the same phase. Note also that all three implementations hold for both the FIG. 37C topology and the FIG. 37D topology.

In a first phase-difference based implementation, at least one of HF switching signal generators 1024 may be configured to adjust the mutual phase difference between the first and second switching signals within at least one corresponding pair of switching signals based on the DC level in variable load 1070' to thereby produce from HF power link system 1065 and rectifier 1067 the transferred power signal as a DC signal correspondingly adjusted in amplitude.

In a second phase-difference based implementation, all HF switching signal generators 1024 may be configured to modulate the mutual phase difference between the first and second switching signals within each pair of switching signals at a phase modulation frequency that is derived from the frequency of the power signal in variable load 1070' to thereby produce from HF power link system 1065 the transferred power signal as an AC power signal modulated at the frequency of the power signal in variable load 1070'.

In a third phase-difference based implementation, at least one of the one or more HF switching signal generators 1024 may be configured to modulate the mutual phase difference between the first and second switching signals within at least one of the plurality of pairs of switching signals at a phase modulation frequency that is derived from the frequency of the power signal in variable load 1070' to thereby produce from the HF power link system the transferred power signal as a DC power signal bearing a portion of signal modulated at the frequency of the power signal in variable load 1070'.

In a frequency-difference based implementation, the first and second HF frequencies in each pair of HF frequencies may differ by a difference frequency $\Delta f$. The HF switching signal generators 1024 may be configured to determine the first and second HF frequencies in each pair of switching signals and to set the difference frequency $\Delta f$ in each pair to double the frequency of the power signal in variable load 1070'. HF power link system 1065 may be arranged to produce the transferred power signal at the difference frequency $\Delta f$ and power signal conversion circuit (elements 1067 and 1069) may be configured to supply the output power signal to variable load 1070' at the frequency of the power signal in variable load 1070'.

With reference to systems 950C and 950D of FIGS. 37C and 37D a method is provided for transferring power between at least one DC source 1028 and variable load 1070', the method comprising: extracting from each of the at least one DC source 1028 at least one pair of first and second HF power signals at a corresponding pair of respectively first and second HF frequencies using a corresponding pair of respectively first and second self-synchronous radio frequency rectifiers/amplifiers 1025A, 1025B; receiving and mixing in HF power link system 1065 the first and second HF power signals of each pair together to produce a transferred power signal; producing in power signal conversion circuit (elements 1067 and 1069) in communication with HF power link system 1065 and variable load 1070' an output power signal from the transferred power signal; and supplying the output power signal to variable load 1070'. Each pair of first and second self-synchronous radio frequency rectifiers/amplifiers 1025A, 1025B is configured to extract a corresponding pair of first and second HF power signals from a single one of the at least one DC source 1028.

The method further comprises: supplying from one or more HF switching signal generators 1024 to one or more pairs of the first and second self-synchronous radio frequency rectifiers/amplifiers 1025A, 1025B a plurality of pairs of first and second HF switching signals at corresponding pairs of respectively first and second HF frequencies; and establishing and controlling in the one or more HF switching signal generators 1024 a mutual phase relationship between the first and second switching signals in each pair. Each of the at least one pair of first and second self-synchronous radio frequency rectifiers/amplifiers 1025A, 1025B is arranged to receive a corresponding pair of first and second switching signals from a single one of the one or more HF switching signal generators 1024 at the corresponding pairs of respectively first and second HF frequencies.

It is to be noted that, unless specifically otherwise stated, the first switching signals in the plurality of pairs of HF switching signals do not have to have the same frequency and the corresponding first HF power signals in the plurality of pairs of HF power signals do not have to have the same frequency. The same separately holds true for the second switching signals in the plurality of pairs of switching signals and the corresponding second HF power signals in the plurality of pairs of HF power signals.

In the method described above, and with reference to the embodiment of FIG. 37C, the at least one DC source 1028 may be single DC source 1028; the at least one pair of first and second self-synchronous radio frequency rectifiers/amplifiers 1025A, 1025B may be a plurality of self-synchronous radio frequency rectifiers/amplifiers 1025A, 1025B all in communication with the single DC source 1028; and the one or more HF switching signal generators 1024 may be a single HF switching signal generator arranged to provide corresponding pairs of first and second switching signals to the plurality of pairs of first and second self-synchronous radio frequency rectifiers/amplifiers 1025A, 1025B.

In the method described above, and with reference to the embodiment of FIG. 37D, the at least one DC source 1028 may be a plurality of DC sources 1028; the at least one pair of first and second self-synchronous radio frequency rectifiers/amplifiers 1025A, 1025B may be a plurality of pairs of self-synchronous radio frequency rectifiers/amplifiers 1025A, 1025B each pair in communication with a corresponding one of the plurality of DC sources 1028; and the one or more HF switching signal generators 1024 may be a plurality of HF switching signal generators 1024 each arranged to provide one corresponding pair of first and second switching signals to a corresponding one of the plurality of pairs of first and second self-synchronous radio frequency rectifiers/amplifiers 1025A, 1025B.

Returning to the methods pertaining to both FIGS. 37C and 37D, the method may further comprise receiving and rectifying in switched mode rectifier 1067 of the power signal conversion circuit the transferred power signal from HF power link system 1065 and receiving and unfolding in unfolding circuit 1069 of the power signal conversion circuit the rectified power signal from switched mode rectifier 1067 to produce the output power signal.

The method may further comprise setting the first and second self-synchronous radio frequency rectifiers/amplifiers 1025A, 1025B in each pair to a rectifying mode; setting switched mode rectifier 1067 to an always-on mode; extracting power from variable load 1070'; and transferring the extracted power to the at least one DC source 1028 via power signal conversion circuit (elements 1067 and 1069 of FIGS. 37C and 37D) and HF power link system 1065.

The method may further comprise unfolding the rectified power signal synchronous with a signal in variable load 1070' based on a reference signal from variable load 1070'; communicating control information to the at least one HF switching signal generator 1024 from the rest of the system, via power signal conversion circuit (elements 1067 and 1069), HF power link system 1065, and the pairs of self-synchronous radio frequency rectifiers/amplifiers 1025A, 1025B; controlling a plurality of elements of system 950C, 950D by use of one or more controllers 1080 in data communication with the plurality of elements; and communicating to the at least one HF switching signal generator 1024 information about at least one of a DC level, a frequency and a phase of a power signal in variable load 1070' using an isolatable load information circuit comprising phase lock loop 1095 and optional isolator system 1090.

Transferring the power signal in the HF power link system may comprise wirelessly transferring the power signal; wirelessly transferring the power signal in the HF power link system may comprise bimodal wirelessly transferring the power signal; and transferring the power signal in the HF power link system may comprise wired transferring the power signal.

In three phase-difference based implementations described immediately hereafter with reference to FIGS. 37C and 37D, the first and second HF frequencies within each pair of HF frequencies may be the same frequency and the first and second switching signals within each pair of switching signals may have between them a mutual phase difference adjustable by the corresponding HF switching signal generator. Note that the first switching signals among the plurality of pairs of switching signals do not have to have the same phase and the corresponding first HF power signals among the corresponding plurality of pairs of HF power signals do not have to have the same phase.

The method for the first phase-difference based implementation comprises: adjusting the mutual phase difference between the first and second switching signals within at least one corresponding pair of switching signals based on the DC level in variable load 1070' to produce from HF power link system 1065 the transferred power signal as a DC signal correspondingly adjusted in amplitude. The mutual phase difference is adjusted by use of at least one of HF switching signal generators 1024.

The method for the second phase-difference based implementation comprises: modulating the mutual phase difference between the first and second switching signals within each pair of switching signals at a phase modulation frequency that is derived from the frequency of the power signal in variable load 1070' to produce from HF power link system 1065 the transferred power signal as an AC power signal modulated at the frequency of the power signal in variable load 1070'. The mutual phase difference is adjusted by use of all HF switching signal generators 1024.

The method for the third phase-difference based implementation comprises: modulating the mutual phase difference between the first and second switching signals within at least one of the plurality of pairs of switching signals at a phase modulation frequency that is derived from the frequency of the power signal in variable load 1070' to produce from HF power link system 1065 the transferred power signal as a DC power signal bearing a portion of signal modulated at the frequency of the power signal in variable load 1070'. The mutual phase difference is adjusted by means of at least one HF switching signal generator 1024.

In a frequency-difference based implementation, the first and second HF frequencies in each pair of HF frequencies may differ by a difference frequency Δf. The method comprises: determining the first and second HF frequencies in each pair of the corresponding first and second switching signals; setting the difference frequency Δf in each pair to double the frequency of the power signal in variable load 1070'; producing the transferred power signal from HF power link system 1065 at the difference frequency Δf; and supplying the output power signal to variable load 1070' at the frequency of the power signal in variable load 1070.

In the following several paragraphs, implementations of systems for transferring electrical power from DC power sources will be presented. The DC power sources may comprise, by way of example, a plurality of photovoltaic cells and may be implemented as an array of photovoltaic cells, also known as "solar cells". Other suitable DC power sources may include without limitation traditional non-rechargeable batteries, including for example carbon-zinc batteries, alkaline and zinc-air batteries; sea- and saltwater batteries; rechargeable batteries including for example lead-acid batteries, nickel-cadmium batteries, and lithium-ion batteries; fuel cells, including for example hydrogen fuel cells; thermoelectric generators such as Seebeck generators and radioisotope-based thermoelectric generators; and any combinations of the aforementioned battery types. By way of example, a solar panel system will be described with reference to FIG. 40 to FIG. 45 based on the power transfer arrangements of FIG. 37A to FIG. 39. As regards the electronic circuitry and power transfer schemes, the generalized example of FIG. 37D will be used, which specifically addresses power transfer from a plurality of DC power sources 1028 to single variable load 1070'. As already explained, load 1070' may be DC or AC. The implementations discussed below all have in common the property that each photovoltaic cell is provided with its own dedicated high frequency power module configured for power transfer. The implementations may differ in respect of which elements of FIG. 37D are integrated in the high frequency power modules and which elements are part of the solar panel system external to the high frequency power modules. The implementations may also differ in respect of whether they employ wired or wireless power transfer.

Figure 40:
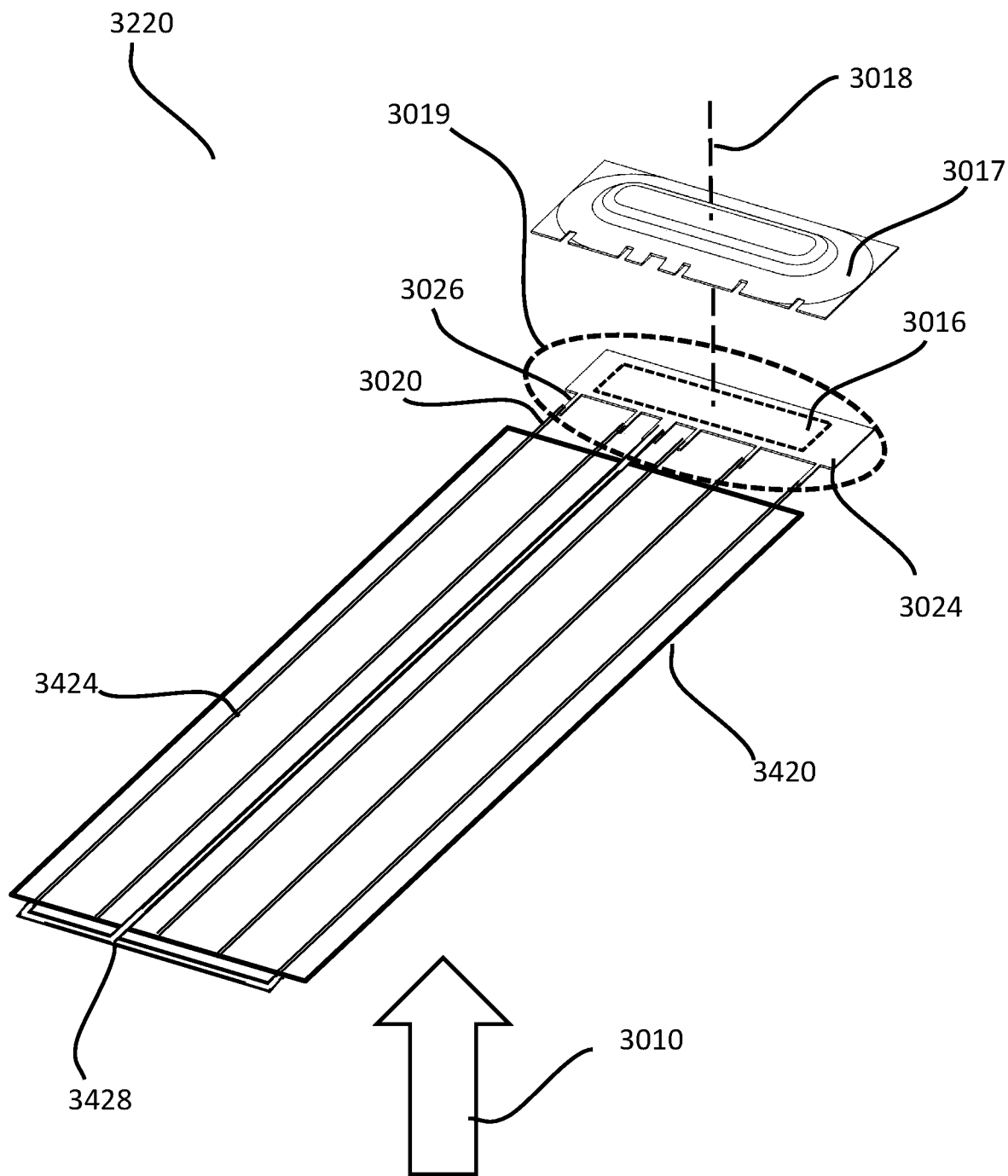
FIG. 40 shows an exploded rear view of a photovoltaic module for wireless transfer of power comprising a photovoltaic cell and a high frequency power module.

FIG. 40 shows a rear view of photovoltaic module 3220 comprising photovoltaic cell 3420 and high frequency power module 3019 proximate photovoltaic cell 3420. High frequency power module 3019 comprises high frequency power circuit 3016 on printed circuit board 3024. The view in FIG. 40 is exploded along axis 3018 showing protective cap 3017 for high frequency power module 3019 separate from high frequency power module 3019. Sunlight impinges on the front surface of photovoltaic cell 3420 along the direction of arrow 3010. Rear surface metallization strips 3424 and front surface metallization connector 3428 extend across photovoltaic cell 3420 and are connected with electrical contacts on PC board fingers 3026 to high frequency power circuit 3016 via metal ribbons 3020. In operation, photovoltaic cell 3420 transfers photovoltaically generated electrical power to high frequency power circuit 3016.

High frequency power circuit 3016 may be based, for example without limitation, on the system described with reference to FIG. 37D. As already explained, the system of FIG. 37D is capable of transferring power to a load that may be either DC or AC, to which end the term "variable load" is employed. The system of FIG. 37D is also capable of transferring power on a wired basis or a wireless basis. In the wireless mode, it may employ bimodal wireless power transfer. This has already been described with reference to FIG. 1, FIG. 19A and FIG. 35A. The system of FIG. 37D is also capable of transferring power using pairs of switching signals having a phase difference between the switching signals in a pair, or having a frequency difference between the switching signals in a pair.

Figure 41A:
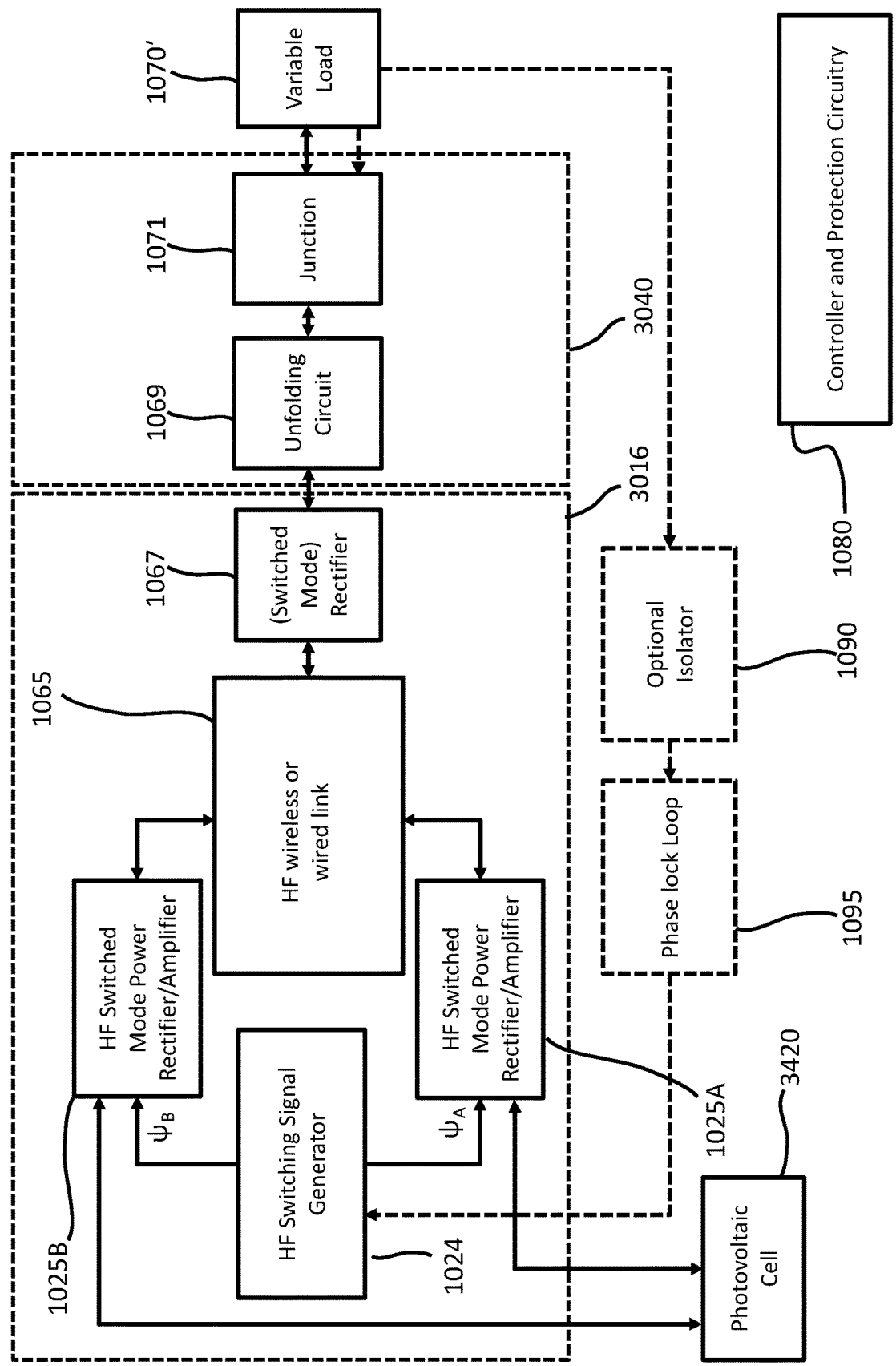
FIG. 41A shows a power transfer system for wireless or wired transfer of power from a photovoltaic cell in a solar panel having a plurality of photovoltaic cells to a variable power load which may be AC or DC.

FIG. 41A shows the circuit of FIG. 37D, adapted specifically for receiving and transferring power obtained from photovoltaic cell 3420 to variable load 1070'. FIG. 41A shows only single HF switching signal generator 1024 and only single pair of HF switched mode power rectifier/amplifiers 1025A and 1025B obtaining power from single photovoltaic cell 3420, as shown in FIG. 40. It is to be understood that, if there is a plurality of photovoltaic cells 3420 in a solar panel system of interest, then there will be one HF switching signal generator 1024 and one pair of HF switched mode power rectifier/amplifiers 1025A and 1025B dedicated to each of photovoltaic cells 3420 in the system. For the sake of clarity, FIG. 41A shows only the circuit elements relating to single photovoltaic cell 3420. Some of the system elements are shared among the photovoltaic cells of the array, while others may be included in high frequency power circuit 3016 for each individual photovoltaic cell 3420.

As compared with FIG. 37D, the circuit of FIG. 41A also has an additional element in the form of junction unit 1071, included in order to allow for components such as, for example, electromagnetic interference filters, wiring junctions and other such ancillary components. Such components are well-known to practitioners in the art, and shall not be any further described herein. They are typically shared by all of photovoltaic cells 3420 in the solar panel system.

Broken line box 3016 in FIG. 41A shows the elements of FIG. 41A that are incorporated in the disclosed high frequency power circuit 3016 dedicated to associated particular photovoltaic cell 3420. FIG. 41A also employs a further broken line box to show aggregator 3040 comprising a collection of elements of FIG. 41A that are shared by all photovoltaic cells 3420 in the solar panel system. Aggregator 3040 may be electrically wired to variable load 1070'. The way in which the elements of FIG. 41A are apportioned between high frequency power circuit 3016 and aggregator 3040 may differ from embodiment to embodiment, but frequency power circuit 3016 comprises at least HF switching signal generator 1024 and a pair of HF switched mode power rectifier/amplifiers 1025A and 1025B, while aggregator 3040 comprises at least junction unit 1071. Unfolding circuit 1069 and switched mode rectifier 1067 may be in either the high frequency power circuit 3016 or in aggregator 3040.

In the various implementations of FIG. 41A, HF link 1065, being either wired or wireless, is incorporated in high frequency power circuit 3016. This specifically allows for wireless power transfer even within high frequency power circuit 3016, and that wireless power transfer may be bimodal. Since wireless power transfer systems described herein are tuned resonant systems, power may also be efficiently transferred between high frequency power circuits 3016 associated with different photovoltaic cells 3420 in the system.

One specific implementation of bimodal wireless power transfer requires a more detailed depiction of HF link 1065. This is done in FIG. 41B. In this particular wireless power transfer arrangement, transmitter module 20''' and transmitter resonator 30''' are incorporated in high frequency power circuit 3016, while receiver module 40''' is incorporated in aggregator 3040. Associated receiver resonator 3050 is employed as a discrete element and is neither incorporated in high frequency power circuit 3016 nor in aggregator 3040. While transmitter module 20''' may function similarly as transmitter module 20'' of FIG. 19A, which is based on FIG. 6, transmitter module 20''' excludes oscillator 26A'', power amplifier 26B'', and transmitter controller 22'' of transmitter module 20'' of FIG. 19A, because the functions of these three elements are performed in the circuit of FIG. 41B by HF switching signal generator 1024, HF switched mode rectifier/amplifiers 1025A and 1025B, and controller 1080, respectively. While receiver module 40''' may function similarly as receiver module 40'' of FIG. 19A, which is based on FIG. 7, receiver module 40''' excludes rectifier 46D, load manager 46E, and receiver controller 42 of FIG. 7, because the functions of these three elements are performed by switched mode rectifier 1067, unfolding circuit 1069, and controller 1080, respectively.

Figure 41B:
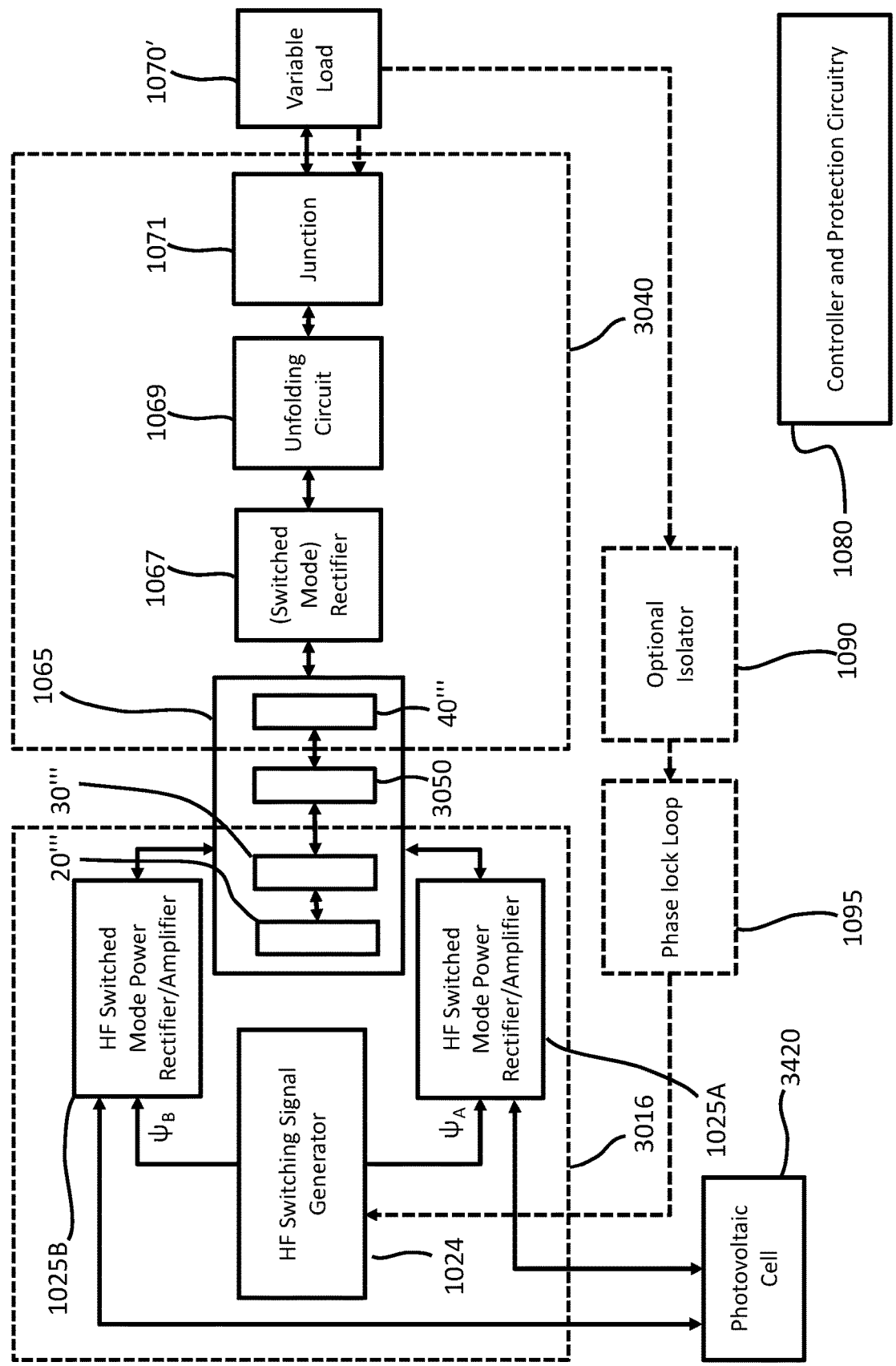
FIG. 41B shows a bimodal wireless power transfer system for transfer of power from a photovoltaic cell in a solar panel having a plurality of photovoltaic cells to a variable power load which may be AC or DC.

The systems shown in FIGS. 41A and 41B are based on FIG. 37D, and, as such, may employ either the $\Delta f$ mode or the $\Delta\phi$ mode to transfer to variable load 1070' either AC (via either the $\Delta f$ mode or the $\Delta\phi$ mode) or DC power (via the $\Delta\phi$) mode, or even a combination of both forms of power where allowed by relevant authorities. When AC power is transferred, the elements of high frequency power circuit 3016 in the systems of both FIGS. 41A and 41B may be phase locked to the existing power signal in load 1070' using the isolatable load information circuit comprising phase lock loop 1095 and optional isolator 1090 in FIGS. 41A and 41B. Alternatively, the information required for HF signal generator 1024 to provide appropriate switching signals $\psi_A$ and $\psi_B$ to HF switched mode power rectifier/amplifiers 1025A and 1025B may in practical implementations be directed in the reverse direction along the power transmission path to HF switching signal generator 1024 via unfolding circuit 1069, switched mode rectifier 1067, HF power link system 1065 and HF switched mode power amplifiers 1025A and 1025B. The ability of HF power link systems 1065 to do such transfer of information has been described before herein with reference to FIG. 7 and FIG. 1. Since this may be done in phase for all individual photovoltaic cells 3420 in the solar panel system, the power signals sourced from the plurality of photovoltaic cells 3420 may be aggregated in phase by aggregator 3040. Controller 1080 may be configured to communicate to HF switching signal generator 1024 at least one of a frequency and a phase based on information about load 1070' and DC source 1028, which, in the photovoltaic implementation, is photovoltaic cell 3420.

Isolatable load information circuit comprising phase lock loop 1095 and optional isolator 1090 in both FIGS. 41A and 41B may, in some embodiments, be incorporated in high frequency power circuits 3016. In some embodiments, controller 1080 and associated protection circuitry may similarly be incorporated in high frequency power circuit 3016 for the systems of both FIGS. 41A and 41B.

Figure 42A:
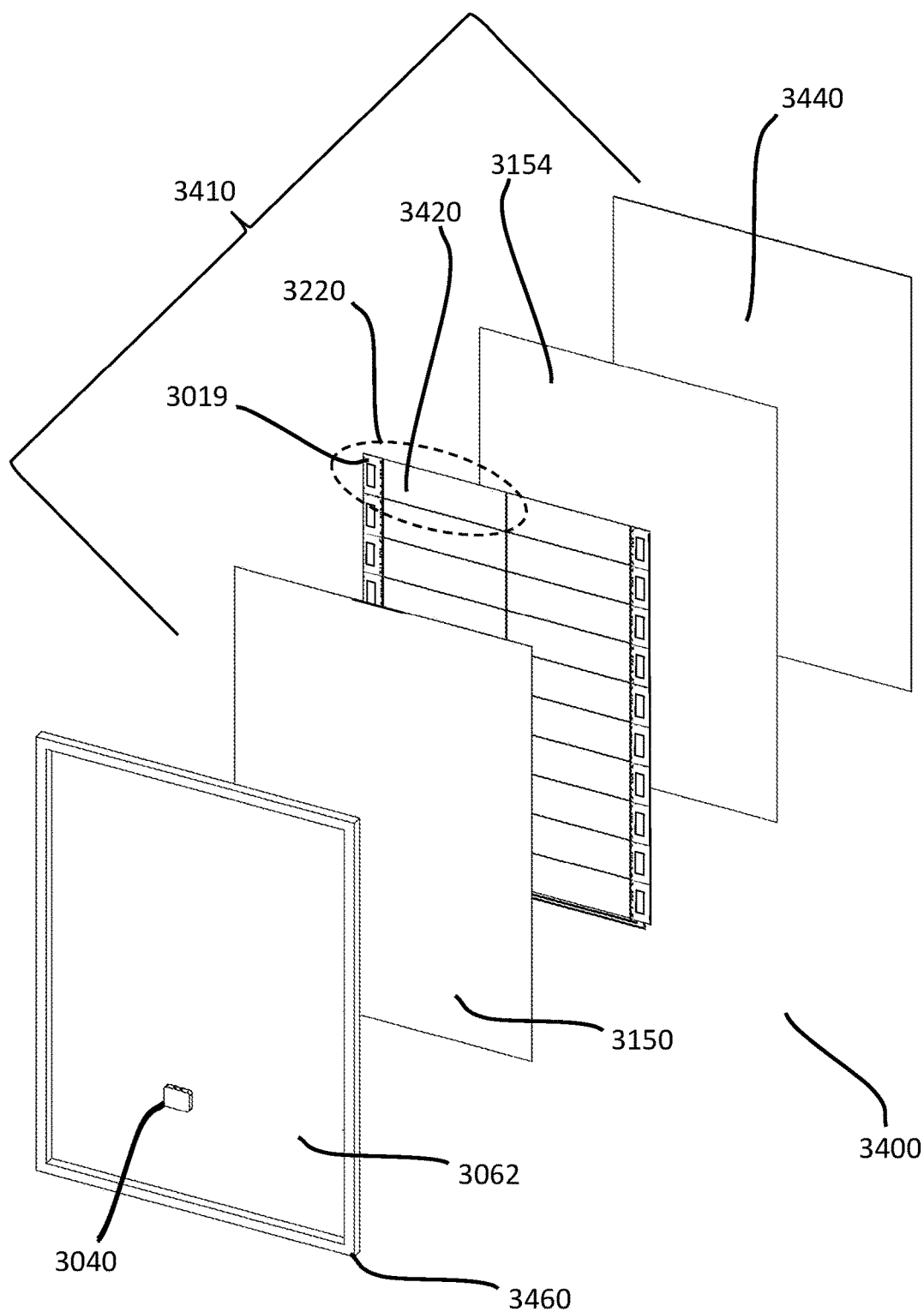
FIG. 42A is a schematic exploded rear view drawing of a solar panel for wireless or wired transfer of power based on an array of photovoltaic modules before conformal application of an encapsulation layer.
Figure 42B:
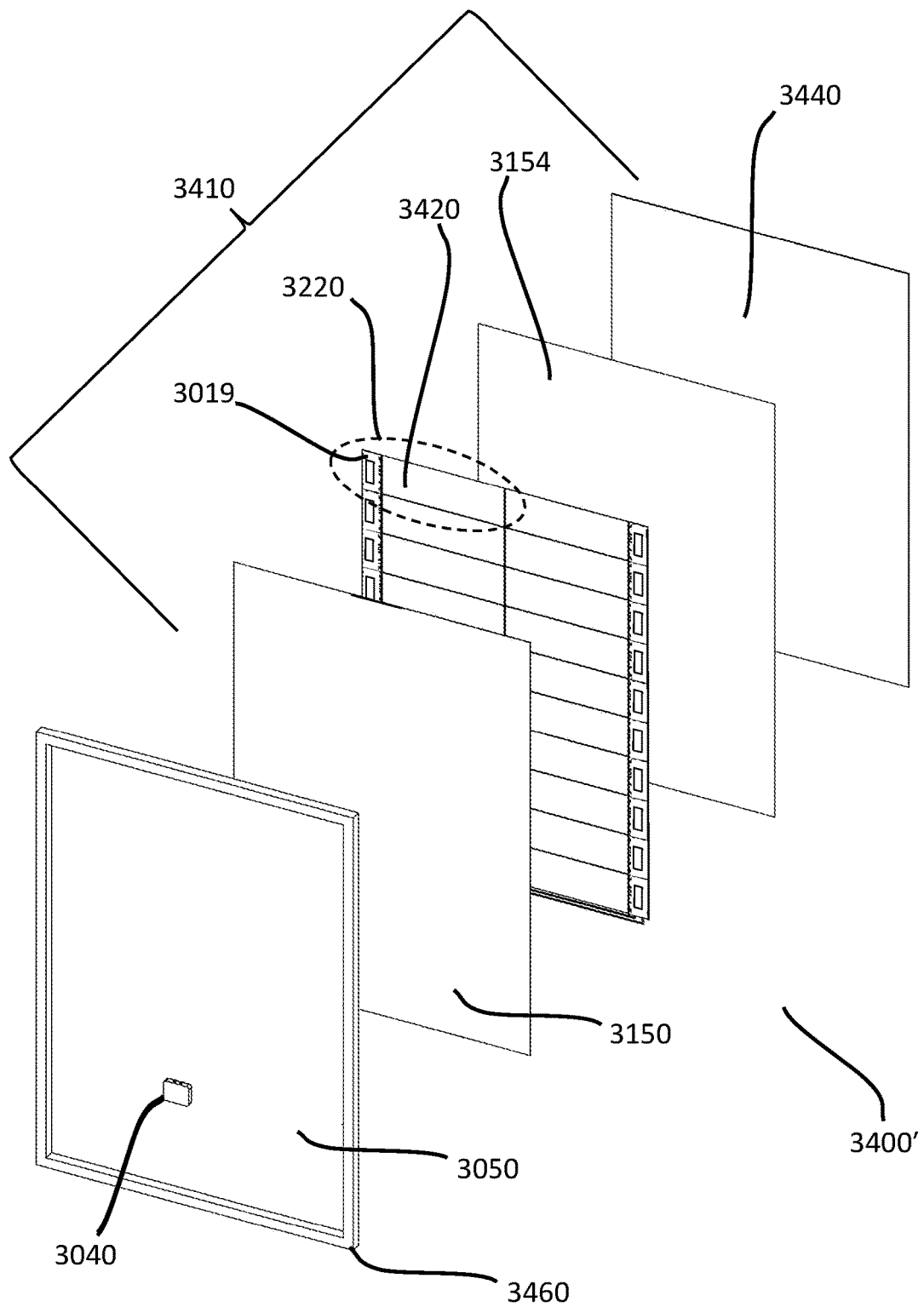
FIG. 42B is a schematic exploded rear view drawing of a solar panel for bimodal wireless transfer of power based on an array of photovoltaic modules before conformal application of an encapsulation layer.

The arrangements of FIGS. 41A and 41B described above lead to two different solar panel system structures, shown in respectively FIG. 42A and FIG. 42B. FIG. 42A is an exploded schematic rear view drawing of solar panel 3400 based on an array of photovoltaic modules 3220 of FIG. 40 employed as per the arrangement of FIG. 41A. High frequency power modules 3019, comprising high frequency power circuits 3016, obtain power from photovoltaic cells 3420 and protective caps 3017 shown in FIG. 40 are omitted from photovoltaic modules 3220 for the purpose of showing high frequency power modules 3019. Solar panel 3400 further comprises transparent solar cover 3440 and frame 3460. Aggregator 3040 may be located on frame 3460, or on a suitably dimensioned protective sheet 3062 filling frame 3460. Solar panel 3400 may optionally comprise an additional optically transparent polymeric layer 3154 between photovoltaic cells 3420 and transparent solar cover 3440. Grouping 3410 of elements in FIG. 42A, also referred to below as a "lamination stack", includes encapsulation layer 3150; the array of photovoltaic modules 3220 before conformal application of encapsulation layer 3150; optional additional optically transparent polymeric layer 3154; and transparent solar cover 3440.

FIG. 42B is an exploded schematic rear view drawing of solar panel 3400' of FIG. 41B based on an array of photovoltaic modules 3220 of FIG. 40 employed as per the arrangement of FIG. 41B. High frequency power modules 3019, comprising high frequency power circuits 3016, obtain power from photovoltaic cells 3420 and protective caps 3017 shown in FIG. 40 are omitted from photovoltaic modules 3220 for the purpose of showing high frequency power modules 3019. Solar panel 3400' further comprises transparent solar cover 3440 and frame 3460. Aggregator 3040 may be located on frame 3460, or on receiver resonator 3050 within frame 3460. Whereas receiver resonator 3050 is shown as a single large plate in FIG. 42B, in other embodiments receiver resonator 3050 may be implemented as a grid or wire structure. Such an arrangement is useful in bifacial solar panels which may be illuminated from the rear side in addition to the front side. Solar panel 3400' may optionally comprise additional optically transparent polymeric layer 3154 between photovoltaic cells 3420 and transparent solar cover 3440. Grouping 3410 of elements in FIG. 42B, also referred to below as a "lamination stack", includes encapsulation layer 3150; the array of photovoltaic modules 3220 before conformal application of encapsulation layer 3150; optional additional optically transparent polymeric layer 3154; and transparent solar cover 3440. As is evident from comparing FIGS. 42A and 42B, a structural difference between the two implementations is the use of receiver resonator 3050 as a distinct element of the system of FIGS. 41B and 42B, while any receiver resonator 3050, if present in the system of FIGS. 41A and 42A, is incorporated within high frequency power circuit 3016.

Figure 43A:
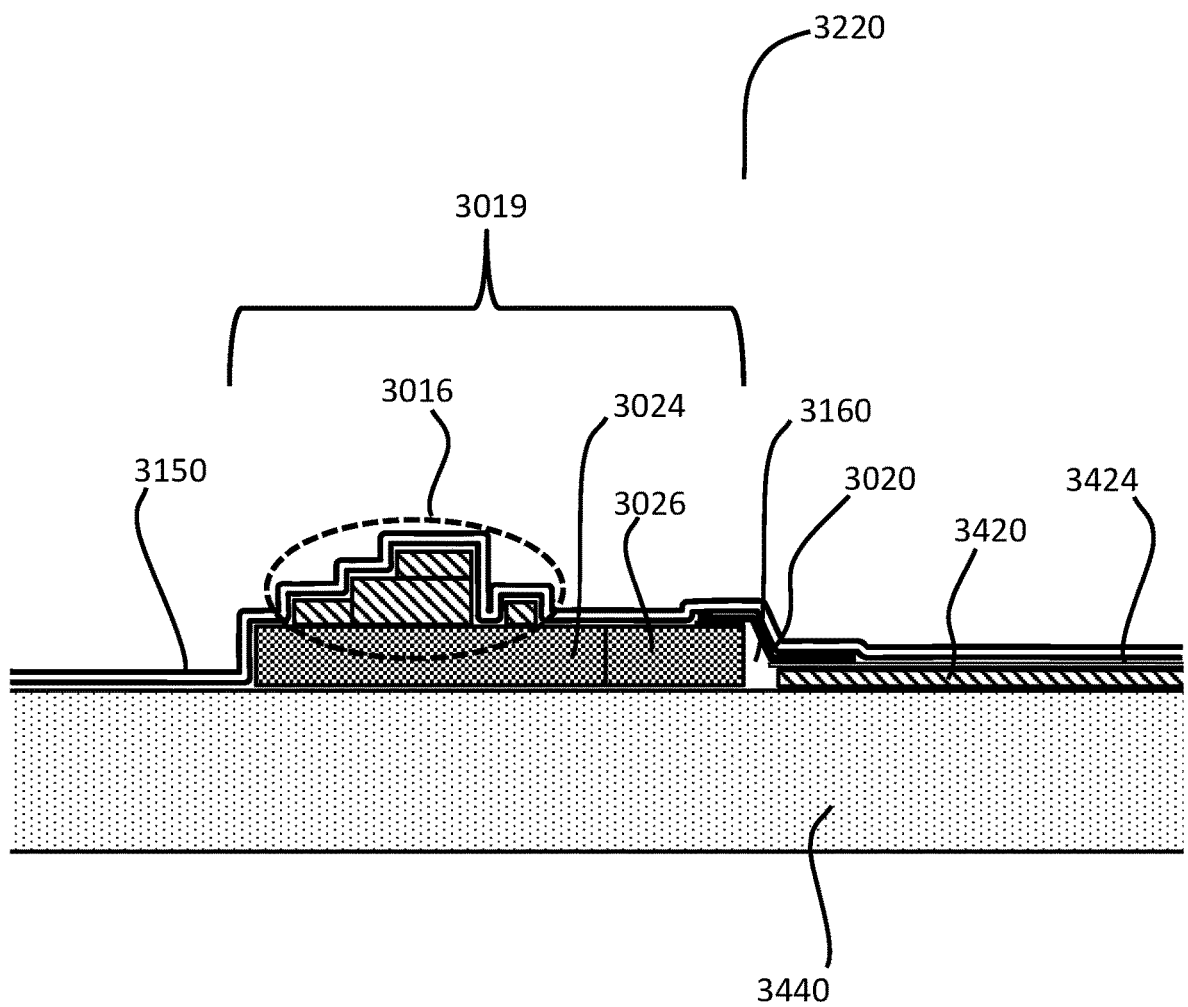
FIG. 43A shows a schematic side view of a photovoltaic module encapsulated under a conformal encapsulation layer.

The fabrication of photovoltaic modules 3220 is now be addressed with reference to FIGS. 43A, 43B, 44 and 45. FIG. 43A shows a schematic side view, not to scale, of a portion of photovoltaic module 3220 of FIG. 40 comprising photovoltaic cell 3420 and high frequency power module 3019. The front solar radiation receiving surface of photovoltaic cell 3420 is disposed on transparent solar cover 3440. Transparent solar cover 3440 may be composed of suitably solar radiation-transparent glass. PC board 3024 of high frequency power module 3019 is similarly mounted on transparent solar cover 3440 proximate photovoltaic cell 3420 with high frequency power circuit 3016 on the opposing side of printed circuit board 3024 from transparent solar cover 3440. The relative dimensions of elements in FIG. 43A have been exaggerated for clarity. Photovoltaic module 3220 is encapsulated under conformal encapsulation layer 3150 disposed on the rear of photovoltaic module 3220 and extending onto transparent solar cover 3440. Conformal encapsulation layer 3150 is applied by thermal vacuum sealing as further described below so that any encapsulation gap, for example gap 3160, is at lower than ambient air pressure.

Figure 43B:
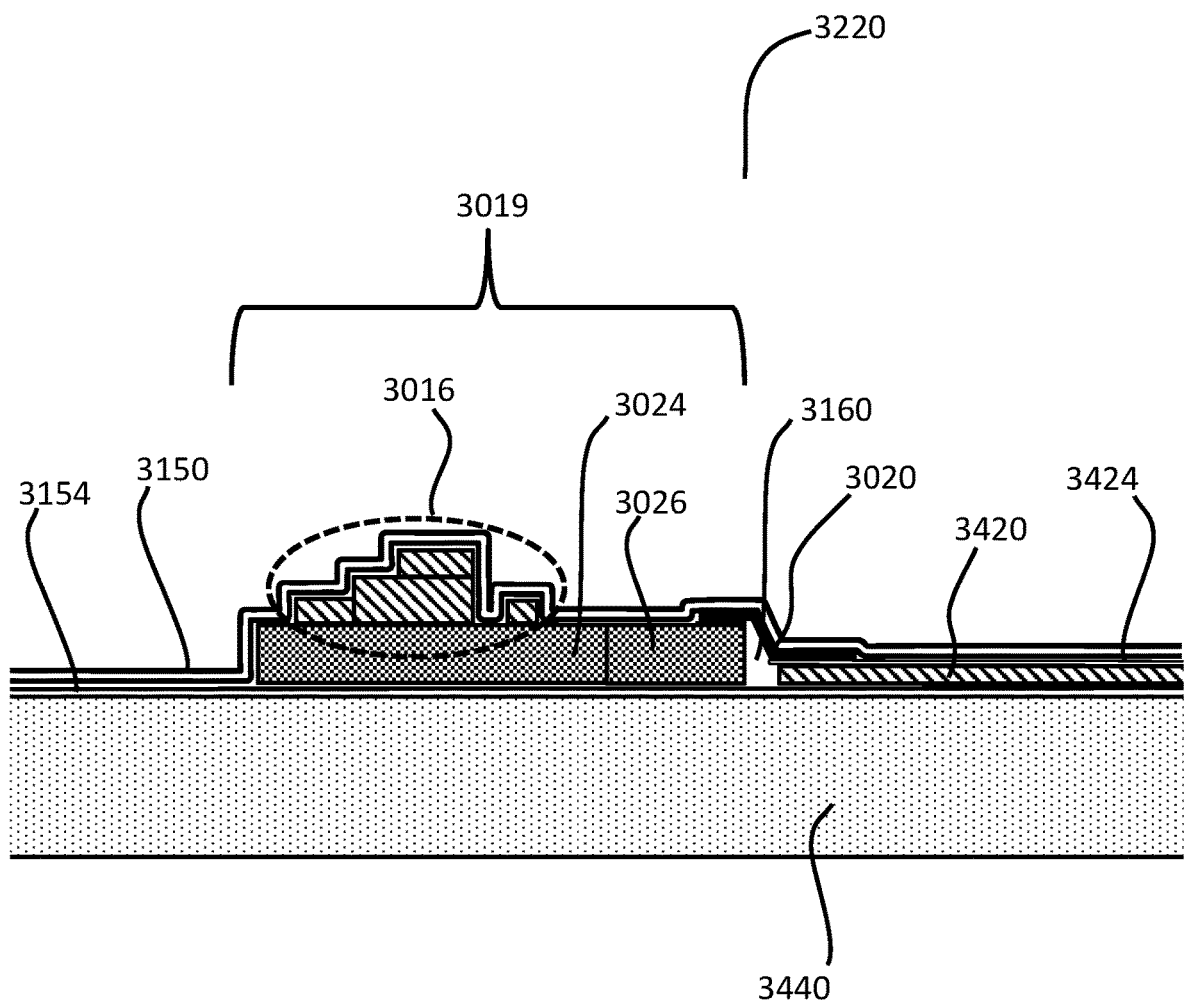
FIG. 43B shows a schematic side view of a further implementation of a photovoltaic module encapsulated under a conformal encapsulation layer.

In some embodiments, shown in FIG. 43B, the surface of transparent solar cover 3440 facing photovoltaic module 3220 may comprise optional additional optically transparent polymeric layer 3154. The material of layer 3154 may include, for example without limitation, ethylene vinyl acetate (EVA). Optional additional optically transparent polymeric layer 3154 may enhance the bonding of photovoltaic module 3220 and conformal encapsulation layer 3150 to transparent solar cover 3440 whilst still allowing transmission of the solar radiation.

A method of production of solar panel 3400 is described herein based on the elements of FIGS. 42A and 43A and a wired power transfer implementation of FIG. 41A. The making of solar panel 3400' based on the elements of FIG. 42B with the wireless power transfer implementation of FIG. 41B proceeds in a similar way, the difference being that, in the wired power transfer case, wiring from the high frequency power module 3019 is routed to aggregator 3040. Encapsulation layer 3150, in the form shown in FIG. 43A, may be conformally applied by thermal vacuum sealing thermally deformable polymeric sheet 3150 of FIG. 42A to transparent solar cover 3440 over the array of photovoltaic modules 3220 using a thermal vacuum laminating machine. Machines of this general type are also arranged to apply mechanical pressure to an arrangement or stack of encapsulation sheets and solar cells whilst being heated under vacuum. The active solar radiation-receiving "front" surface of the array of photovoltaic modules 3220 may be laid on transparent solar cover 3440 and thermally deformable polymeric sheet 3150 laid over the rear of the array of photovoltaic modules 3220 to produce lamination stack 3410 before insertion into the laminating machine. Air is evacuated from the laminating machine and heat is applied. Mechanical pressure may be applied in direction normal to the plane of the stack of the sheets and solar cells during the heating. Under the action of ambient air pressure returned to the laminating machine, thermally deformable polymeric sheet 3150 is forced onto transparent solar cover 3440, conformally encapsulating the array of photovoltaic modules 3220, thus resulting in conformal encapsulation layer 3150 shown in FIGS. 43A and 43B. As a result of the above method of vacuum sealing, any encapsulation gap, for example gap 3160 of FIG. 43A or FIG. 43B, is at lower than ambient air pressure.

In some embodiments, protective caps 3017 (see FIGS. 40A and 40B) may be placed over high frequency power module 3019 of photovoltaic modules 3220. Protective cap 3017 may comprise one or more polymers including without limitation polyamide; polyphenylene oxide; polyphenylene sulfide; polylactic acid; polyetheretherketone; acrylonitrile butadiene styrene; polycarbonates; polyethylene terephthalate glycol; acrylonitrile styrene acrylate; polyethylene; polypropylene; polyoxymethylene; polybenzimidazole; polyether sulfone; polyetherimide; polyvinylidene difluoride; polytetrafluoroethylene. A cap formed of any one or more of these compounds may provide suitable protection for high frequency power module 3019. Protective cap 3017 may be placed over high frequency power module 3019 before or after encapsulation. Protective cap 3017 may be encapsulated under conformal encapsulation layer 3150 as an enclosure.

Conformal encapsulation layer 3150 serves as a protection for photovoltaic modules 3220. Conformal encapsulation layer 3150 may comprise one or more layers of cross-linkable and thermally deformable polymeric materials, including but not limited to polyethylene terephthalate; biaxially oriented polyethylene terephthalate; ethylene vinyl acetate; fluorinated coating; fluorinated polyester; polyvinyl fluoride; polyvinylidene fluoride; polyethylene vinyl acetate; polyethylene naphthalate; ethylene tetrafluoroethylene; fluoroethylene vinyl ether; tetrafluoroethylene hexafluoropropylene vinylidene fluoride copolymer; polyamide; polypropylene; polyethylene; polyvinylidene fluoride-short sugar palm fiber.

Figure 44:
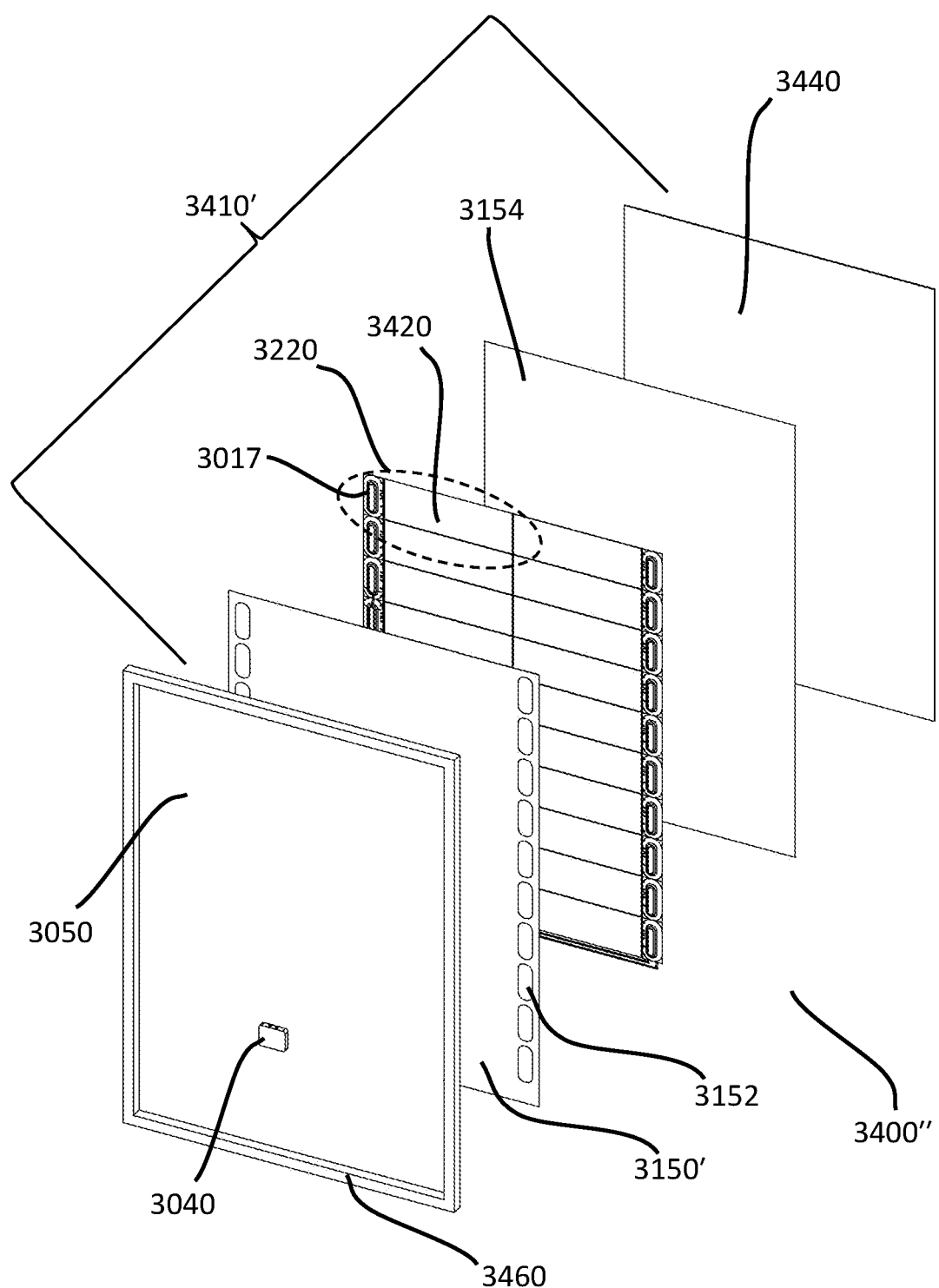
FIG. 44 is a schematic exploded rear view drawing of a solar panel for wireless transfer of power based on an array of photovoltaic modules including protective caps before conformal application of an encapsulation layer and employs the system of FIG. 42B as example.

In some embodiments, protective cap 3017 may protrude through conformal encapsulation layer 3150. In some embodiments, as shown in FIG. 44, protective caps 3017 obscure high frequency power modules 3019. In FIG. 44, lamination stack 3410' for the embodiment of solar panel 3400" includes thermally deformable polymeric sheet 3150'. Prior to lamination, suitable holes 3152 may be fashioned in thermally deformable polymeric sheet 3150' above protective caps 3017, the holes having lateral dimensions smaller than those of protective caps 3017 in order to preserve the integrity of the resulting seal between encapsulation layer 3150' and caps 3017. FIG. 44 is based on the system of FIG. 42B, but may equally well be applied to the system of FIG. 42A.

In some embodiments, additional optically transparent polymeric sheet 3154 shown in FIGS. 42A, 42B and 44 may be placed between transparent solar cover 3440 and photovoltaic modules 3220 before the lamination process. The embodiments shown in FIGS. 40, 42A, 42B, 43A, 43B and 44 all have high frequency power modules 3019 (it is obscured in FIG. 44) disposed proximate and laterally with respect to the corresponding individual photovoltaic cells 3420. In other embodiments, high frequency power modules 3019 may be disposed on insulating layers disposed on the rear surfaces of corresponding photovoltaic cells 3420. This particular arrangement ensures that a maximum of solar radiation is captured by the front surfaces of photovoltaic cells 3420 and high frequency power modules 3019 do not occupy precious radiation-gathering area that could have been occupied by photovoltaic cells 3420.

Figure 45:
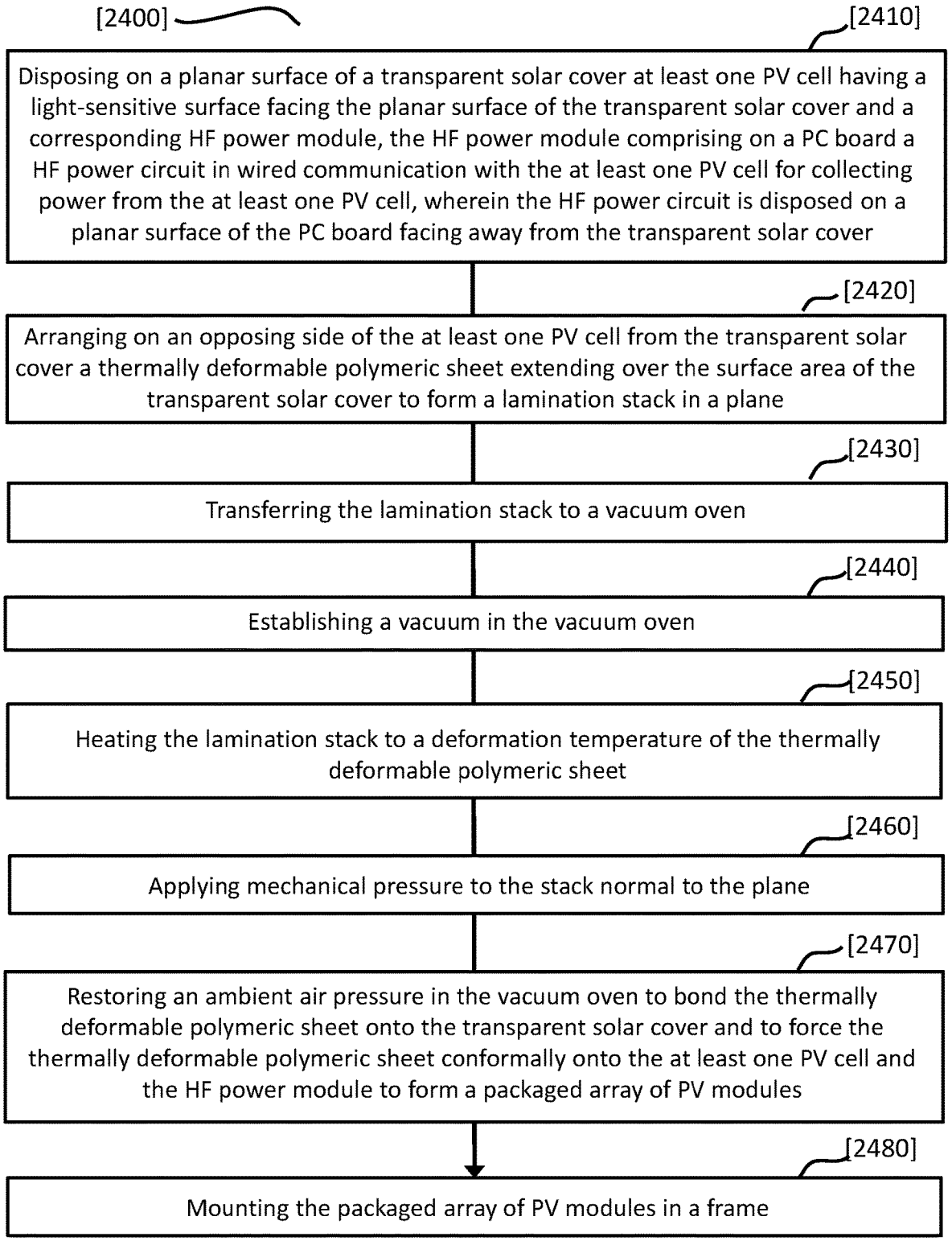
FIG. 45 shows a flow chart of a method for making a solar panel.

A method [2400], described with reference to the flow chart in FIG. 45, is provided for making solar panel 3400, 3400', 3400", the method comprising: disposing [2410] on a planar surface of transparent solar cover 3440 at least one photovoltaic cell 3420 having a light-sensitive surface facing the planar surface of transparent solar cover 3440 and corresponding high frequency power module 3019 comprising on printed circuit board (PC board) 3024 high frequency power circuit 3016 in wired communication with the at least one photovoltaic cell 3420 for collecting power from the at least one photovoltaic cell 3420, wherein high frequency power circuit 3016 is disposed on a planar surface of PC board 3024 facing away from transparent solar cover 3440; arranging [2420] on an opposing side of the at least one photovoltaic cell 3420 from the transparent solar cover a thermally deformable polymeric sheet 3150 extending over the surface area of the transparent solar cover to form lamination stack 3410, 3410' in a plane; transferring [2430] lamination stack 3410, 3410' to a vacuum oven; establishing [2440] a vacuum in the vacuum oven to remove air between layers of lamination stack 3410; heating [2450] lamination stack 3410, 3410' to a deformation temperature of thermally deformable polymeric sheet 3150; applying [2460] mechanical pressure to the stack normal to the plane; restoring [2470] ambient air pressure in the vacuum oven to bond thermally deformable polymeric sheet 3150 onto the transparent solar cover and to force thermally deformable polymeric sheet 3150 conformally onto the at least one photovoltaic cell 3420 and high frequency power module 3019 to form a packaged array of photovoltaic modules; and mounting [2480] the packaged array of photovoltaic modules 3220 in frame 3460.

The method [2400] may further comprise disposing transparent thermally cross-linkable polymer sheet 3154 on transparent solar cover 3440 before disposing on the transparent solar cover the at least one photovoltaic cell 3420 and high frequency power module 3019.

Arranging [2420] the thermally deformable polymeric sheet may comprise arranging thermally deformable cross-linkable polymer sheet 3154. Arranging the thermally deformable cross-linkable polymer sheet may comprise arranging a sheet comprising one or more layers of one or more of polyethylene terephthalate; biaxially oriented polyethylene terephthalate; ethylene vinyl acetate; fluorinated polyester; polyvinyl fluoride; polyvinylidene fluoride; polyethylene vinyl acetate; polyethylene naphthalate; ethylene tetrafluoroethylene; fluoroethylene vinyl ether; tetrafluoroethylene hexafluoropropylene vinylidene fluoride copolymer; polyamide; polypropylene; polyethylene; and polyvinylidene fluoride-short sugar palm fiber.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements may be physical, logical, or a combination thereof; elements which are integrally formed may be considered to be connected or coupled;
"wired", "via a wired connection", or any variant thereof, means any physical connection via conductive medium, intermediate circuitry, or other means allowing for flow of an electric current between, though, or across components of a system;
"electric communication", "electrical communication", or any variant thereof, means any connection, coupling, interface, or other means for communication, hardwired, wireless, or a combination thereof, suitable to transfer of an electric signal between through or across components of a system;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms;
"simultaneous" and variations thereof may include the meaning simultaneous, substantially simultaneous, and/or concurrent.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments include various operations, which are described herein. These operations may be performed by hardware components, software, firmware, or a combination thereof.

Certain embodiments may be implemented as a computer program product that may include instructions stored on a machine-readable medium. These instructions may be used to program a general-purpose or special-purpose processor to perform the described operations. A machine-readable medium includes any mechanism for storing information in a form (for example, software or a processing application) readable by a machine (for example, a computer). The machine-readable medium may include, but is not limited to, magnetic storage medium (e for example, floppy diskette); optical storage medium (for example, CD-ROM); magneto-optical storage medium; read-only memory (ROM); random-access memory (RAM); erasable programmable memory (for example, EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Computer processing components used in implementation of various embodiments include one or more general-purpose processing devices such as a microprocessor or central processing unit, a controller, graphical processing unit (GPU), cell computer, or the like. Alternatively, such digital processing components may include one or more special-purpose processing devices such as a digital signal processor (DSP), an application specific integrated circuit (ASIC), a field programmable gate array (FPGA), or the like. In some embodiments, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Where a component (for example, a software module, processor, assembly, device, circuit, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments.

Specific examples of systems, methods and apparatus have been described herein for purposes of illustration. These are only examples. The technology provided herein may be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The invention claimed is:

1. A power transfer system to transfer power between a DC source and a variable load, the system comprising:
    first and second self-synchronous radio frequency rectifiers/amplifiers configured to extract first and second high frequency (HF) power signals from the DC source at respectively first and second frequencies;
    an HF power link system configured to receive and mix the first and second HF power signals to produce a transferred power signal; and
    a power signal conversion circuit in communication with the HF power link system and the variable load and configured to produce, based at least in part on the transferred power signal, an output power signal and supply the output power signal to the variable load.

2. The system of claim 1, further comprising an HF switching signal generator configured to supply first and second switching signals to the first and second rectifiers/amplifiers at the respective first and second frequencies and to establish and control a mutual phase relationship between the first and second switching signals.

3. The system of claim 2, wherein the power signal conversion circuit comprises:
    a switched mode rectifier configured to receive the transferred power signal from the HF power link system and rectify the transferred power signal to produce a rectified power signal; and
    an unfolding circuit configured to receive the rectified power signal from the switched mode rectifier and unfold the rectified power signal to produce the output power signal.

4. The system of claim 3, wherein the first and second self-synchronous radio frequency rectifiers/amplifiers are configured to operate in a rectifying mode and the switched mode rectifier is configured to operate in an always-on mode, thereby allowing power to be extracted from the variable load and transferred to the DC source via the power signal conversion circuit and the HF power link system.

5. The system of claim 2, wherein:
    the first and second frequencies are the same frequency; and
    the first and second switching signals have a mutual phase difference adjustable by the HF switching signal generator.

6. The system of claim 5, wherein the HF switching signal generator is configured to adjust the mutual phase difference between the first and second switching signals based on a DC level in the variable load to thereby produce from the HF power link system the transferred power signal as a DC signal correspondingly adjusted in amplitude.

7. The system of claim 5, wherein the HF switching signal generator is configured to modulate, based at least in part on a modulation function, the mutual phase difference between the first and second switching signals at a phase modulation frequency that is derived from a frequency of a power signal in the variable load to thereby produce from the HF power link system the transferred power signal as an AC power signal modulated at the frequency of the power signal in the variable load.

8. The system of claim 2, wherein the first and second frequencies differ by a difference frequency.

9. The system of claim 8, wherein the HF switching signal generator is configured to determine the first and second frequencies and to set the difference frequency to double the frequency of the power signal in the variable load.

10. The system of claim 8, wherein:
the HF power link system is configured to produce the transferred power signal at the difference frequency; and
the power signal conversion circuit is configured to supply the output power signal to the variable load at the frequency of the power signal in the variable load.

11. The system of claim 1, wherein the HF power link system comprises a wireless power link.

12. The system of claim 11, wherein the wireless HF power link system comprises a bimodal wireless HF power link system.

13. The system of claim 1, wherein the HF power link system comprises a wired HF power link.

14. A method for transferring power between a DC source and a variable load, the method comprising:
extracting, from the DC source at first and second high frequency (HF) frequencies, corresponding first and second HF power signals via corresponding first and second self-synchronous radio frequency rectifiers/amplifiers;
receiving and mixing, in an HF power link system, the first and second HF power signals to produce a transferred power signal;
producing, in a power signal conversion circuit in communication with the HF power link system and the variable load, an output power signal based at least in part on the transferred power signal; and
supplying the output power signal to the variable load.

15. The method of claim 14, further comprising:
generating, in an HF switching signal generator in communication with the first and second rectifiers/amplifiers, first and second switching signals at the respective first and second frequencies; and
establishing and controlling, in the HF switching signal generator, a mutual phase relationship between the first and second switching signals.

16. The method of claim 14, further comprising:
receiving and rectifying, in a switched mode rectifier of the power signal conversion circuit, the transferred power signal from the HF power link system; and
receiving and unfolding, in an unfolding circuit of the power signal conversion circuit, the rectified power signal from the switched mode rectifier.

17. The method of claim 16, further comprising:
setting the first and second self-synchronous radio frequency rectifiers/amplifiers to a rectifying mode;
setting the switched mode rectifier to an always-on mode, extracting power from the variable load; and
transferring the extracted power to the DC source via the power signal conversion circuit and the HF power link system.

18. The method of claim 15, wherein the transferring the power signal in the HF power link system comprises wirelessly transferring the power signal.

19. The method of claim 18, wherein the wirelessly transferring the power signal in the HF power link system comprises bimodally and wirelessly transferring the power signal.

20. The method of claim 15, wherein the transferring the power signal in the HF power link system comprises transferring the power signal via a wired connection.

21. The method of claim 15, wherein the first and second frequencies of the first and second switching signals are the same frequency; and the first and second switching signals have a mutual phase difference adjustable by the HF switching signal generator.

22. The method of claim 21, further comprising adjusting the mutual phase difference between the first and second switching signals based on a DC level in the variable load to produce from the HF power link system the transferred power signal as a DC signal correspondingly adjusted in amplitude.

23. The method of claim 21, further comprising modulating, based at least in part on a modulation function, the mutual phase difference between the first and second switching signals at a phase modulation frequency that is derived from a frequency of a power signal in the variable load to produce from the HF power link system the transferred power signal as an AC power signal modulated at the frequency of the power signal in the variable load.

24. The method of claim 15 further comprising:
determining the first and second frequencies of the corresponding first and second switching signals; and
setting the difference frequency equal to double the frequency of the power signal in the variable load.

25. The method of claim 24, further comprising:
producing the transferred power signal from the HF power link system at the difference frequency; and
supplying the output power signal to the variable load at the frequency of the power signal in the variable load.

* * * * *